United States Patent
Hogan et al.

(10) Patent No.: US 8,781,863 B2
(45) Date of Patent: *Jul. 15, 2014

(54) AUTOMATION OF AUDITING CLAIMS

(71) Applicant: HyperQuest, Inc., Buffalo Grove, IL (US)

(72) Inventors: Dennis M. Hogan, Spring Grove, IL (US); Jeffrey J. Hogan, Glenview, IL (US)

(73) Assignee: HyperQuest, Inc., Buffalo Grove, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/779,403

(22) Filed: Feb. 27, 2013

(65) Prior Publication Data
US 2013/0173313 A1    Jul. 4, 2013

Related U.S. Application Data

(60) Division of application No. 13/610,972, filed on Sep. 12, 2012, now Pat. No. 8,447,638, which is a continuation of application No. 12/474,450, filed on May 29, 2009, now Pat. No. 8,346,577.

(51) Int. Cl.
G06Q 40/00 (2012.01)
G06Q 40/08 (2012.01)

(52) U.S. Cl.
CPC ..................................... G06Q 40/08 (2013.01)
USPC .................................. 705/4; 705/35; 705/39

(58) Field of Classification Search
CPC ................................................... G06Q 40/08
USPC .......................................................... 705/4
See application file for complete search history.

(56) References Cited

U.S. PATENT DOCUMENTS

| 5,128,859 A | 7/1992 | Carbone et al. |
| 5,432,904 A | 7/1995 | Wong |
| 5,715,468 A | 2/1998 | Budzinski |

(Continued)

FOREIGN PATENT DOCUMENTS

| CA | 2312639 A1 | 12/2000 |
| WO | WO 01/39008 A1 | 5/2001 |
| WO | WO 2007/127226 A3 | 1/2008 |
| WO | WO 2008/054722 A3 | 5/2008 |

OTHER PUBLICATIONS

"buyings.net:EACC Has Also Been Added to Naked Short List Today", M2 Presswire, Conventry: Apr. 17, 2007. p. 1.*

(Continued)

*Primary Examiner* — Hai Tran
(74) *Attorney, Agent, or Firm* — Miles & Stockbridge P.C.; James T. Carmichael

(57) ABSTRACT

Described are computer-based methods and apparatuses, including computer program products, for automation of auditing claims. A data file is received comprising one or more auditable items, each auditable item comprising a word string having one or more words. Each word string for each auditable item is translated using one or more translation steps into a translated item description. Each translated item description is compared to a plurality of terms to generate matching information. Each translated item description is associated with an item identifier based on the matching information. Each auditable item is accepted or rejected based on the item identifier and one or more rules associated with the data file.

22 Claims, 105 Drawing Sheets

(56) References Cited

U.S. PATENT DOCUMENTS

| | | | |
|---|---|---|---|
| 5,839,112 A | 11/1998 | Schreitmueller et al. | |
| 5,950,169 A * | 9/1999 | Borghesi et al. | 705/4 |
| 6,076,088 A * | 6/2000 | Paik et al. | 1/1 |
| 6,081,774 A | 6/2000 | De Hita et al. | |
| 6,185,540 B1 | 2/2001 | Schreitmueller et al. | |
| 6,338,045 B1 | 1/2002 | Pappas | |
| 6,484,150 B1 * | 11/2002 | Blinn et al. | 705/26.81 |
| 6,523,021 B1 | 2/2003 | Monberg et al. | |
| 6,778,979 B2 | 8/2004 | Grefenstette et al. | |
| 6,782,510 B1 | 8/2004 | Gross et al. | |
| 6,792,410 B1 | 9/2004 | Donovan et al. | |
| 6,842,730 B1 | 1/2005 | Ejerhed et al. | |
| 6,910,017 B1 | 6/2005 | Woo et al. | |
| 6,910,024 B2 | 6/2005 | Krishnamurthy et al. | |
| 7,010,494 B2 | 3/2006 | Etzioni et al. | |
| 7,110,960 B2 | 9/2006 | Phillips et al. | |
| 7,194,406 B2 | 3/2007 | Ejerhed et al. | |
| 7,249,114 B2 | 7/2007 | Burchetta et al. | |
| 7,299,228 B2 | 11/2007 | Cao et al. | |
| 7,337,149 B2 | 2/2008 | Blouin et al. | |
| 7,343,307 B1 | 3/2008 | Childress | |
| 7,546,291 B2 | 6/2009 | Selca et al. | |
| 7,596,512 B1 * | 9/2009 | Raines et al. | 705/26.61 |
| 7,680,867 B2 | 3/2010 | Green et al. | |
| 7,783,644 B1 * | 8/2010 | Petrou et al. | 707/748 |
| 7,912,705 B2 | 3/2011 | Wasson et al. | |
| 7,945,478 B2 | 5/2011 | Hogan et al. | |
| 7,970,621 B2 | 6/2011 | Crooks et al. | |
| 8,073,718 B2 | 12/2011 | Hogan et al. | |
| 2002/0007289 A1 | 1/2002 | Malin et al. | |
| 2002/0016655 A1 | 2/2002 | Joao | |
| 2002/0035488 A1 | 3/2002 | Aquila et al. | |
| 2002/0049618 A1 | 4/2002 | McClure et al. | |
| 2002/0073051 A1 | 6/2002 | Blouin et al. | |
| 2002/0082849 A1 | 6/2002 | Tenorio | |
| 2002/0087408 A1 | 7/2002 | Burnett | |
| 2002/0147630 A1 | 10/2002 | Rose et al. | |
| 2002/0188467 A1 | 12/2002 | Eke | |
| 2003/0028404 A1 | 2/2003 | Herron et al. | |
| 2003/0050843 A1 | 3/2003 | Onoue | |
| 2003/0154111 A1 | 8/2003 | Dutra et al. | |
| 2003/0171959 A1 | 9/2003 | Galloway | |
| 2003/0172008 A1 | 9/2003 | Hage et al. | |
| 2004/0034566 A1 | 2/2004 | Nagata | |
| 2004/0044549 A1 | 3/2004 | Loop | |
| 2004/0093241 A1 | 5/2004 | Stone et al. | |
| 2004/0111302 A1 | 6/2004 | Falk et al. | |
| 2004/0153346 A1 | 8/2004 | Grundel et al. | |
| 2004/0243423 A1 * | 12/2004 | Rix et al. | 705/1 |
| 2004/0243583 A1 | 12/2004 | Olsen | |
| 2004/0254929 A1 | 12/2004 | Isaac | |
| 2005/0004819 A1 | 1/2005 | Etzioni et al. | |
| 2005/0010454 A1 * | 1/2005 | Falk et al. | 705/4 |
| 2005/0075912 A1 | 4/2005 | Bealke et al. | |
| 2005/0125261 A1 * | 6/2005 | Adegan | 705/4 |
| 2005/0125311 A1 | 6/2005 | Chidiac | |
| 2005/0171867 A1 | 8/2005 | Doonan et al. | |
| 2005/0177527 A1 | 8/2005 | Morris et al. | |
| 2005/0187834 A1 | 8/2005 | Painter et al. | |
| 2005/0197897 A1 | 9/2005 | Veit et al. | |
| 2005/0289007 A1 | 12/2005 | Glebe | |
| 2006/0010172 A1 | 1/2006 | Grigoriadis et al. | |
| 2006/0036516 A1 | 2/2006 | Glebe | |
| 2006/0064393 A1 | 3/2006 | Orr | |
| 2006/0106653 A1 | 5/2006 | Lis | |
| 2006/0129440 A1 | 6/2006 | Frauenhoffer et al. | |
| 2006/0190342 A1 | 8/2006 | Dendl et al. | |
| 2006/0195370 A1 | 8/2006 | Howarth | |
| 2006/0242089 A1 | 10/2006 | Vahidi et al. | |
| 2007/0050311 A1 | 3/2007 | Mohr et al. | |
| 2007/0074131 A1 | 3/2007 | Assadollahi | |
| 2007/0106499 A1 | 5/2007 | Dahlgren et al. | |
| 2007/0124216 A1 | 5/2007 | Lucas | |
| 2007/0179868 A1 | 8/2007 | Bozym | |
| 2007/0179869 A1 | 8/2007 | Cochrum | |
| 2007/0219982 A1 | 9/2007 | Piper et al. | |
| 2007/0250415 A1 | 10/2007 | Wilch | |
| 2007/0295800 A1 | 12/2007 | Staats | |
| 2008/0097796 A1 | 4/2008 | Birchall | |
| 2008/0103806 A1 | 5/2008 | Harris | |
| 2008/0109128 A1 * | 5/2008 | Littooy et al. | 701/29 |
| 2008/0243556 A1 | 10/2008 | Hogan et al. | |
| 2008/0255887 A1 | 10/2008 | Gruter | |
| 2008/0281658 A1 | 11/2008 | Siessman | |
| 2009/0150200 A1 | 6/2009 | Siessman | |
| 2009/0259670 A1 | 10/2009 | Inmon | |
| 2010/0114561 A1 | 5/2010 | Yasin | |
| 2010/0169353 A1 | 7/2010 | Soetaman | |
| 2010/0257082 A1 | 10/2010 | Foster | |
| 2010/0305941 A1 | 12/2010 | Hogan et al. | |
| 2010/0305977 A1 | 12/2010 | Hogan et al. | |
| 2010/0305978 A1 | 12/2010 | Hogan et al. | |
| 2012/0059678 A1 | 3/2012 | Hogan et al. | |
| 2012/0310632 A1 | 12/2012 | Hogan et al. | |
| 2012/0316867 A1 | 12/2012 | Hogan et al. | |
| 2013/0006605 A1 | 1/2013 | Hogan et al. | |
| 2013/0006614 A1 | 1/2013 | Hogan et al. | |

OTHER PUBLICATIONS

Audatex in the crunch [automobile insurance damage system] Dentay, E. Source: *Computer Data*, v 5, n 11, 46, Nov. 1980.

Vehicle parts information system combined with maintenance information management system, IPCOM000160581D, Nov. 21, 2007.

Third Party component discovery and recall notification, IPCOM000176380D, Nov. 14, 2008.

The Shake-Up in Car Insurance, Henry, Ed. *Money*. New York: Sep. 1978. vol. 7, Iss. 9; p. 77.

Shifting gears: aftermarket auto parts [Legal action against insurance companies in the US for alleged unauthorized use of aftermarket parts in vehicle repair have bubbled up into Canada], Carr, David. *Canadian Underwriter*. Don Mills: May 2000. vol. 67, Iss. 5; p. 16.

Auto Insurers Could Save Millions in Claims, Haggerty, Alfred G.. *The National Underwriter*. (Property & Casualty Insurance Edition). Cincinnati: Nov 22, 1985. vol. 89, Iss. 47; p. 50, 2 pgs.

Body/Repair Shop Visits to Determine Distribution of Replacement Parts Sources, Jordan, W. A.; Godley, C. J. (Associated Management Services, Inc., Oxon Hill, MD.) Sponsor: National Highway Traffic Safety Administration, Washington, DC., 28p, Oct. 1989.

Adaptive Quality Assurance (AquA) method and system, IPCOM000190336D, Nov. 24, 2009.

An Overview of recent literature of spare parts inventories, Kennedy et al., International Journal of Production Economics 76, 201-215, 2002.

Written Opinion of the International Searching Authority dated Apr. 8, 2008 for PCT/US2007/022879 filed Aug. 4, 2008, 4 pgs.

"buyins.net:EACC Has Also Been Added to Naked Short List Today", M2 Presswire, pp. 1-2, Apr. 17, 2007.

Y. Ravin and N. Wacholder, "Extracting names from natural-language text." IBM Research Report 20338, IBM Research Division, Apr. 10, 1997.

Nonfinal Office Action dated Aug. 16, 2010, in U.S. Appl. No. 12/726,221.

Final Rejection dated Sep. 30, 2010, in U.S. Appl. No. 12/726,221.

Nonfinal Office Action dated Oct. 6, 2010, in U.S. Appl. No. 11/928,570.

Final Office Action dated Mar. 22, 2011, in U.S. Appl. No. 11/928,570.

Notice of Allowance dated Apr. 4, 2011, in U.S. Appl. No. 12/726,221.

Nonfinal Office Action dated May 25, 2011, in U.S. Appl. No. 12/474,472.

Notice of Allowance dated Sep. 28, 2011, in U.S. Appl. No. 12/474,472.

Nonfinal Office Action dated Nov. 4, 2011, in U.S. Appl. No. 12/474,450.

Nonfinal Office Action dated Jan. 25, 2012, in U.S. Appl. No. 12/474,482.

Nonfinal Office Action dated Jan. 27, 2012, in U.S. Appl. No. 12/474,454.

(56) References Cited

OTHER PUBLICATIONS

Final Office Action dated Apr. 6, 2012, in U.S. Appl. No. 12/474,450.
Nonfinal Office Action dated Apr. 6, 2012, in U.S. Appl. No. 13/296,427.
Notice of Allowance dated Jun. 12, 2012, in U.S. Appl. No. 12/474,482.
Notice of Allowance dated Jul. 12, 2012, in U.S. Appl. No. 12/474,450.
Final Rejection dated Sep. 11, 2012, in U.S. Appl. No. 12/474,454.
Nonfinal Office Action dated Oct. 16, 2012, in U.S. Appl. No. 13/588,253.
Nonfinal Office Action dated Oct. 24, 2012, in U.S. Appl. No. 13/610,972.
Final Rejection dated Nov. 15, 2012, in U.S. Appl. No. 13/296,427.
Nonfinal Office Action dated Nov. 27, 2012, in U.S. Appl. No. 13/602,980.
Nonfinal Office Action dated Dec. 27, 2012, in U.S. Appl. No. 13/584,448.
Notice of Allowance dated Feb. 1, 2013, in U.S. Appl. No. 13/610,972.
Notice of Allowance dated Feb. 1, 2013, in U.S. Appl. No. 12/474,454.
Notice of Allowance dated Mar. 1, 2013, in U.S. Appl. No. 13/588,253.
Final Rejection dated Mar. 13, 2013, in U.S. Appl. No. 13/602,980.
Notice of Allowance dated Apr. 11, 2013, in U.S. Appl. No. 13/296,427.
Notice of Allowance dated Jul. 18, 2013, in U.S. Appl. No. 13/602,980.

* cited by examiner

| MAKE | SINGLE REL. | MODEL WORD 1 | MODEL WORD 2 | MAKE CONSTRAINT 1 | MAKE CONSTRAINT 2 |
|---|---|---|---|---|---|
| AUDI | ALLROAD | ALL, AL | ROAD, ROA, RD | | |
| BUICK | SKYLARK | SKY, SK | HAWK, HAW | | |
| CHEVROLET | C 30 PICKUP | 30 | C | MERCEDES, MERC, MERCEDEZ, MERZ, MRCDS, MERCEDE, MERCED, MERCE, MERB, MRCDE | BENZ, B, BNZ, BEN, BE |
| FORD | WINDSTAR | WIND, WIN, WI, WND | STAR, STA | | |
| PONTIAC | FIREFLY | FIRE, FIR, FI | FLY, FL | | |
| SATURN | L SERIES | LS | 1 | | |
| VOLKSWAGEN | EUROVAN | EURO, URO, EUR, EU | VAN, VA | | |
| OLDSMOBILE | CIERA | CUTLAS, CTLSS, CTLS, CUTLAS, CUTLA, CUTL | CIERA, CIER, CIE, CIARA | | |
| CHRYSLER | CROSSFIRE | CROSS, CROS, X | FIRE, FIR, FI, FR | | |
| MAZDA | MPV | MPV | VAN, VA | | |
| NISSAN | NX | PULSAR, PULSA, PULS | NX, X, N | | |

FIG. 6A

| MAKE | DUAL WORD REL. | MODEL WORD 1 |
|---|---|---|
| BUICK | PARK AVENUE | PARKAVENUE, PARKAVENU, PARKAVEN, PARKAVE, PARKAV |
| CHEVROLET | CAMARO Z | CAMAROZ |
| FORD | BRONCO II | BRONCOII, BRNCOII |
| ISUZU | I MARK | IMARK, IMAR |
| LAND ROVER | LAND ROVER | LANDROVER, LANDROVE, LANDROV, LANDRO |
| LINCOLN | TOWN CAR | TOWNCAR, TOWNCA, TOWNC |
| MITSUBISHI | MONTERO SPORT | MONTEROSPORT, MONTEROSPOR, MONTEROSPO, MONTEROSP |
| OLDSMOBILE | CUSTOM CRUISER | CUSTOMCRUISER, CUSTOMCRUISE, CUSTOMCRUIS, CUSTOMCRUI, CUSTOMCRU |
| OLDSMOBILE | 98 | NINETYEIGHT, NINETYEIGH, NINETYEIG, NINETYEI |
| PLYMOUTH | GRAN FURY | GRANFURY, GRANFUR, GRANFU |
| PONTIAC | GRAND AM | GRANDAM, GRANDA |
| RENAULT | LE CAR | LECAR, LECA, LACAR, LACA |
| TOYOTA | MARK II | MARKII |
| VOLKSWAGEN | KARMANN GHIA | KARMANNGHIA, KARMANNGHI, KARMANNGH, KARMANNG |
| CHRYSLER | E CLASS | ECLASS, ECLAS, ECLA |
| HONDA | DEL SOL | DEL, DELSOL, DELSO |
| GMC | SAVANA | SAVANASPECIAL |

FIG. 6B

| CLASSIFICATION GLOSSARY | CLASSIFICATION ALIAS |
|---|---|
| COUPE | COUPE, CS, CP, CPE, 2 DR, 2 D, 2 DOOR, TWO DOOR, COUP |
| SEDAN | SEDAN, SED, SDN, 4 DR, 4 D, 4 DOOR, FOUR DOOR |
| PICKUP | PICKUP, P U, PKUP, P UP, PICK U, PU, PICK UP, PK UP, PICK-UP, PKP, QUAD, CHSCAB, HARDBODY, PKUPXCB PKUPCREW PKUPQUA, HALF TON, HALFTON, P/U, CREW CAB, XTRACAB |
| WAGON | WAGON, WGN, SW |
| VAN | VAN, CARGO, CHEVYVAN, CUTAWAY, CUTAW, CUTAWA, CUTAW, RAMVAN, CLUBWAGON, CLUB, G32, P |
| SUPERDUTY | SUPERDUTY, SD, HD, HEAVY,SUPER DUTY,SUP DUTY |
| 4 WD | 4 X 4,4x4 |
| 2 WD | 2 X 4, 4 X 2,2x4,4x2 |

| INVALID MAKE TABLE |
|---|
| MOTO, MOT, MO, MOTORHOME, MOTORHOM, MOTORHO, MOTORH |
| AERBUS,AIRBUS,AIRBIS,AERB |
| AIRSTREAM |
| ANGLER |
| BIG DOG |
| BOUNDER,BOUNDAR,BOUNDR |
| BRAVE |
| CHALLENGER |
| COACHMAN,COACHMEM,COACH,COACHM |
| DAMON,DAYMON,DAMAN |
| DOLPHIN,DOLFIN |
| DURCHMEN |
| DUTCHMAN,DUTCH,DUTCHMEN,DUTCHM |
| GULFSTREAM |
| JOURNEY |
| MAJESTIC,MAJEST,MAJESTI |
| NEWMAR,KNEWMAR,NEWMR,NEWMER |
| PRAIRIE SCHNOONER |
| REXALL, RECALL,REXAL |
| SHASTA |
| SOUTHWIND |
| SPORTCOACH |
| STARCHASE |
| SUNCREST |
| TERRY |
| THORN |

| MAKE | MODEL WORD 1 | MODEL WORD 2 |
|---|---|---|
| CHEVROLET | SILVERADO, SIL, SILV, SILVE, SILVER, SILVERA, SILVERAD, SLVDO, SLVRDO, SILVERDOR | |
| GMC | SIERRA, SIERA, SIARA, SIERR, SIER, IERR, IERRA | |
| CHEVROLET | AVALANCHE, AVALA, AVALAN, AVALANC, AVALANCH, AVLNCH, AVALANCE | |
| CHEVROLET | SUBURBAN, SBRN, SBRBN, SUB, SUBU, SUBUR, SUBURB, SUBURBA | |
| GMC | YUKON, YKN, YUK, YUKO, UCON | XL |
| MITSUBISHI | FUSCO, FUSC, FUSO, FUS | |
| MITSUBISHI | RAIDER, RAIDE, RAID, RAYDER, RAYDE, RAI | |
| CHEVROLET | COLORADO, COLORAD, COLORA, COLOR, CALARADO, CALARAD, COLARADO, COLARAD | |
| FORD | ESCALADE, ESCA, ESCAL, ESCALA, ESCALAD | |

FIG. 6E

| MAKE ALIAS WORD 1 | MAKE ALIAS WORD 2 |
|---|---|
| ISUZU, ISUZ, ISU, ISZU, ISZ | |
| JEEP, JEP, JP | |
| MAZDA, MAZD, MAZ, MZDA, MZD | |
| MERCEDES, MERC, MERCEDEZ, MERZ, MRCDS, MERCEDE, MERCED, MERCE, MERB, MRCDE | BENZ, B, BNZ, BEN, BE |
| MITSUBISHI, MITSUBISH, MITSUBIS, MITSUBI, MITSUB, MITSU, MTSB | |
| NISSAN, NISSA, NISAN, NISS, NIS, DATSUN, DATSU, DATS, DATS, DAT, DTSN, NSN | |
| TOYOTA, TOY, TOYO, TOYT | |

| MAKE | MODEL WORD 1 | MODEL WORD 2 | MODEL WORD 3 |
|---|---|---|---|
| CHEVROLET | LUMINAAPV, LUMINAPV | | |
| CHEVROLET | ASTRO, ASTR, AST, ASTROVAN, ASTROVA, ASTROV | | |
| CHRYSLER | TOWN, TWN, TOW | &, AND | COUNTRY, CTRY, CNTRY, COUN, COUNT, COUNTR |
| DODGE | CARAVAN, CRVN, CARA, CARAV, CARAVA, GRANDCARAVAN, GRANDCARAVA, GRANDCARAV, GRANDCARA, GRCARAVAN | | |
| FORD | VILLAGER, VLGR, VLLGR, VILAGER, VILLAGE, VILAGE | | |
| FORD | WINDSTAR, WNDSTR, WINDST, WINDSTA | | |
| GMC | SAFARI, SAFAR | | |
| GMC | SAVANA, SAVANNA, SVNA, SAVVANA, SAVA, SAVAN | | |
| ISUZU | HOMBRE, HOMBR, HMBRE, HMBR | | |
| ISUZU | VEHICROSS, VHCRS, VEHICRS, VEHICROS, VEHICRO, VEHICR | | |
| MAZDA | MPV | | |
| NISSAN | AXXESS, AXESS, AXCESS, AXES, AXXES, AXXE | | |

FIG. 6G

| Make CLASSIFICATION GLOSSARY | Make CLASSIFICATION ALIAS |
|---|---|
| AM | AMERICAN MOTORS |
| AMC | AMERICAN MOTORS |
| GM | GENERAL MOTORS |

| F | I | MFG | MAKE | S | MODEL | ID | SS ID | MODEL SUBSET | MFG 1 | MFG 2 |
|---|---|---|---|---|---|---|---|---|---|---|
| N | 1 | HONDA | ACURA | N | LEGEND | 29 | 5521 | LEGEND SEDAN | HONDA, HOND, HON, HNDA, HND | |
| N | 2 | HONDA | ACURA | | NSX | 39 | | | HONDA, HOND, HON, HNDA, HND | |
| N | 3 | HONDA | ACURA | | RDX | 6457 | | | HONDA, HOND, HON, HNDA, HND | |
| N | 4 | HONDA | ACURA | | SLX | 42 | | | HONDA, HOND, HON, HNDA, HND | |
| N | 5 | HONDA | ACURA | | TL SERIES | 6009 | | | HONDA, HOND, HON, HNDA, HND | |
| N | 6 | HONDA | ACURA | | TSX | 6262 | | | HONDA, HOND, HON, HNDA, HND | |
| N | 7 | HONDA | ACURA | | VIGOR | 5704 | | | HONDA, HOND, HON, HNDA, HND | |
| N | 8 | INFINITI | INFINITI | N | FX SERIES | 6229 | 6231 | FX45 | INFINITI, INFINIT, INFINI, INFIN, INFI, INFINITI, INFNTY | ROMEO, ROME, ROM |

FIG. 6I

| MAKE 1 | MAKE 2 | FIRST WORD | 2 | 3 | 4 | 5 | FIRST WORD | 2 | 3 | 4 | 5 | DUP? |
|---|---|---|---|---|---|---|---|---|---|---|---|---|
| ACURA, ACCU, ACUR, ACURA | | LEGEND, LGND, LEG, LEGE, LEGEN | | | | | LEGEND, LGND, LEG, LEGE, LEGEN | SEDAN | | | | |
| ACURA, ACCU, ACUR, ACURA | | NSX | | | | | | | | | | |
| ACURA, ACCU, ACUR, ACURA | | RDX | | | | | | | | | | |
| ACURA, ACCU, ACUR, ACURA | | SLX | | | | | | | | | | |
| ACURA, ACCU, ACUR, ACURA | | TL, T | | | | | | | | | | |
| ACURA, ACCU, ACUR, ACURA | | TSX | | | | | | | | | | |
| ACURA, ACCU, ACUR, ACURA | | VIGOR, VIG, VIGO | | | | | | | | | | |
| INFINITI, INFINIT, INFINI, INFIN, INFI, INFINITI, INFNTY | | FX, XF | | | | | FX | 45 | | | | |

| ROW # 664 | MAKE 606A | CLAIM 656 | | | MAKE 658A | ESTIMATE BLOCK 658 | | MFG 660A | MAKE 660 | SUPER 662A | MODEL 662 |
|---|---|---|---|---|---|---|---|---|---|---|---|
| | | | MODEL | | | MODEL | | | | | |
| | | SUPER 656B | SUBSET 656C | | | SUPER 658B | SUBSET 658C | | MAKE 660B | | SUBSET 662B |
| | | HIT PERCENTAGE – WEIGHTING 652 | | | | | | PROPOSED TRANSLATION 654 | | | |
| | | | | | | | | | | | |
| | | | | | | | | | | | |
| | | | | | | | | | | | |

| HYPHENATED WORD | WORD |
|---|---|
| BEL-AIRE | BELAIRE |
| CO-OP | COOP |
| CO-OPERATIVE | COOPERATIVE |
| CO-OPERATORS | COOPERATORS |
| EVER-GREEN | EVERGREEN |
| NORTH-EAST | NORTHEAST |
| NORTH-WEST | NORTHWEST |
| PRE-PAID | PREPAID |
| RE-INS | REINSURANCE |
| RE-INSURANCE | REINSURANCE |
| SOUTH-EAST | SOUTHEAST |
| SOUTH-WEST | SOUTHWEST |
| STATE-WIDE | STATEWIDE |

FIG. 8A

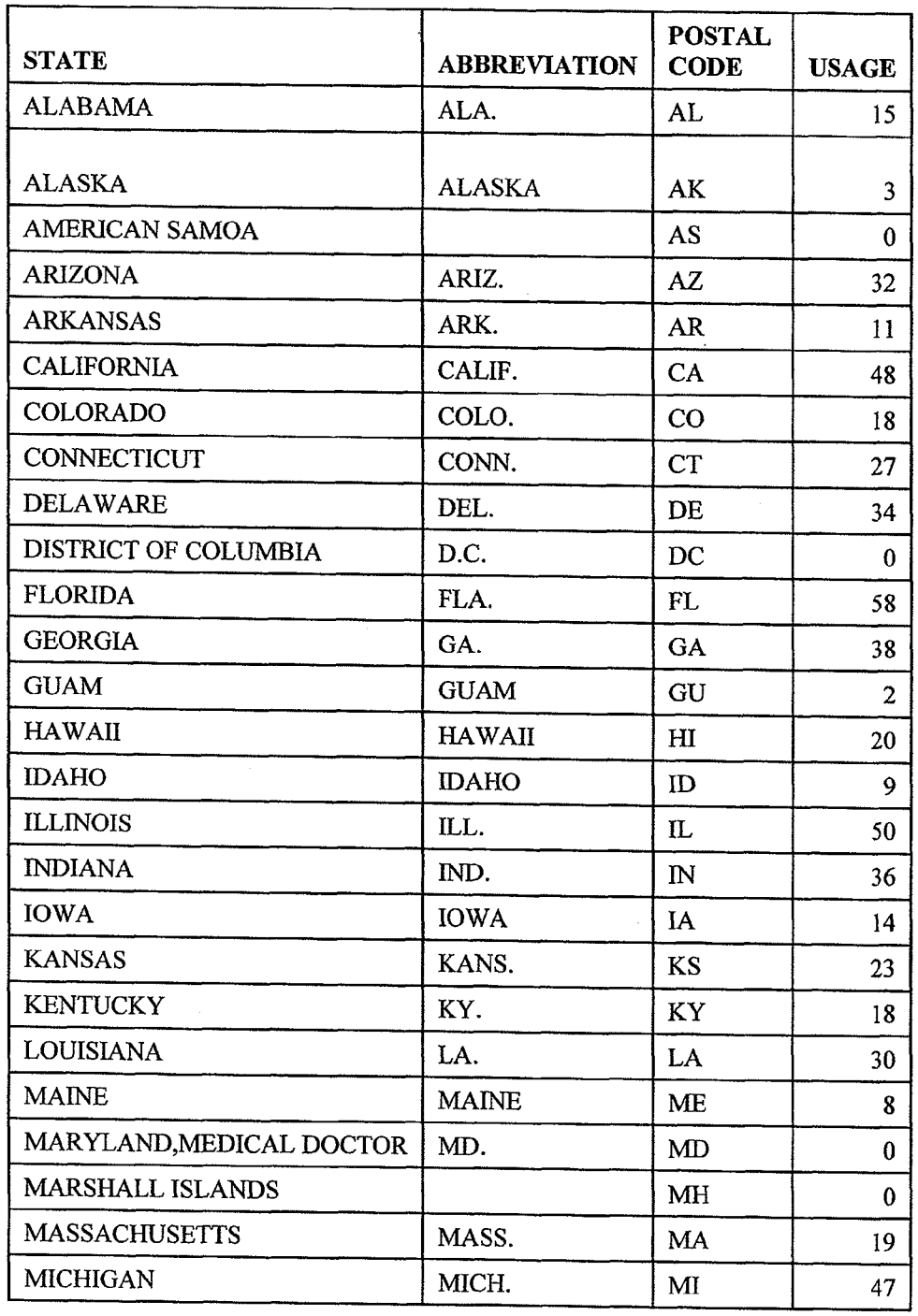

| STATE | ABBREVIATION | POSTAL CODE | USAGE |
|---|---|---|---|
| ALABAMA | ALA. | AL | 15 |
| ALASKA | ALASKA | AK | 3 |
| AMERICAN SAMOA |  | AS | 0 |
| ARIZONA | ARIZ. | AZ | 32 |
| ARKANSAS | ARK. | AR | 11 |
| CALIFORNIA | CALIF. | CA | 48 |
| COLORADO | COLO. | CO | 18 |
| CONNECTICUT | CONN. | CT | 27 |
| DELAWARE | DEL. | DE | 34 |
| DISTRICT OF COLUMBIA | D.C. | DC | 0 |
| FLORIDA | FLA. | FL | 58 |
| GEORGIA | GA. | GA | 38 |
| GUAM | GUAM | GU | 2 |
| HAWAII | HAWAII | HI | 20 |
| IDAHO | IDAHO | ID | 9 |
| ILLINOIS | ILL. | IL | 50 |
| INDIANA | IND. | IN | 36 |
| IOWA | IOWA | IA | 14 |
| KANSAS | KANS. | KS | 23 |
| KENTUCKY | KY. | KY | 18 |
| LOUISIANA | LA. | LA | 30 |
| MAINE | MAINE | ME | 8 |
| MARYLAND,MEDICAL DOCTOR | MD. | MD | 0 |
| MARSHALL ISLANDS |  | MH | 0 |
| MASSACHUSETTS | MASS. | MA | 19 |
| MICHIGAN | MICH. | MI | 47 |

| DICTIONARY | ALIASES | USE IN COMPANY LISTING |
|---|---|---|
| 1 | | 2 |
| 6 | | 1 |
| 99 | | 1 |
| 123 | | 1 |
| 156 | | 1 |
| 210 | | 1 |
| 1997 | | 1 |
| A | | 29 |
| AAA | | 10 |
| AAJS | | 1 |
| AAMBG | | 1 |
| ABBA | | 1 |
| ABRAZO | | 1 |
| ACCIDENT | ACCID,ACC | 26 |

FIG. 8C

| COUNTRY | STATE | CITY/TOWN | REGION/COUNTY | USED AS A GEOGRAPHICAL LOCATION |
|---------|-------|-----------|---------------|--------------------------------|
| | | | | o |
| | | | | o |
| | | | | o |
| | | | | o |
| | | | | o |
| | | | | o |
| | | | | o |
| | | | | o |
| | | | | o |
| | | | | o |
| | | | | o |
| | | | | o |
| | | | | o |
| | | | | o |

| DICTIONARY | ALIASES | USE IN COMPANY LISTING |
|---|---|---|
| COALITION | | 1 |
| COAST | | 7 |
| COASTAL | | 2 |
| COCE | | 1 |
| COD | | 1 |
| COFACE | | 1 |
| COKATO | | 1 |
| COLCHESTER | | 1 |
| COLEMAN | | 1 |
| COLLEGE | | 2 |
| COLLEGIATE | | 1 |
| COLOGNE | | 2 |
| COLONIAL | | 17 |

FIG. 8E

| COUNTRY | STATE | CITY/TOWN | REGION/COUNTY | USED AS A GEOGRAPHICAL LOCATION |
|---|---|---|---|---|
| | | | COAST | 0 |
| | | | COASTAL | 0 |
| | | | | 0 |
| | | COKATO | | 0 |
| | | COLCHESTER | | 0 |
| | | COLEMAN | | 0 |
| | | | | 0 |
| | | COLOGNE | | 0 |
| | | | | 0 |
| | | | | 0 |

| Col. 1 | Col. 2 | Col. 3 | Col. 4 | Col. 5 | Col. 6 | Col. 7 |
|---|---|---|---|---|---|---|
| KEY | PARENT COMPANY NAME | PARENT INDEX | COMPANY CODE | NAME IN ONE STRING | PARENT INDEX | COMPANY NUMBER |
| 210 | HBW HOLDINGS GROUP | 103130 | 35700 | HBW HOLDINGS GROUP | 103130 | 0 |
| A CENTRAL | CENTRAL SERVICES GROUP | 101560 | 11105 | 0 | - | 0 |
|  | CENTRAL SERVICES GROUP | 101560 | 11105 | ABN AMRO HOLDING N.V | 100050 | 0 |
| AAA | AAA FEDERATED MOTOR CLUBS | 100020 |  | N/A | 104570 | 0 |
|  | AAA FEDERATED MOTOR CLUBS | 100020 |  | 0 | - | 0 |
|  | AAA FEDERATED MOTOR CLUBS | 100020 | 71854 | 0 | - | 0 |
|  | AAA FEDERATED MOTOR CLUBS | 100020 | 10675 | WR BERKLEY CORPORATION | 107340 | 98 |
|  | AAA FEDERATED MOTOR CLUBS | 100020 | 42960 | 0 | - | 0 |
|  | AAA FEDERATED MOTOR CLUBS | 100020 | 11329 | 0 | - | 0 |
|  | AAA FEDERATED MOTOR CLUBS | 100020 |  | 0 | - | 0 |

| Col. 8 | Col. 9 | Col. 10 | Col. 11 | Col. 12 | Col. 13 | Col. 14 |
|---|---|---|---|---|---|---|
| FEIN | COMPANY STATUS | STATE OF DOMICILE | FIRST POSITION | SECOND POSITION | THIRD POSITION | FOURTH POSITION |
|  |  | 0 | 210 | HOME | BUYERS | WARRANTY |
| 16-1598412 | 1 | VERMONT | AAJS | REINSURANCE | CORPORATION | 0 |
|  |  | VERMONT | AAMBG | REINSURANCE | INCORPORATED | 0 |
|  |  | TEXAS | ABBA | INDEMNITY | COMPANY | 0 |
|  |  | ARIZONA | ABRAZO | ADVANTAGE | HEALTH | PLAN |
|  |  | WISCONSIN | ABRI | HEALTH | PLAN | INCORPORATED |
| 52-0891929 | 1 | VERMONT | ABS | BOILER | AND | MARINE |
| 23-2866784 | 1 | MAINE | ACADIA | INSURANCE | COMPANY | 0 |
| 23-2639473 | 1 | LOUISIANA | AACADIAN | LIFE | INSURANCE | COMPANY |
|  |  | VERMONT | ACBG | RISK | RETENTION | GROUP |
|  |  | 0 | ACC | CONSUMER | FINANCE | SAN |

FIG. 8H

| Col. 15 | Col. 16 | Col. 17 | Col. 18 |
|---|---|---|---|
| FIFTH POSITION | SIXTH POSITION | SEVENTH POSITION | EIGHTH POSITION |
| OF | VIRGINIA | 0 | 0 |
| 0 | 0 | 0 | 0 |
| 0 | 0 | 0 | 0 |
| INCORPORATED | 0 | 0 | 0 |
| 0 | 0 | 0 | 0 |
| INSURANCE | COMPANY | 0 | 0 |
| 0 | 0 | 0 | 0 |
| 0 | 0 | 0 | 0 |
| INCORPORATED | 0 | 0 | 0 |
| DIEGO | CALIFORNIA | 0 | 0 |

| Col. 19 | Col. 20 | Col. 21 | Col. 22 | Col. 23 |
|---|---|---|---|---|
| NINTH POSITION | TENTH POSITION | ELEVENTH POSITION | TWELFTH POSITION | WORD COUNT |
| 0 | 0 | 0 | 0 | 6 |
| 0 | 0 | 0 | 0 | 3 |
| 0 | 0 | 0 | 0 | 3 |
| 0 | 0 | 0 | 0 | 3 |
| 0 | 0 | 0 | 0 | 5 |
| 0 | 0 | 0 | 0 | 4 |
| 0 | 0 | 0 | 0 | 6 |
| 0 | 0 | 0 | 0 | 3 |
| 0 | 0 | 0 | 0 | 4 |
| 0 | 0 | 0 | 0 | 5 |
| 0 | 0 | 0 | 0 | 6 |

| Col. 24 | Col. 25 | Col. 26 | Col. 27 |
|---|---|---|---|
| FINAL REVIEW | 1/3 | APPX. FIRST THIRD WEIGHT | APPX. SECOND THIRD WEIGHT |
| 1 | 2 | 10 | 7 |
| 10 | 1 | 0 | 10 |
| 10 | 1 | 0 | 10 |
| 10 | 1 | 0 | 10 |
| 1 | 1.7 | 5.2 | 14 |
| 1 | 1.3 | 4 | 16 |
| 1 | 2 | 4 | 17 |
| 1 | 1 | 1 | 10 |
| 1 | 1.3 | 4 | 16 |
| 1 | 1.7 | 8 | 14 |
| 1 | 2 | 6 | 10 |

| Col. 28 | Col. 29 | Col. 30 | Col. 31 | Col. 32 |
|---|---|---|---|---|
| APPX. THIRD THIRD WEIGHT | FIRST THIRD APPEARS IN | FIRST POSITION OF LOCATION WORD IN STRING | NUMBER OF LOCATION WORDS | THIRD OF STRING WITH LOCATION WORDS |
| 18 | 1 | 6 | 1 | 3 |
| 10 | 2 | 0 | 0 | 0 |
| 10 | 2 | 0 | 0 | 0 |
| 10 | 2 | 0 | 0 | 0 |
| 11 | 1 | 0 | 0 | 0 |
| 19 | 1 | 0 | 0 | 0 |
| 20 | 1 | 0 | 0 | 0 |
| 10 | 1 | 0 | 0 | 0 |
| 19 | 1 | 0 | 0 | 0 |
| 11 | 1 | 0 | 0 | 0 |
| 12 | 1 | 4 | 3 | 2 |

| Col. 1 | Col. 2 | Col. 3 | Col. 4 | Col. 5 | Col. 6 | Col. 7 |
|---|---|---|---|---|---|---|
| KEY | PARENT COMPANY NAME | PARENT INDEX | COMPANY CODE | NAME IN ONE STRING | PARENT INDEX | COMPANY NUMBER |
| NATIONAL, HOME | HBW HOLDINGS GROUP | 103130 | 12301 | PROGRESSIVE GROUP | 105590 | 0 |
| | | N/A | 42919 | PROGRESSIVE GROUP | 105590 | 155 |
| | N/A | 104570 | 42919 | PROGRESSIVE GROUP | 105590 | 155 |
| NATIONAL, INCOME | TORCHMARK CORPORATION | 106580 | 42919 | PROGRESSIVE GROUP | 105590 | 155 |
| NATIONAL, MID | BERKSHIRE HATHAWAY | 101210 | 42919 | PROGRESSIVE GROUP | 105590 | 155 |
| NATIONAL, INDEMNITY | BERKSHIRE HATHAWAY | 101210 | 38784 | PROGRESSIVE GROUP | 105590 | 155 |
| NATIONAL, SOUTH | BERKSHIRE HATHAWAY | 101210 | 95005 | 0 | , | 0 |
| NATIONAL, TRUCKERS | N/A | 104570 | 15040 | PROGRESSIVE GROUP | 105650 | 382 |
| NATIONAL, INSURANCE | | N/A | 28711 | ICE HOLDINGS INCORPORATED | 105660 | 3499 |

FIG. 8M

| Col. 8 | Col. 9 | Col. 10 | Col. 11 | Col. 12 | Col. 13 | Col. 14 |
|---|---|---|---|---|---|---|
| FEIN | COMPANY STATUS | STATE OF DOMICILE | FIRST POSITION | SECOND POSITION | THIRD POSITION | FOURTH POSITION |
| 0 | 0 | 0 | PROGRESSIVE | GARDEN | STATE | INSURANCE |
| 0 | 1 | MISSOURI | PROGRESSIVE | NORTHWESTERN | INSURANCE | COMPANY |
| 0 | 1 | NEW YORK | PROGRESSIVE | NORTHWESTERN | INSURANCE | COMPANY |
| 0 | 1 | GEORGIA | PROGRESSIVE | NORTHWESTERN | INSURANCE | COMPANY |
| 91-1187829 | 1 | OHIO | PROGRESSIVE | NORTHWESTERN | INSURANCE | COMPANY |
| 59-1951700 | 1 | INDIANA | PROGRESSIVE | NORTHWESTERN | INSURANCE | COMPANY |
| 93-0863097 | 1 | OREGON | PROVIDENCE | HEALTH | PLAN | 0 |
| 05-0204000 | 1 | ROAD ISLAND | PROVIDENCE | MUTUAL | FIRE | INSURANCE |
| 13-4164015 | 1 | OKLAHOMA | PROVIDENCE | PROPERTY | AND | CASUALTY |

| Col. 15 | Col. 16 | Col. 17 | Col. 18 |
|---|---|---|---|
| FIFTH POSITION | SIXTH POSITION | SEVENTH POSITION | EIGHTH POSITION |
| COMPANY | 0 | 0 | 0 |
| 0 | 0 | 0 | 0 |
| 0 | 0 | 0 | 0 |
| 0 | 0 | 0 | 0 |
| 0 | 0 | 0 | 0 |
| 0 | 0 | 0 | 0 |
| 0 | 0 | 0 | 0 |
| COMPANY | 0 | 0 | 0 |
| INSURANCE | COMPANY | 0 | 0 |

| Col. 24 | Col. 25 | | Col. 26 | Col. 27 |
|---|---|---|---|---|
| FINAL REVIEW | 1/3 | | APPX. FIRST THIRD WEIGHT | APPX. SECOND THIRD WEIGHT |
| 5 | | 1.7 | 12.5 | 13 |
| 5 | | 1.3 | 10.5 | 11 |
| 5 | | 1.3 | 10.5 | 11 |
| 5 | | 1.3 | 10.5 | 11 |
| 5 | | 1.3 | 10.5 | 11 |
| 5 | | 1.3 | 10.5 | 11 |
| 5 | | 1.3 | 10.5 | 11 |
| 5 | | 1 | 5 | 10 |
| 5 | | 1.7 | 12 | 14 |
| 5 | | 2 | 14 | 20 |

| Col. 28 | Col. 29 | Col. 30 | Col. 31 | Col. 32 |
|---|---|---|---|---|
| APPX. THIRD THIRD WEIGHT | FIRST THIRD APPEARS IN | FIRST POSITION OF LOCATION WORD IN STRING | NUMBER OF LOCATION WORDS | THIRD OF STRING WITH LOCATION WORDS |
| 11 | 1 | 2 | 2 | 0 |
| 19 | 2 | 2 | 1 | 2 |
| 19 | 2 | 2 | 1 | 2 |
| 19 | 2 | 2 | 1 | 2 |
| 19 | 2 | 2 | 1 | 2 |
| 19 | 2 | 2 | 1 | 2 |
| 19 | 2 | 2 | 1 | 2 |
| 19 | 2 | 2 | 1 | 2 |
| 10 | 1 | 1 | 1 | 0 |
| 11 | 1 | 1 | 1 | 1 |
| 20 | 1 | 1 | 1 | 1 |

| WORD-1 | WORD-2 | WORD-3 | WORD-4 | WORD-5 | WORD-6 | WORD-7 | WORD-8 | WORD-9 | WORD-10 | WORD-11 | WORD-12 | WORD COUNT |
|---|---|---|---|---|---|---|---|---|---|---|---|---|
| USAGE # | USAGE # | USAGE # | USAGE # | USAGE # | USAGE # | USAGE # | USAGE # | USAGE # | USAGE # | USAGE # | USAGE # | LOC-POSITION |
| Y/N LOCAL | Y/N LOCAL | Y/N LOCAL | Y/N LOCAL | Y/N LOCAL | Y/N LOCAL | Y/N LOCAL | Y/N LOCAL | Y/N LOCAL | Y/N LOCAL | Y/N LOCAL | Y/N LOCAL | 1/3 LOC-POSITION |

| WORD-1 | WORD-2A | WORD-3 | WORD-4 | WORD-5 | WORD-6 | WORD-7 | WORD-8 | WORD-9 | WORD-10 | WORD-11 | WORD-12 | WORD COUNT |
|---|---|---|---|---|---|---|---|---|---|---|---|---|
| USAGE # | USAGE # | USAGE # | USAGE # | USAGE # | USAGE # | USAGE # | USAGE # | USAGE # | USAGE # | USAGE # | USAGE # | LOC-POSITION |
| Y/N LOCAL | Y/N LOCAL | Y/N LOCAL | Y/N LOCAL | Y/N LOCAL | Y/N LOCAL | Y/N LOCAL | Y/N LOCAL | Y/N LOCAL | Y/N LOCAL | Y/N LOCAL | Y/N LOCAL | 1/3 LOC-POSITION |

← 860 ← 862

| WORD-1 | WORD-2B | WORD-3 | WORD-4 | WORD-5 | WORD-6 | WORD-7 | WORD-8 | WORD-9 | WORD-10 | WORD-11 | WORD-12 | WORD COUNT |
|---|---|---|---|---|---|---|---|---|---|---|---|---|
| USAGE # | USAGE # | USAGE # | USAGE # | USAGE # | USAGE # | USAGE # | USAGE # | USAGE # | USAGE # | USAGE # | USAGE # | LOC-POSITION |
| Y/N LOCAL | Y/N LOCAL | Y/N LOCAL | Y/N LOCAL | Y/N LOCAL | Y/N LOCAL | Y/N LOCAL | Y/N LOCAL | Y/N LOCAL | Y/N LOCAL | Y/N LOCAL | Y/N LOCAL | 1/3 LOC-POSITION |

| | 1 | 2 | 3 | 4 | 5 | 6 | 7 | 8 | 9 | 10 | 11 | 12 |
|---|---|---|---|---|---|---|---|---|---|---|---|---|
| 1-10 | 3875 | 1104 | 356 | 204 | 132 | 80 | 22 | 9 | 3 | 0 | 0 | 1 |
| 11-31 | 973 | 684 | 244 | 157 | 141 | 92 | 39 | 17 | 3 | 0 | 0 | 0 |
| 31-49 | 662 | 580 | 260 | 181 | 142 | 75 | 23 | 8 | 3 | 2 | 0 | 0 |
| 50-100 | 616 | 697 | 385 | 177 | 171 | 104 | 59 | 21 | 2 | 1 | 0 | 0 |
| 101-400 | 917 | 1537 | 1077 | 732 | 518 | 359 | 215 | 84 | 28 | 8 | 2 | 0 |
| 401-5000 | 104 | 2503 | 4600 | 4079 | 2027 | 813 | 248 | 58 | 16 | 2 | 2 | 0 |
| TOTAL | 7147 | 7105 | 6922 | 5530 | 3131 | 1523 | 606 | 197 | 55 | 13 | 4 | 1 |
| 1-10 | 54.22% | 15.54% | 5.14% | 3.69% | 4.22% | 5.25% | 3.63% | 4.57% | 5.45% | 0.00% | 0.00% | 100.00% |
| 11-31 | 13.61% | 9.63% | 3.52% | 2.84% | 4.50% | 6.04% | 6.44% | 8.63% | 5.45% | 0.00% | 0.00% | 0.00% |
| 31-49 | 9.26% | 8.16% | 3.76% | 3.27% | 4.54% | 4.92% | 3.80% | 4.06% | 5.45% | 15.38% | 0.00% | 0.00% |
| 50-100 | 8.62% | 9.81% | 5.56% | 3.20% | 5.46% | 6.83% | 9.74% | 10.66% | 3.64% | 7.69% | 0.00% | 0.00% |
| 101-400 | 12.83% | 21.63% | 15.56% | 13.24% | 16.54% | 23.57% | 35.48% | 42.64% | 50.91% | 61.54% | 50.00% | 0.00% |
| 401-5000 | 1.46% | 35.23% | 66.45% | 73.76% | 64.74% | 53.38% | 40.92% | 29.44% | 29.09% | 15.38% | 50.00% | 0.00% |
| % OF WORDS | 100.00% | 99.41% | 96.85% | 77.38% | 43.81% | 21.31% | 8.48% | 2.76% | 0.77% | 0.18% | 0.06% | 0.01% |

FIG. 10A

| | | | | | | |
|---|---|---|---|---|---|---|
| 1044A → | CENTURION | LIFE | INSURANCE | | | |
| 1044B → | CENTURION | CASUALTY | COMPANY | | | |
| 1044C → | CENTURION | INSURANCE | COMPANY | | | |
| 1044D → | CENTURION | LIFE | INSURANCE | COMPANY | | |
| 1044E → | CENTURION | MEDICAL | LIABILITY | PROTECTION | RISK | RETENTION | GROUP |

1040

1042A →

| | TOTAL COUNT | DIFFERENCE IN TOTAL | # OF MATCHES | WEIGHTED MATCH COUNT | WEIGHTED WORD COUNT |
|---|---|---|---|---|---|
| 1046A → | 3 | | | 2 | |
| 1046B → | 3 | 0 | 1 | 1 | 2.3 |
| 1046C → | 3 | 0 | 2 | 1.5 | 2 |
| 1046D → | 4 | -1 | 3 | 2 | 2.5 |
| 1046E → | 7 | -4 | 1 | 1 | 6.24 |

1042B →

| | WEIGHTED MATCH DIFFERENCE | SEQUENCE # COUNT | AVERAGE SEQUENCE # COUNT | CALCULATION |
|---|---|---|---|---|
| 1048A → | | | | |
| 1048B → | -1.3 | 0 | 0 | 3.3 |
| 1048C → | -0.5 | 0 | 0.5 | 2 |
| 1048D → | -0.5 | 0 | 0 | 1.5 |
| 1048E → | -5.24 | 0 | 0 | 11.24 |

FIG. 10C

| | CRUM | FORSTER | INSURANCE | | | |
|---|---|---|---|---|---|---|
| 1064A → | CRUM | FORSTER | AND | INDEMNITY | COMPANY | |
| 1064B → | CRUM | FORSTER | AND | INSURANCE | COMPANY | |
| 1064C → | CRUM | FORSTER | AND | SPECIALTY | INSURANCE | COMPANY |
| 1064D → | CRUM | FORSTER | AND | UNDERWRITERS | COMPANY | |
| 1064E → | CRUM | FORSTER | AND | | OF | OHIO |

1062A →

| | TOTAL COUNT | DIFFERENCE IN TOTAL | # OF MATCHES | WEIGHTED MATCH COUNT | WEIGHTED WORD COUNT |
|---|---|---|---|---|---|
| 1066A → | 3 | | | | 2.5 |
| 1066B → | 5 | -2 | 2 | 2 | 3.8 |
| 1066C → | 5 | -2 | 3 | 2.5 | 3.5 |
| 1066D → | 6 | -3 | 3 | 2.5 | 4.4 |
| 1066E → | 5 | -2 | 2 | 2 | 3.96 |

1062B →

| | WEIGHTED MATCH DIFFERENCE | SEQUENCE # COUNT | AVERAGE SEQUENCE # COUNT | CALCULATION |
|---|---|---|---|---|
| 1068A → | | | | |
| 1068B → | -1.8 | 1.00 | 0.5 | 6.3 |
| 1068C → | -1 | 1.00 | 0.666666667 | 4.7 |
| 1068D → | -1.9 | 1.00 | 1 | 6.9 |
| 1068E → | -1.96 | 1.00 | 0.5 | 6.5 |

FIG. 10D

| DESIGNATOR | TERM 1 | TERM 2 | TERM 3 | TERM 4 | TERM 5 | ORIENT | DESC | NAME |
|---|---|---|---|---|---|---|---|---|
| FRAME | REAR | BODY | LOWER | | | REAR | END | CLIP |
| FRAME | UPPER | HARD | TOP | | | REAR | END | CLIP |
| FRAME | LIFTGATE | | | | | REAR | END | CLIP |
| FRAME | REAR | BODY | PANEL | | | REAR | END | CLIP |
| ASSEMBLY | FRONT | RIGHT | SIDE | RAIL | | FRONT | END | CLIP |
| ASSEMBLY | SUNROOF | HOUSING | | | | | | SUNROOF |
| CLIP | FRONT | | | | | FRONT | END | CLIP |
| CLIP | SIDE | RAIL | | | | FRONT | END | CLIP |
| CLIP | FRONT | INNER | | | | FRONT | END | CLIP |
| STRUCTURE | INNER | SHORT | | | | FRONT | END | CLIP |
| SECTION | INNER | OUTER | FRONT | | | FRONT | END | CLIP |
| SECTION | LEFT | CENTER | PILLAR | ROCKER | PANEL | FRONT | END | CLIP |
| SHEETMETAL | REAR | BODY | | | | REAR | END | CLIP |
| SHEETMETAL | ROOF | LIFTGATE | | | | REAR | END | CLIP |
| PANEL | SUNROOF | SLIDING | | | | | | SUNROOF |
| SHELL | LEFT | REAR | DOOR | | | LEFT REAR | DOOR | SHELL |
| SHELL | RIGHT | REAR | DOOR | | | RIGHT REAR | DOOR | SHELL |

| Metric Words | Correct Word | Text/Numeric Words | Correct Word |
|---|---|---|---|
| LITER | LITER | ONE QUARTER | ONE QUARTER |
| LITERS | LITER | 1/4 | ONE QUARTER |
| LTR | LITER | ONE QTR | ONE QUARTER |
| MILLILITER | MILLILITER | TWO QUARTERS | TWO QUARTER |
| MILLILITERS | MILLILITER | 2/4 | TWO QUARTER |
| MIL | MILLILITER | THREE QUARTER | THREE QUARTER |
| CUBIC | CUBIC | THREE QUARTERS | THREE QUARTER |
| CUB | CUBIC | 3/4 | THREE QUARTER |
| INCH | INCH | ONE | ONE |
| HP | HORSEPOWER | FIVE | FIVE |
| FOOT | FOOT | SIX | SIX |
| VOLT | VOLT | TEN | TEN |
| V | VOLT | TWENTY | TWENTY |
| POUND | POUND | THIRTY | THIRTY |
| IB | POUND | MM | THOUSAND |
| LBS | POUND | THOUSAND | THOUSAND |
| WATT | WATT | | |
| AMPERES | AMPERE | | |
| GALLON | GALLON | | |
| QUARTS | QUART | | |
| QT | QUART | | |
| OUNCES | OUNCE | | |
| METERS | METER | | |
| CENTIMETER | CENTIMETER | | |
| TONNES | TON | | |
| T | TON | | |

FIG. 12C

| To Be Converted | Convert To |
|---|---|
| P / MARKER | PARK MARKER |
| P / S | POWER STEERING |
| 1 / 4 | QUARTER |
| AM / FM | RADIO |
| AM - FM | RADIO |
| R / C | REMOTE CONTROL |
| RT / FRT | RIGHT FRONT |
| R / F | RIGHT FRONT |
| R / R | RIGHT REAR |
| R / S | RIGHT SIDE |
| TAIL / STOP | TAIL LAMP |
| T / GATE | TAILGATE |
| 3 / 4 | THREE QUARTER |
| W / STRIP | WEATHER STRIP |
| W / OPENING | WHEEL OPENING |
| W / HOUSE | WHEELHOUSE |
| W / S | WINDSHIELD |
| W / SHIELD | WINDSHIELD |
| W'SHIELD | WINDSHIELD |
| I / S | INSIDE |
| A / M | RADIO |
| 4WD | FOUR WHEEL DRIVE |

| Abbreviation | Conversion |
|---|---|
| R ROOF | ROOF |
| R RUNNING | RIGHT RUNNING |
| R SEALBEAM | RIGHT HEADLAMP |
| R SIDE | RIGHT SIDE |
| R SIGNAL | RIGHT SIGNAL |
| R STRIP | RIGHT STRIP |
| R STRIPE | RIGHT STRIPE |
| R TAIL | RIGHT TAIL |
| R WINDOW | RIGHT WINDOW |
| R WIN | RIGHT WINDOW |
| R WIND | RIGHT WINDOW |
| R WINDSHIELD | RIGHT WINDSHIELD |
| R LUGGAGE | ROOF LUGGAGE |
| R BED SIDE | RIGHT BEDSIDE |
| R BEDSIDE | RIGHT BEDSIDE |
| R GLASS | REAR GLASS |
| R RUNNING BOARD | RIGHT RUNNING BOARD |

| Abbreviation | Final word |
|---|---|
| 2ND | 2ND |
| 3RD | 3RD |
| A | A |
| ABSORBER | ABSORBER |
| ABSORBERS | ABSORBER |
| ABSRBR | ABSORBER |
| ACCELERATOR | ACCELERATOR |
| ACTUATOR | ACTUATOR |
| ADAPTER | ADAPTER |
| ADAPT | ADAPTER |
| ADPTR | ADAPTER |
| ADPTER | ADAPTER |
| ADHESIVE | ADHESIVE |
| ADHES | ADHESIVE |
| ADHSV | ADHESIVE |
| ADJUST | ADJUSTER |
| ADJUSTER | ADJUSTER |
| ADJUST | ADJUSTING |
| ADJUSTG | ADJUSTING |

FIG. 12F

| CCC Section Headers | Orientation Word (Add this word at the beginning) | Descriptor Word (Add this word at the beginning) | Orientation Word (Add this word at the end) | Descriptor Word (Add this word at the end) |
|---|---|---|---|---|
| AIR CONDITIONER & HEATER | | AIR CONDITIONER | | |
| AIR CONDITIONER & HEATER | | HEATER | | |
| BACK DOOR | BACK | DOOR | | |
| BACK GLASS | BACK | GLASS | | |
| BODY SIDE PANELS | SIDE | BODY PANEL | | |
| CAB | | CABIN | | |
| CENTER PILLAR & ROCKER PANEL | CENTER | PILLAR | | |
| CENTER PILLAR & ROCKER PANEL | | ROCKER PANEL | | |
| CLEAR COAT | | | | |
| CONSOLE | | CONSOLE | | |
| CONVERTIBLE TOP | | CONVERTIBLE | | |

| Description Word String | | | | | | |
|---|---|---|---|---|---|---|
| And1 | And2 | And3 | And4 | OR1 | OR2 | OR3 |
| FRONT | END | | | CLIP | ASSEMBLY | SHEETMETAL |
| FRONT | | | | CLIP | | SHEETMETAL |
| SHORT | | QUARTER | | CLIP | ASSEMBLY | |
| SHORT | THREE | | | CLIP | ASSEMBLY | |
| REAR | | | | CLIP | | |
| REAR | BODY | | | PANEL | | |
| REAR | END | | | CLIP | ASSEMBLY | |
| TOP | TAIL | | | CLIP | | |
| CABIN | | | | CLIP | ASSEMBLY | |
| BLOWER | | | | ASSEMBLY | | |
| CONVERTIBLE | TOP | | | ASSEMBLY | | |
| COOLING | FAN | | | ASSEMBLY | | |
| COOLING | FAN | MOTOR | SHROUD | ASSEMBLY | | |
| AIR CONDITIONER | FAN | | | ASSEMBLY | | |

| CONSTRAINT | | | | Translation to CNHQPD Table | | | |
|---|---|---|---|---|---|---|---|
| 1 | 2 | 3 | 4 | Orientation | Descriptor | Item Name |
| BUMPER | GRILLE | COVER | BAR | FRONT | END | ASSEMBLY |
| BUMPER | GRILLE | COVER | BAR | FRONT | END | ASSEMBLY |
| ENGINE | | | | FRONT | END | ASSEMBLY |
| ENGINE | | | | FRONT | END | ASSEMBLY |
| | | | | REAR | END | ASSEMBLY |
| | | | | REAR | END | ASSEMBLY |
| | | | | REAR | END | ASSEMBLY |
| | | | | REAR | END | ASSEMBLY |
| | | | | | CABIN | ASSEMBLY |
| | | | | | BLOWER | MOTOR |
| | | | | TOP | CONVERTIBLE LIFT | MOTOR |
| | | | | | RADIATOR FAN | MOTOR |
| | | | | | RADIATOR FAN | MOTOR |
| | | | | | RADIATOR FAN | MOTOR |

FIG. 12I

| ONE WORD AND LISTED WORDS | ONE WORD AND ORIENTATION WORDS | ONE WORD |
|---|---|---|
| ABSORBER | ABSORBER | |
| ACTUATOR | ACTUATOR | |
| | | ALTERNATOR |
| | | ANTENNA |
| APRON | | |
| ARM | ARM | |
| | | ARMREST |
| ASSEMBLY | | |
| AXLE | | |
| BAFFLE | BAFFLE | |
| BAG | BAG | |
| | | BALANCER |
| BAR | BAR | |
| | | BATTERY |
| BEAM | BEAM | |
| BEARING | BEARING | |
| | | BED |
| BEZEL | BEZEL | |
| BLADE | BLADE | |
| BLOCK | BLOCK | |
| BLOWER | BLOWER | |
| BODY | BODY | |
| BOOSTER | BOOSTER | |
| BOTTLE | BOTTLE | |
| BRACE | BRACE | |
| BRACKET | BRACKET | |
| | | BRAKE |

FIG. 12J

| FIRST WORD | SECOND WORD | COMBINED WORD |
|---|---|---|
| A | PILLAR | A PILLAR |
| AIR | BAG | AIR BAG |
| BEDSIDE | PANEL | BEDSIDE PANEL |
| BELT | MOULDING | BELT MOULDING |
| BUMPER | COVER | BUMPER COVER |
| COMBINATION | LAMP | COMBINATION LAMP |
| COWL | DASH | COWL DASH |
| FOG | LAMP | FOG LAMP |
| FUSE | BOX | FUSE BOX |
| HINGE | PILLAR | HINGE PILLAR |
| INSTRUMENT | PANEL | INSTRUMENT PANEL |
| KEYLESS | ENTRY | KEYLESS ENTRY |
| LEAF | SPRING | LEAF SPRING |
| MUD | GUARD | MUD GUARD |
| QUARTER | PANEL | QUARTER PANEL |
| REINFORCEMENT | BAR | REINFORCEMENT BAR |
| ROLLER | DOOR | ROLLER DOOR |
| RUNNING | BOARD | RUNNING BOARD |
| SEAT | BELT | SEAT BELT |
| TAIL | GATE | TAILGATE |
| TAIL | LAMP | TAIL LAMP |
| TIE | BAR | TIE BAR |
| TOOL | KIT | TOOL KIT |
| TRIM | PANEL | TRIM PANEL |
| TURBOCHARGER | COOLER | TURBOCHARGER COOLER |
| TURN | SIGNAL | TURN SIGNAL |
| WHEEL | OPENING | WHEEL OPENING |
| WINDSHIELD | FRAME | WINDSHIELD FRAME |

FIG. 12K

| I | Dictionary | When Noun | When Is an Adjective |
|---|---|---|---|
| 98 | CARPET | CARPET,CARGO,FLOOR,BUCKET,INTERIOR,TRUNK,COMPARTMENT,CABIN,BODY,ROOF,BUMPER,DOOR,SEAT,QUARTER PANEL,LIFTGATE,CONSOLE,TRIM,PANEL, | BACKING,MAT,HOLDER,PAD,EXTENSION,RETAINER, |
| 99 | CARRIER | CARRIER,WHEEL,TIRE,DIFFERENTIAL,SPARE,JACK,ROOF,LUGGAGE,HOSE,ENGINE,PANEL,EXHAUST,AXLE,BODY,BUMPER,DOOR,CALIPER, | HANDLE,HOUSING,INSULATOR,MOUNT,SUPPORT,CASE,LOCK,PLUG,SHIELD,STRIKER,CYLINDER,SHAFT,RUBBER,BRACE,PIN,SPRING,BEARING,RETAINER,BRACKET,RELAY,BOLT,REINFORCEMENT,RIVET,NUT,GASKET,SEAL,GUIDE,CLAMP,STOPPER, |
| 100 | CASE | CASE,BLOWER,HEATER,TRANSFER,AIR CONDITIONER,CONSOLE,STEERING,TIRE,DIFFERENTIAL,CORE,CONTROL,LID,THERMOSTAT,CLEANER,TRANSMISSION,BATTERY,QUARTER PANEL,MOTOR,THROTTLE,PANEL,EVAPORATOR,BODY,FILTER,FUSE,DOOR,CABLE,BEARING, | WIRING,INTERMEDIATE,SHAFT,CABLE,BAFFLE,COVER,SHIFT,MODULE,SUPPORT,EXTENSION,OUTLET,CYLINDER,LOCK,PLATE,SHIELD,INLET,INTAKE,HINGE,DEFLECTOR,GASKET,SEAL,RETAINER,BRACKET,SNAP,RING,GUIDE,BOLT,LABEL, |
| 101 | CASSETTE | CASSETTE,PANEL,AM FM, | RADIO,CD,DECK,BRACKET |
| 102 | CATALYTIC | NEVER | CONVERTER,BOLT,GASKET,SEAL,LABEL,BRACKET, |
| 103 | CATCH | CATCH,DOOR,HOOD,SAFETY,LID,TRUNK,COVER,LOCK,FENDER, | HANDLE,MOUNT,RELEASE,ROD,STRIKER,SUPPORT,LINK,BRACKET,NUT,BOLT,LEVER,SNAP,GUIDE,REINFORCEMENT, |
| 104 | CAUTION | NEVER | LABEL, |

| When Is an Orientation | Major Assembly | Assembly-A | Sub-Assembly-B | Sub-Assembly Component |
|---|---|---|---|---|
| NEVER | | | | |
| NEVER | | | DIFFERENTIAL,ROOF,LUGGAGE,ENGINE,AXLE,BODY,BUMPER,DOOR, | |
| NEVER | | TRANSFER,CONSOLE,STEERING,DIFFERENTIAL,TRANSMISSION, | | |
| NEVER | | | | |
| NEVER | | | | CASSETTE,PANEL,AM/FM, |
| NEVER | | | | DOOR,HOOD,SAFETY,LID,TRUNK,FENDER, |
| NEVER | | | CD,CONSOLE,PANEL,SEAT,TRUNK,LID,NAVIGATION,QUARTER PANEL,DOOR,ROOF,DASH,AM FM,DASH, | |

| Simple Component | Support Structure | Protector | Hardware/Consumables | Generic Build Number | Generic Classification |
|---|---|---|---|---|---|
| | CARRIER,WHEEL,TIRE,SPARE,JACK,HOSE,PANEL,EXHAUST,CALIPER, | | | 3 | N |
| CASE,BLOWER,HEATER,TIRE,CORE,CONTROL,LID,THERMOSTAT,CLEANER,BATTERY,QUARTER PANEL,MOTOR,THROTTLE,PANEL,EVAPORATOR,BODY,DOOR, | FILTER,FUSE,CABLE,BEARING, | | | 4 | N |
| | | | | 5 | N |
| | | | | D | A |
| CATCH,COVER,LOCK, | | | | 4 | N |
| | | | | D | A |
| | | | | 6 | N |

FIG. 12N

| CAT_NAME | SUB_CAT_NAME | SUB_SUB_CAT_NAME | GENERIC PART ID | MATCH COUNT | ORIENTATION 1 |
|---|---|---|---|---|---|
| AIR BAGS & AIR BAG ELECTRICAL | AIR BAGS | AIR BAG - LEFT | 3 | 3 | LEFT |
| AIR BAGS & AIR BAG ELECTRICAL | AIR BAGS | AIR BAG - LEFT SIDE | 4 | 3 | LEFT |
| AIR BAGS & AIR BAG ELECTRICAL | AIR BAGS | AIR BAG - RIGHT | 5 | 3 | RIGHT |
| AIR BAGS & AIR BAG ELECTRICAL | AIR BAGS | AIR BAG - RIGHT SIDE | 6 | 3 | RIGHT |
| AIR BAGS & AIR BAG ELECTRICAL | ELECTRICAL | AIR BAG SENSOR - LEFT | 8 | 3 | LEFT |
| AIR BAGS & AIR BAG ELECTRICAL | ELECTRICAL | AIR BAG SENSOR - RIGHT | 9 | 3 | RIGHT |

FIG. 12P

| Orientation Alias 1 | Orientation Alias 2 | Orientation Alias 3 | Orientation Alias 4 | Orientation Alias 5 | Descriptor 1 | Descriptor Alias 1 | Descriptor Alias 2 |
|---|---|---|---|---|---|---|---|
| DRIVE | DRIVER | FRONT | | | AIR | CONTROL | BAG |
| DRIVE | DRIVER | FRONT | SIDE | | AIR | CONTROL | BAG |
| PASSENGER | FRONT | | | | AIR | CONTROL | BAG |
| PASSENGER | FRONT | SIDE | | | AIR | CONTROL | BAG |
| SIDE | DRIVE | DRIVER | FRONT | CENTER | AIR | BUMPER | IMPACT |
| SIDE | PASSENGER | FRONT | CENTER | | AIR | BUMPER | IMPACT |

| Descriptor Alias 3 | Descriptor Alias 4 | Descriptor Alias 5 | Descriptor Alias 6 | Descriptor Alias 7 | Part Name | Part Name Alias Word 1 | Part Name Alias Word 2 |
|---|---|---|---|---|---|---|---|
| STEERING | WHEEL | | | | | | |
| IMPACT | DOOR | HEAD | SEAT | ROOF | BAG | MODULE | UNIT |
| IMPACT | INSTRUMENT | | | | BAG | MODULE | UNIT |
| IMPACT | DOOR | HEAD | SEAT | ROOF | BAG | MODULE | UNIT |
| BAG | | | | | SENSOR | UNIT | |
| BAG | | | | | SENSOR | UNIT | |

FIG. 12Q

| Constraint Word 9 | Constraint Word 10 | Constraint Word 11 | Constraint Word 12 | Constraint Word 13 | Constraint Word 14 | Constraint Word 15 | Constraint Word 16 |
|---|---|---|---|---|---|---|---|
| ONBOARD | MOTOR | IGNITION | FUEL | SENDING | CRUISE | SIDE | CABLE |
| ONBOARD | MOTOR | IGNITION | FUEL | SENDING | CRUISE | CABLE | CONNECTOR |
| MAIN | ONBOARD | MOTOR | IGNITION | FUEL | SENDING | CRUISE | SIDE |
| MAIN | ONBOARD | MOTOR | IGNITION | FUEL | SENDING | CRUISE | CABLE |
| MAIN | ONBOARD | MOTOR | IGNITION | FUEL | SENDING | CRUISE | SIDE |
| ENGINE | MAIN | ONBOARD | MOTOR | IGNITION | FUEL | SENDING | CRUISE |

FIG. 12S

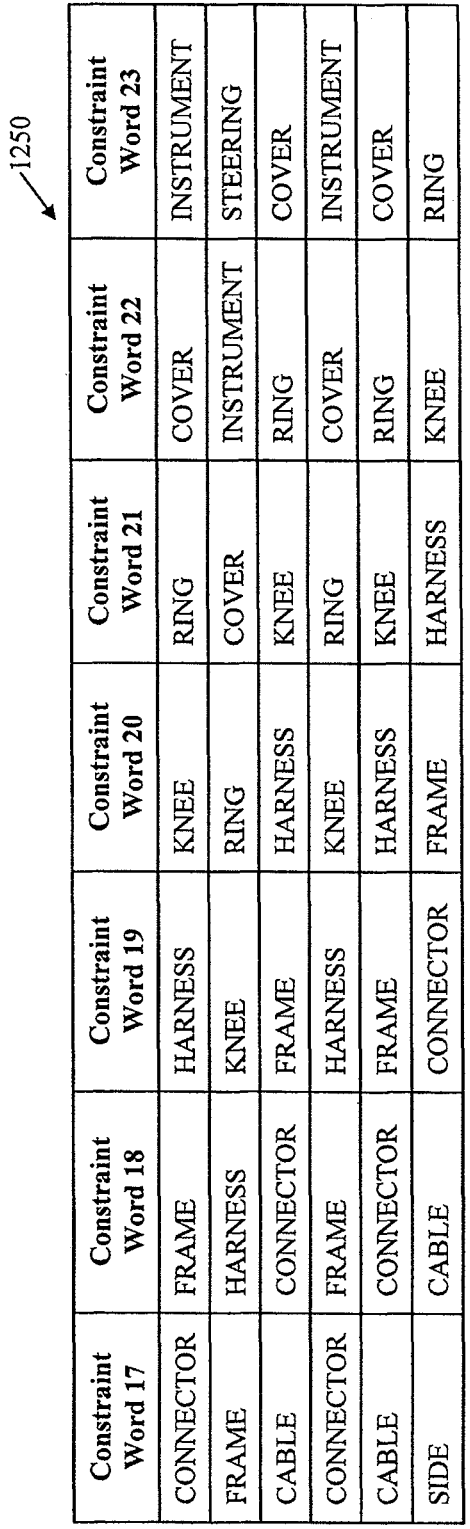

FIG. 12T

| Constraint Word 17 | Constraint Word 18 | Constraint Word 19 | Constraint Word 20 | Constraint Word 21 | Constraint Word 22 | Constraint Word 23 |
|---|---|---|---|---|---|---|
| CONNECTOR | FRAME | HARNESS | KNEE | RING | COVER | INSTRUMENT |
| FRAME | HARNESS | KNEE | RING | COVER | INSTRUMENT | STEERING |
| CABLE | CONNECTOR | FRAME | HARNESS | KNEE | RING | COVER |
| CONNECTOR | FRAME | HARNESS | KNEE | RING | COVER | INSTRUMENT |
| CABLE | CONNECTOR | FRAME | HARNESS | KNEE | RING | COVER |
| SIDE | CABLE | CONNECTOR | FRAME | HARNESS | KNEE | RING |

| PART DESCRIPTION -- 1 | |
|---|---|
| LEFT | AIR BAG |
| LEFT | AIR BAG |
| RIGHT | AIR BAG |
| RIGHT | AIR BAG |
| LEFT | AIR SENSOR |
| RIGHT | AIR SENSOR |

| PART DESCRIPTION -- 12 | | |
|---|---|---|
| | | |
| | | |
| RIGHT FRONT | CONTROL | MODULE |
| | | |

FIG. 12W

| I | Col. A | Col. B | Col. C | Col. D | Col. E | Col. F | Col. G | Col. H |
|---|---|---|---|---|---|---|---|---|
| 1 | 585 | 586 | 587 | 588 | 589 | | | |
| 2 | 464 | 465 | 470 | 471 | 484 | 485 | 491 | 492 |
| 3 | 36 | 37 | 1001 | 1002 | | | | |
| 4 | 600 | 601 | 602 | 603 | | | | |
| 5 | 585 | 586 | 587 | 588 | | | | |
| 6 | 575 | 576 | 577 | 582 | | | | |
| 7 | 575 | 576 | 577 | 582 | | | | |
| 8 | 569 | 570 | 571 | 578 | | | | |
| 9 | 561 | 562 | 563 | 564 | | | | |
| 10 | 495 | 496 | 497 | 498 | | | | |
| 11 | 470 | 471 | 491 | 492 | | | | |
| 12 | 466 | 467 | 486 | 487 | | | | |
| 13 | 464 | 465 | 484 | 485 | | | | |
| 14 | 461 | 462 | 481 | 482 | | | | |
| 15 | 403 | 404 | 405 | 406 | | | | |
| 16 | 243 | 244 | 245 | 246 | | | | |
| 17 | 175 | 176 | 181 | 182 | | | | |
| 18 | 175 | 176 | 181 | 182 | | | | |
| 19 | 101 | 102 | 103 | 104 | | | | |
| 20 | 91 | 92 | 93 | 94 | | | | |
| 21 | 86 | 87 | 88 | 89 | | | | |
| 22 | 80 | 81 | 82 | 83 | | | | |
| 23 | 71 | 72 | 73 | 74 | | | | |
| 24 | 58 | 59 | 60 | 61 | | | | |
| 25 | 38 | 39 | 49 | 50 | | | | |
| 26 | 3 | 4 | 5 | 6 | | | | |

AUTOMATION OF AUDITING CLAIMS

REFERENCE TO RELATED APPLICATIONS

This application is a division of U.S. application Ser. No. 13/610,972, filed on Sep. 12, 2012, which is a continuation of U.S. application Ser. No. 12/474,450, filed on May 29, 2009, now U.S. Pat. No. 8,346,577. The contents of each of the foregoing are incorporated by reference herein in their entirety.

FIELD OF THE INVENTION

The present invention relates generally to computer-based methods and apparatuses, including computer program products, for automation of auditing claims.

BACKGROUND

Insurance claim estimates can be written by a number of different appraisal types (e.g., independent appraisers, repair shop appraisers, insurance staff appraisers). The appraiser can select the tools and/or materials used to generate the estimates (e.g., how to write estimates, what software to use to write the estimates, what forms to use, etc.). The completed estimates are sent to the appropriate insurance company for review, approval and payment.

Completed estimates are reviewed to determine accuracy prior to approval and settlement of costs. The review includes, in part, determining liability for the claim costs. Liability either rests with the reviewing insurance company, a different insurance company, or a third party. When the liability rests with an insurance company other than the reviewing insurance company, or with a third party, all estimate repair documents are imaged and mailed (or emailed) to the liable party.

The review and settlement process for claim estimates is fundamentally consistent regardless of the claim type (e.g., a claim for a vehicle repair, a subrogation claim, a glass claim, a medical claim, a property claim, or other claim type). As such, the documents used in the processes for review and settlement of a claim are also materially similar. Some claim documents can be received electronically, while most documents used in a review are imaged, making it technically impossible today to automate the review, approval, and/or payment process for claims.

It is estimated that, on average, claim costs for insurers are inflated by over 20% on each claim, or approximately $2.0 billion per year. To exert some control over the quality of repair operations and the accuracy of repair expenditures and claim costs, insurance companies perform audits on the repair documents and repair work associated with an insurance claim. Similarly, other businesses, such as glass companies, salvage pool businesses, rental car companies, and others, perform the same or similar auditing of documents to control quality of work performed and costs expended.

For claims undergoing an audit process auditors manually analyze parts selected, manually analyze repair operations suggested/performed, and manually perform other proprietary business procedures and guidelines that are designed by the insurer to provide the best end-result for the vehicle owner and the business. Only limited capabilities exist in electronic auditing of estimate line items, which are limited to single line "Yes/No" outputs that are completely reliant upon an underlying code being associated with a data element on a specific line item of an estimate. There may not be a code for each line item. For example, if an appraisal source modifies an estimate line manually from the pre-defined input of the estimating software, those codes no longer exist. Because this occurs on almost all claim estimates, the current electronic auditing tools can be more appropriately characterized as tools that "flag" possible issues for auditors. The audit itself must still be completed manually. The cost and inefficiencies around this type of process enable only a minority of all claims to be reviewed for quality and accurateness.

The primary factors that affect claims cost are (1) the "parts" being utilized on the repair estimate, and (2) the "repair operation" being listed as necessary. From these two key estimate elements other costs are either incurred, or avoided. Insurance companies can reduce repair costs by having appraisers substitute higher priced original equipment parts from original equipment manufacturers ("OEM's") with less expensive, equivalent, aftermarket, recycled or reconditioned parts ("alternative parts"). Advantageously, by using alternative parts, appraisers and repair shops save actual repair time, improve the quality of parts used in the repair, and accelerate the time taken to repair a vehicle. The end result is advantageous for all parties involved in the process.

For example, a claims appraiser, to save time and simplify the writing of a repair estimate, often selects higher priced OEM parts on a repair estimate, claiming no availability of approved alternative parts. Similarly a repair shop can receive payment for an OEM part from an insurance company and actually use a lower quality, less expensive, non-approved part without the insurance company having an accurate and reliable process to verify proper part utilization. Similarly, a repairer or appraiser may add repair operations onto an estimate that are not needed, based on the type of part selected. Without a manual review of the claim documents, these costs and lower quality parts can go undetected and contribute to higher repair costs and insurance rate costs, as well as poorer quality repairs for policyholders. Insurance claims and general repairs cannot be processed in an automatic process today because there is no system to accept claim documents and convert them into a usable, electronic form. There is no system capable of deciphering, or translating line items on the claim and repair documents to review accuracy and best practices. There is no system capable of reviewing and comparing various data across the documents to ensure adherence to the insurers best practices and guidelines for repairs.

For example, the subrogation of insurance claims is an extremely manual and paper based process. Assume driver A is insured by company A', and driver B is insured by company B'. Driver A is involved in an accident with driver B, where A is responsible for the accident. However, B can go to his insurance company B' to repair his automobile, insurance company B' pays for the repairs, and then insurance company B' subrogates against driver A's insurance carrier for reimbursement. Insurance company A', however, will respond to insurance company B' by evaluating how the vehicle was repaired and then pay only what A' feels is the proper amount.

This process cannot be performed on every claim filed per year, and often leads to the parties going through an arbitration process with any settlement occurring, on average, over five (5) months after the initial subrogation. When sizing the automotive claims (repair claims and subrogation claims) marketplace there are approximately 30,000,000 claims that must be reviewed, approved and paid each year. Of this volume, none of the claims that can be electronically and automatically reviewed (or audited) in a manner that constitutes an audited review. This can be problematic, because the insurance company must either elect to pay the claim as received (at a 100% value) or to apply people to the review process, which is both time consuming and expensive. The cumulative claim cost for the repair estimate only (excluding rental, towing, people, etc.) is estimated at over $100 billion U.S. dollars.

The end result is a very time-consuming "he said, she said" process. As disclosed in U.S. patent application Ser. No. 11/928,570 (U.S. Pub. No. 2008/0243556), which is hereby incorporated by reference herein in its entirety, subrogation specialists and self-insured's can gain access to real-time data that supports availability of parts on historical dates, enabling parties involved in the claims process to better identify when an appraiser did not accurately utilize parts on an estimate and/or accurately document the cost of parts on the estimate. However, subrogation specialists must still manually analyze each operational entry in the repair documents to generate a proper settlement amount.

SUMMARY OF THE INVENTION

The invention, in one aspect, features a computerized auditing method. The auditing method includes receiving, via a processor, a data file comprising one or more auditable items, each auditable item comprising a word string having one or more words. The method includes translating, using the processor, each word string for each auditable item using one or more translation steps into a translated item description. The method includes comparing, using the processor, each translated item description to a plurality of terms to generate matching information. The method includes associating, using the processor, each translated item description with an item identifier based on the matching information. The method includes accepting, using the processor, or rejecting each auditable item based on the item identifier and one or more rules associated with the data file.

In another embodiment, the method includes determining the item identifier is rejected for an auditable item and rejecting the auditable item, or determining the item identifier is accepted for the auditable item and accepting the auditable item. The method can include unsuccessfully translating a word string into a translated item description and logging the word string as an unsuccessful translation. The method can include unsuccessfully associating a translated item description with a single item identifier, and associating the translated item description with a plurality of item identifiers. Translating can include preprocessing the word string.

In another embodiment, preprocessing includes removing one or more orientation words from the word string, removing one or more unnecessary words from the word string, adding a space before one or more punctuation marks in the word string, or any combination thereof. Translating the word string can include determining the word string includes one or more standard words from a plurality of standard words, and removing the one or more standard words from the word string. Translating the word string can include determining word string includes one or more specific words from a plurality of specific words, and for each specific word from the one or more specific words, processing the word string based on the specific word.

In another embodiment, the plurality of specific words can include predetermined word strings, structural part groupings, abbreviations, metric indicators, computer generated formats, non-alphanumeric characters, single letters, or any combination thereof. The metric indicators can be alphanumeric, alpha, and numerical characters dealing with metrics. Translating the word string can include determining the word string includes one or more abbreviations from a plurality of abbreviations, and for each abbreviation from the one or more abbreviations, processing the word string based on the abbreviation. Translating the word string can include determining the word string includes header information, and processing the word string based on the header information. Translating the word string can include determining the word string includes one or more ambiguous words from a plurality of ambiguous words, and processing the word string based on the one or more ambiguous words.

In another embodiment, translating the word string includes applying one or more rules from a plurality of rules to the word string, wherein each rule is associated with a logic for processing the word string, determining whether the word string contains one or more predetermined items, and if the word string contains one or more predetermined items, for each predetermined item, processing the word string based on the predetermined item. The method can include, for each predetermined item, determining whether the word string satisfies a condition associated with the predetermined item, and if the word string satisfies the condition, generating the translated item description. The method can include determining whether the translated item description was not generated, and if the translated item description was not generated, generating the translated item description based on a statistical estimation. The one or more rules can include one or more specific item rules, one or more combination rules, or any combination thereof. The one or more predetermined items can include one or more terms, one or more punctuation marks, or any combination thereof. The method can include determining the word string includes one word, and generating the translated item description to include the one word.

In another embodiment, translating the word string includes applying one or more combination rules to the word string, wherein each rule is associated with a logic for processing the word string, comparing the word string against a build table to generate a relationship between the one or more words of the word string, the build table comprising one or more index words, each index word being associated with index information, and generating the translated item description based on the relationship. The method can include determining whether the word string includes one or more predetermined items, and for each predetermined item of the word string, processing the word string based on the predetermined item. The index information can include noun information, adjective information, orientation information, or any combination thereof.

In another embodiment, comparing includes, for each word in the word string, determining whether the word is an orientation word, if the word is an orientation word, modifying the word string based on the orientation word. If the word is not an orientation word, determining whether one or more remaining words in the word string match a list of preceding terms, for each word that matches the list of preceding terms, recording a preceding relationship, determining whether one or more remaining words in the word string match a list of anteceding terms, and for each word that matches the list of anteceding terms, recording an anteceding relationship.

In another embodiment, the method includes determining at least one word of the word string is not associated with a relationship, and processing one or more non-orientation words of the word string. Processing the one or more non-orientation words can include, for each non-orientation word of the word string, determining whether the non-orientation word is associated with a build number. If the non-orientation word is not associated with a build number, associating the non-orientation word with a generic build number, arranging the word string based on the relationship, determining whether the word string satisfies a proper relationship criteria, and if the word string does not satisfy the proper relationship criteria, logging the word string. The one or more predetermined items can include one or more punctuation marks, one or more joinable words, or any combination thereof.

In another embodiment, the data file can include an automobile insurance demand file, and the one or more word strings can include one or more repair part descriptions. The data file further includes one or more recommended part descriptions for repair of the vehicle, and the one or more rules associated with the data file are based on the one or more recommended part descriptions for repair.

The invention, in another aspect, features a computerized auditing method. The method includes receiving, via a processor, a data file comprising one or more auditable items, extracting, using the processor, a word string from each auditable item, translating, and using the processor, each word string using one or more translation steps into a translated item description. The method includes, for each translated item description, comparing, using the processor, the translated item description to a plurality of terms, generating, using the processor, a matching table comprising one or more entries, wherein each entry of the matching table includes a matching term from the plurality of terms and matching information, the matching information comprising a match characteristic between the translated item description and the term and an item identifier, determining, using the processor, whether the match characteristic for each entry is below a predetermined threshold. If the match characteristic is below the predetermined threshold, removing, using the processor, the entry from the matching table. The method includes determining, using the processor, if one entry of the matching table includes a best match. The method includes, if one entry includes the best match, associating, using the processor, the item identifier of the one entry with the translated item description. The method includes, if no entry includes the best match, determining, using the processor, whether a plurality of entries include a similar match indicator value, and if the plurality of entries include the similar match indicator value, associating, using the processor, the item identifier for each of the plurality of entries with the translated item description, otherwise associating the translated item description with a no match indicator. The method includes accepting, using the processor, or rejecting each auditable item associated with an item identifier based on the item identifier and one or more rules associated with the data file, and generating, using the processor, an audit report.

The invention, in another aspect, features a computerized auditing method. The method includes receiving, via a processor, a data file comprising one or more auditable items, each auditable item comprising a word string having one or more words. The method includes translating, using the processor, each word string into a translated item description. Translating includes determining, using the processor, whether the word string includes a primary name, if the word string includes a primary item name, calculating, using the processor, the translated item description based on the primary name, and if the word string does not include a primary item name, calculating, using the processor, the translated item description based on the last word of the word string. The method includes comparing, using the processor, each translated item description to a plurality of predetermined terms to generate matching information, associating, using the processor, each translated item description with an item identifier based on the matching information, and accepting, using the processor, or rejecting each auditable item based on the item identifier and one or more rules associated with the data file.

The invention, in another aspect, features a computerized auditing method. The method includes receiving, using the processor, a data file comprising one or more auditable items, each auditable item comprising a word string having one or more words. The method includes translating, using the processor, each word string for each auditable item into a translated item description. Translating each word string includes generating, using the processor, relationship information between two or more words of the word string based on a classification of each word of the word string, determining, using the processor, whether each word of the word string is associated with the relationship information, if each word of the word string is associated with the relationship information, calculate, using the processor, the translated item description based on the relationship information, and if each word of the word string is not associated with the relationship information, calculate, using the processor, the translated item description based on ordering information. The method includes comparing, using the processor, each translated item description to a plurality of predetermined terms to generate matching information. The method includes associating, using the processor, each translated item description with an item identifier based on the matching information, and accepting, using the processor, or rejecting each auditable item based on the item identifier and one or more rules associated with the data file.

The invention, in another aspect, features an apparatus. The auditing apparatus includes an auditing system configured to receive a data file comprising one or more auditable items, each auditable item comprising a word string having one or more words. The auditing apparatus includes a translator in communication with the auditing apparatus configured to translate each word string for each auditable item using one or more translation steps into a translated item description, compare each translated item description to a plurality of terms to generate matching information, associate each translated item description with an item identifier based on the matching information, and accept or reject each auditable item based on the item identifier and one or more rules associated with the data file.

In another embodiment, the apparatus includes a text recognition unit in communication with the audit unit and the translator configured to recognize the text of the data file. The apparatus can include an output unit configured to generate an audit report, the audit report comprising an audit result for each auditable item of the data file. The apparatus can include a database in communication with the translator configured to store one or more rules, the one or more rules being used to translate the word string.

The invention, in another aspect, features a computer program product, tangibly embodied in a computer readable storage medium. The computer program product includes instructions being operable to cause a data processing apparatus to receive a data file comprising one or more auditable items, each auditable item comprising a word string having one or more words, translate each word string for each auditable item using one or more translation steps into a translated item description, compare each translated item description to a plurality of terms to generate matching information, associate each translated item description with an item identifier based on the matching information, and accept or rejecting each auditable item based on the item identifier and one or more rules associated with the data file.

The invention, in another aspect, features an apparatus. The apparatus includes means for receiving a data file comprising one or more auditable items, each auditable item comprising a word string having one or more words. The apparatus includes means for translating each word string for each auditable item using one or more translation steps into a translated item description, comparing each translated item description to a plurality of terms to generate matching information, associating each translated item description with an item identifier based on the matching information, and accepting or rejecting each auditable item based on the item identifier and one or more rules associated with the data file.

The invention, in another aspect, features a computerized auditing method. The method includes receiving, via a processor, a data file comprising make model information, insurance company information, and one or more auditable items, each auditable item comprising a word string having one or more words. The method includes automatically translating, using the processor, the make model information into a vehicle identifier, the insurance company information into an insurance company identifier, and the one or more auditable items into one or more groups of identifiers, wherein the one or more groups of identifiers includes one or more part item identifiers, one or more operational item identifiers, or both. The method includes automatically generating, using the processor, a parts audit report based on the one or more groups of identifiers, the parts audit report comprising data indicative of whether one or more parts of the one or more auditable items is accepted based on one or more rules associated with the insurance company identifier. The method includes automatically generating, using the processor, an operational audit report based on the one or more groups of identifiers, the operational audit report comprising data indicative of whether one or more operations of the one or more auditable items is accepted based on one or more rules associated with the insurance company identifier, and automatically generating, using the processor, a multi-point estimate based on the parts audit report data and the operational audit report data.

In another embodiment, automatically translating the make model information into a vehicle identifier includes, for each word string comprising make model information, wherein the make model information includes one or more make fields and one or more model fields, preparing the one or more model fields for translation by applying one or more rules from a plurality of rules, and associating each field of the one or more model fields with a class from a list of classes, preparing the one or more make fields for translation by applying one or more rules from the plurality of rules, associating each field of the one or more make fields with one or more make model entries from a plurality of predetermined make model entries, associating each field of the one or more model fields with one or more make model entries from the plurality of predetermined make model entries, and automatically translating the word string into one or more vehicle identifiers based on the associated make model entries.

In another embodiment, the one or more make fields include a claim make field and an estimate block make field, and the one or more model fields include a claim model field and an estimate block model field. Preparing the one or more model fields for translation by applying one or more rules from a plurality of rules can include identifying a model in the one or more model fields that does not need processing, identifying two words that must be combined into one word, and combining the two words into one word, identifying a first word that must be separated into two words, and separating the first word into two words, or identifying a second word as a descriptive classification word, and standardizing a spelling of the second word, or any combination thereof.

In another embodiment, associating each field of the one or more make fields with one or more make model entries from a plurality of predetermined make model entries includes generating a temporary translation table, wherein each row of the temporary translation table includes a manufacturer field, a make field, a model superset field, and a model subset field, identifying a match of a make field of the one or more make fields with a predetermined make model entry, and populating a row of the temporary translation table with match information. Automatically translating the insurance company information into an insurance company identifier includes, wherein the insurance company information includes data comprising one or more words, processing the data through one or more processing steps to generate processed data comprising one or more processed words, selecting one or more candidate word strings based on the one or more processed words, associating matching information with each of the one or more candidate word strings, generating analysis information for each of the one or more candidate word strings based on the associated matching information, and associating an insurance company identifier with received data based on the analysis information and one or more matching rules.

In another embodiment, processing the data through one or more processing steps to generate processed data comprising one or more processed words includes identifying a hyphenated word and replacing the hyphenated word in the data indicative of an insurance company name with a predetermined word string, and identifying a state abbreviation word, identifying a position of the state abbreviation word in the data indicative of an insurance company name, and associating an identifier with the data indicative of the position, or identifying a punctuation mark in the data indicative of an insurance company name, inserting a space before the punctuation mark, and inserting a space after the punctuation mark, or any combination thereof. Processing the data through one or more processing steps to generate processed data comprising one or more processed words can include determining whether each word of the data is spelled correctly based on a predetermined list of words, and if a word is spelled incorrectly, associating the word with an identifier indicative of the word being spelled incorrectly, or if a word is spelled correctly, associating the word with an identifier indicative of the word being spelled correctly.

In another embodiment, selecting one or more candidate word strings based on the one or more processed words includes determining whether the data includes two or more words with a same usage number, selecting a first word in the data, wherein the first word has an earliest location in the data of the two or more words with the same usage number, and selecting the one or more candidate word strings based on the first word. Generating analysis information for each of the one or more candidate word strings based on the associated matching information can include determining whether a location word is in the data, the location word being indicative of an insurance company name, and if there is a location word, for each location word, determining a position of the location word in the data indicative of an insurance company name, and associating the word with an identifier indicative of the position.

In another embodiment, automatically translating the one or more auditable items into one or more groups of identifiers includes, for each word string comprising auditable items, applying one or more rules from a plurality of rules to the word string, wherein each rule is associated with a logic for processing the word string, determining whether the word string contains one or more predetermined items, and if the word string contains one or more predetermined items, for each predetermined item, processing the word string based on the predetermined item. The one or more rules can include one or more specific item rules, one or more combination rules, or any combination thereof. The one or more predetermined items can include one or more terms, one or more punctuation marks, or any combination thereof. Automatically translating the one or more auditable items into one or more groups of identifiers can include, for each word string comprising auditable items, applying one or more combination rules to the word string, wherein each rule is associated with a logic for processing the word string, comparing the word string against a build table to generate a relationship between the one or more words of the word string, the build table comprising one or more index words, each index word being associated with index information, and generating the translated item description based on the relationship. The multi-point estimate can include an audit estimate based on each line item of the data file, wherein each line item is automatically evaluated based on any remaining line items of the data file. Automatically translating the one or more auditable items into an operational item identifier can include automatically translating an auditable item from the one or more auditable items that does not involve a physical removal of a vehicle part with a replacement of a replacement part in place of the removed vehicle part.

The invention, in another aspect, features an apparatus. The apparatus includes an auditing system configured to receive a data file comprising make model information, insurance company information, and one or more auditable items, each auditable item comprising a word string having one or more words. The apparatus includes a make model translator in communication with the auditing system configured to automatically translate the make model information into a vehicle identifier. The apparatus includes an insurance company name translator in communication with the make model translator configured to automatically translate the insurance company information into an insurance company identifier. The apparatus includes a parts translator in communication with the insurance company name translator configured to automatically translate the one or more auditable items into one or more groups of identifiers, wherein the one or more groups of identifiers includes one or more part item identifiers, one or more operational item identifiers, or both. The apparatus includes an output unit in communication with the auditing apparatus configured to automatically generate a parts audit report based on the one or more groups of identifiers, the parts audit report comprising data indicative of whether one or more parts of the one or more auditable items is accepted based on one or more rules associated with the insurance company identifier. The output unit is further configured to automatically generate an operational audit report based on the one or more groups of identifiers, the operational audit report comprising data indicative of whether one or more operations of the one or more auditable items is accepted based on one or more rules associated with the insurance company identifier. The output unit is further configured to automatically generate a multi-point estimate based on the parts audit report data and the operational audit report data.

The invention, in another aspect, features a computer program product, tangibly embodied in a computer readable storage medium. The computer program product includes instructions being operable to cause a data processing apparatus to receive a data file comprising make model information, insurance company information, and one or more auditable items, each auditable item comprising a word string having one or more words. The instructions are further operable to cause a data processing apparatus to automatically translate the make model information into a vehicle identifier, the insurance company information into an insurance company identifier, and the one or more auditable items into one or more groups of identifiers, wherein the one or more groups of identifiers includes one or more part item identifiers, one or more operational item identifiers, or both. The instructions are further operable to cause a data processing apparatus to automatically generate a parts audit report based on the one or more groups of identifiers, the parts audit report comprising data indicative of whether one or more parts of the one or more auditable items is accepted based on one or more rules associated with the insurance company identifier. The instructions are further operable to cause a data processing apparatus to automatically generate an operational audit report based on the one or more groups of identifiers, the operational audit report comprising data indicative of whether one or more operations of the one or more auditable items is accepted based on one or more rules associated with the insurance company identifier. The instructions are further operable to cause a data processing apparatus to automatically generate a multi-point estimate based on the parts audit report data and the operational audit report data.

The invention, in another aspect, features an auditing apparatus. The auditing apparatus includes means for receiving a data file comprising make model information, insurance company information, and one or more auditable items, each auditable item comprising a word string having one or more words. The auditing apparatus includes means for automatically translating the make model information into a vehicle identifier. The auditing apparatus includes means for automatically translating the insurance company information into an insurance company identifier. The auditing apparatus includes means for automatically translating the one or more auditable items into one or more groups of identifiers, wherein the one or more groups of identifiers includes one or more part item identifiers, one or more operational item identifiers, or both. The auditing apparatus includes means for automatically generating a parts audit report based on the one or more groups of identifiers, the parts audit report comprising data indicative of whether one or more parts of the one or more auditable items is accepted based on one or more rules associated with the insurance company identifier, automatically generating an operational audit report based on the one or more groups of identifiers, the operational audit report comprising data indicative of whether one or more operations of the one or more auditable items is accepted based on one or more rules associated with the insurance company identifier, and automatically generating a multi-point estimate based on the parts audit report data and the operational audit report data.

The invention, in another aspect, features a computerized method. The method includes receiving data, via a processor, indicative of a vehicle make and model, the data comprising one or more make fields and one or more model fields. The method includes preparing, using the processor, the one or more model fields for translation by applying one or more rules from a plurality of rules, and associating each field of the one or more model fields with a class from a list of classes. The method includes preparing, using the processor, the one or more make fields for translation by applying one or more rules from the plurality of rules, associating, using the processor, each field of the one or more make fields with one or more make model entries from a plurality of predetermined make model entries, associating, using the processor, each field of the one or more model fields with one or more make model entries from the plurality of predetermined make model entries, and automatically translating, using the processor, the data into one or more vehicle identifiers based on the associated make model entries.

In another embodiment, the one or more make fields include a claim make field and an estimate block make field, and the one or more model fields include a claim model field and an estimate block model field. Preparing the one or more model fields for translation by applying one or more rules from a plurality of rules can include identifying a model in the one or more model fields that does not need processing, identifying two words that must be combined into one word, and combining the two words into one word, identifying a first word that must be separated into two words, and separating the first word into two words, or identifying a second word as a descriptive classification word, and standardizing a spelling of the second word, or any combination thereof.

In another embodiment, preparing the one or more model fields for translation by associating each field of the one or more model fields with the class from the list of classes includes identifying a vehicle make of a make field of the one or more make fields is improper for translation, and terminating the translation; or determining a model field of the one or more model fields includes a truck, and applying one or more rules to identify the truck, or any combination thereof. The method can further include determining a make field of the one or more make fields includes a numeric value and a model field of the one or more model fields does not include the numeric value, and inserting the numeric value in the model field. Applying one or more rules to identify the truck can include inserting one or more words, removing one or more words, or both.

In another embodiment, preparing the one or more make fields for translation by applying one or more rules from the plurality of rules includes converting a make abbreviation in a make field of the one or more make fields to an expanded spelling, or inserting a space between each two word pair of all words of the one or more make fields, the one or more model fields, or both to remove any excess spaces between the words, or any combination thereof. Each of the one or more predetermined make model entries can include manufacturer information, make information, and model information. Associating each field of the one or more make fields with one or more make model entries from a plurality of predetermined make model entries can include generating a temporary translation table, wherein each row of the temporary translation table includes a manufacturer field, a make field, a model superset field, and a model subset field, identifying a match of a make field of the one or more make fields with a predetermined make model entry, and populating a row of the temporary translation table with match information.

In another embodiment, identifying a match includes matching each word in a word string of the make field with the predetermined make model entry, and associating the match with a complete match indicator. Automatically translating the data into one or more vehicle identifiers based on the associated make model entries can include analyzing the temporary translation table to determine match information for each row, and translating the data into the one or more vehicle identifiers based on the match information. The match information for each row can be based on a number of field matches for the row and a match indicator for the row. The method can further include determining the temporary translation table includes one row, and translating the data into the one or more vehicle identifiers based on the one row. The method can include determining the temporary translation table includes two or more rows with one or more matches in the model subset field, calculating a goodness value for each row, wherein the goodness value is based on match information for each row, a number of row matches, or any combination thereof, and translating the data into the one or more vehicle identifiers based a row with a highest goodness value.

The invention, in another aspect, features an apparatus. The apparatus includes an auditing system configured to receive data indicative of a vehicle make and model, the data comprising one or more make fields and one or more model fields. The auditing apparatus includes a make model translator in communication with the auditing system configured to prepare the one or more model fields for translation by applying one or more rules from a plurality of rules, and associating each field of the one or more model fields with a class from a list of classes. The auditing apparatus is configured to prepare the one or more make fields for translation by applying one or more rules from the plurality of rules. The auditing apparatus is configured to associate each field of the one or more make fields with one or more make model entries from a plurality of predetermined make model entries. The auditing apparatus is configured to associate each field of the one or more model fields with one or more make model entries from the plurality of predetermined make model entries. The auditing apparatus is configured to automatically translate the data into one or more vehicle identifiers based on the associated make model entries.

The invention, in another aspect, features a computer program product, tangibly embodied in a computer readable storage medium. The computer program product includes instructions being operable to cause a data processing apparatus to receive data indicative of a vehicle make and model, the data comprising one or more make fields and one or more model fields. The instructions are further operable to cause a data processing apparatus to prepare the one or more model fields for translation by applying one or more rules from a plurality of rules, and associating each field of the one or more model fields with a class from a list of classes. The instructions are further operable to cause a data processing apparatus to prepare the one or more make fields for translation by applying one or more rules from the plurality of rules. The instructions are further operable to cause a data processing apparatus to associate each field of the one or more make fields with one or more make model entries from a plurality of predetermined make model entries. The instructions are further operable to cause a data processing apparatus to associate each field of the one or more model fields with one or more make model entries from the plurality of predetermined make model entries. The instructions are further operable to cause a data processing apparatus to automatically translate the data into one or more vehicle identifiers based on the associated make model entries.

The invention, in another aspect, features an apparatus. The apparatus includes means for receiving data indicative of a vehicle make and model, the data comprising one or more make fields and one or more model fields. The apparatus includes means for preparing the one or more model fields for translation by applying one or more rules from a plurality of rules and associating each field of the one or more model fields with a class from a list of classes, preparing the one or more make fields for translation by applying one or more rules from the plurality of rules, associating each field of the one or more make fields with one or more make model entries from a plurality of predetermined make model entries, associating each field of the one or more model fields with one or more make model entries from the plurality of predetermined make model entries, and automatically translating the data into one or more vehicle identifiers based on the associated make model entries.

The invention, in another aspect, features a computerized method. The method includes receiving, via a processor, data indicative of an insurance company name, the data comprising one or more words, processing, using the processor, the data through one or more processing steps to generate processed data comprising one or more processed words, selecting, using the processor, one or more candidate word strings based on the one or more processed words, associating, using the processor, matching information with each of the one or more candidate word strings, generating, using the processor, analysis information for each of the one or more candidate word strings based on the associated matching information, and associating, using the processor, an insurance company identifier with received data based on the analysis information and one or more matching rules.

In another embodiment, processing the data through one or more processing steps to generate processed data comprising one or more processed words includes identifying a hyphenated word and replacing the hyphenated word in the data indicative of an insurance company name with a predetermined word string, identifying a state abbreviation word, identifying a position of the state abbreviation word in the data indicative of an insurance company name, and associating an identifier with the data indicative of the position, or identifying a punctuation mark in the data indicative of an insurance company name, inserting a space before the punctuation mark, and inserting a space after the punctuation mark, or any combination thereof.

In another embodiment, processing the data through one or more processing steps to generate processed data comprising one or more processed words includes determining whether each word of the data is spelled correctly based on a predetermined list of words, and if a word is spelled incorrectly, associating the word with an identifier indicative of the word being spelled incorrectly, or if a word is spelled correctly, associating the word with an identifier indicative of the word being spelled correctly. The method can further include associating an identifier with each word of the data indicative of a word usage for the word, determining whether each word is a location word, and if a word is a location word, associating the word with an identifier indicative of the word being a location word. The method can further include generating processed data based on a number of words in the data indicative of an insurance company name, a number of words associated with an identifier indicative of the word being spelled correctly, or both.

In another embodiment, selecting one or more candidate word strings based on the one or more processed words includes identifying the data indicative of an insurance company name includes a definitive word pattern. Selecting one or more candidate word strings based on the one or more processed words can include calculating a number of words in the data indicative of an insurance company name and associating an identifier indicative of the number of words with the data. Selecting one or more candidate word strings based on the one or more processed words can include determining whether the data includes two or more words with a same usage number. Selecting a first word in the data, wherein the first word has an earliest location in the data of the two or more words with the same usage number, and selecting the one or more candidate word strings based on the first word. The matching information associated with each of the one or more candidate word strings can include a number of words in the data indicative of an insurance company name, a sequence of words in the data, an identifier indicative of whether a location word exists in the data, a location of a location word in the data, or any combination thereof.

In another embodiment, generating analysis information for each of the one or more candidate word strings based on the associated matching information includes determining whether a location word is in the data, the location word being indicative of an insurance company name, and if there is a location word, for each location word, determining a position of the location word in the data indicative of an insurance company name, and associating the word with an identifier indicative of the position. The method can further include calculating a weighted word match count based on a word usage number for the data indicative of an insurance company name, the one or more candidate word strings, or both. The method can further include calculating a sequence number count based on a difference in relative sequence of a lowest usage word in the data indicative of an insurance company name and each of the one or more candidate word strings. The lowest usage word can be a word used least in the data indicative of an insurance company name. The method can further include calculating an average absolute sequence number count for each of the one or more candidate word strings based on a difference in relative sequence of a word in the data indicative of an insurance company name and the candidate word string. Associating an insurance company identifier with received data based on the analysis information and one or more matching rules can include associating the insurance company identifier based on a word usage number and a number of candidate word string matches.

The invention, in another aspect, features an apparatus. The apparatus includes an auditing system configured to receive data indicative of an insurance company name, the data comprising one or more words. The apparatus includes an insurance company name translator in communication with the auditing system configured to process the data through one or more processing steps to generate processed data comprising one or more processed words. The insurance company name translator is further configured to select one or more candidate word strings based on the one or more processed words. The insurance company name translator is further configured to associate matching information with each of the one or more candidate word strings. The insurance company name translator is further configured to generate analysis information for each of the one or more candidate word strings based on the associated matching information. The insurance company name translator is further configured to associate an insurance company identifier with received data based on the analysis information and one or more matching rules.

The invention, in another aspect, features a computer program product, tangibly embodied in a computer readable storage medium. The computer program product includes instructions being operable to cause a data processing apparatus to receive data indicative of an insurance company name, the data comprising one or more words. The instructions are further operable to cause a data processing apparatus to process the data through one or more processing steps to generate processed data comprising one or more processed words. The instructions are further operable to cause a data processing apparatus to select one or more candidate word strings based on the one or more processed words. The instructions are further operable to cause a data processing apparatus to associate matching information with each of the one or more candidate word strings. The instructions are further operable to cause a data processing apparatus to generate analysis information for each of the one or more candidate word strings based on the associated matching information. The instructions are further operable to cause a data processing apparatus to associate an insurance company identifier with received data based on the analysis information and one or more matching rules.

The invention, in another aspect, features an apparatus. The apparatus includes means for receiving data indicative of an insurance company name, the data comprising one or more words. The apparatus includes means for processing the data through one or more processing steps to generate processed data comprising one or more processed words, selecting one or more candidate word strings based on the one or more processed words, associating matching information with each of the one or more candidate word strings, generating analysis information for each of the one or more candidate word strings based on the associated matching information, and associating an insurance company identifier with received data based on the analysis information and one or more matching rules.

The techniques described herein can provide one or more of the following advantages. Claims can be automatically converted from an imaged form to a digital or electronic form, reducing both the time and cost required to prepare a claim for review. Electronic claims can be automatically translated and verified against rules associated with parts appropriate or approved for a specific vehicle, operations allowable or needed for a specific vehicle repair, and other insurance company specific guidelines implemented as part of an insurance policy or the Company's best practices. Together and separately, each of these advantages reduce the time and cost required to audit the claims and collectively and/or separately improve the quality of the claim settlement and repair.

Better auditing can lead to not only better cost control but also better auditing quality, which in turn positively impacts vehicle values for the owners, quality of repairs for the owners, and insurance rates that are tied in part to expense ratios. The personnel required to review the claims are reduced, the quality is improved, and all claims are now able to be automatically reviewed, which benefits both the consumer as well as the parties involved in the claims process. Sets of rules used to translate and verify the claims can be easily updated and modified, allowing the system and apparatus to grow to meet future demands. In addition to enabling auditing across many verticals of business, the automation of claims processing and auditing enabled through these techniques enables automated settlement between parties, reducing the cost, time and personnel burden of cash settlement between these parties.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings.

FIGS. 6A-6J are diagrams of exemplary tables for translating make and model data of a data file;

FIG. 6L is an exemplary diagram of a match determination table;

FIG. 10A shows an exemplary graph 1000 for word position versus word usage count;

FIGS. 10B-10D show exemplary string tables and exemplary analysis output tables;

FIGS. 16B-16G are exemplary screen shots of an exemplary web utility used to carry out features of the subject invention.

DETAILED DESCRIPTION

Figure 1:
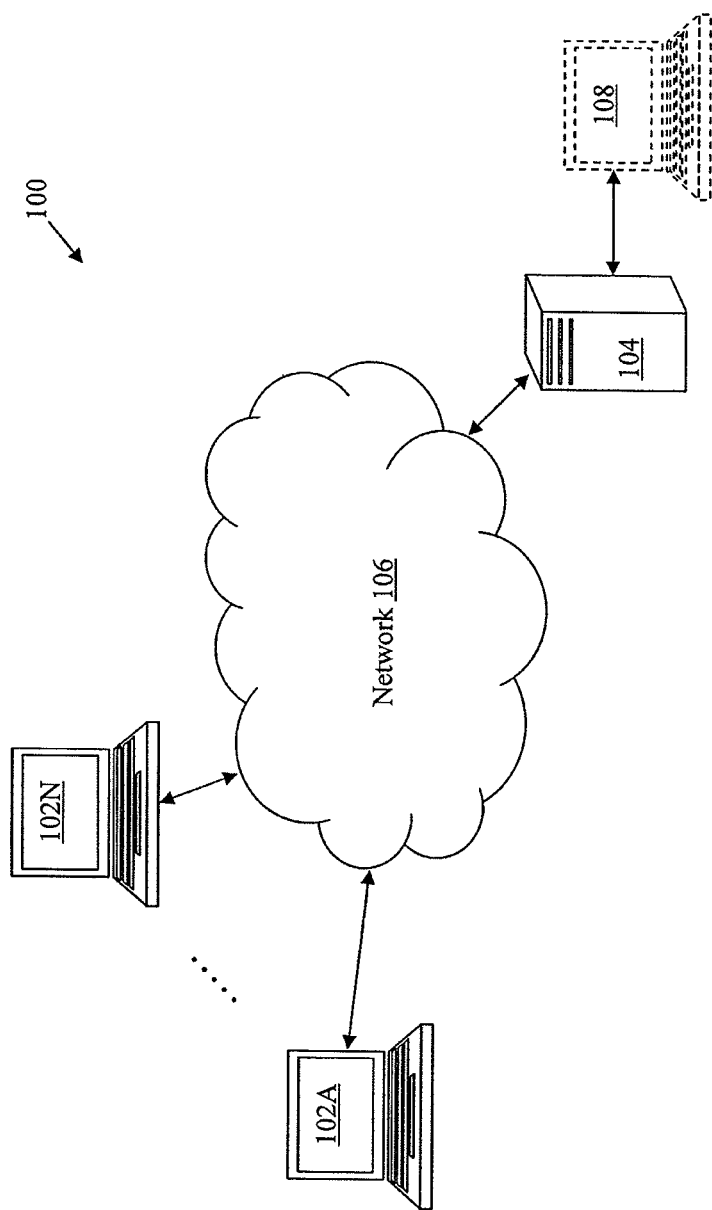
FIG. 1 is a block diagram illustrating an exemplary auditing system network.

It should be understood that the principles described herein are not limited in application to the details of construction or the arrangement of components set forth in the following description or illustrated in the following drawings. The principles can be embodied in other embodiments and can be practiced or carried out in various ways. Also, it is to be understood that the phraseology and terminology used herein is for the purpose of description and should not be regarded as limiting.

Exemplary embodiments are illustrated in the drawings. Although this specification refers primarily to auditing replacement parts used in automobile insurance claims, it should be understood that the subject matter described herein is applicable to any type of insurance claim, such as, for example, property insurance or medical insurance. It should be noted that a plurality of hardware and software based devices, as well as a plurality of different structural components can be utilized to implement the invention. Furthermore, and as described in subsequent paragraphs, the specific configurations illustrated in the drawings are intended to exemplify embodiments of the principles described here in and that other alternative configurations are possible.

While some terms (e.g., matching terms and terms in the figures and associated descriptions) are described in the specification in all uppercase letters, this is for exemplary purposes only, and it should be understood that the terms can be represented in any combination of lowercase and uppercase letters. Similarly, if terms are described in lowercase and/or uppercase letters, or any combination thereof, the terms can be represented in any combination of lowercase and uppercase letters. Further, while some embodiments are described using tables, this is for exemplary purposes only and is not intended to be limiting. The number of columns and/or rows depicted in tables are for exemplary purposes only. Any additional number of rows and/or columns can be added to implement the principles presented below. Data can be stored in any data structure, such as a table, a linked list, single or multi-dimensional data array, circular array, and/or any other type of data structure.

In general overview, auditable items of a data file are translated into a translated item description. Each translated item description is compared to a plurality of predetermined terms to generate matching information, and using the matching information each translated item description is associated with an item identifier. Each auditable item is accepted or rejected based on the item identifier and one or more rules associated with the data file.

FIG. 1 illustrates a block diagram of an exemplary auditing system network 100. The auditing system network 100 includes client computers 102A through 102N (collectively client computers 102) connected to auditing system 104 through network 106. An optional auditing system maintenance computer 108 is directly in communication with auditing system 104. The client computers 102 can be, for example, insurance carriers.

The auditing system 104 may be any known computing system but is preferably a programmable, processor-based system. For example, the computer 104 may include a microprocessor, a hard drive, random access memory (RAM), read only memory (ROM), input/output (I/O) circuitry, and any other well-known computer component. The computer 104 is preferably adapted for use with various types of storage devices (persistent and removable), such as, for example, a portable drive, magnetic storage (e.g., a floppy disk), solid state storage (e.g., a flash memory card), optical storage (e.g., a compact disc or CD), and/or network/Internet storage. The computer 104 may comprise one or more computers, including, for example, a personal computer (e.g., an IBM-PC compatible computer) or a workstation (e.g., a SUN or Silicon Graphics workstation) operating under a Windows, MS-DOS, UNIX, or other suitable operating system and preferably includes a graphical user interface (GUI).

Figure 2:
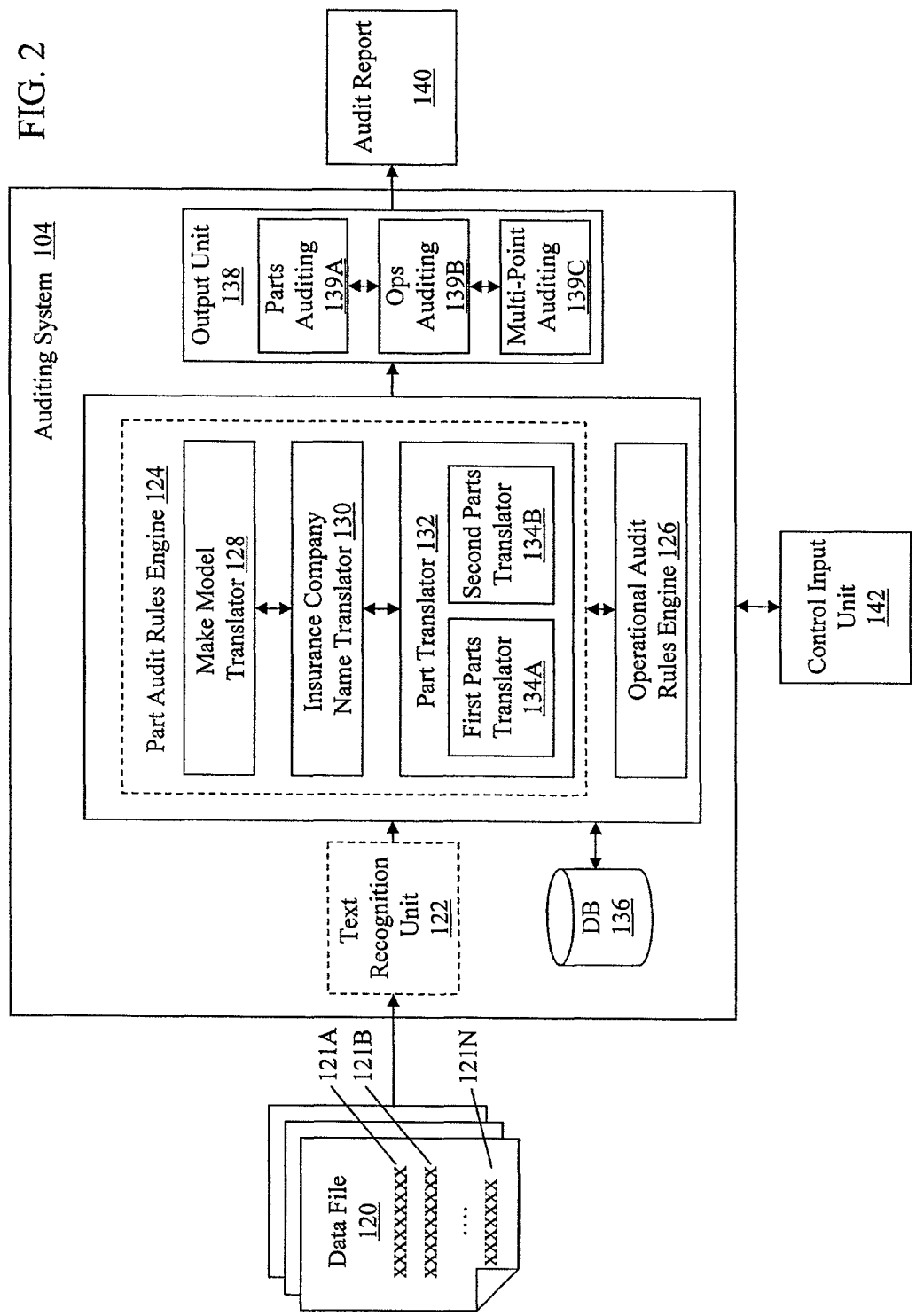
FIG. 2 is a block diagram showing an exemplary auditing system.

FIG. 2 illustrates an exemplary block diagram of auditing system 104 of FIG. 1. The client computers 102 submit one or more data files 120 to auditing system 104. Data file 120 includes auditable items 121A through 121N (collectively auditable items 121). The auditing system 104 includes an optional text recognition unit 122. The text recognition unit 122 is in communication with the part audit rules engine 124 and the operational audit rules engine 126. The parts audit rules engine 124 includes the make model translator 128, the insurance company name translator 130, and the part translator 132. The make model translator 128 is in communication with the insurance company name translator 130. The parts translator 132 includes the first parts translator 134A and the second parts translator 134B. The parts audit rules engine 124 and the operational audit rules engine 126 is in communication with database 136. The parts audit rules engine 124 and the operational audit rules engine 126 are also in communication with output unit 138. Output unit 138 outputs audit report 140.

Output unit 138 can include applications that use identifiers (e.g., generated by the make model translator 128, the insurance company name translator 130, the parts translator 132, and/or the operational audit rules engine 126) to generate various types of reports. Output unit 138 includes a parts auditing application 139A, an operational (ops) auditing application 139B, and a multi-point auditing application 139C (collectively, report applications 139). The output unit 138 can include need not include all of the auditing applications 139. In some examples, the multi-point auditing application 139C uses the output from the parts auditing application 139A and the ops auditing application 139B to generate a multi-point audit report. The operation of these applications is described with reference to the figures below.

The control input unit 142 is in communication with the auditing system 104. The control input unit 142 is used to transmit rules, guidelines, standards, responses, actions, and/or other control information to the auditing system 104. While the parts audit rules engine 124 is shown to include the make model translator 128, the insurance company name translator 130, and the parts translator 132, the components of the parts audit rules engine 124 can be implemented in one or more modules (e.g., software programs, hardware components). In some embodiments, the control input unit 142 performs an inventory parts update. For example, once every pre-determined time period (e.g., every 24 hours) the control input unit 142 updates the inventory of parts stored in database 136 by adding any new parts and/or modifying existing parts.

The client computers 102 transmit the data file 120 to auditing system 104 using, for example, fax, mail, email, a web service, or any other type of communication tool. The data file 120 is entered, for example, manually, transmitted as an electronic data file, and/or transmitted as an image file. If the data file 120 is transmitted as an image file, the text recognition unit 122 can translate the image into machine-editable text fields (e.g., translate data file 120 into machine-editable auditable fields 120, where the auditable fields 120 include an associated word string) for translation by translator 104. For example, text recognition unit 122 can perform an optical character recognition (OCR) of images of handwritten, typewritten, or printed data files (e.g., captured by a scanner as a PDF file) into machine-editable text fields. The parts translator 132 receives the output of the machine-editable text fields from the text recognition unit 122. In some embodiments, the auditing system 104 receives a machine-editable data file 120, and the text recognition unit 122 can be omitted.

Figure 3:
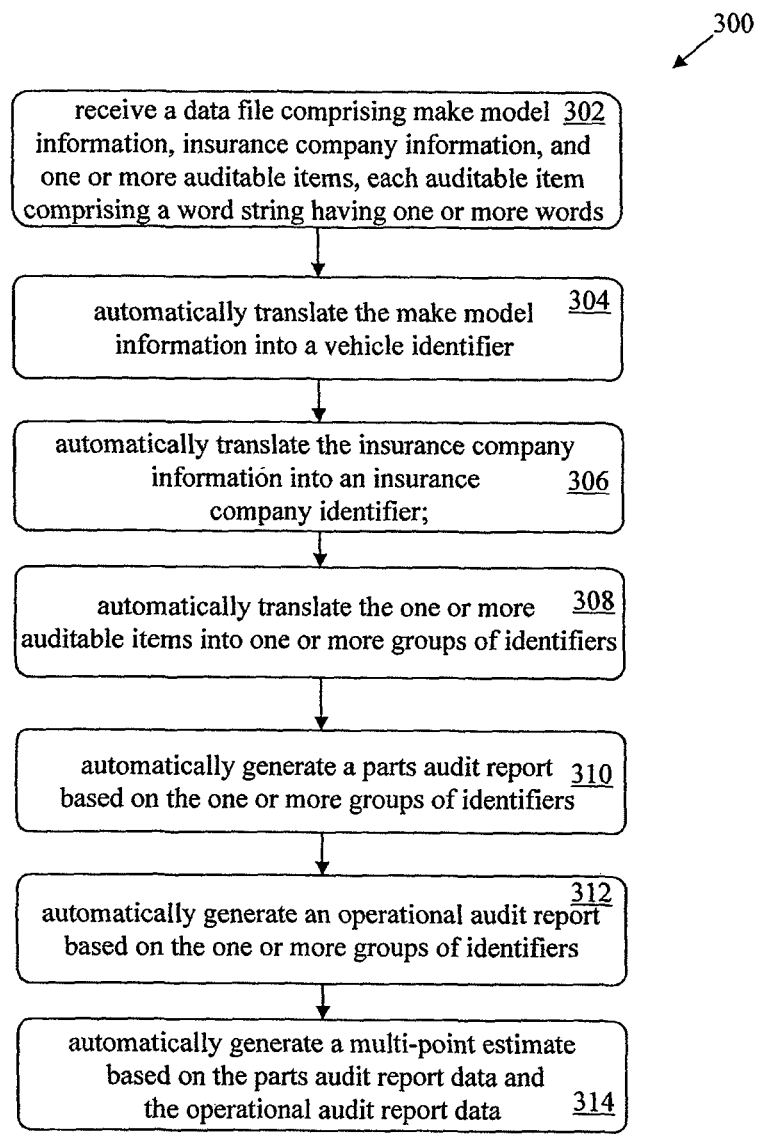
FIG. 3 is a flow chart of an exemplary method for automatically generating a multi-point estimate.

FIG. 3 is a flow chart of an exemplary method 300 for automatically generating a multi-point estimate (i.e., a full, automated review of an estimate, as if performed by an actual person). The auditing system 104 receives (302) a data file (e.g., data file 120) comprising make model information, insurance company information, and one or more auditable items (e.g., auditable items 121), each auditable item comprising a word string having one or more words. The auditing system 104 automatically translates (304) the make model information into a vehicle identifier. The auditing system 104 automatically translates (306) the insurance company information into an insurance company identifier. The auditing system 104 automatically translates (308) the one or more auditable items into one or more groups of identifiers. The one or more groups of identifiers can include one or more part item identifiers, one or more operational item identifiers, or both.

The auditing system 104 automatically generates (310) a parts audit report based on the one or more groups of identifiers, the parts audit report comprising data indicative of whether one or more parts of the one or more auditable items is accepted based on one or more rules associated with the insurance company identifier. The auditing system 104 automatically generates (312) an operational audit report based on the one or more groups of identifiers. The operational audit report includes data indicative of whether one or more operations of the one or more auditable items is accepted based on one or more rules associated with the insurance company identifier. The auditing system 104 automatically generates (314) a multi-point estimate based on the parts audit report data and the operational audit report data.

Figure 12A:
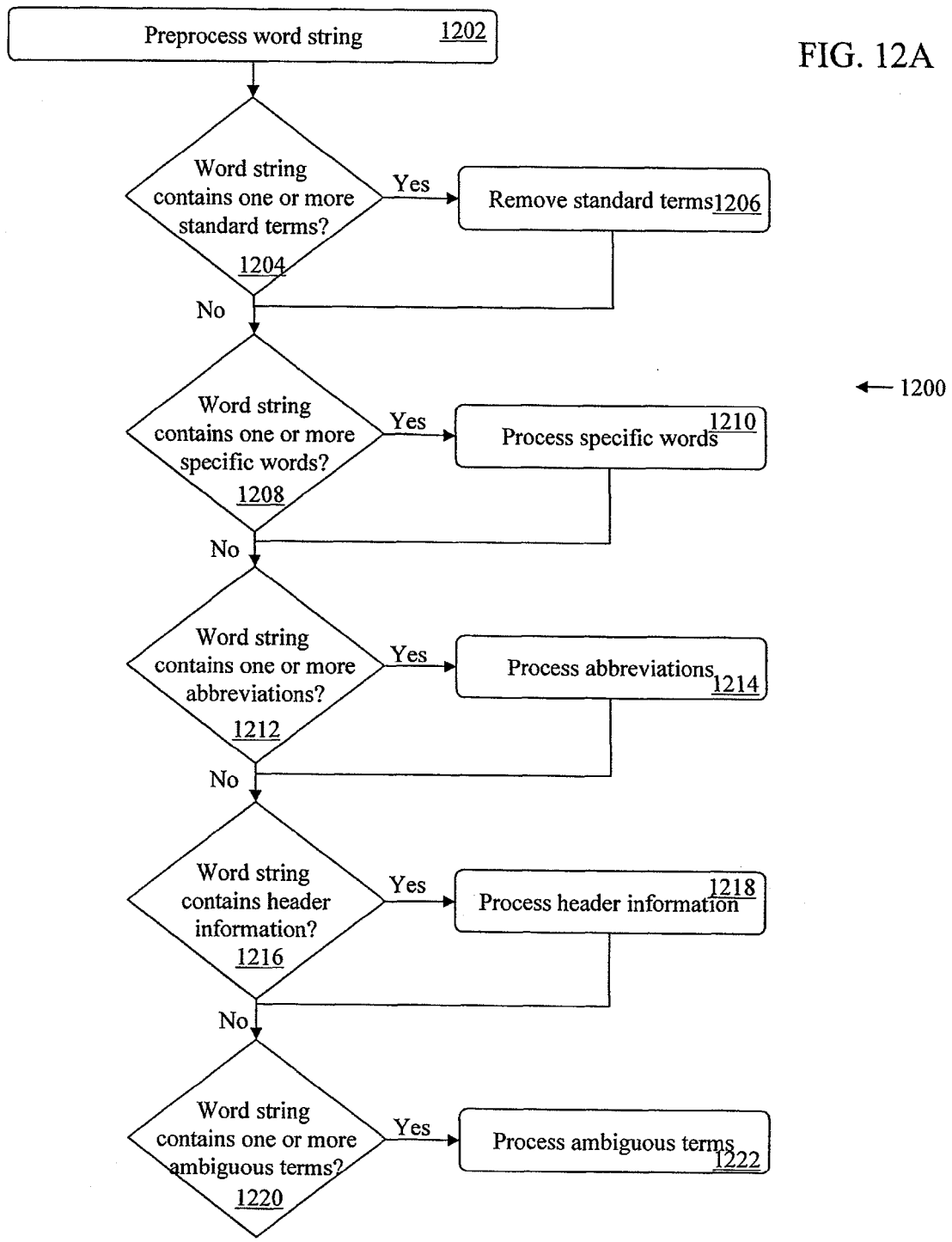
FIG. 12A is a flow chart of an exemplary method for initial processing of a word string during translation.

With respect to step 304, the make model translator 128 translates the make model information into the vehicle identifier. This process is described in further detail with reference to FIGS. 4-6L. With respect to step 306, the insurance company name translator 130 translates the insurance company information into the insurance company identifier. This process is described in further detail with FIGS. 7-10D. With respect to step 308, the part translator 132 (e.g., the first parts translator 134A, the second parts translator 134B, and/or both) translates one or more of the auditable items into one part item identifiers. This process is described in further detail with FIGS. 12A-13. The operational audit rules engine 126 translates one or more of the auditable items into operational item identifiers (e.g., repair/estimate operations). This process is described in further detail with FIGS. 12 and 14A-14C.

In an exemplary embodiment, the translators (e.g., the translators of the part audit rules engine 124 and the operational audit rules engine 126) take unstructured data (e.g., from the text recognition unit 122 and/or from the data file 120 directly) and translate the outputs into identifiers recognized by the auditing system 104. These identifiers are processed through one (1), or a combination of three (3), audit processes (e.g., the parts auditing application 139A, the ops auditing application 139B, and/or the multi-point auditing application 139C). Advantageously, by developing multiple audit processes, the processes can work independently of each other, allowing an insurance company or other business to use them for specific needs. For example, an insurance company may desire to have an internal claims review team use the parts auditing services of the auditing system 104 (e.g., provided through the parts auditing application 139A) to confirm parts utilization on estimates. Or, the same insurance company may want to have repair estimates reviewed for accuracy of repair operations for vehicles being repaired (e.g., via the ops auditing application 139B). In another example, an insurance company may want to have repair estimates reviewed in a completely automated process (e.g., via the multi-point auditing process 139C).

With respect to step 310, the auditing system 104 applies the part identifiers to a database and application (e.g., the database 136 and the parts auditing application 139A of FIG. 2) to audit for best practices and compliance to insurance policy guidelines, generating the parts audit report ("parts auditing" or "parts auditing services"). Of single repair components, parts can have a large impact on overall claim severity. The parts auditing component (e.g., the parts auditing application 139A, when used in conjunction with the other required components of the auditing system 104) of the auditing system 104 ensures accuracy in parts utilization on repair estimates. Parts auditing services deliver accurate parts inventory to appraisers, confirm parts availability for insurance company review teams, automatically approve part selections on behalf of insurers, and document historical availability for subrogation reviewers.

Existing services that are known in the art can help an insurance company locate parts for use in an estimate. These services can be found online (e.g., CarPart.com) or can be found inside the estimating software solutions used by appraisers. The online services are manual and require an appraiser to manually enter a website and search for specific parts. The services inside an estimating software system are more automated, but they only work for specific parts and also require the part to be associated with an accurate OEM number from the manufacturer. This OEM number is not always available (e.g., only approximately 35% of the time), and the services are further restricted by the limited number of parts that are supported.

The parts auditing component of the auditing system 104 utilizes parts translators (e.g., the first parts translator 134 and the second parts translator 134B) designed and developed as a means to: (1) take inventory provided by part suppliers each day (e.g., over 140,000,000 pieces of inventory daily) and translate them so that a part identifier can be tagged on to each piece of inventory received, and (2) to take estimate line item descriptions from repair estimates (e.g., data file 120) and to translate and associate those line item descriptions with a part identifier.

Once the translators translate estimated line item details for parts into a unique part identifier, the auditing system 104 can provide part alternatives by searching the database (e.g., database 136) for matching identifiers, filter out inventory not approved by an insurer, and/or audit for compliance to specific part use guidelines of the insurer. Advantageously, because the auditing system 104 does not rely on OEM numbers or a user to manually do the search, the parts auditing component can be performed on all parts listed on an estimate because the process is automatic and complete.

With respect to step 312, the auditing system 104 applies operational item identifiers to a database and application (e.g., the database 136 and the ops auditing application of FIG. 2) to audit for best practices and compliance to insurance policy guidelines, generating the operational audit report ("operational auditing" or "repair/operation auditing"). Operational auditing refers to the auditing of line items on a repair estimate (e.g., data file 120) that do not involve a physical removal of a vehicle part (i.e. a hood) with the replacement of a replacement part in place of the removed part. For example, operational auditing includes auditing labor hours, auditing repair operations (e.g., recharging an AC compressor), auditing labor rates for a repair operation, and auditing the number of hours it takes to remove and replace a physical part (but not the audit of the part itself, just the operation). Once an estimate file (e.g., data file 120) is converted (e.g., via text recognition unit 122, if necessary), it can be input into the automated auditing systems, and in this example the operational auditing system (e.g., the ops auditing application 139B of FIG. 2).

Currently operational auditing system providers are limited with capabilities. Each requires that the data is received in an electronic format, the data received is associated on the same line of the estimate, and the data being audited is of a pre-defined value (e.g., not any free text, semi-structured or un-structured data). These limitations make operational auditing inefficient and impractical in attempting to audit all claim estimates. Less than 50% of the industry's claim estimates are available in an electronic form so insurance companies cannot rely on an automated auditing solution. Additionally, because the only result from current operational auditing providers is a YES/NO result for an isolated line of an estimate data, the user encounters incomplete feedback from the auditing system and is required to review the materials manually to confirm.

For example, assume a repair estimate is received electronically (not as an image). Each line on the repair estimate identifies a repair operation that must take place during the repair of the vehicle. Assume line number fourteen (14) includes an operation code of "REPAIR", a line item description inserted by the appraiser of "FULL FRAME", a part type/part number of "Existing", and labor units of "9.0."

Current operational auditing systems can identify and understand an electronic code for REPAIR and the labor units of 9.0, but cannot interpret or understand FULL FRAME because it is a written/typed description. As such, current operational auditing systems can only make decisions with an electronically received (formatted) repair estimate, and the result of such systems can only take place with respect to a single line item (e.g., information from other lines can not be considered). Such operational auditing systems cannot consider parts information as it relates to an operation.

Therefore, a rule that says do not allow FRAME labor to exceed 6 units would be run and line fourteen (14) would not fail because the operational auditing system would not identify the line was associated with a FRAME repair. This would cause the insurance company to incorrectly allow a repair appraiser to have increased hours on line fourteen, and ultimately this "gap" in capability of the auditing system providers places a burden on the insurance company to manually check each estimate even after running the rules against the audit to know if the audit rule fired correctly. Advantageously, by translating FULL FRAME into a corresponding operational identifier, the operational auditing application 139B of the auditing system 104 can properly apply operational rules, eliminating the need for manual review and improper rule firing. If a repair estimate is not received electronically (e.g., is received as an image), without the translators (e.g., the make model translator 128, the insurance company name translator 130, and the parts translator 132 of FIG. 2) the repair estimate file would need to be processed manually. As such, the auditing system 104 can automatically translate both electronic and non-electronic files.

With respect to step 314, the auditing system combines identifiers and/or reports (e.g., the part identifiers and the operational item identifiers and/or the parts audit report and operational audit report) into an auditing application that would simulate a review of an estimate, as if performed by an actual person, generating a multi-point estimate ("multi-point auditing"). Multi-point auditing enables real-time, fully automated review, audit and approval of a claim repair estimate, without human review.

Multi-point auditing can be achieved because the auditing system can, through it's various components, identify a data set and then understand what that data set means, for every field of every estimate detail, regardless of whether it is a part or operational line item (e.g., the translators can translate the required data into meaningful identifiers for use by the auditing system 104). This capability enables not only the electronic auditing of claims or other data files, but it opens the road for complete automation of approval, procurement and payment activities between insurers, repairers and suppliers into the claims repair process.

Multi-point auditing allows multiple data points, across a repair estimate, to be considered in whole so that a decision can be made about any specific line's accuracy or appropriateness. For example, assume a data file includes multiple line items, two of which are: (1) line item=six (6), operation=CHECK/ADJUST, line item description=HEADLAMPS, and labor units="0.4", and (2) line item=seven (7), operation=REMOVE/REPLACE, line item description="L FRT COMBINATION LAMP ASSEMBLY", and labor units="INC." Conventional auditing systems known in the art can not properly audit this line item combination for inappropriate labor operations (such as aiming headlamps). In the multi-point auditing process of the auditing system 104, the translators (e.g., the part translator 132) would have associated a part identifier to the description in line seven to mark it as a headlamp being replaced. The auditing system 104 would have kept track of such a detail from line seven (e.g., via storage in database 136) and scanned the remaining lines of the estimate to find that line six includes a labor operation that would also be translated for a headlamp. The auditing system would store that information and use rules to deduce that estimating software (e.g., Mitchell Ultra-Mate Estimating Software) adds enough labor for replacing a headlamp (line seven) to include the aiming operation. The multi-point auditing would therefore alert the appraiser and the insurer that line six should be deleted, as the operation was included in the cost of line seven.

Advantageously, repair estimates can be received, processed, reviewed/audited, and required changes (if they exist) can be communicated back to the appraisal source and the insurer without human intervention. Multi-point auditing can be performed on all claims regardless of what format they are received (electronic or imaged). Additionally, the process for translating outputs of the conversion process can be applied to all types of forms. For example, medical claims can be audited, where billions of claims are dealt with annually, and all of them are rubber stamped and paid or audited with less than trustworthy tools that require human review of the audit results after the fact. Advantageously, if all claims data can be converted to digital form, the ability to enable procurement, real-time automated settlement, and many other features exists.

Figure 4:
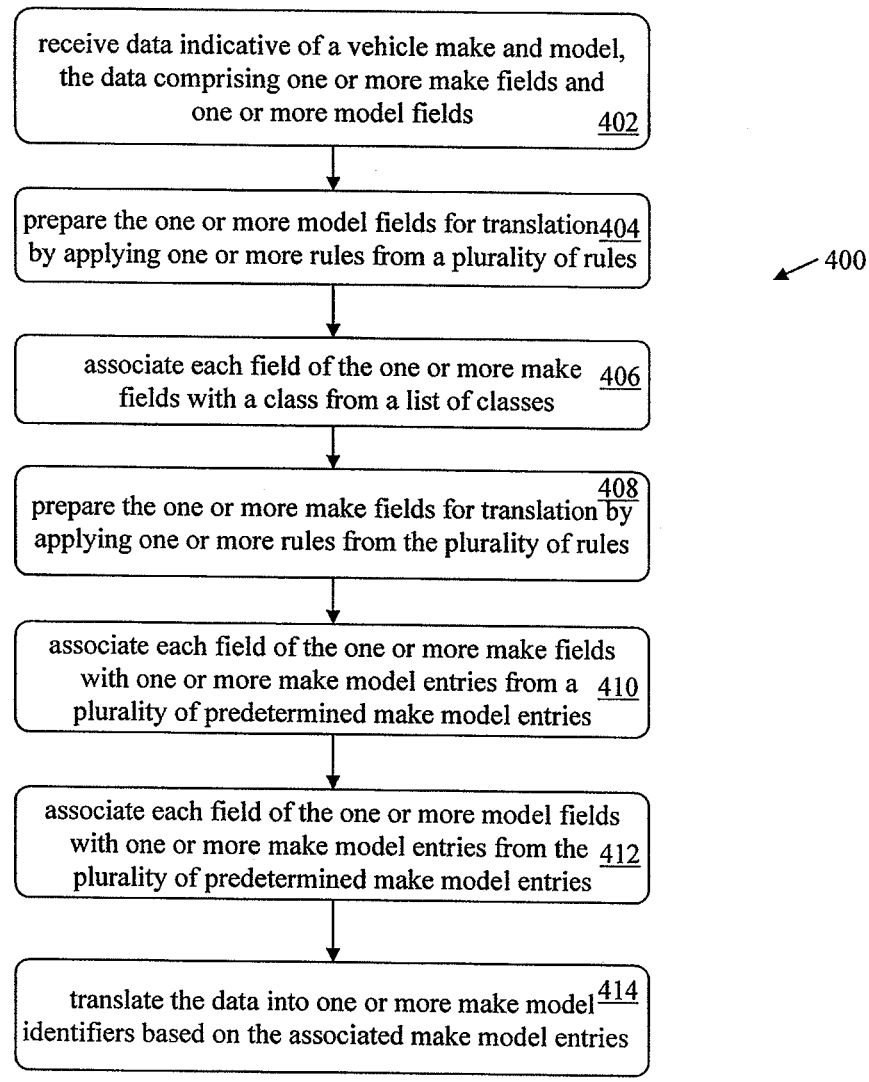
FIG. 4 is a flow chart of an exemplary method for automatically translating make and model data of a data file.
Figure 5A:
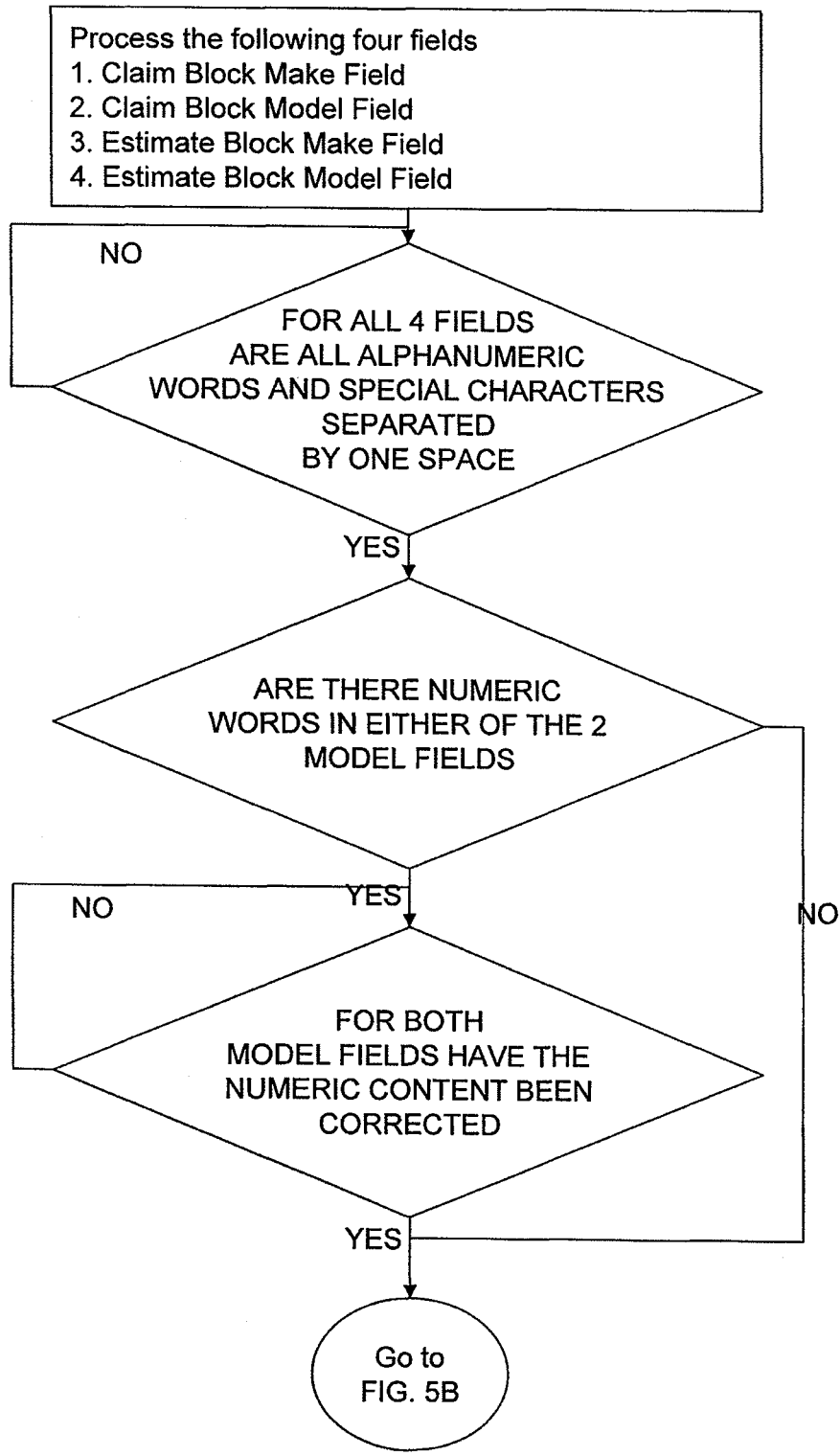
FIGS. 5A-5Y are flow charts of a more detailed method of the exemplary method of FIG. 4.
Figure 5B:
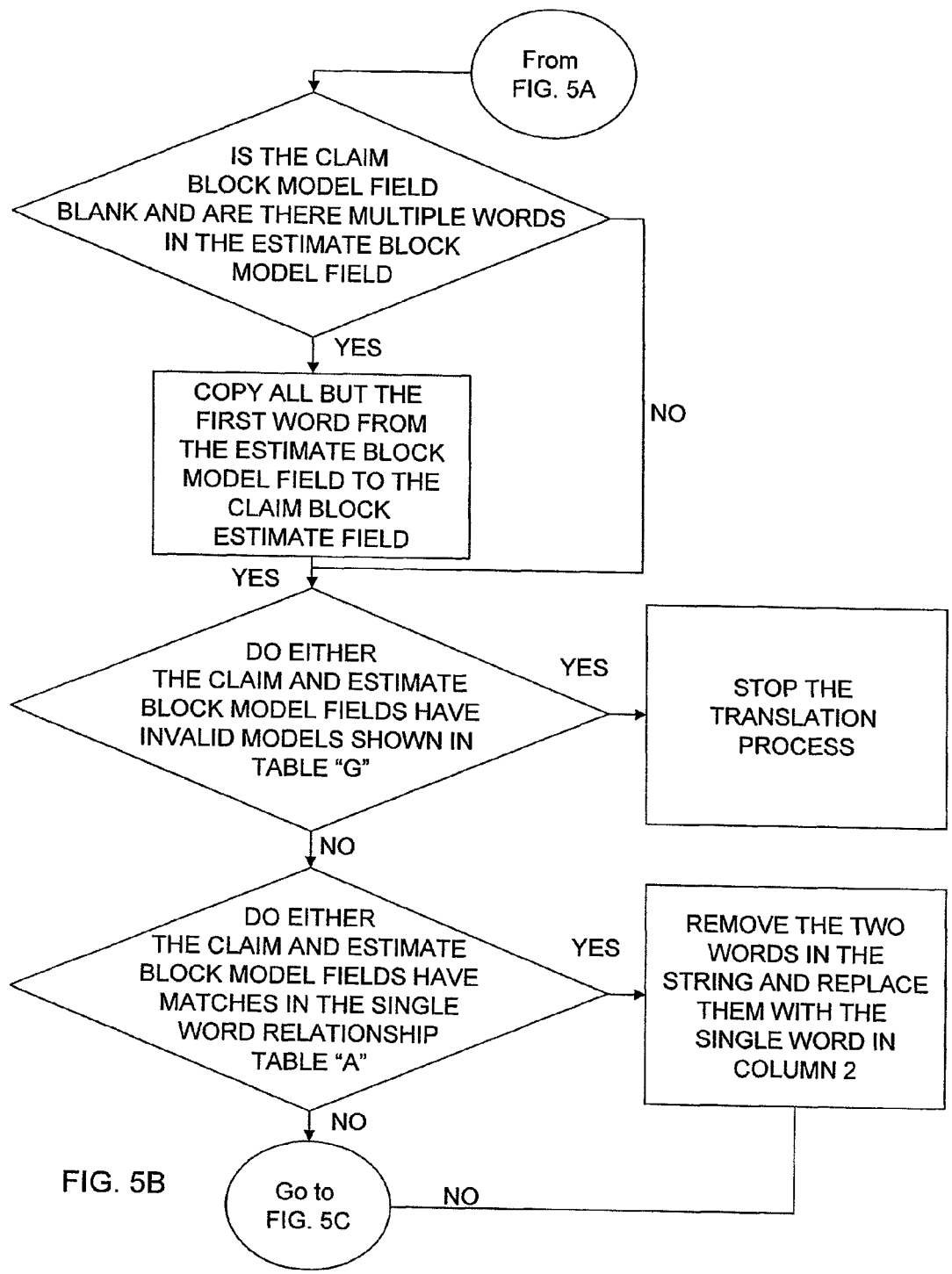
Figure 5C:
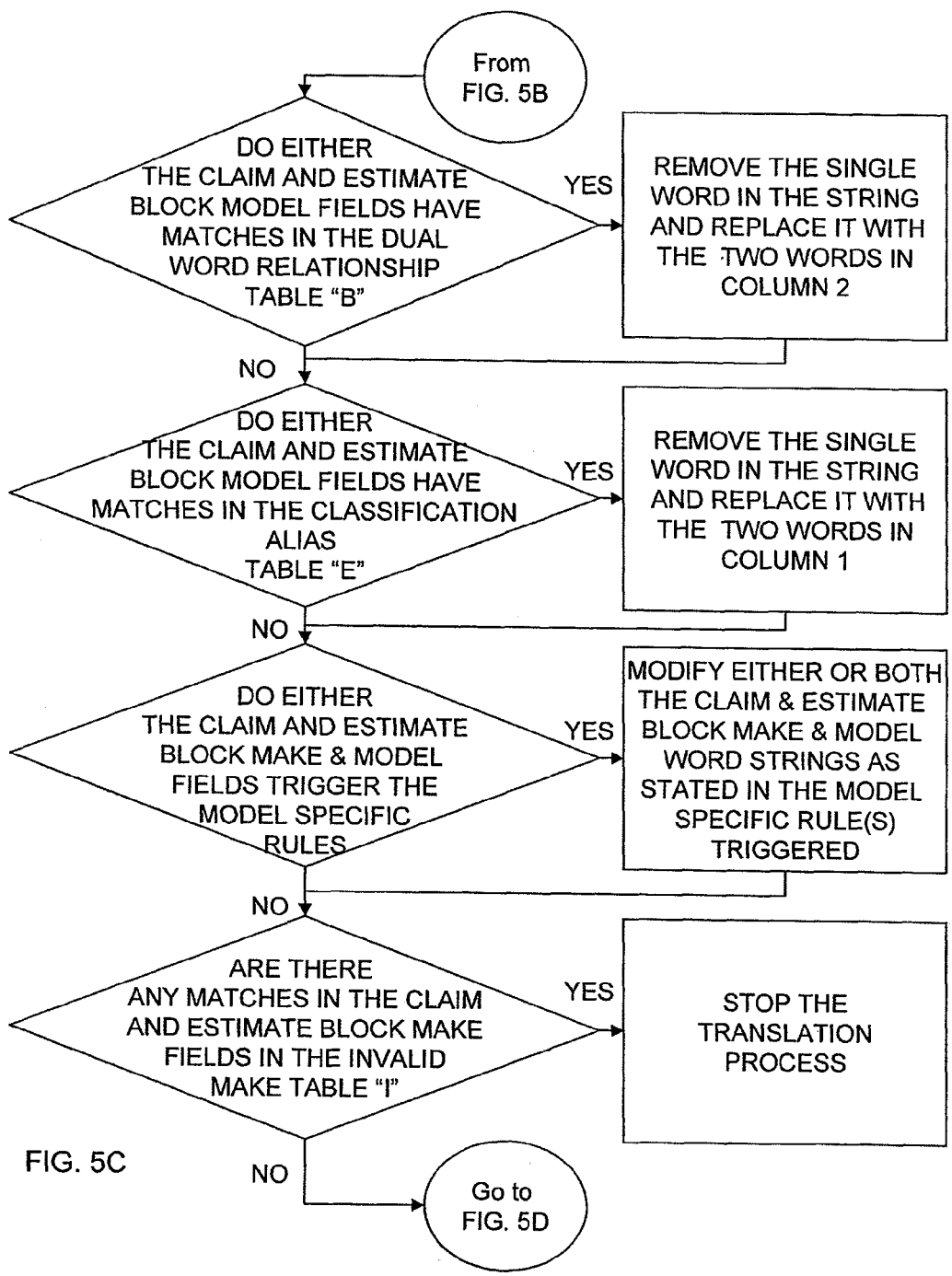
Figure 5D:
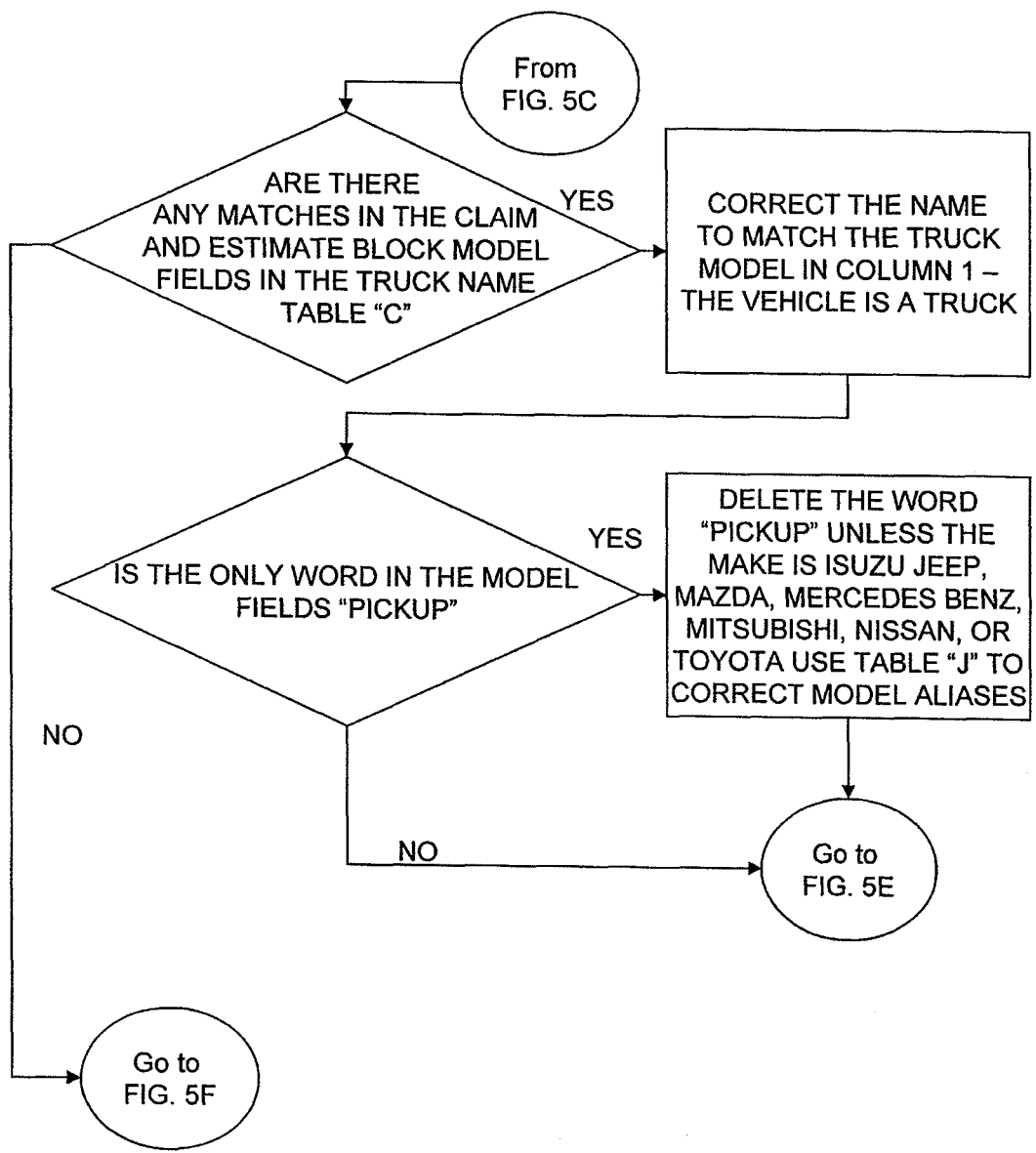
Figure 5E:
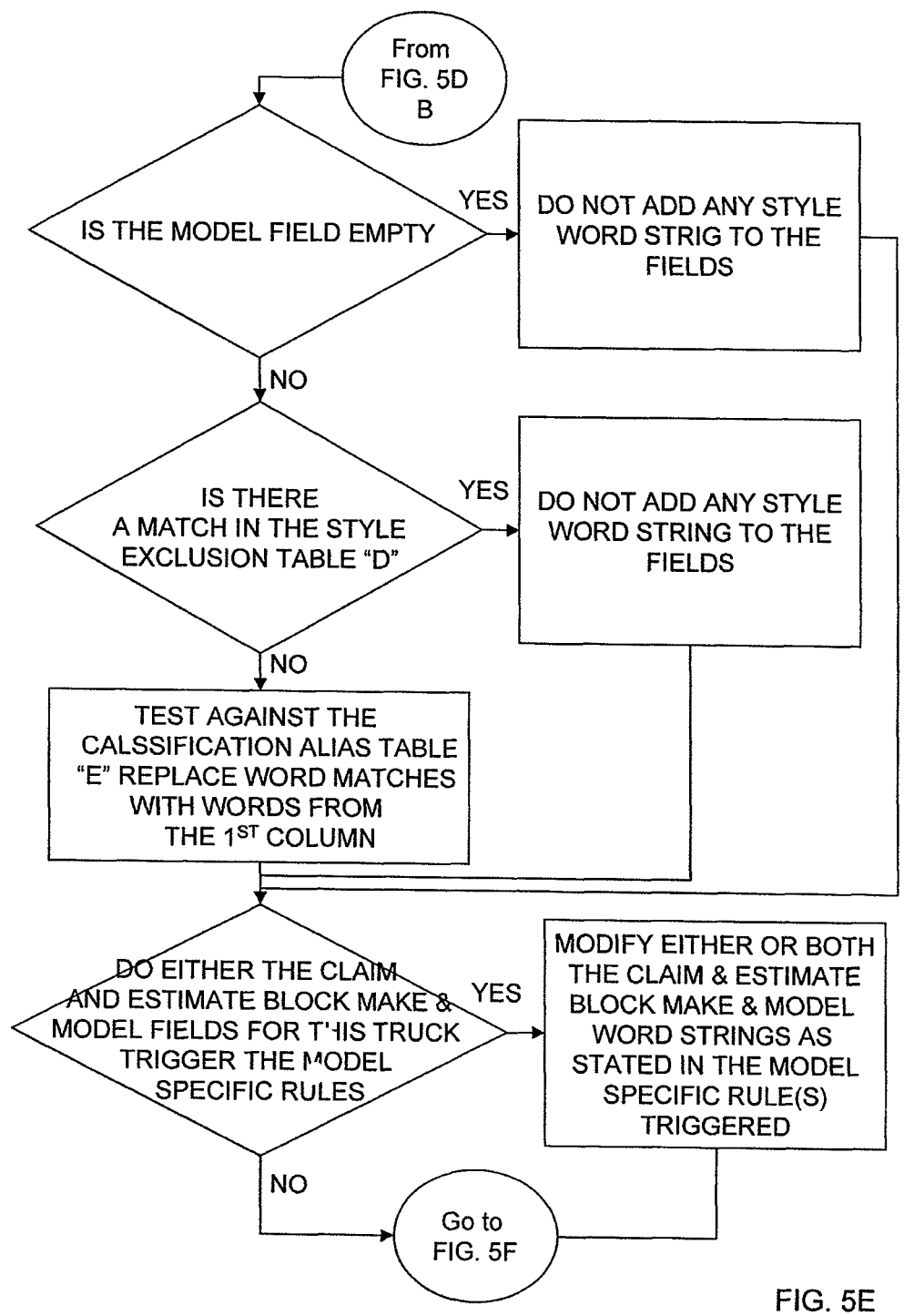
Figure 5F:
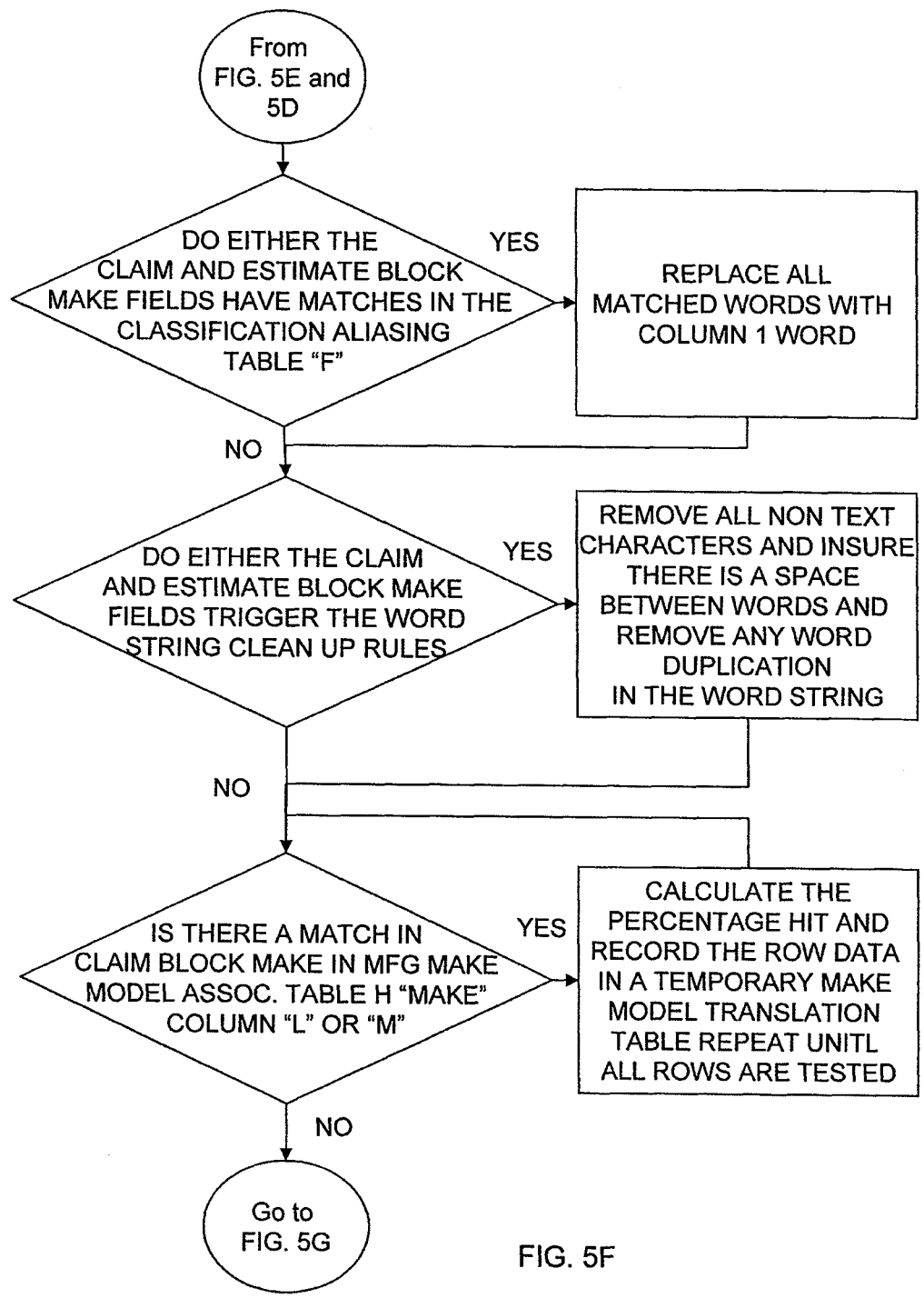
Figure 5G:
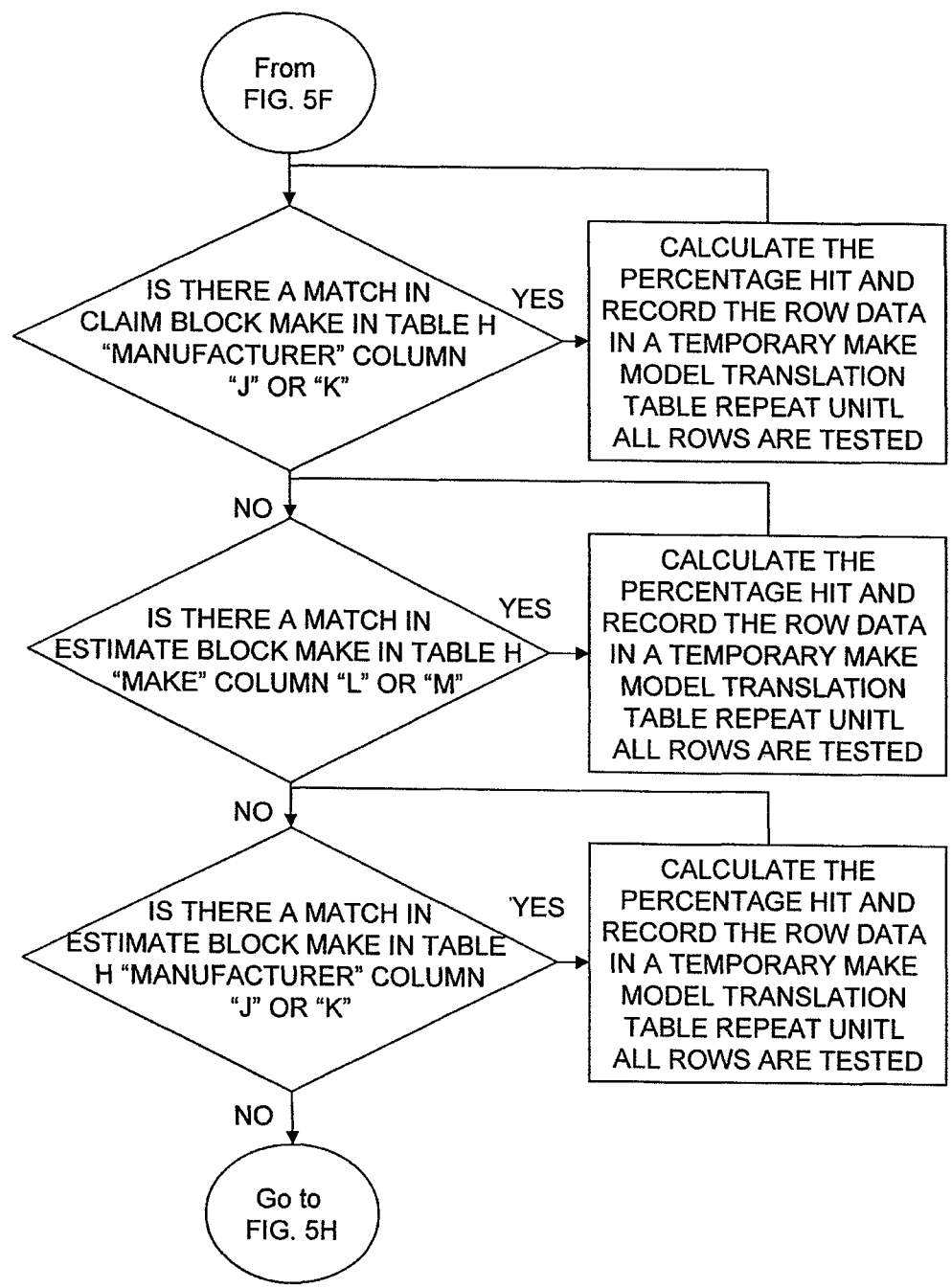
Figure 5H:
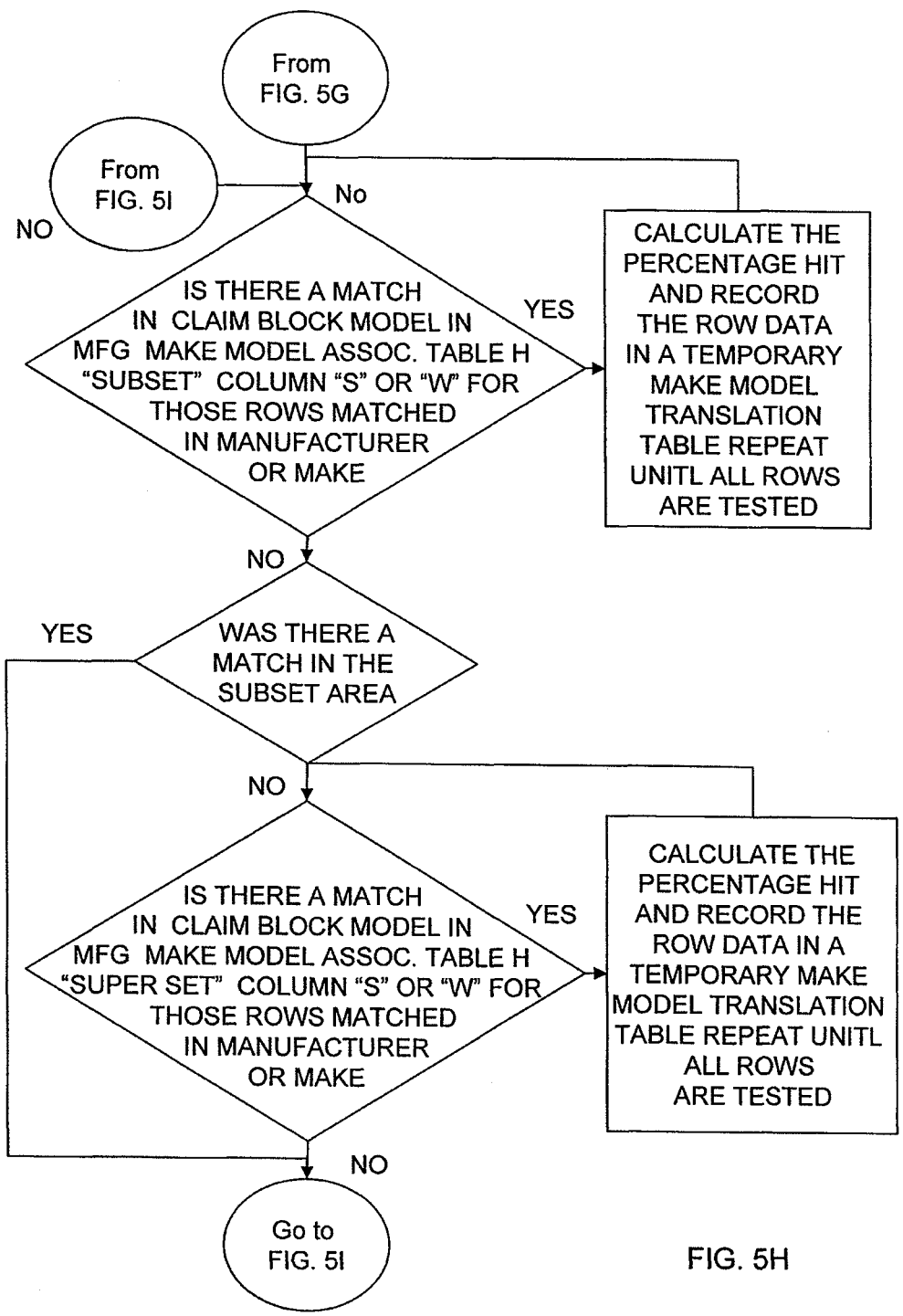
Figure 5I:
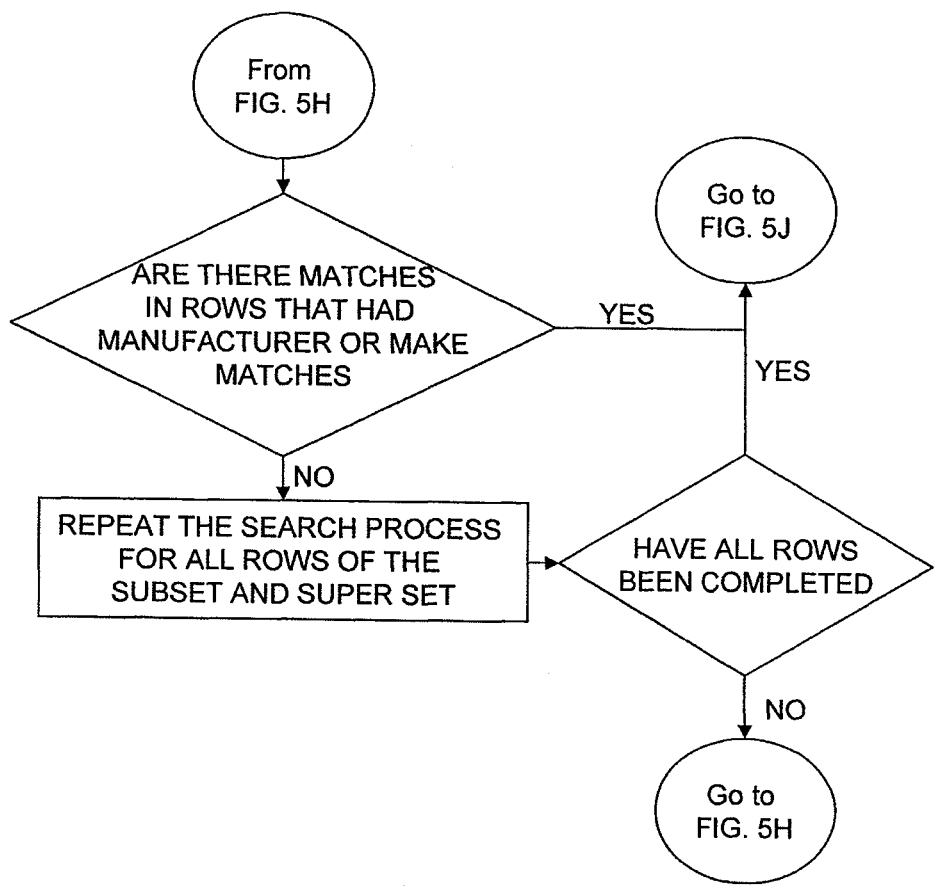
Figure 5J:
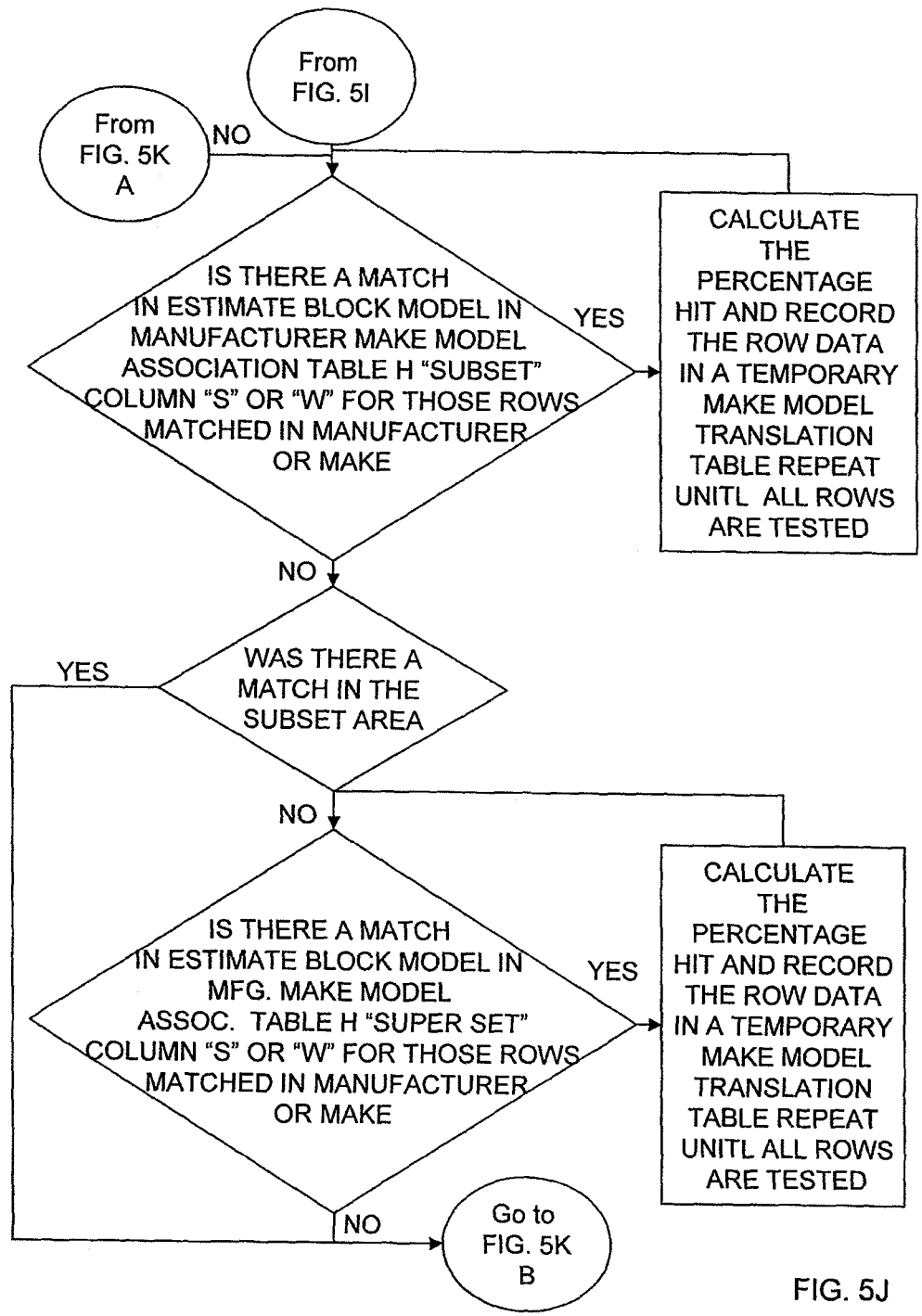
Figure 5K:
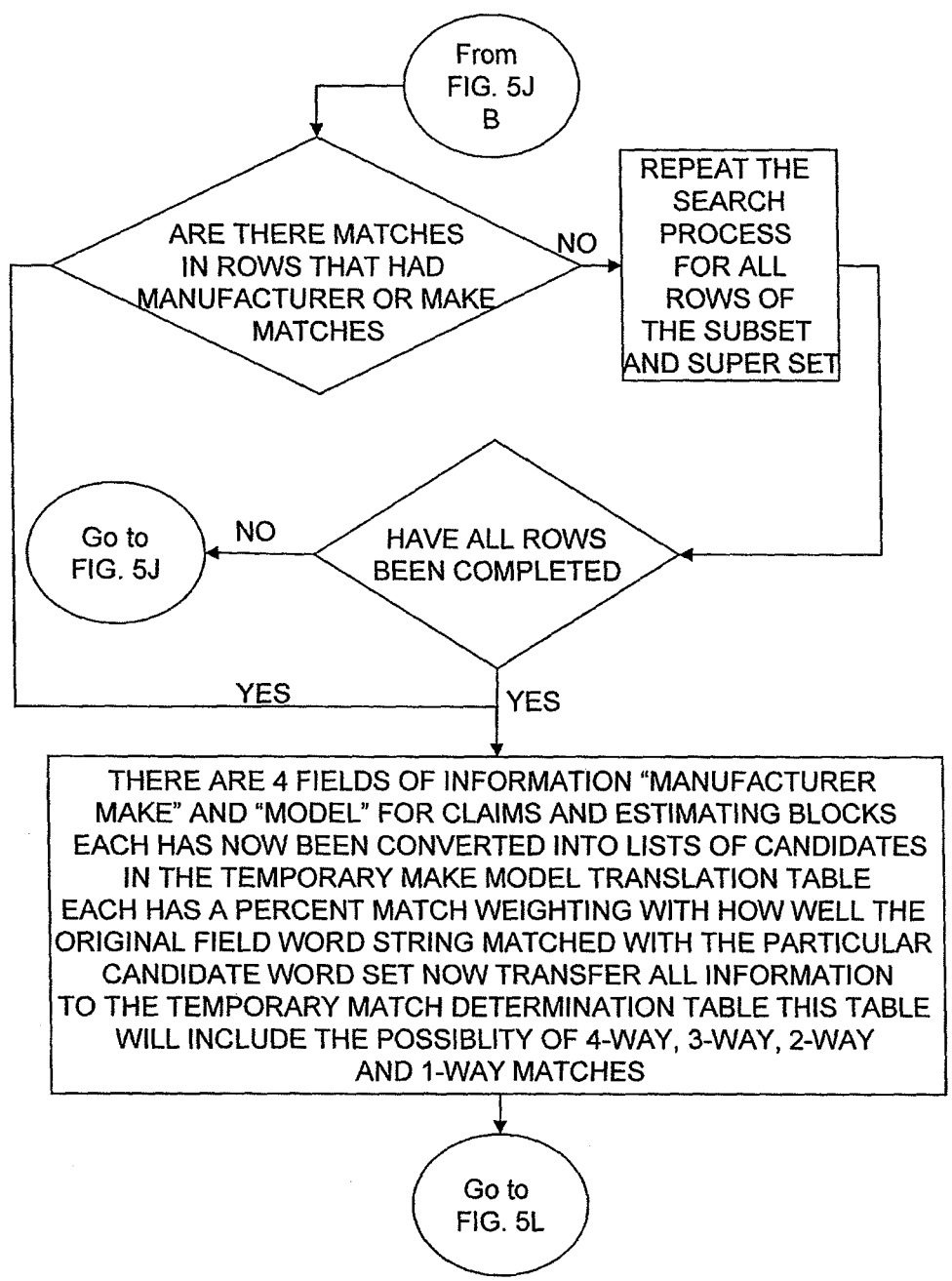
Figure 5L:
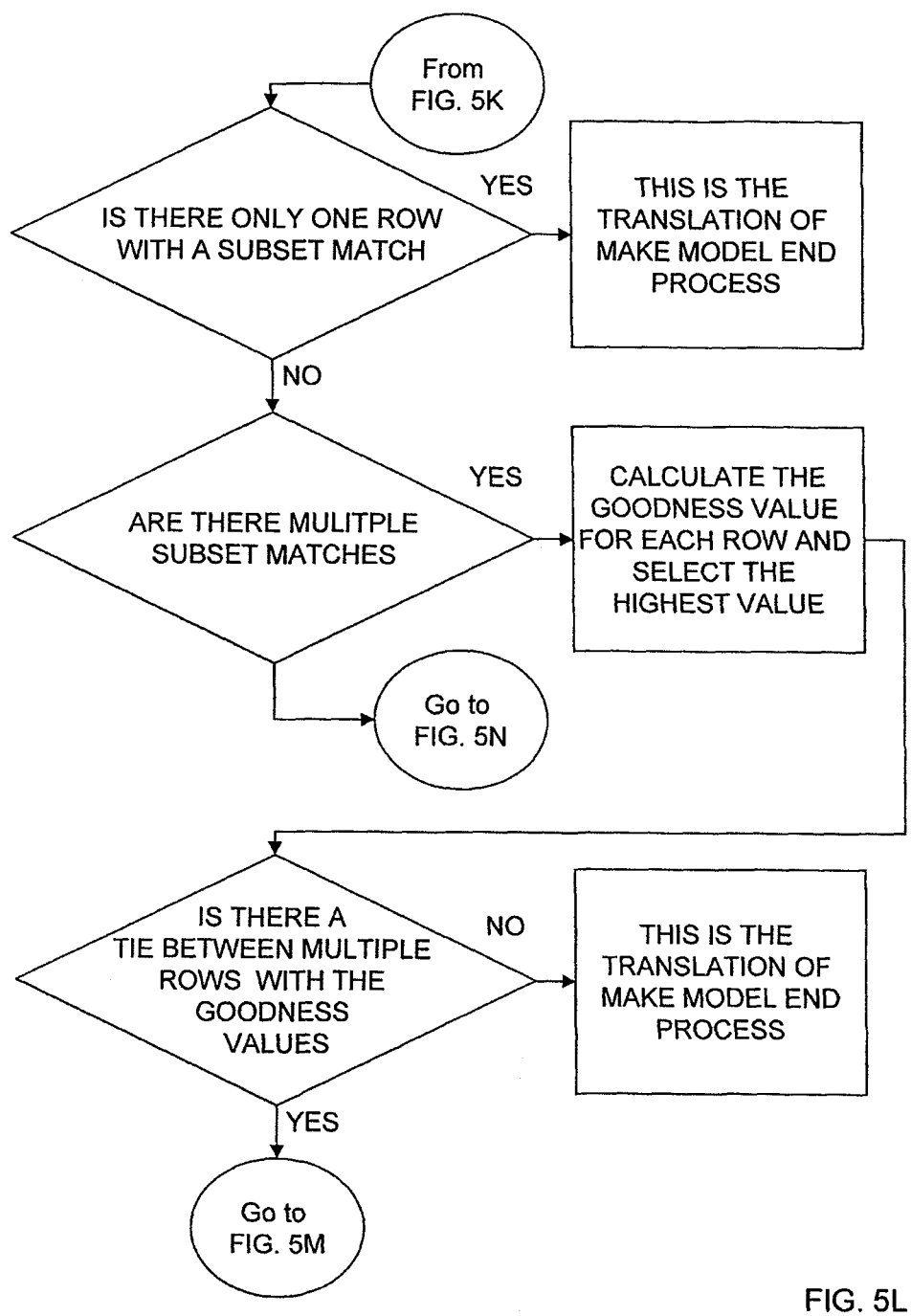
Figure 5M:
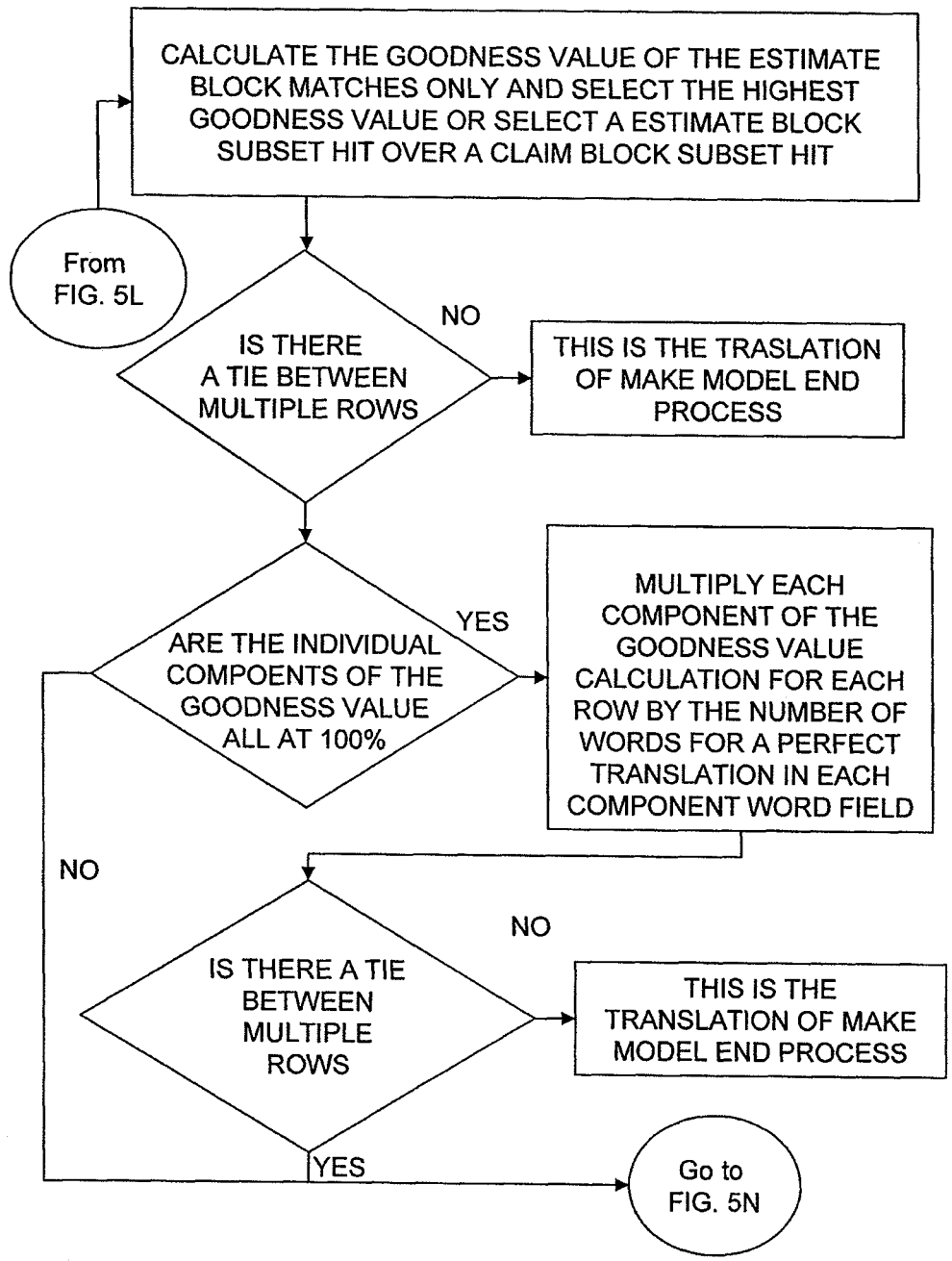
Figure 5N:
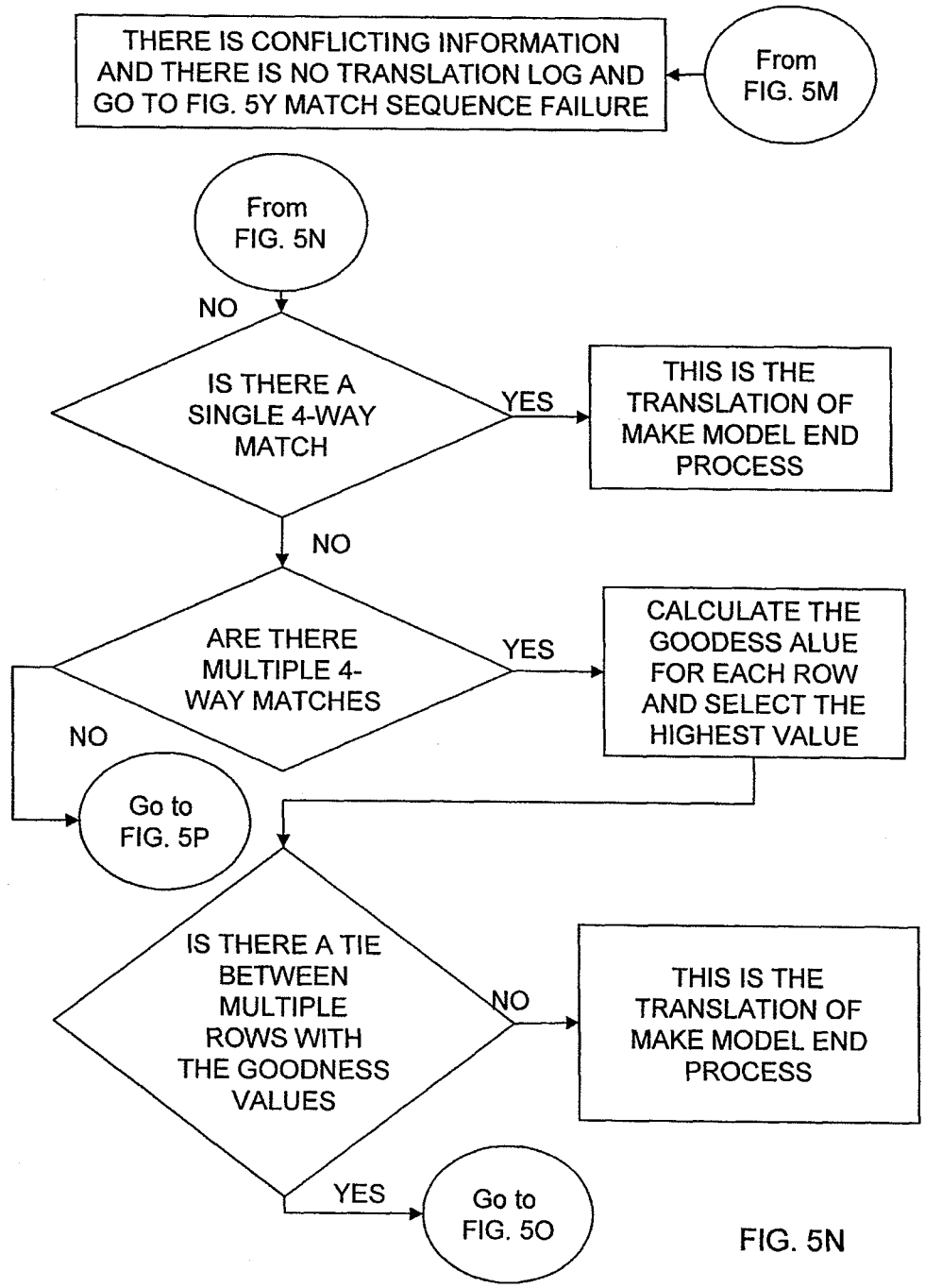
Figure 5O:
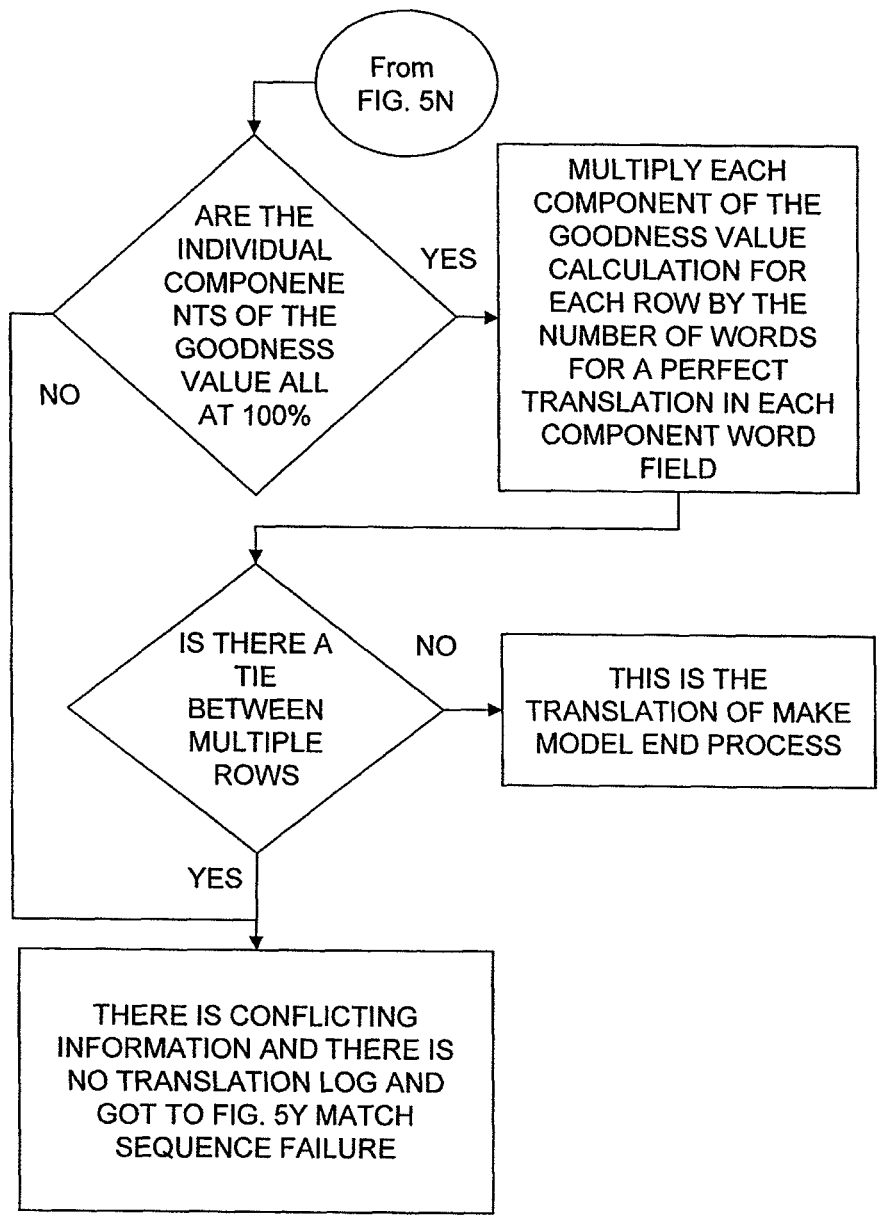
Figure 5P:
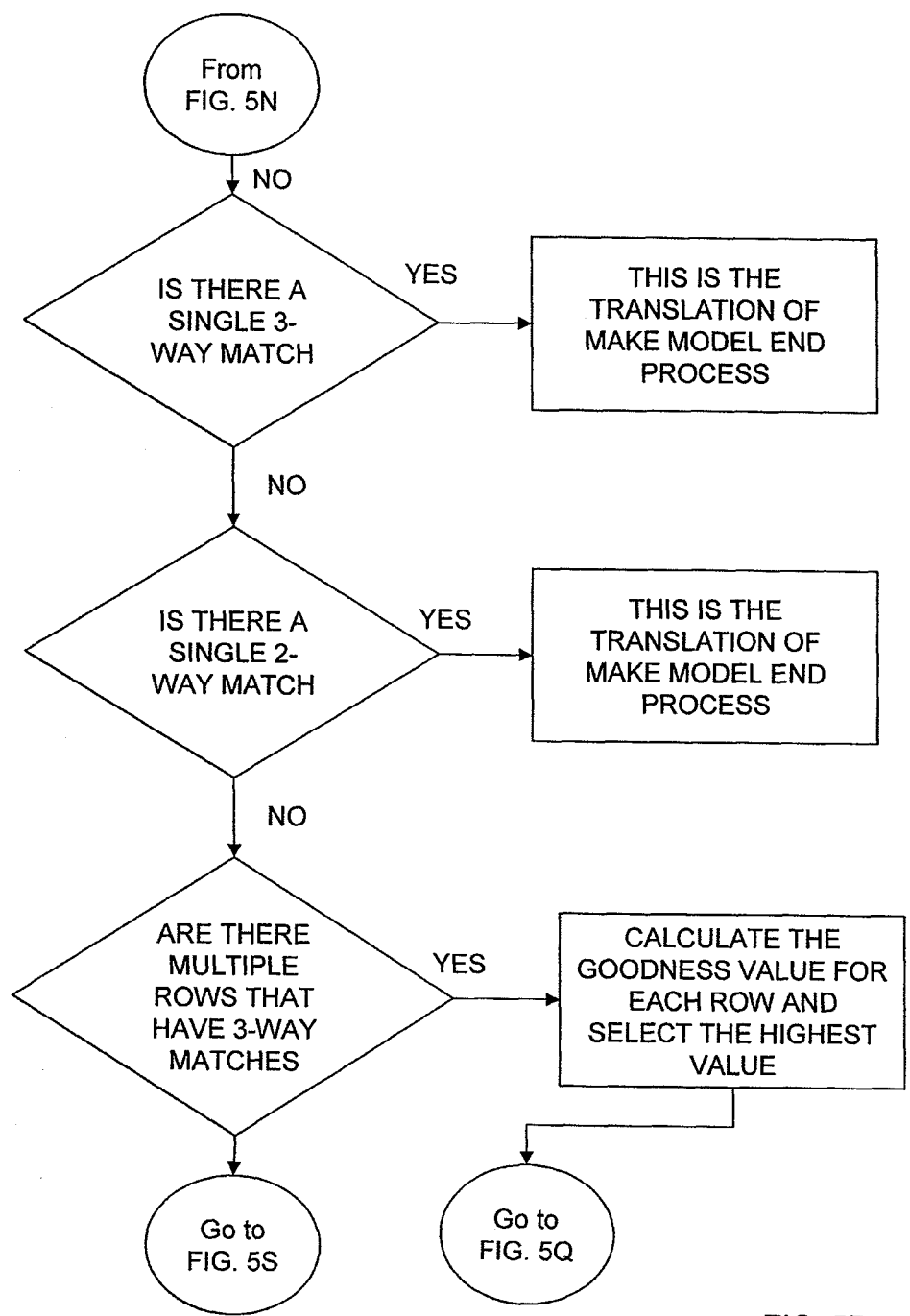
Figure 5Q:
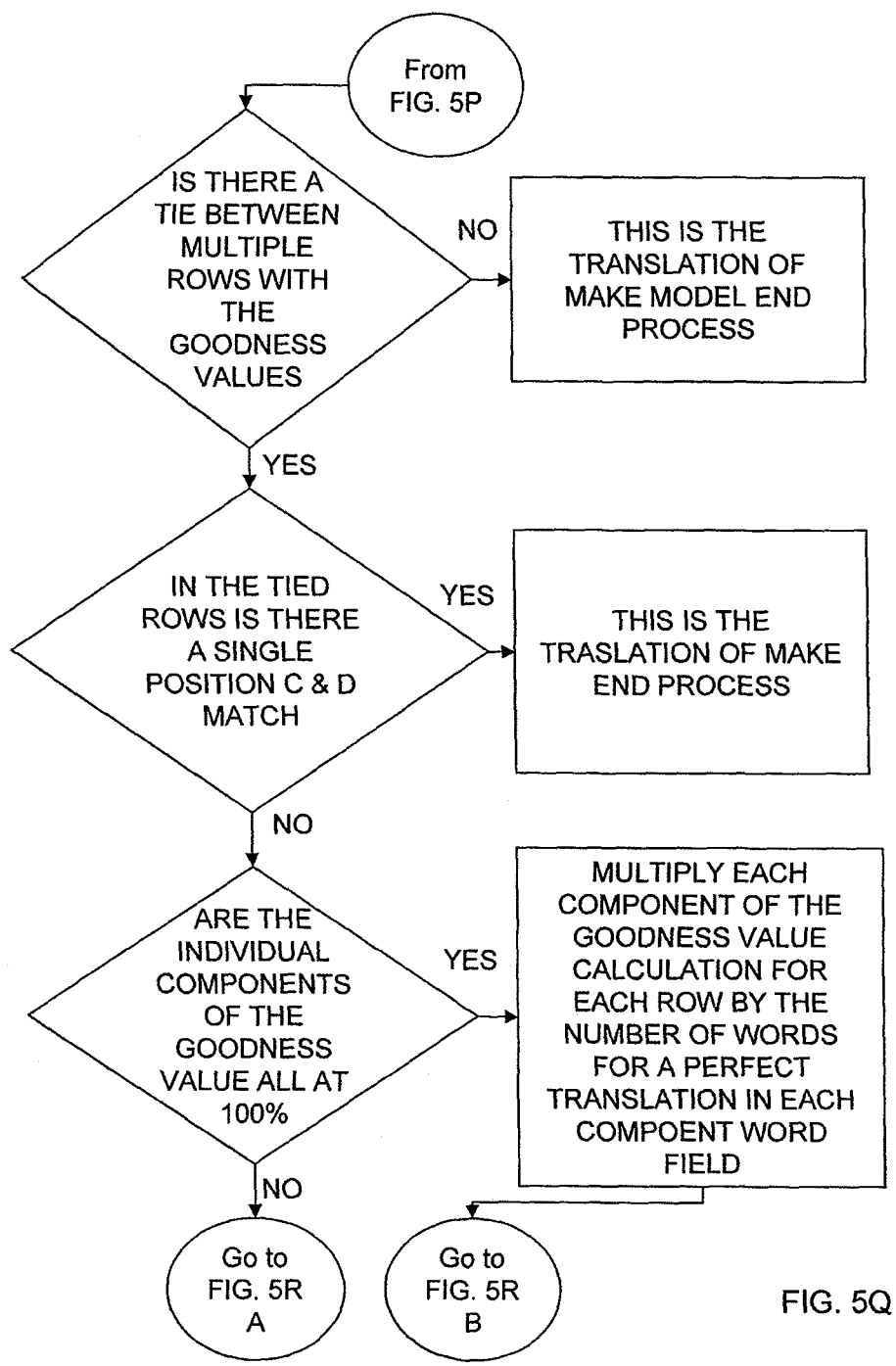
Figure 5R:
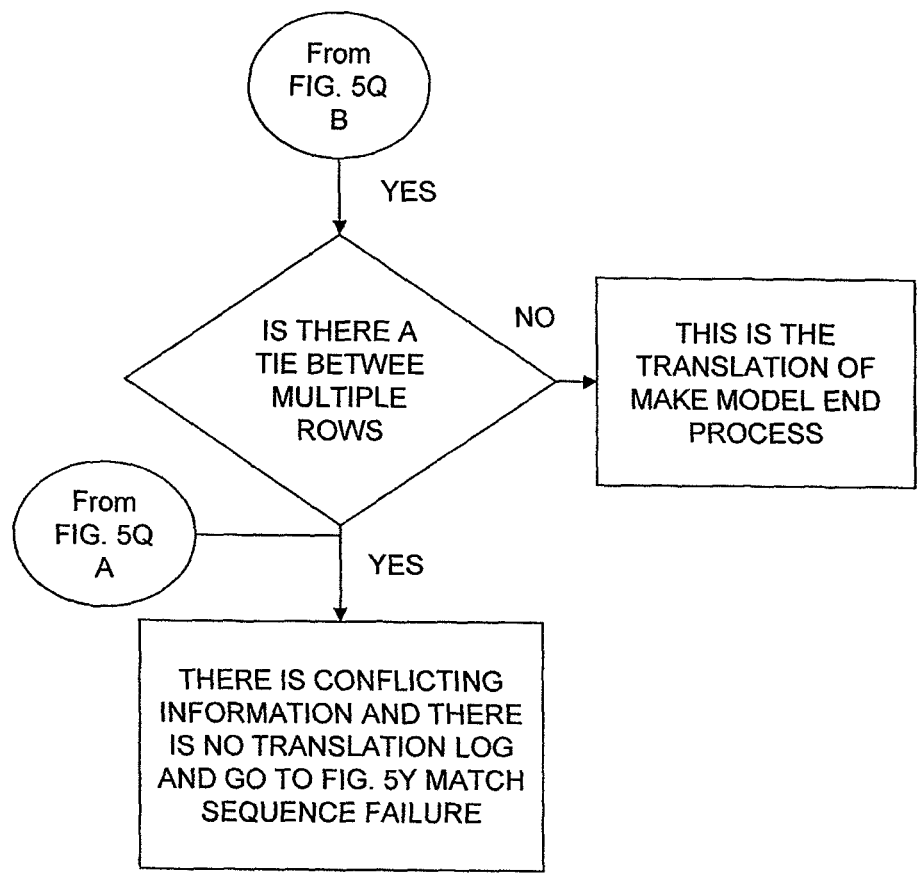
Figure 5S:
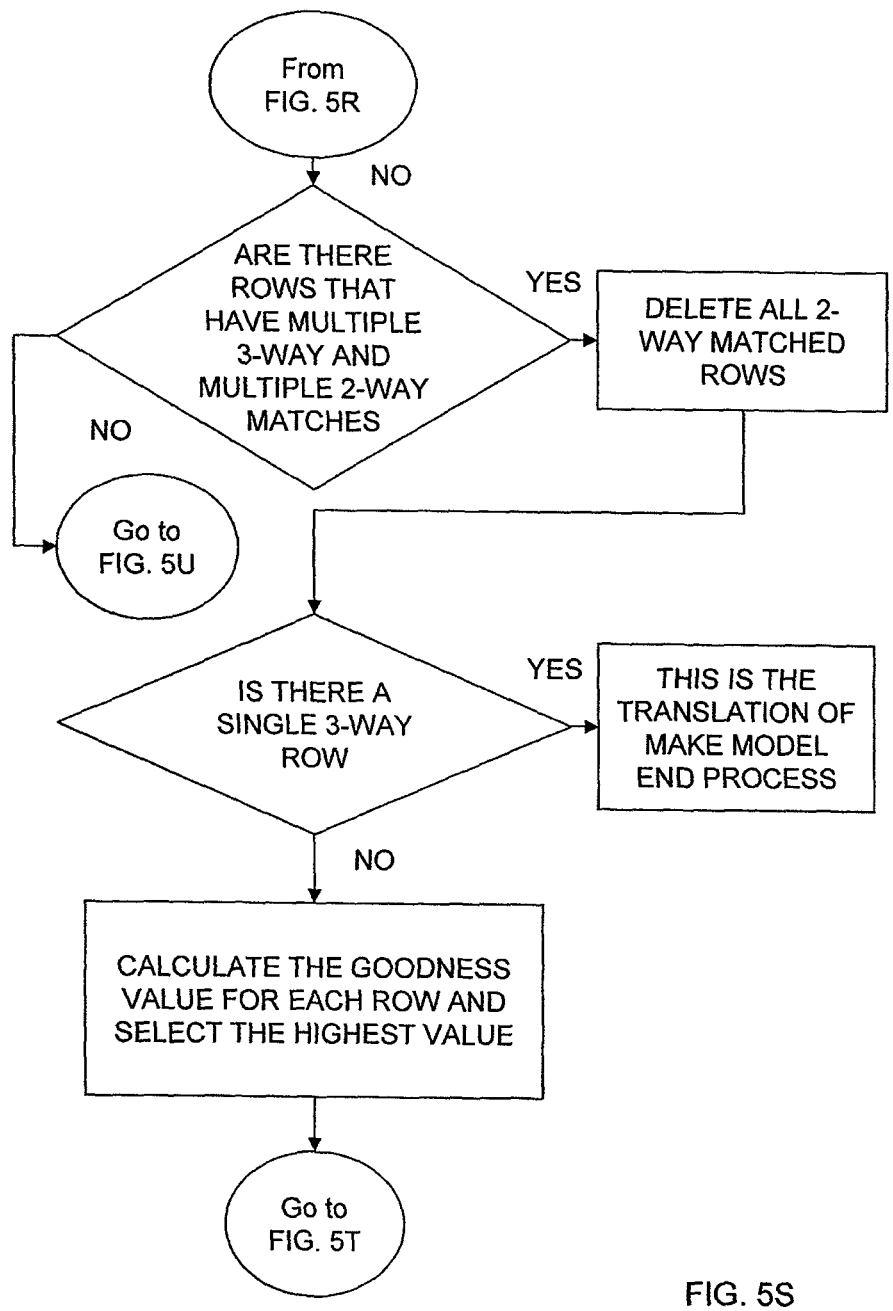
Figure 5T:
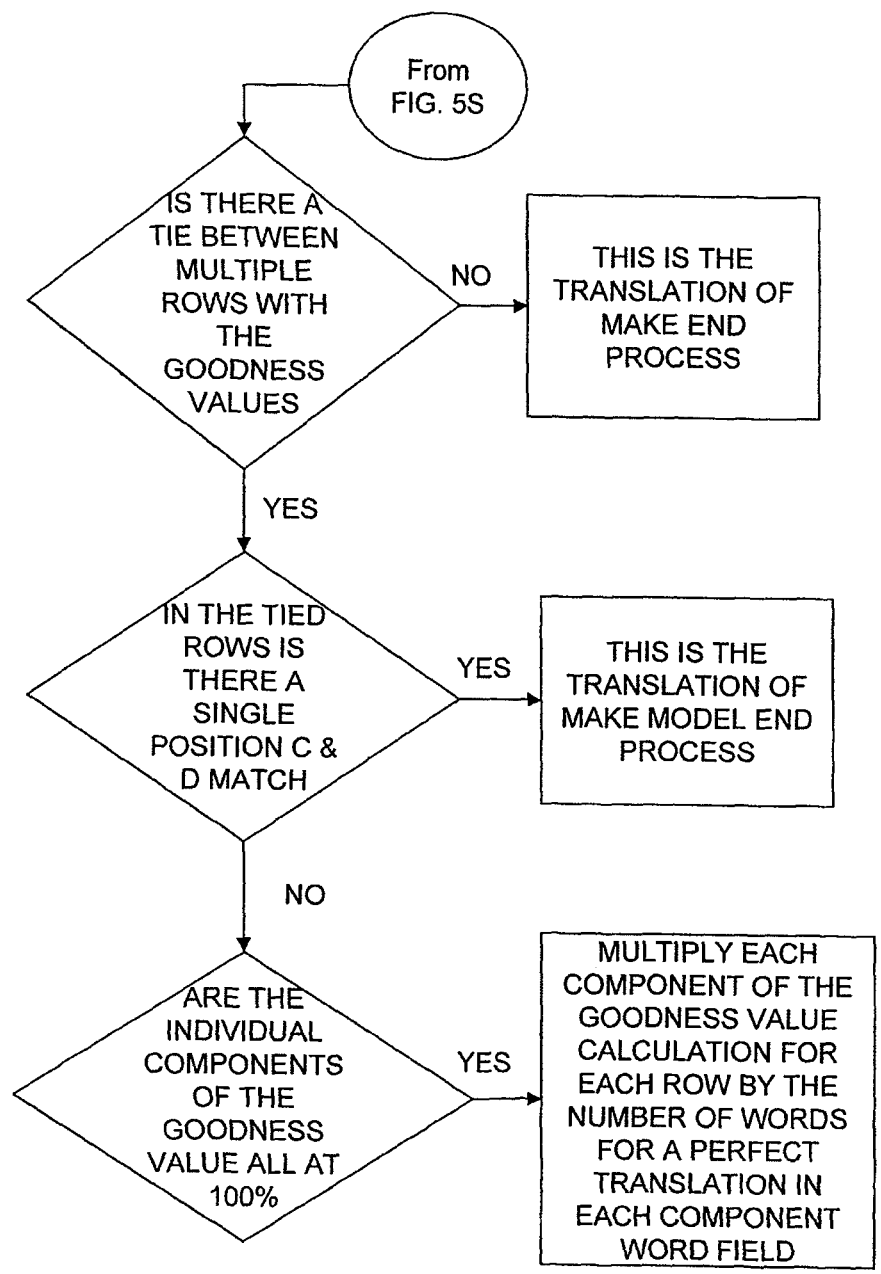
Figure 5U:
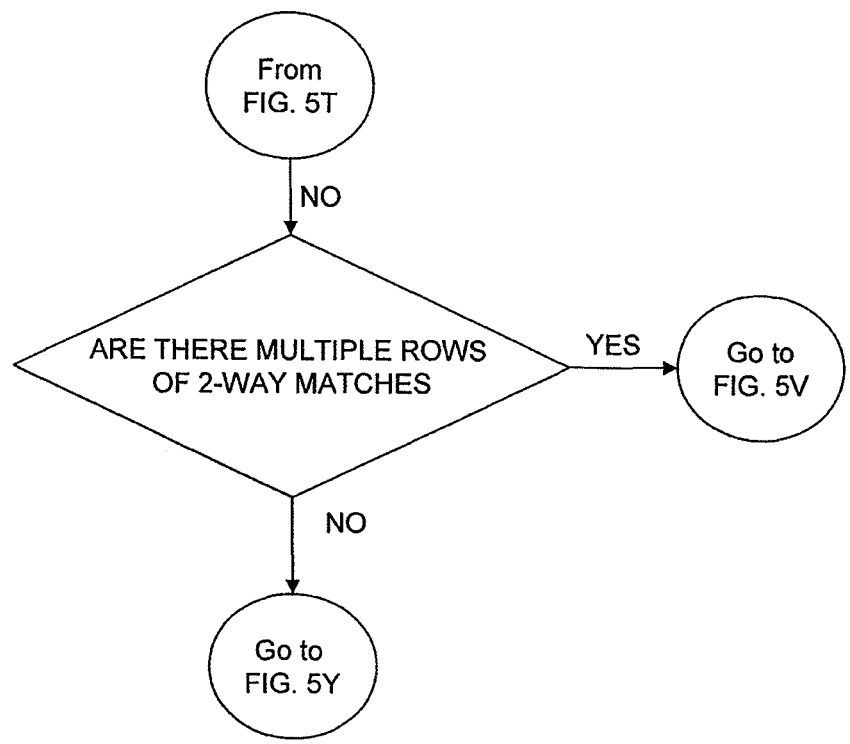
Figure 5V:
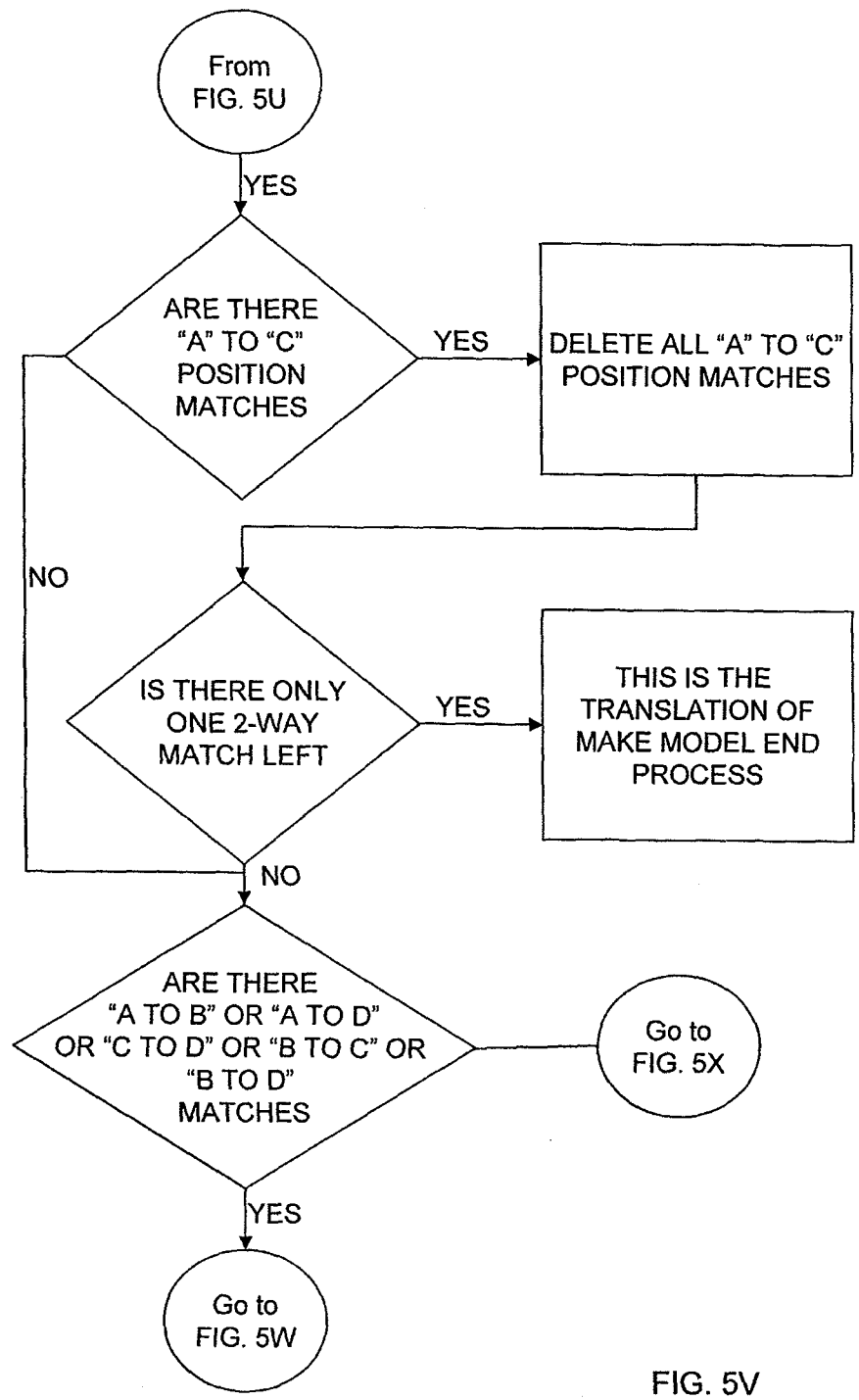
Figure 5W:
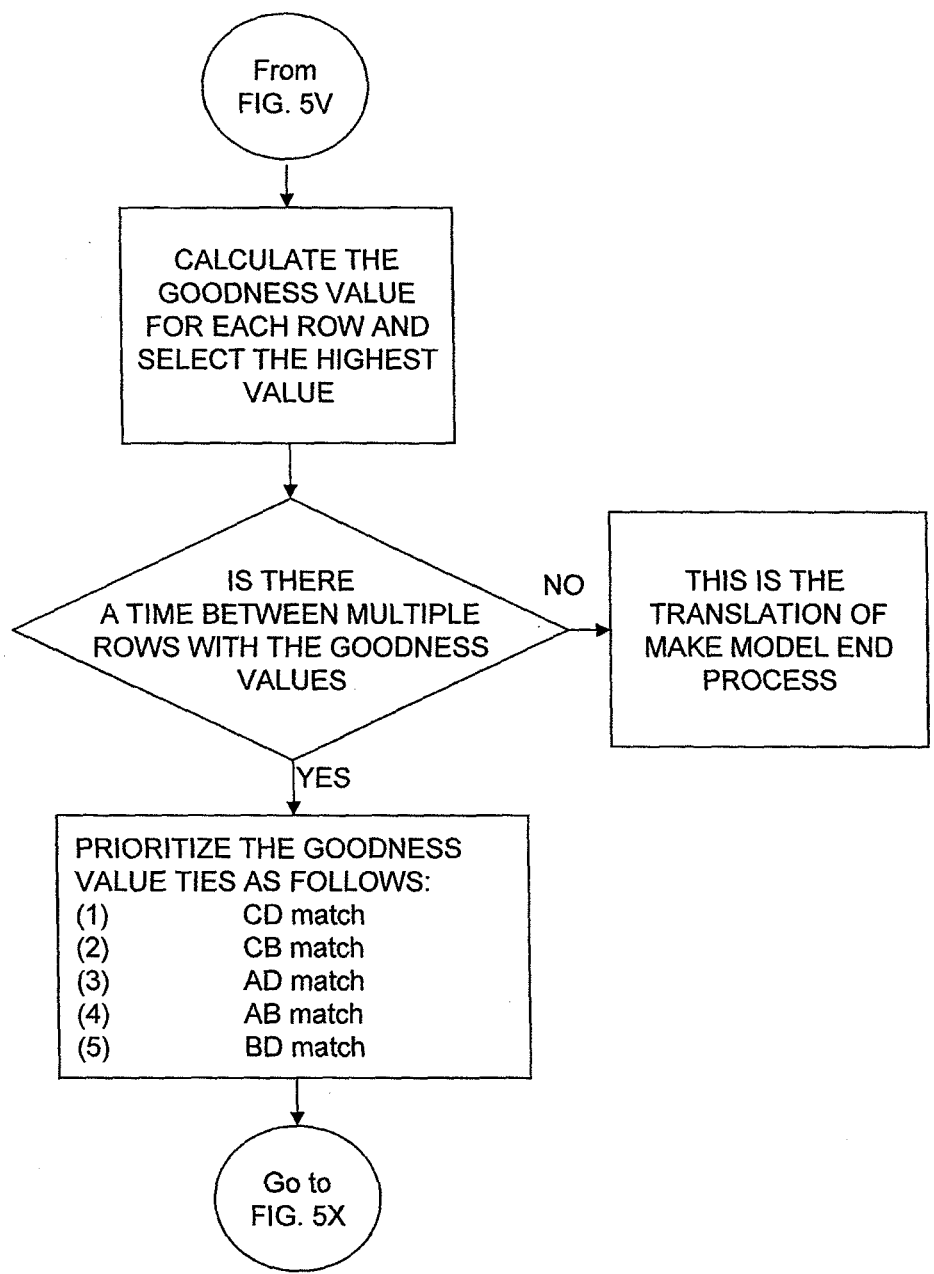
Figure 5X:
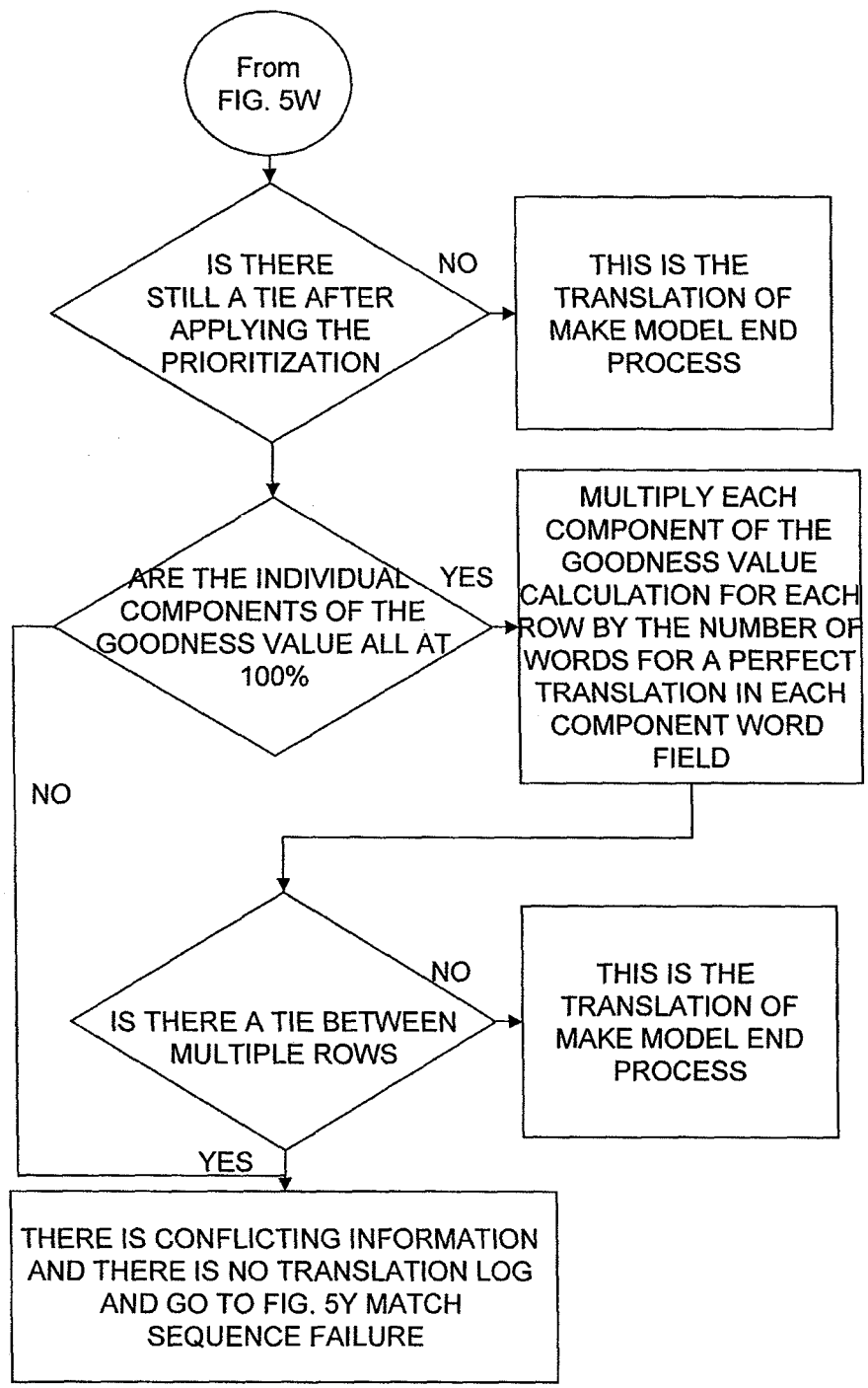
Figure 5Y:
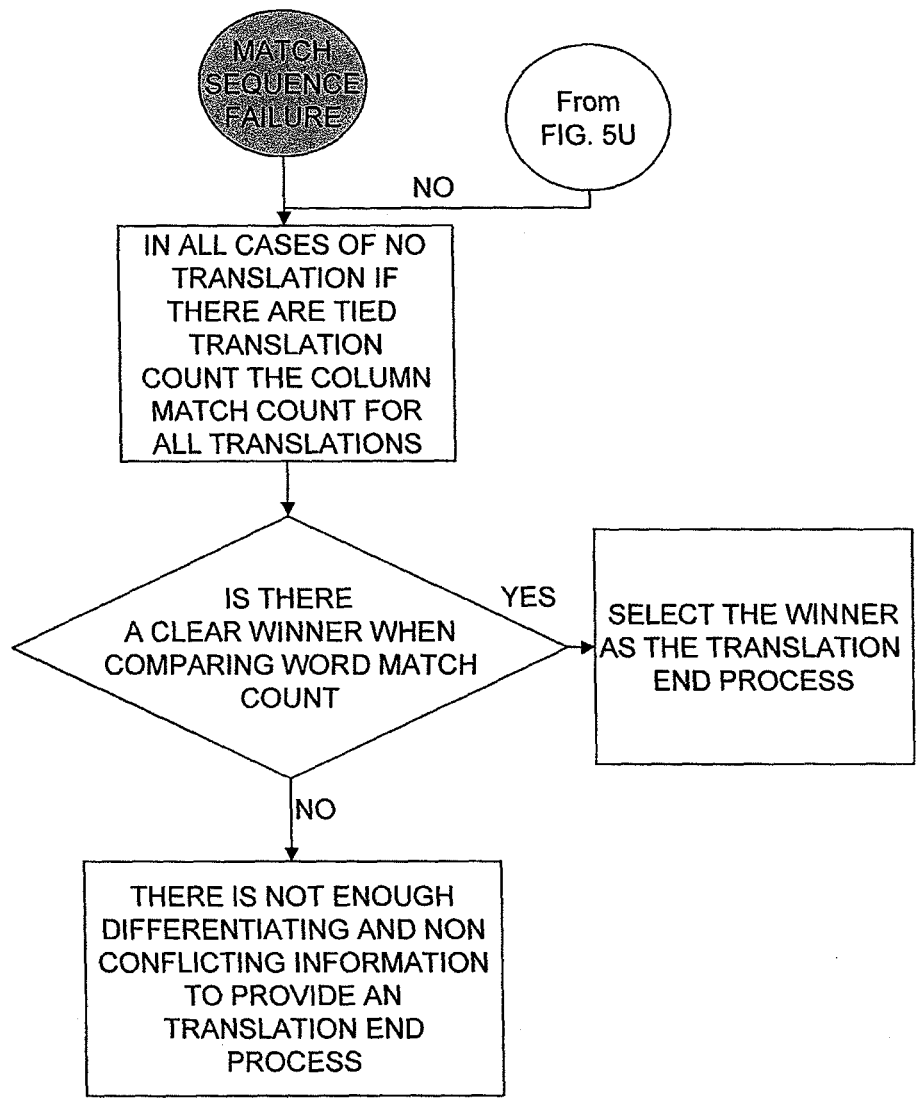

FIG. 4 is a flow chart of an exemplary method 400 for automatically translating make and model data of a data file into a vehicle identifier. FIGS. 5A-5Y are flow charts of a more detailed method of the method 400 described with reference to FIG. 4. The auditing system 104 receives (402) data indicative of a vehicle make and model, the data comprising one or more make fields and one or more model fields. The make model translator 128 prepares the one or more model fields for translation by applying (404) one or more rules from a plurality of rules. The make model translator 128 prepares the one or more model fields for translation by associating (406) each field of the one or more model fields with a class from a list of classes. The make model translator 128 prepares (408) the one or more make fields for translation by applying one or more rules from the plurality of rules. The make model translator 128 associates (410) each field of the one or more make fields with one or more make model entries from a plurality of predetermined make model entries. The make model translator 128 associates (412) each field of the one or more model fields with one or more make model entries from the plurality of predetermined make model entries. The make model translator 128 automatically translates (414) the data into one or more vehicle identifiers based on the associated make model entries.

Below is an example of a translation process (e.g., carried out by the make model translator 128) with reference to the steps of method 400 of FIG. 4. In a preferred embodiment, the sequence of the steps is preserved for the make model translation. However, in other examples the steps can be executed in any order and in any combination without detracting from the make model translation. For example, translation steps can be added and removed as additional patterns are identified within insurance company names.

With respect to step 402, four primary pieces of information can be used: the claim block make field, the claim block model field, the estimate block make field, and the estimate block model field. The make model translator 128 can prepare the characters of the word strings in each of the four fields for the translation process. The preparation can include, for example, separating all dissimilar types of characters for processing in the claim block make and model fields and the estimate block make and model fields. In some examples, all alphanumeric words and the special character "&" may be split into two or more words by separating the alpha and numeric and special characters from each other by inserting a space between them. In some examples, if both the claim block model field and the estimate block model field have numerics, and if the smaller numeric is a truncated version of the larger numeric (e.g., divided by 10 or 100) then the make model translator 128 can set both numerics equal to the larger numeric (e.g., if one model field has 3500 and the other model field has 35 or 350, then the make model translator 128 sets both model fields to equal 3500). In some examples, if the claim block model field is empty and there are multiple words in the claim block make field, then the make model translator 128 can copy all but the first word from the claim block make field word string into the claim block model field.

With respect to step 404 of FIG. 4, the make model translator prepares the one or more model fields for translation by applying one or more rules from a plurality of rules. As illustrative examples, the rules are configured to identify models in the claim block model field (e.g., "motorcycles") that may not need to be processed, find words that have been incorrectly separated and should be combined into a single word, find words that have been incorrectly combined that should be separated into two words, standardize spelling of descriptive classification words (e.g., "coupe" or "wagon") through conversion of aliases or abbreviations, and identify a passenger car model.

In some examples, to identify models in the claim block model field (e.g., "motorcycles") that may not need to be processed, the make model translator 128 is configured to search for matches of the individual words of the claim block model field word in a list (or table, such as an "Invalid Model Table") An exemplary list of the invalid terms includes, for example, MOTORCYCLE, MOTORCYCL, MOTORCYC, MOTORCY, MOTORC, CYCLE, CYCL, CYC, MOTOR CYCLE, MOTOR CYCL, MOTOR CYC, MOTOR CY, RG, HARLEY, and KAWASAKI. If a match occurs with an invalid term, the make model translator 128 can be configured to discontinue all testing of the claim and estimate block data and stop processing the claim.

FIG. 6A is an exemplary table 600 for use when determining if words were incorrectly separated. Table 600 includes six columns. The top row of table 600 includes the column labels. Column 1 is the "Make" column, which lists exemplary vehicle makes (e.g., Saturn). Column 2 is the "Single Word Relationship" ("Single Rel.") column, which lists words that may be separated by one or more spaces into multiple words (e.g., "allroad", which may be contained in a field as the two words "all" and "road"). Columns 3 and 4 are labeled as the "Model Word 1" and "Model Word 2" columns, respectively. For each row, columns 3 and 4 list words which can be combined to the corresponding word in column 2. Columns 5 and 6 are labeled as the "Make Constraint 1" and "Make Constraint 2" columns, respectively, and contain constraint information, if any, for other column values within each row. To find words that have been incorrectly separated, the make model translator 128 can be configured to test the claim block model field and the estimate block model field word string's words against columns 3 and 4, to find words in the word string that are separate and should be combined into the one word listed in column 2. In some examples, if two matches are found in a row, one in each of columns 3 and 4, then the make model translator 128 deletes the existing two words and replaces them with the single word shown in column 2. The make model translator 128 checks columns 5 and 6 to determine if there is a match to the make field. If there is a match, the make model translator 128 does not replace model field with the word in column 2.

FIG. 6B is an exemplary table 602 for use when determining if words have been incorrectly combined. Table 602 includes three columns, and the top row indicates the column labels. Column 1 is the "Make" column and includes exemplary vehicle makes. Column 2 is the "Dual Word Relationship" (Dual Word Rel.) column, and includes dual words that may be improperly combined. Column 3 is the "Model Word 1" column, which includes, for each row, words that correspond to the dual word relationship words in column 2. To find words that have been incorrectly combined, the make model translator 128 can test the claim block model field and the estimate block model field word string's words against column 3, to find words in the word string that are combined and should be separated into the two words listed in the corresponding entry of column 2 for the particular row. In some examples, if one match is found in a row, the make model translator 128 can be configured to delete the existing word and replace it with the two words shown in column.

FIG. 6C is an exemplary table 604 for use when standardizing the spelling of descriptive classification words. Table 604 includes two columns, and the top row indicates the column labels. Column 1 is the "Classification Glossary" column, and column 2 is the "Classification Alias" column. The make model translator 128 can standardize the spelling of descriptive classification words, such as "coupe" or "wagon," through conversion of aliases or abbreviations. The make model translator 128 can run claim block model string words and estimate block model string words through table 604. The make model translator 128 can replace any matched words in column 2 from the model fields with the corresponding word for the row in column 2.

The make model translator 128 can use rules to help identify a passenger car model. One exemplary rule is if the word "Somerset" is in the model word string, then models "Regal" or "Regal Coupe" or "Regal Sedan" cannot be match. Another exemplary rule is if DEL is found in a model field and Honda is the make, then add SOL to the model field if it does not already exist in the field and delete all other words in that field except for DEL SOL (e.g., DEL SOL is two words). Vehicle makes can be coded in this manner. For example, Honda and all of its aliases can be coded into such a rule. The rule can be updated as additional aliases are uncovered.

Another exemplary rule is if Fleetwood or one of its aliases is matched as a model word and Chevrolet (or one of its aliases) is the make, then replace the make of Chevrolet and the model field with "invalid." Another exemplary rule is if BMW is the "Make" and the "Model" field begins with "Z" and contains the letter "M," remove the letter "M." Another exemplary rule is if the claim or estimate block make field contains the word "Civic" and the associated model field contains the word "Hybrid" change the model field to "Civic Hybrid" and the associated make field to "Honda." Another exemplary rule is if the claim or estimate block make field contains the word "Accord" and the associated model field contains the word "Hybrid" change the Model field to "Accord Hybrid" and the associated Make field to "Honda."

Another exemplary rule is (a) if the claim or estimate block model field contains "Blazer", change model field to "BLAZER S 10" for following conditions, model year 1995 and above, or model year 1994 and below and "FULLSIZE" not in model field. If (b) the claim or estimate block model field contains "Jimmy", change model field to "JIMMY S 15" for following conditions: model year 1995 and above, or model year 1994 and below and "FULLSIZE" not in model field. Another exemplary rule is if the claim or estimate block model field contains "SL" or "SW" and "1" or "2" and claim and estimate block model field and style field doesn't contain "COUPE" and style field doesn't contain "SEDAN", add "SEDAN" to style. Another exemplary rule is if the claim or estimate block model field contains the words "Lesabre" and "Limited", remove the word "Limited" from the associated model fields.

Another exemplary rule is if the claim or estimate block model field contains the words "Deville" and "Concours", then remove the word "Deville" from the associated model fields. Another exemplary rule is if the claim or estimate block model field contains the words "RANCHERO" and "GT" the remove the word "GT" from the associated model fields. Another exemplary rule is if the claim or estimate block make field has the word "Merc" and the associated claim or estimate field model field contain any word that starts with any of the following letter sets: "BOB", "CAP", "COM", "COU", "GRA", "LYN", "MAR", "MET", "MON", "MOU", "MYS", "SAB", "TOP", "TRA", "VIL", "ZEP", then change the associated make field to "Mercury." Otherwise, if there is not a match, change the associated make field to "Mercedes Benz".

Another exemplary rule is if the claim or estimate block make field contains the word "Dodge" and the associated model field contains any of the following number sets "1500", "2500", "3500", but does not contain the word "RAM" in either the claim or estimate block model fields, then add the word "Pickup" to the associated model field. Another exemplary rule is if the word "DODGE" and "RAM" found in claim or estimate block make field, remove "RAM" from claim or estimate block make field and add "RAM PICKUP" to claim and estimate block model field. Another exemplary rule is if the claim or estimate block model field contains the words "Mustang" and "GT" the remove the word "GT" from the associated model fields. Another exemplary rule is if the claim or estimate block make field has the words "Dodge" and the associated model field has the word "INTR" change the associated model field to "Intrepid". Another exemplary rule is if the claim or estimate block make field has the words "Oldsmobile" and the associated model field has the word "INTR" change the associated model field to "Intrigue".

Another exemplary rule is if the claim or estimate block make field has the words "Eagle" and the associated model field has the words "Eagle" and "Talon", remove the word "Eagle" from the associated model field. Another exemplary rule is if the claim or estimate block make field has the words "MINI" and the associated model field has the word "COOPER" add the word "MINI" to the associated model field and remove the word "MINI" form the make field and add the word "BMW" to the make field. Another exemplary rule is if claim or estimate block make field contains "Chevrolet" or alias and claim or estimate block model field contains Prizm or alias, then set the make to GEO and model to PRIZM. Another exemplary rule is if the estimate or claim block make field has the word "Subaru" and the associated model field has the two words "GL" and "XT" then remove the word "GL" from the model field.

Another exemplary rule is if the estimate or claim block make field has the word "Toyota" or alias and the associated model field has the word "Seinna" or alias, change the make field to "Toyota" and model field to "Seinna". If the estimate or claim block make field has the word "Nissan" or alias and the associated model field has the word "Armada" or alias, change the make field to "Nissan" and the model field to "Armada". Another exemplary rule is if the estimate or claim block make field has the word "Infiniti" or alias and the associated model field has the word "QX 56", change the make field to "Infiniti" and model field to "QX 56". Another exemplary rule is if the estimate or claim block make field has the word "BUICK" or alias and the associated model field has the word "Century" or alias, then change the make field to "Buick" and the model field to "Century". Another exemplary rule is if the estimate or claim block model field has the word "METRO" or alias, Change the make field to "GEO" and the model field to "METRO".

Another exemplary rule is if the estimate or claim block make field has the word "FORD" or alias and the associated model field has the word "PROBE" or alias, then change the make field to "FORD" and model field to "PROBE". Another exemplary rule is if the estimate or claim block make field has the word "MERCEDES BENZ" or alias and the associated model field has the word "430" and the letter "E", then change the make field to "MERCEDES BENZ" and the model field to "E CLASS".

With respect to step 406, the make model translator 128 can, for example, identify and flag vehicle makes for different reports, determine if the model is a truck, and use rules to determine what the truck is. FIG. 6D is an exemplary table 606 for use when identifying recreational vehicles. Column 1 is labeled "Invalid Make Table" and contains various listings of recreational vehicles. The make model translator 128 can identify and flag makes that are recreational vehicles (RVs) for special reports but standard processing. The special report can be, at the end of the processing, to send an email. The make model translator 128 runs all claim and estimate block make fields through column 1. If a match is found (e.g., either the first word or one of its aliases, which are listed as subsequent words in rows that contain more than one word) and it is the only word in the make field, then the make model translator 128 can flag the claim as "RV" and place the make name in the RV make field, delete the matched word in the claim or estimate block make field and continue to process on the other claim or estimate block field information. The "RV" field and "RV Make" fields are new fields that can be added to the table in the audit record.

FIG. 6E is an exemplary table 608 for use when determining if the model is a truck. Table 608 includes three columns, with the top row including the label for each column. Column 1 is the "Make" column, column 2 is the "Model Word 1" column, and column 3 is the "Model Word 2" column. The make model translator 128 can determine if the translation process is dealing with a model that has the name of a truck by, for example, determining if the words for any particular row in table 608 match the words in the word string of the fields of the claim or estimate model blocks. Not all words in the estimate and claim block fields need to be matched. If there is a match, then the make model translator 128 can perform a number of steps. First, the make model translator 128 can run a check on both the claim block model field and the estimate block model field to determine if both fields have a matched row in table 608. If both the claim block model field and the estimate block model field do not have a match in table 608 (e.g., only one field has a match) then continue in sequence skipping the remaining steps. If both have a match and the two matches are different, then skip to running the rules as described below.

Second, if there is a numeric in either the claim block model field or the estimate block model field, but not both, then the make model translator 128 adds the numeric to the field that does not have a numeric. Third, if there are no numerics in the claim and estimate block model fields but a truck name was identified in one of the model fields, then the make model translator 128 can add the truck name matched to the claim or estimate block model field that did not have the match. Lastly, the make model translator 128 deletes all other words in the claim and estimate block model fields word strings, besides the truck name matched and the numeric. These steps are for exemplary purposes and are not intended to be limiting.

The make model translator 128 can use one or more rules to clarify what particular truck the claim (data file) involves. One exemplary rule is if PICKUP (or one of its aliases) is in a model field and is the only word in the model field, delete the word PICKUP unless the make is ISUZU, JEEP, MAZDA, MERCEDES BENZ, MITSUBISHI, NISSAN, or TOYOTA (or an alias of one of the vehicle makes). FIG. 6F is a diagram of an exemplary table 610 for use when determining an alias. Table 610 includes two columns, column 1 labeled "Make Alias Word 1" and column 2 labeled "Make Alias Word 2", each of which includes aliases for which the first term in the list of terms for a row represents the base word (e.g., "ISUZU" for the first data row is the base word, and "Isuz", "ISU", "ISZU", and "ISZ" are alias words).

FIG. 6G is a diagram of an exemplary table 612 for use when determining a style to exclude. Table 612 includes four columns, the top-most column including the column labels. Column 1 is the "Make" column, column 2 is the "Model Word 1" column, column 3 is the "Model Word 2" column, and column 3 is the "Model Word 3" column. Each row includes a make in column 1, and one or more model terms in columns 2-4. The make model translator 128 can be configured to, for all models except those shown in table 612 (e.g., columns 2-4), concatenate the style information to the model word string using three steps, which are not intended to be limiting and are for illustrative purposes. First, if a model field is empty, the make model translator 128 does not add any style to that field. Second, if all of the words in a row of table 612 match the words in the model word string for either the claim block or the estimate model field, the make model translator 128 does not add style to either the current claim block or estimate block model fields. All words in the claim block or estimate block model word strings do not need to be matched. Third, if no words are found to match in table 612 then the make model translator 128 tests the words in the style word string against table 604 of FIG. 6C and adds the matched words, replacing the original words in the string that were matched.

Another exemplary rule is if "E" precedes any numbers and Ford is the "make" or "manufacturer", add the word "Van" to the claim and estimate block model names unless it causes duplication. Another exemplary rule is if the make is Dodge and the letters "BR" directly precede the numbers "1500", or "2500", or "3500"—change the "BR" to the word "pickup". Another exemplary rule is if the make is Mazda and the letters "B" directly precede the numbers "1600", "1800", "2000", "2200", "2300", "2500", "2600", "3000", or "4000" in the model field, then add the word "pickup". Another exemplary rule is if the claim block and estimate block for models match except for the fact that one has the words "SUPERDUTY", then add the words "SUPERDUTY" to the block that does not have it. Another exemplary rule is if SUBURBAN is matched in a model field, then change the make to CHEVROLET.

Another exemplary rule is if a match is on a row with S10 but "S" is not matched in the superset columns then S10 cannot be the match, and skip the S10 row. Another exemplary rule is if "S" and "10" have been matched in a model field, then the Model ID for "10 Series Truck" cannot be a match. Another exemplary rule is if "S" and "10" are found in either the estimate block model field or the claim block model field, then add "S" and "10" to both the claim block model field and the estimate block model field, remove any other single letters or numbers or words with the exception of "Blazer", and if "Blazer" is found in either the claim block model field or the estimate block model field, add "Blazer" to both the claim block and estimate block fields and remove any other text unless it is "S10".

Another exemplary rule is if CIERA or one of its aliases is found in a model field and Cutlass (or one of Cutlass aliases) is also found, delete the word CUTLASS (or its alias) and continue in sequence. Another exemplary rule is if CALAIS or one of its aliases is found in a model field and Cutlass (or one of Cutlass aliases) is also found, delete the word CUTLASS (or its alias) and continue in sequence. Another exemplary rule is if OLDSMOBILE or one of its aliases is matched as a make and "Ninety" or one of its aliases is matched, then the row in table 616 of FIGS. 6I-6J including Oldsmobile with EIGHTY EIGHT in the MODEL column (not shown as an entry in FIGS. 6I-6J) cannot be a match (e.g., skip this row). Another exemplary rule is if Solara or one of its aliases is matched in a model filed, then delete all words in the model field except SOLARA or it alias.

Another exemplary rule is if Voyager or one of its aliases is in the estimate block model field, then delete all other words except Voyager in both claim block model field and estimate block model field. If Voyager or one of its aliases is in the claim block model field, then delete all other words except Voyager in the claim block model. Another exemplary rule is if the claim or estimate block Model field is empty and the associated manufacturing field has a text string plus one of the following numbers preceding or following a term from the list "10, 20, 100, 200, 250, 300, 350, 400, 450, 1000, 1500, 2000, 2500, 3000, or 3500", then add the number to the associated model field and remove it from the manufacturing field.

Another exemplary rule is if the claim or estimate block make field has the two words "Dodge" and "RAM", then remove the word "RAM" from the make field and add the words "RAM" and "Pickup" to the associated model field. Another exemplary rule is if the claim or estimate block make field has the words "Dodge" and the associated model field has the words "Dakota" and "Pickup" remove the word "Pickup" from the associated model field.

With respect to step 408, the make model translator 128 prepares the one or more make fields for translation by applying one or more rules from the plurality of rules. In some embodiments, the make model translator 128 converts make abbreviations to a corresponding corrected, expanded spelling.

FIG. 6H is a diagram of an exemplary table 614 for use when aliasing make classifications. Table 614 includes two columns, column 1 labeled "Make Classification Glossary," and column 2 labeled "Make Classification Alias." The make model translator 128 can run words in the make fields through column 1 and convert any matching abbreviations to the correct spelling of the corresponding entry in column 2 for a matching row. In some examples the make model translator 128 replaces non-text characters by spaces (e.g., replaces comas, quotes, hyphens, back slashes, etc.). The make model translator 128 can exclude some non-text characters from replacement (e.g., an ampersand (&)).

In some examples, the make model translator 128 cleans up the word strings after the previous adjustments (e.g., steps 404-408). The make model translator 128 separates all words by one space (where a word is a group of text characters preceded and followed by a space, including the first word in the word string that may not be preceded by a space and the last word in the word string that may not be followed by a space) to remove any excess spaces. If the make model translator 128 determines there are duplicate words within the word string, the make model translator 128 can be configured to delete the duplicative words.

With respect to step 410, the make model translator 128 associates each field of the one or more make fields with one or more make model entries from a plurality of predetermined make model entries. In some examples, the make model translator 128 uses a table to match the words in the claim and estimate block make fields with various predetermined make model entries.

Figure 6J:
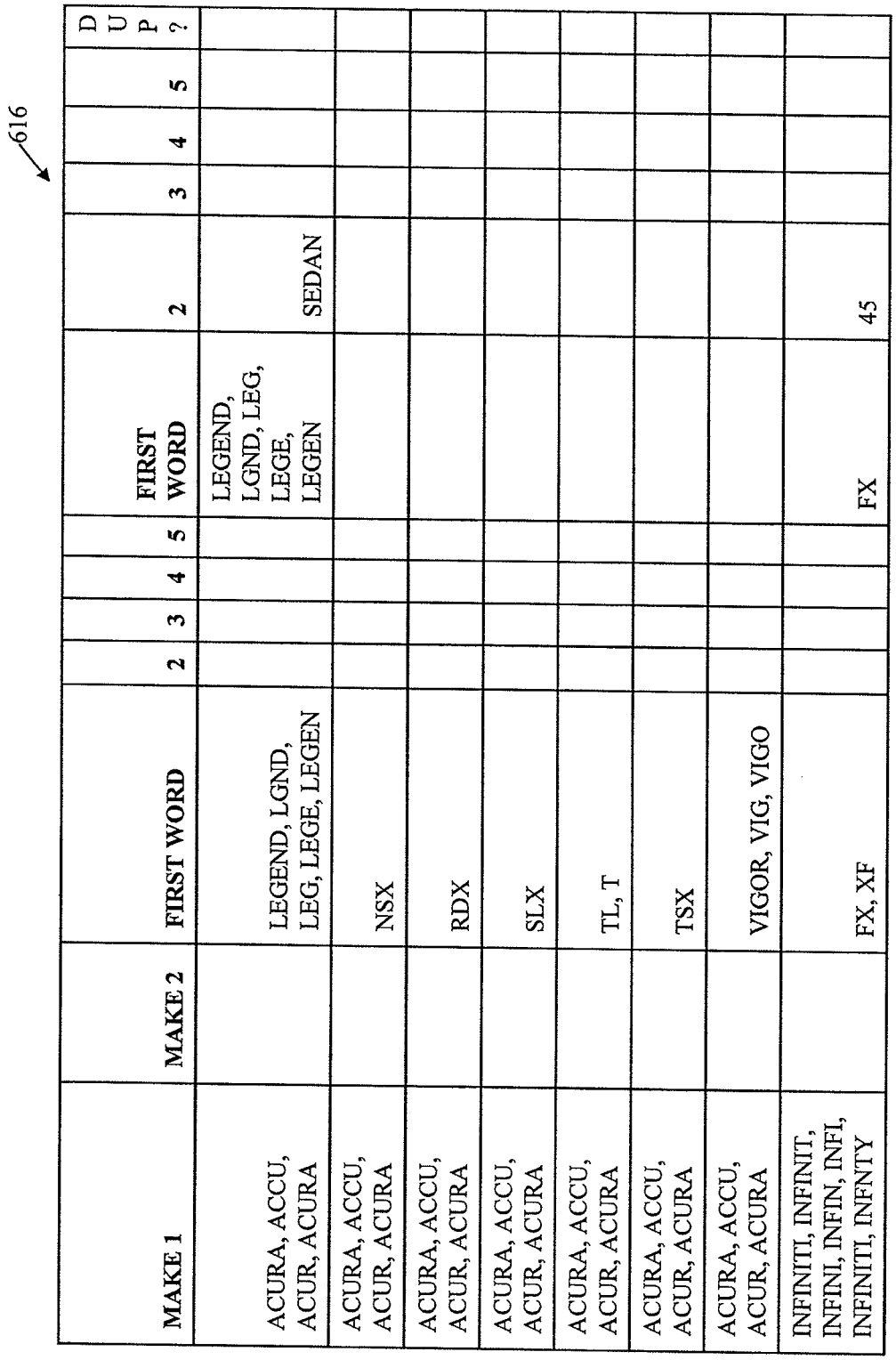

FIGS. 6I and 6J are a diagram of an exemplary Table 616 for use when associating manufacturer, make, and model information. Table 616 includes twenty-four columns, with the first eleven columns shown in FIG. 6I and the remaining thirteen columns shown in FIG. 6J. Column 1 is labeled "Change Flag Y/N" (F) and is used to indicate during the updating process and prior to loading that a change has been made to that row in Table 616. Column 2 is labeled "Index Number" (I), which provides a unique index number for each row of table 616. Column 3 is labeled "Manufacturer" (MFG) and includes manufacturer information, and column 4 is labeled "Make" and includes make information. Columns 5-9, which are labeled "Superset (N=DO NOT SHOW)" (S), "Model", "HQ Model ID" (ID), "HQ Subset ID" (SS ID), and "Model Subset", respectively, contain information regarding the vehicle model for each row. Columns 10 and 11, labeled "Manufacturer" (MFG 1 and MFG 2), contain manufacturer information. Columns 12 and 13, labeled "Make" (MAKE 1 and MAKE 2), contain make information. Columns 14-23 contain model information, and can be divided into two groups: columns 14-18 which relate to model superset word sets, and columns 19-23, which relate to model subset word sets. Columns 14-18 are labeled "First Word", "Second Word" (2), "Third Word" (3), "Fourth Word" (4), and "Fifth Word" (5), respectively. Similarly, columns 19-23 are labeled "First Word", "Second Word" (2), "Third Word" (3), "Fourth Word" (4), and "Fifth Word" (5), respectively. Column 24 is labeled "Duplicate" (DUP?) and indicates whether any of the entries in the able are duplicative (e.g., the make model translator 128 determines if there is a duplication between the entry in the HQ Model ID column and the HQ SubSet ID, taking into account that the rules do not allow a HQ SubSet ID without an entry in the Model Subset column). The aliases in table 616 can be specific to a manufacturer/make/model combinations.

Figure 6K:
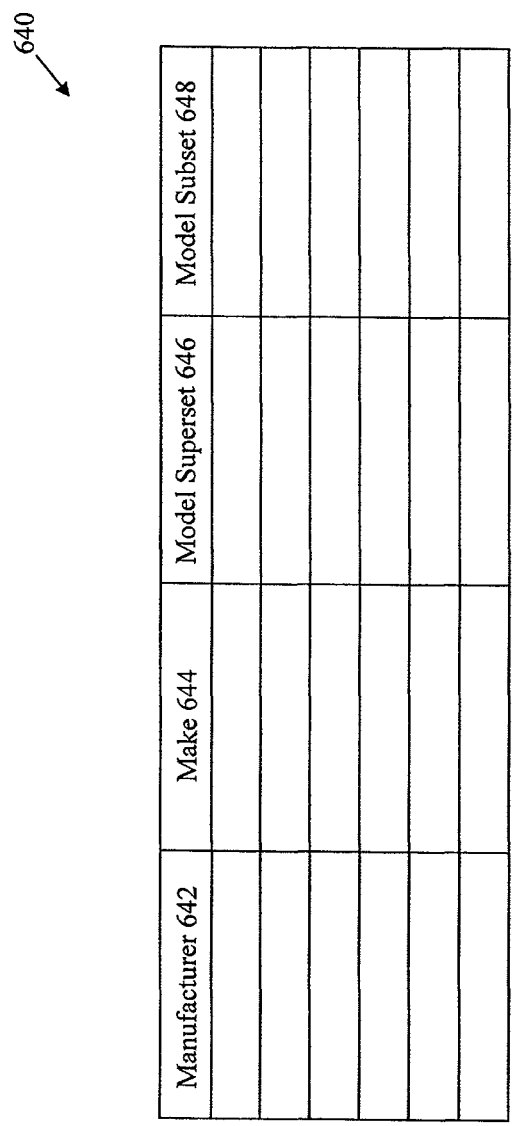
FIG. 6K is an exemplary diagram of a temporary make model translation table.

FIG. 6K is an exemplary diagram of a make model temporary translation table 640. The temporary translation table 640 includes a manufacturer field 642, a make field 644, and model superset field 646, and a model subset field 648. The make model translator 128 populates the fields of a row when the make model translator identifies a match, as described in further detail below. The diagram of the temporary translation table 640 is intended for illustrative purposes, and can have any number of rows and/or columns as necessary to facilitate a make model translation.

The make model translator 128 uses table 616 of FIGS. 6I and 6J to match the words in the claim and estimate block make fields to the various information contained in each row and column. For example, the make model translator 128 compares word strings in the make fields against both the "Manufacturer" and "Make" columns, columns 2 and 3. When doing this comparison, the make model translator 128 keeps track of the "hit rate" for matches. The hit rate is the count of make matches divided by the number of words required for a perfect translation when matching make words, or the count of manufacturer matches divided by the number of words required for a perfect translation when matching manufacturer words.

An example of aliasing using table 616 is provided below, using the temporary translation table 640 of FIG. 6K. First ("the first step"), the make model translator 128 tests each word in the claim block make word string, and searches for makes in table 616, beginning in column 12 and ending in column 13. The make model translator 128 tests each word in the string against every word in each row's word set. If any words are matched in the rows word set, then the make model translator 128 determines there is a match and a solid row match. For each match, the make model translator 128 calculates the percentage by counting the number of unique matches, dividing by the number of words for a perfect translation, and multiplying by 100. The make model translator 128 loads the row number (from column 2 of table 616), percent, manufacturer's name (from column 3 of table 616), make name (from column 4 of table 616), and super set and sub set information (super set information is from columns 14-18, the "First Word", "Second Word", "Third Word", "Fourth Word", and "Fifth Word" columns of FIG. 6J, and the sub set information is from columns 19-23, the "First Word", "Second Word", "Third Word", "Fourth Word", and "Fifth Word" columns, if available, of table 616 of FIG. 6J) model name into the temporary translation table 640. In some examples, the row information and hit information is loaded into the temporary translation table 640, while other information is not loaded in since the information is easily retrievable.

The make model translator 128 repeats the first step above through the rest of the rows with a corresponding matching make in the make columns 12 and 13 until completed. If matches occur, then the make model translator 128 performs the second step below. In the first step, the make model translator 128 also tests each word in the claim block make word string and search for makes beginning (instead of with columns 12 and 13) in the manufacturer column 10, and ending in column 11. The make model translator 128 tests each word in the string against every word in each row's word set. If any words are matched in the rows word set, then the make model translator 128 identifies a match and a solid row match, and calculates the percentage and loads the pertinent information into the temporary translation table 640 as described above. Second ("the second step"), the make model translator tests each word in the estimate block make word string and searches for makes in both columns 12 and 13 and then columns 10 and 11 as described above with reference to testing the claim block make word string.

With respect to step 412, the make model translator 128 associates each field of the one or more model fields with one or more make model entries from the plurality of predetermined make model entries (e.g., the entries in table 616). As indicated above, the aliases in table 616 are specific to a manufacturer/make/model combination. The make model translator 128 receives and/or can act on more detailed model information in some cases. Advantageously, the make model translator 128 can further narrow down the parts for a vehicle within the model series. The more specific model information is called the subset, where the more general model information is called the superset (where every subset is the child of a superset. For the subset calculation, the hit rate is the count of unique matches. For the superset, the hit rate is the count of unique matches.

The make model translator 128 tests each word in the claim block model word string and search for models in table 616, in the model subset word sets, beginning at columns 19 and ending at column 23 (i.e., through columns 19 and 23, inclusive), for those rows that had manufacturer or make matches in them from the rules associated with step 410 above. The make model translator 128 tests each word in the string against every word in each row's word set. If all words from each column are matched in the rows sub set word set, then the make model translator 128 identifies a 100% match and a solid row match. If the make model translator determines a less than a perfect match with the word set, the match is not treated as a match.

For each 100% match, the make model translator 128 loads the row number, percent, manufacturer name, make name, superset & subset model name into claim block information in the temporary translation table 640. The make model translator 128 repeats the matching process through the rest of the sub set column's rows until completed. If a match has been found in the subset the super set column does not need to be tested. Otherwise, the make model translator 128 tests each word in the claim block model word string and search for models in table 616 in the superset columns, beginning in the super set column 14 and ending in superset column 18, for those rows that had manufacturer or make matches in them from the rules of step 410. The make model translator 128 tests each word in the string against every word in each row's word set. If any words are matched in the rows word set then we have a match and a solid row match. If multiple rows are matched with the exact same vehicle description (e.g., manufacturer, make, and superset model), the make model translator 128 deletes all but one of the identical rows. The make model translator calculates the percentage by counting the number of matches, dividing by the number of words for a perfect translation, and multiplying the quotient by 100. The make model translator loads the row number, percent, manufacturer name, make name, superset & subset (if available) model name into claim block information in the temporary translation table 640. The make model translator 128 repeats the process through the rest of the super set column's rows until completed. If there are no model matches in the rows where there have been make matches, then the make model translator 128 repeats the test on all of the make's manufacturer's rows in table 616 for a model subset match and then model superset match as described above.

The make model translator 128 searches for invalid model matches in the estimate block model word string (e.g., MOTORCYCLE, RG, HARLEY, KAWASAKI, etc.). If a match occurs discontinue all testing of claim and estimate block data and indicate there is no translation available. Otherwise, the make model translator 128 tests each word in the estimate block model word string and searches for models in table 616, beginning in the subset column 19 and ending in subset column 23, as well as beginning at superset column 14 and ending at superset column 18, if necessary, as described above for matching the claim block model word string for those rows that had manufacturer or make matches in them from rules in step 410.

With respect to step 414, the make model translator 128 determines the best translation. The method 400 started with four pieces of information, the four fields of "manufacturer/make" and "model" for the claims and estimating blocks. Through steps 404-412, each has now been converted into lists of candidates in the temporary translation table 640. Each has a percent match weighting with how well the original field word string matched with the particular candidate word set. Now, the temporary translation table 640 as populated can have three different levels of row matches: 4-way, 3-way, and 2-way, each of which have the potential of different confidence weighting.

For example, the subset takes precedence if the subset is a perfect 2 for 2 match or when it is a 100% match. If the subset is not a 100% match, then the subset is considered 0%, and only matches in the superset are considered. Due to the ranges for these match sets, the match sets can overlap and cause ties. The following exemplary breakdown shows the extremes and averages of the matched sets:

a best match is a 4-way match (e.g., a match across all four fields of the temporary translation table 640, which can be represented by the number one (1)) with a weighting range of 100% to 75%, AVERAGE (87.50%);

a second best match is either a 4-way match with a weighting range of 75% to 50%, AVERAGE (62.50%), or a 3-way match with an weighting range of 100% to 75%, AVERAGE (87.50%);

a third best match is either a 4-way match with a weighting range of 50% to 25%, AVERAGE (37.50%), a 3-way match with a weighting range of 75% to 50%, AVERAGE (62.50%), or a 2-way match with an weighting range of 100% to 75%, AVERAGE (87.50%);

a fourth best match is either a 4-way match with a weighting range of 25% to 0%, AVERAGE (12.50%), a 3-way match with a weighting range of 50% to 25%, AVERAGE (37.50%), or a 2-way match with an weighting range of 75% to 50%, AVERAGE (62.50%);

a fifth best match is either a 3-way match with an weighting range of 25% to 0%, AVERAGE (12.50%), or a 2-way match with an weighting range of 50% to 25%, AVERAGE (37.50%);

a sixth best match is a 2-way match with a weighting range of 25% to 0%, AVERAGE (12.50%);

and lastly is a no match.

An exemplary way to create 4-way, 3-way and 2-way average weights and goodness values for the match set is to use equations 1 through 4:

$$Y_{Total} = \frac{10}{25} \times \frac{\sum_{i=1}^{n} X_i}{n} \qquad \text{Equation 1}$$

$$Y_{4\text{-}way} = \frac{1}{25} \times \frac{X_1 + X_2 + X_3 + X_4}{4} \qquad \text{Equation 2}$$

$$Y_{3\text{-}way} = \frac{1}{25} \times \frac{X_1 + X_2 + X_3}{3} \qquad \text{Equation 3}$$

$$Y_{2\text{-}way} = \frac{1}{25} \times \frac{X_1 + X_2}{2} \qquad \text{Equation 4}$$

where:
Y=the "goodness zone value", where the higher the Y value is, the better the match;
X=the individual "hit percentage ratings" for each row; and
n=the number of row matches.

In some embodiments, because the four pieces of information the make model translator 128 is using are not deemed equal in value. For example, the model information is rated higher than make information, and estimate information is rated higher than claim information. For the example below, assume:
A=claim block make information;
B=claim block model information (precedent);
C=estimate block make information (preferred); and
D=estimate block model information (precedent and preferred).

Using the above definitions, and also the fact that make to make matches carry insufficient information, there are certain match possibilities combined with information preferences and precedents. A four-way (4-way) match possibility is ABCD. Three-way (3-way) match possibilities include BCD, ACD, ABC, and ABD. Two-way (2-way) match possibilities include: CD, CB, AD, AB, BD, and AC.

The make model translator 128 checks for the best translation in table 616. FIG. 6L is an exemplary diagram of a match determination table 650. The match determination table 650 includes hit percentage—weighting fields 652 and proposed translation fields 654. Hit percentage—weighting fields 652 includes claim block fields 656 and estimate block fields 658. The claim block fields 656 includes make field 656A and model fields super 656B and subset 656C. The estimate block fields 658 include make field 658A and model fields super 658B and subset 658C. The proposed translation fields 654 include the make fields 660 and model fields 662. The make fields include the manufacturer (mfg) field 660A and the make field 660B. The model fields 662 include the super field 662A and the subset field 662B. The match determination table 650 also includes a row # indicator 664.

The make model translator 128 creates a temporary instance of the match determination table 650. The make model translator 128 pulls all row matches from the temporary translation table 640, which includes 4-way, 3-way, 2-way, and 1-way matches. Since there may be matches from the same row, all manufacturer, make, superset, and subset information will be the same and therefore only needs to be entered once into the match determination table 650. As the 4 or 3 or 2 pieces of information are copied/written into the match determination table 650, the make model translator 128 transfers the hit percentage into the appropriate column of the match determination Table 650.

Below is an exemplary list of rules the make model translator 128 can use to govern the determination of a match. This listing is not intended to be limiting. If there is only one row with a subset match (e.g., the make model translator 128 determines a particular row of the match determination table 650 has a subset match and there is only one row with a subset match), the make model translator 128 deletes all other rows, indicates the remaining row contains the translation, and move to the completion steps. If, however, there is more than one row, the make model translator 128 deletes duplicates.

If the make model translator 128 determines there are multiple subset matches, the make model translator 128 calculates the goodness value using Equation 3 for all rows, and selects the highest goodness valve as the translation, and move to the completion steps. If this not the case continue in sequence. In the case of a tie, the make model translator 128 calculates the goodness value of the estimate block matches only and select the highest goodness value; or we can select an estimate block subset hit over a claim block subset hit. If there is still a tie between multiple rows, the make model translator 128 checks to see if the individual components of the goodness value for each row are all at 100% (e.g., $Y1=(1/25)*((100\%+100\%+100\%)/3)=4$ or $Y2=(1/25)*((100\%+100\%+100\%)/3)=4)$. If so, the make model translator 128 multiplies each component of each row by the number of words for a perfect translation in each component word field. For example, if Y1 has (a) a make equal to Chevrolet, which has one word for a perfect translation, and (b) a model equal to s and 10, each with two words for a perfect translation, for a claim make and model match and only a estimate model match, then $Y1=(1/25)*(([100\%]*1+[100\%]*2+[100\%]*2)/3)\}=6.64$. As another example, if Y2 has (a) a make equal to Chevrolet, which has one word for a perfect translation, and (b) a model equal to blazer and s10, where each has three words for a perfect translation, for a claim make and model match and only an estimate model match, then $Y1=(1/25)*(([100\%]*1+[100\%]*3+[100\%]*3)/3)\}=9.33$. The make model translator 128 selects the highest adjusted goodness score and proceeds to the completion steps. Otherwise, if there is a tie, then the conflicting information does not provide a translation, and the make model translator 128 moves to the completion steps without a translation.

If one row has a 4-way match, and there are no subset matches, the make model translator 128 identifies the row as the sole 4-way row match, deletes all other rows, and move to the final steps with the row as the "proposed translation." If there is more than one row, the make model translator delete duplicates. If there are multiple rows that have two or more 4-way matches, and the proposed translations are not identical, then the make model translator 128 deletes all other rows and performs a tie break. An exemplary tie brake is illustrated below. The make model translator 128 calculates the goodness value with Equation 2 for all rows, and selects the highest goodness value as the translation, and move to the completion steps. Otherwise, if two or more 4-way hits exist with the same goodness value, then as a tiebreak the make model translator 128 calculates the goodness value (e.g., add match percentages and divide by 2) for the estimate make and model component only. If the make model translator 128 determines that one estimate block make model component that has a higher goodness value, the make model translator 128 select that as the match. Otherwise, if there is still a tie between multiple rows, the make model translator 128 checks if the individual components of the "Goodness Value" for each row are all at 100%. (e.g., $Y1=(1/25)*((100\%+100\%+100\%+100\%)/4)$ or $Y2=(1/25)*((100\%+100\%+100\%+100\%)/4))$. If they are, the make model translator 128 multiplies each component of each row by the number of words for a perfect translation in each component word field. For example, assume Y1 has (a) a make equal to Chevrolet, which has one word for a perfect translation, and (b) a model equal to s10, which has two words for a perfect translation. Therefore, for a claim make and model match and a estimate make and model match, $Y1=(1/25)*(([100\%]*1+[100\%]*2+[100\%]*1+[100\%]*2)/4)=6.00$. For example, assume Y2 has (a) a make equal to Chevrolet, which has one word for a perfect translation, and (b) a model equal to Blazer s10, which has three words for a perfect match. Therefore, for a claim make and model match and an estimate make and model match, $Y1=(1/25)*(([100\%]*1+[100\%]*3+[100\%]*1+[100\%]*3)/4)=8.00$. The make model translator 128 selects the highest adjusted goodness score. Otherwise, if there is a tie, then the conflicting information does not provide a translation, and the make model translator 128 moves to the completion steps.

If one row has a 3-way match, and there are no subset or 4-way matches, and the 3-way match is the sole 3-way row match, the make model translator 128 deletes all other rows, indicates this proposed translation is the translation, and move to the completion steps. If there is more than one row, the make model translator 128 deletes duplicates.

If one row has a 2-way match, and there are no subset or 4-way or 3-way matches, and the 2-way match is the sole 2-way row match, the make model translator 128 deletes all other rows and this proposed translation is identified as the translation, and the make model translator 128 moves to the completion steps. If there is more than one row, the make model translator 128 deletes duplicates.

If there are multiple rows that have two or more 3-way matches, and the proposed translations are not identical, the make model translator performs a tie break. For example, the make model translator 128 calculates the goodness value using Equation 3 for all rows, and selects the highest goodness valve as the translation, moving to the completion steps.

Otherwise, if the matches have the same goodness value, then the make model translator 128 determines if the match in one row is "C" and "D" and the other is "A" and "B", selecting the row with "C&D" as the translation, moving to the completion steps. Otherwise, if there is still a tie between multiple rows, the make model translator 128 checks if the individual components of the goodness value for each row are all at 100% (e.g., $Y1=(\frac{1}{25})*((100\%+100\%+100\%)/3)$ and $Y2=(\frac{1}{25})*((100\%+100\%+100\%)/3)$). If they are all at 100%, the make model translator 128 multiplies each component of each row by the number of words for a perfect translation in each component word field as described above. The make model translator 128 selects the highest adjusted goodness score. Otherwise, if there is a tie then the conflicting information does not provide a translation, and the make model translator 128 moves to the completion steps.

If there are multiple rows that have one or more 3-way matches and one to more 2-way matches, and the proposed translations are not identical, the make model translator 128 performs a tie breaker. For example, the make model translator 128 deletes all 2-way matches. If there is a single 3-way match or multiple 3-way matches with identical proposed translations, the make model translator 128 select this proposed translation as the translation and move to the completion steps. Otherwise, the make model translator 128 calculates the goodness value using Equation 3 for all rows and selects the highest goodness valve as the translation, moving to the final step. If the matches have the same goodness value then if the match in one row is "C" and "D" and the other is "A" and "B", the make model translator 128 selects the row with "C&D" as the translation and moves to the completion steps. Otherwise, if there is still a tie between multiple rows, the make model translator 128 checks if the individual components of the goodness value for each row are all at 100% as described above, and if they are, the make model translator 128 multiplies each component of each row by the number of words for a perfect translation in each component word field. The make model translator 128 selects the highest adjusted goodness score. Otherwise, if there is a tie then the conflicting information does not provide a translation and the make model translator 128 moves to the completion steps.

If there are multiple rows with 2-way matches and the proposed translation is not identical, the make model translator 128 performs a tie break. For example, if there are "A to C" matches, the make model translator 128 deletes the "A to C" matches. If, after the deletion there is only one 2-way match left, the make model translator 128 identifies the one 2-way match as the translation and moves to the completion steps. If there are "A to B" or "A to D" or "C to D" or "B to C" or "B to D" matches and the proposed translations are not identical, the make model translator 128 performs a tie break. For example, the make model translator 128 calculates the goodness value using Equation 4 for all rows, and selects the highest goodness value as the translation, moving to the completion steps. If the matches have the same goodness value, then the make model translator 128 can pick the row based on a predetermined priority (e.g., the following list arranged with the highest priority first and continuing on to the lowest priority: a CD match, a CB match, an AD match, an AB match, and, lastly, a BD match). If there is a tie, then the conflicting information does not provide a translation, and the make model translator 128 moves to the completion steps. Otherwise, if there is still a tie between multiple rows, the make model translator 128 checks if the individual components of the goodness value for each row are all at 100% as described above.

Lastly are the completion steps. If there are no matches (hits) there is not a translation available with the information provided. If the make model translator 128 has two or more translations and the same goodness value, then the make model translator 128 selects the translation with the most column hits (word matches) as the default result. If more than one translation exists that have the same number of column hits, then if there is still conflicting information that cannot be reconciled there is not a translation. Otherwise, if a clear match winner has been chosen, then the make model translator 128 use that row translation as the make and model information.

In some embodiments, all the operations described above for the make model translator 128 are carried out linearly and in the order described. However, this is not intended to be limiting, and any combination of the above operations can be carried out in any order.

Figure 7:
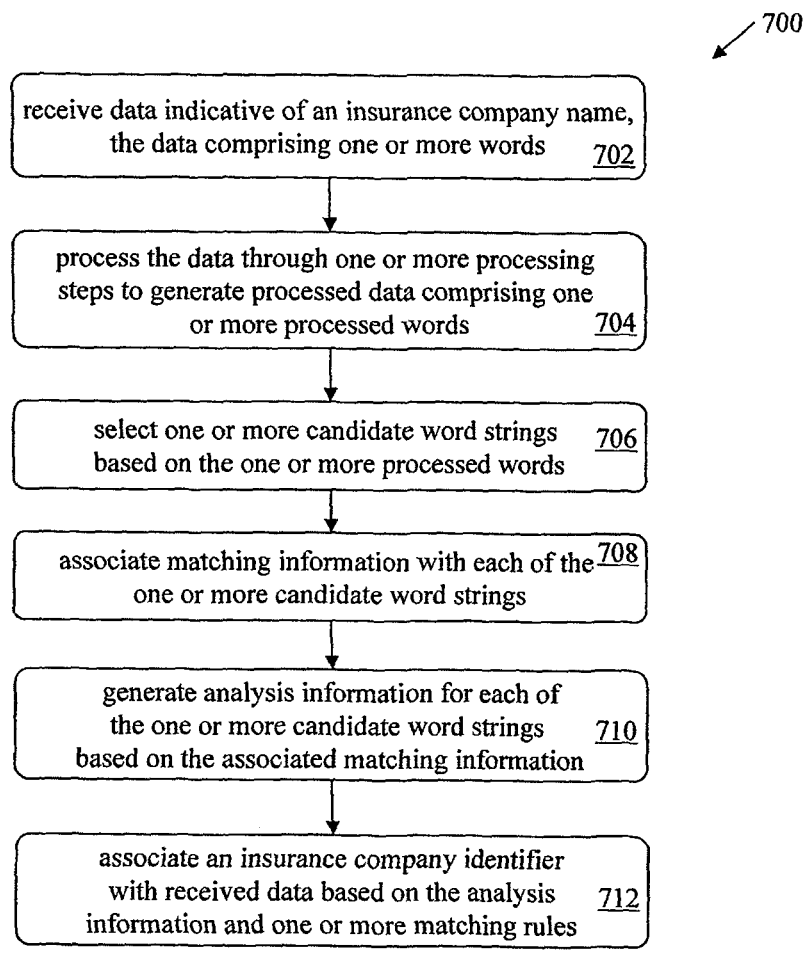
FIG. 7 is a flow chart of an exemplary method for translating insurance data of a data file.
Figure 8P:
FIGS. 8A-8R are diagrams of exemplary tables for translating insurance data of a data file.
FIG. 8S is an exemplary diagram of processed words.
FIG. 8T is an exemplary diagram of two word strings of processed words.

FIG. 7 is a flow chart of an exemplary method 700 for translating insurance data of a data file. The insurance company name translator 130 receives (702) data indicative of an insurance company name, the data comprising one or more words. The insurance company name translator 130 processes (704) the data through one or more processing steps to generate processed data comprising one or more processed words. The insurance company name translator 130 selects (706) one or more candidate word strings based on the one or more processed words. The insurance company name translator 130 associates (708) matching information with each of the one or more candidate word strings. The insurance company name translator 130 generates (710) analysis information for each of the one or more candidate word strings based on the associated matching information. The insurance company name translator 130 associates (712) an insurance company identifier with received data based on the analysis information and one or more matching rules.

The auditing system 104 uses the insurance company name translator 130 to generate an accurate translation of a word string that can be related to a known level of an insurance company, which in turn can be rolled up to the next higher level of the insurance companies hierarchy. Recurring patterns can be deduced from insurance company names (e.g., by reviewing 10,000 insurance company names). In some examples, the number of words used in the body of insurance company names is about 10 times larger than used in parts translation (e.g., via parts translator 132). This can make aliasing of an insurance company name dictionary (e.g., a template including all insurance company names for aliasing) difficult because of stepping on other aliases. Abbreviations are often used in both the informal and formal names, so the abbreviations cannot be blindly expanded (e.g., as a preprocessing step). Insurance companies are licensed by state by product, so, in some examples, insurance company names will appear fifty (50) times for one product if licensed all fifty (50) states. Therefore, differentiating between the multiple insurance company names requires identification of the state the type of policy was issued in. Since the type of product is often included in the insurance company name, the type of product may not need to be dealt with separately.

In some examples, the majority of the insurance company names are made unique by just one word, or at most two words. In some examples, (e.g., a small number of cases) the insurance company names are made unique by the order of a sequence of common insurance words. In many of the insurance company name word strings, the first one to three words, not including grammatical articles, are differentiating words that can be used to distinguish between insurance company names. In some insurance company name word strings, where the differentiation comes toward the end of the word string, the differentiating words are generally made up of locations (e.g., town, city, county, state, region, country). In insurance name word strings the order of the word sequence can be important, and should be maintained as the word string is processed (e.g., by the insurance company name translator 130). An analysis of the matching of the translated insurance company name word strings with other name word strings has shown that for some insurance company names, common word matches should carry less weight than uncommon word matches. To increase accuracy, the insurance company name translator 130 can be configured to determine that a proper name for an insurance company exists in a translation table or dictionary if all words in the name are represented in the dictionary table (or data structure being used to represent the insurance company names). The insurance company name translator 130 can include rules that incorporate one or more of these recurring patterns.

Below is an example of a translation process (e.g., carried out by the insurance company name translator 130) with reference to the steps of method 700 of FIG. 7. In a preferred embodiment, the sequence of the steps is preserved for the insurance company name translation. However, in other examples the steps can be executed in any order and in any combination without detracting from the insurance company name translation. For example, translation steps can be added and removed as additional patterns are identified within insurance company names.

With respect to step 702, the insurance company name translator 130 receives data indicative of an insurance company name with one or more words. In some examples, the insurance company name field word string is up to twelve words long.

In some embodiments, the insurance company name translator 130 generates a dictionary table (e.g., table 804A of FIGS. 8C-8F) and a table to numerically list insurance company names to facilitate the insurance company name translation. This creation process includes, for example, listing information for each company (e.g., a company code, primary company name, company group code, FEIN—federal employer identification number, company business activity status, state of domicile, and words used in the subordinate word string). The insurance company name translator 130 analyzes the company information to make cross-references to data in the dictionary table, accumulate counts of true occurrences of occurrence categories, calculate word counts for the insurance company names, and other comparisons of words in the insurance company names. The insurance company name translator 130 calculates, for example, the lowest category of word usage, the approximate usage number total in the first third of the word string, the approximate usage number total in the second third of the word string, and the approximate usage number total in the third third of the word string, and whether the lowest usage word occurs in the first third, second third, or third third of the word string. The insurance company name translator 130 creates, in some embodiments, a table that explains the number of times words are used within the list of company names by word string position and/or a table that shows the position in the word string of words representing geographical locations. The insurance company name translator 130 uses this calculated information while translating a word string into an insurance company name.

FIG. 8A is a diagram of is an exemplary table 800 for use when translating hyphenated words. Table 800 includes two columns, with the first row including the labels for each column. Column 1 is the "Hyphenated Word" column, and includes hyphenated words. Column 2 is the "Word" column, and includes the term of column 1 for the corresponding row without the hyphen. For hyphenated words, if the insurance company name translator 130 determines that one or more of the hyphenated word groups, "xxxx-yyyy" in column 1 of table 800 appear in the insurance company name word string, then the insurance company name translator 130 substitutes the corresponding word in column 2 of table 800 for the hyphenated word group. In some examples, if the replacement word in table 800 is actually two words separated by a coma, the insurance company name translator 130 creates two words strings, placing one of the coma separated words in each word string. Both word strings will be evaluated by the insurance company name translator 130.

FIG. 8B is a diagram of an exemplary table 802 for use when translating state abbreviations. Table 802 includes four columns, and the top row of table 802 includes the column labels. Column 1 is the "state" column, and includes state names. Column 2 is the "Abbreviation" column, and includes state abbreviations for the corresponding state of column 1. Column 3 is the "Postal Code" column, and includes the postal code for the corresponding state of column 1. Column 4 is the "Usage" column, which displays the word usage of each row in the list of insurance company names.

For state abbreviations, if the insurance company name translator 130 determines that the word string includes one or more of the word groups in columns 1-3 of table 802, the insurance company name translator 130 can either leave the word groups (e.g., if they appear in the "state" column) or replace the word groups with the words in column 1 of table 802 (e.g., if they appear in either the "abbreviation" or "postal code" columns). If the word is replaced or matched in column 1 of table 802, the insurance company name translator 130 marks that word and location as a state or territory of the United States. Additionally, if the first location word's position number is greater than ⅔*(the total number of words in the string), the insurance company name translator 130 notes the word position as "3" (e.g., in tables one through five of steps 908A-908E of FIG. 9A, or in column 32, the "third of the word string the location words are located in" column of table 806 of FIG. 8L). In some embodiments, the word position is noted during the development of the group table as described above. If the replacement word in table 802 is actually two words separated by a coma, where either word may be one or two words, the insurance company name translator 130 creates two words strings, placing one of the coma separated words in each word string. Both word strings will be evaluated by the insurance company name translator 130.

To add spaces, if necessary, the insurance company name translator 130 can be configured to verify there is a space before and after each punctuation mark (e.g., a coma, hyphen, slash, and @) in the word string. For example, the insurance company name translator 130 translates "R/R" to "R_/_R", "U-Bolt" to "U_-_Bolt", "Ring,Retainer" to "Ring_,_Retainer", and "spock&shield" to "spock_&_shield", where "_" is used to indicate a space that was added in the word string by the insurance company name translator 130.

To process abbreviations for the word "and," the insurance company name translator 130 can determine if the abbreviation for the word "and" exists (e.g., "&"), and if so, replace it with the word "and." The insurance company name translator 130 can be configured to remove characters from the word string (e.g., comas, hyphens, slashes, and other grammatical non-alpha-numeric characters). The insurance company name translator 130 can also be configured to process alpha-numeric word groups within the insurance company name word into two separate word groups within the name string (e.g., the insurance company name translator 130 translates "245xy" by inserting a space, to "245"_"xy").

With respect to step 704, the insurance company name translator 130 processes the data (e.g., the word string) through one or more processing steps to generate processed data comprising one or more processed words. For example, the insurance company name translator 130 is configured to correct the spelling and usage number of words in the word string.

FIGS. 8C-8F are diagrams of a table 804A and 804B (collectively 804) for use as a insurance company name dictionary. FIGS. 8C and 8D are one example of entries for table 804, and FIGS. 8E and 8F are a second example of entries for table 804. FIGS. 8C and 8E include the first three columns of table 804, and FIGS. 8D and 8F include the remaining five columns, and the top row of each table indicates the column labels. Column 1 is the "Dictionary" column, and includes the dictionary term, which is the correctly spelled version of the word to be used in the insurance company name. Column 2 is the "Aliases" column, and includes any aliases of the word in Column 1, if appropriate. Column 3 is the "Use in Company Listing" column, and indicates the number of times the word is used in the company listing. Columns 4 through 8 indicate attributes of the word, and are labeled, respectively, "Country", "State", "City/Town", "Region/County," and "Show if the word has been used as a Geographical Location within insurance company name strings." Column 8 is used in the determination of the translation of the insurance company name and enables the translator to determine the impact of location words.

The insurance company name translator 130 determines if each word in the word string is spelled correctly and is in the name dictionary which is column 1. Or if the insurance company name translator 130 determines there is an alias match column 2, the insurance company name translator 130 replaces the alias with the spelling in column 1.

The insurance company name translator 130, for each word matched in column 1 should record the corresponding usage number in column 3 (e.g., the corresponding usage number is calculated in that row by looking the word up in a numerical listing of companies, not shown), in addition to recording that the word is spelled correctly. For the remaining words that are not matched in columns 1 or 2, the insurance company name translator 130 can log them as not in the dictionary for reference, if necessary.

The insurance company name translator 130 can include a minimum criteria to continue translation. If the insurance company name translator 130 identifies words that do not have a match in column 3 then the insurance company name translator 130 checks whether there is a match in the column 2. The insurance company name translator 130 selects the first matches found, chooses the corresponding correct spelling in column 2 and again records the usage number corresponding to the match in column 3 (e.g., the corresponding usage number is calculated in that row by looking the word up in a numerical listing of companies, not shown).

The insurance company name translator 130 follows the sequence described below. The sequence describes worst case, so the insurance company name translator 130 continues on anything better than worst case. If the insurance company name translator 130 determines the name word string is one word long, then if the word has been matched in column 1 or 2, the insurance company name translator 130 continues to FIG. 8S and the associated description, calculating the word usage, and recording the number in column 3. Otherwise, if not, the insurance company name translator 130 stops the translation process, and places the name word string in the un-translated log string.

If the insurance company name translator 130 determines the name word string is two words long, then if the insurance company name translator 130 matched the first word in column 1 or 2 and has not matched the second word, the insurance company name translator 130 continue to FIG. 8S and the associated description unless the insurance company name translator 130 determines the first word has a usage in column 3 equal to or greater than 100, or if the first word translated as "THE." If either of these cases exist, insurance company name translator 130 stops translation and places the name word string in the un-translated log string. If the name word string is two words long and if the insurance company name translator 130 matched the second word in column 1 or 2 and has not matched the first word, the insurance company name translator 130 continues to FIG. 8S and the associated description unless the second word has a usage in column 3 equal to or greater than forty (40). If the usage number of the second word is greater than forty (40), the insurance company name translator 130 stops the translation, and places the name word string in the un-translated log string.

If the insurance company name translator 130 determines the name word string is three words long, then if the insurance company name translator 130 matched the first word of the three in column 1 or 2 and the insurance company name translator 130 has not matched either the second or third words, the insurance company name translator 130 continues to FIG. 8S and the associated description unless the insurance company name translator 130 determines the first word has a usage in column 3 equal to or greater than one hundred (100), or the first word translated as "THE." If either of these cases exists, the insurance company name translator 130 stops the translation, and places the name word string in the un-translated log string. If the name word string is three words long and if the insurance company name translator 130 has matched the second word in column 1 or 2 and the insurance company name translator 130 has not matched either the first and third words, the insurance company name translator 130 continues to FIG. 8S and the associated description unless the insurance company name translator 130 determines the second word has a usage in column 3 equal to or greater than forty (40). If the insurance company name translator 130 determines the second word's usage number is greater than forty (40), the insurance company name translator 130 stops translating, and places the name word string in the un-translated log string. If the name word string is three words long and if the insurance company name translator 130 has matched the third word in column 1 or 2 and the insurance company name translator 130 has not matched either the first or second words, the insurance company name translator 130 stops the translation and places the name word string in the un-translated log string unless the third word has a usage in column 3 less than ten (10). If the third word's usage number is less than ten (10), the insurance company name translator 130 continues to FIG. 8S and the associated description.

If the insurance company name translator 130 determines the name word string is greater than three words (e.g., four to eleven words long), if the insurance company name translator 130 determines the first three words in the string do not meet the minimum criteria of the three word step above, the insurance company name translator 130 stops the translation, and places the name word string in the un-translated log string and stop translation. Otherwise, the insurance company name translator 130 continues to FIG. 8S and the associated description. If the insurance company name translator 130 determines that there are no matches in either column 1 or 2, then the insurance company name translator 130 places the one or more word in the unmatched error log, along with a copy of the entire name word string, and stops the translation process.

After completing the sequence above, the insurance company name translator 130 should have generated a correctly spelled word string (e.g., a word string of 1 to 12 words) with the word usage attached to each word, and location words designated by a logical "YES." FIG. 8S is an exemplary diagram 850 of one or more processed words, words WORD-1 through WORD-12, collectively called "words", each word being associated with a USAGE # and a Y/N LOCAL. If there are duplicate words possible because of the abbreviations, then there will be two effective correctly spelled word strings where one word in both strings will be different. FIG. 8T is an exemplary diagram of two word strings 860, 870 of processed words. Word string 860 includes WORD-1, WORD-2A to represent a first duplicate word, and WORD-3 through WORD-12, each word being associated with a USAGE # and a Y/N LOCAL. Word string 870 includes WORD-1, WORD-2B to represent a second duplicate word, and WORD-3 through WORD-12, each word being associated with a USAGE # and a Y/N LOCAL. While FIGS. 8S and 8T depict twelve words, this is for illustrative purposes only, and it should be understood that the processed word string can include any number of words (e.g., one word, two words, etc.).

Otherwise, if the insurance company name translator 130 did not generate a correctly spelled word string, then the translation would be stopped and the insurance company name translator 130 would have generated an error log including, for example, the complete un-translated name word string and/or the word or words that would not translate.

Figure 10B:
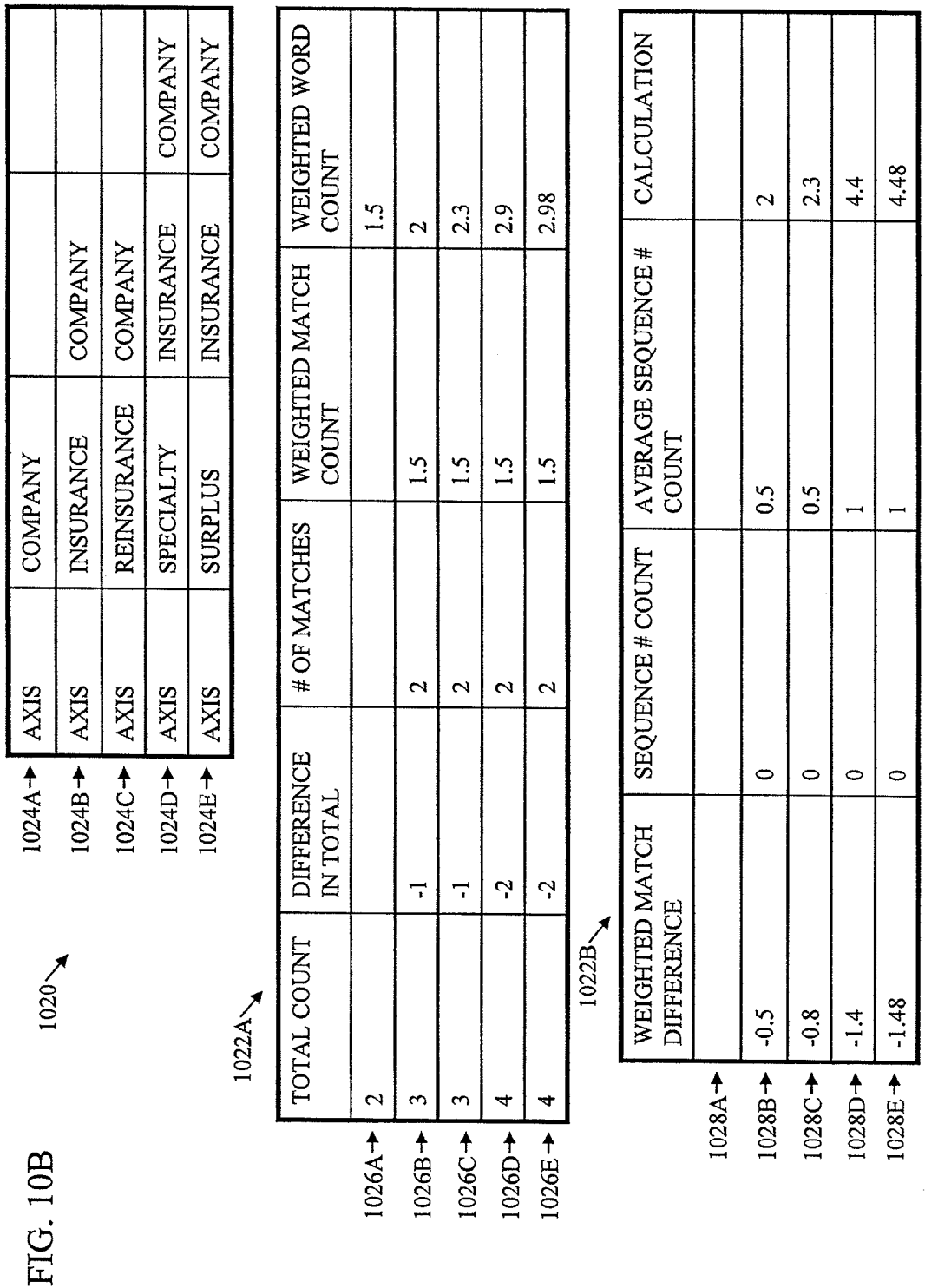

With respect to step 706, the insurance company name translator 130 selects one or more candidate word strings based on the one or more processed words (e.g., FIGS. 10A-10B). Name word strings often have two patterns: those with a definitive word, and those with a definitive local called out. For the definitive word pattern, many word strings have the definitive word for the name word string located within the first three words of the string. For example, on a surveyed sample of insurance company name word strings, 93.18% of words used once in a name string occur in the first three word positions, 93.89% of words used twice in name strings occur in the first three positions, 93.78% of words used three times in name strings occur in the first three positions, 94.89% of words used four times in name strings occur in the first three positions, and 93.55% of words used five to ten times in name strings occur in the first three positions. This pattern may account for, for example, approximately 85% of insurance company names. Another pattern is the pattern where a local is specified in the last third of the world string (e.g., "Mutual Insurance Company of Montana"). This pattern may account for, for example, approximately 10 to 12% of insurance company names. Additionally, common words can be used to translate the insurance company field, which can depend on the sequence to differentiate the name (e.g., "Mutual Fire and Marine Insurance Company").

Figure 9A:
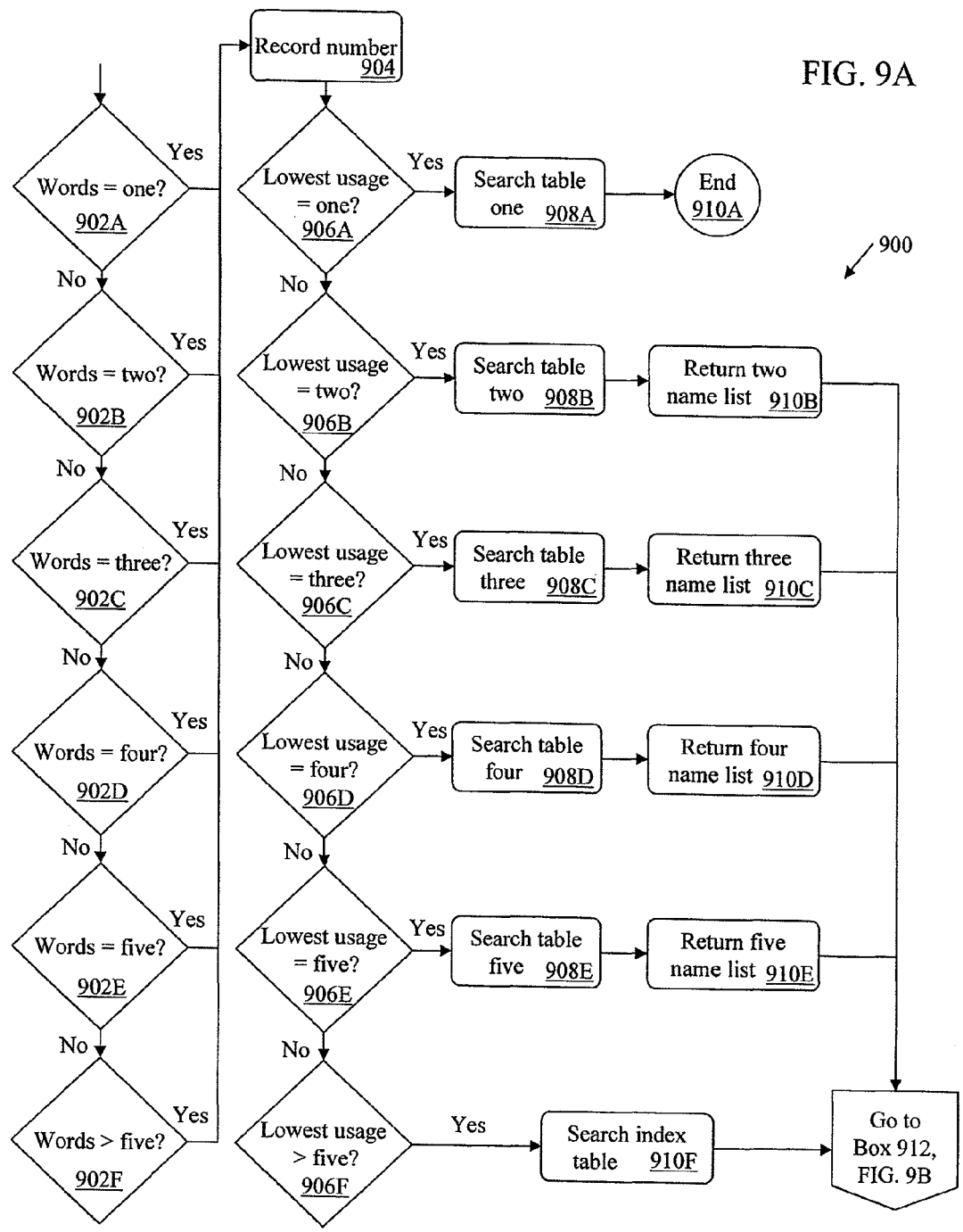
FIG. 9A is a flow chart of an exemplary method for selecting candidate insurance company name word strings.

FIG. 9A is a flow chart of an exemplary method 900 for selecting candidate insurance company name word strings. The insurance company name translator 130 collects additional information and identifies options. In steps 902A-902F, the insurance company name translator 130 determines how many words are in the name word string (or word strings, depending on the previous translation steps). The insurance company stories (904) this information with the word string. In steps 906A-906F, the insurance company name translator 130 determines the lowest word usage word in the word string(s). If there is more than one with the same usage number, the insurance company name translator 130 uses the first word in the string with that number (e.g., 1, 2, 3, 4, 5, or greater than 5).

FIGS. 8G-8L and 8M-8R are diagrams of an exemplary table 806 use for indexing, where the top row includes the column descriptions. Column 1 is the "Key" column, column 2 is the "Parent Company Name" column, and column 3 is the "Parent Index" column. Columns 4 through 32 include information regarding the children of the parent. Columns 4 through 10 are the "Company Code" column, the "Name In One String" column, the "Parent Index" column, the "Company Number" column, the "FEIN" column, the "Company Status" column, and the "State of Domicile" column. Columns 11 through 22 are the "First Position" column, the "Second Position" column, the "Third Position" column, the "Fourth Position" column, the "Fifth Position" column, the "Sixth Position" column, the "Seventh Position" column, the "Eighth Position" column, the "Ninth Position" column, the "Tenth Position" column, the "Eleventh Position" column, and the "Twelfth Position" column. Columns 23 through 32 are the "Word Count" column, the "Final Review of Lowest Categories In Word String" (Final Review) column, the "One Third Cell Count" (⅓) column, the "Approximate First Third Category Weighting" (Appx. First Third Weight) column, the "Approximate Second Third Category Weighting" (Appx. Second Third Weight) column, the "Approximate Third Third Category Weighting" (Appx. Third Third Weight) column, the "First Third the Lowest Category Number Appears" column, the "First Position of Location Word In String" column, the "NUMBER OF LOCATION WORDS PER WORD STRING" column, and the "THE ⅓ OF THE WORD STRING THE LOCATION WORD(S) ARE LOCATED" column.

FIGS. 8M-8R are diagrams of an exemplary table 808 use for indexing. Table 808 includes the same columns as table 806, but provides a second exemplary data set different from the data set of table 806. Column 1 is the "Key" column, column 2 is the "Parent Company Name" column, and column 3 is the "Parent Index" column. Columns 4 through 32 include information regarding the children of the parent. Columns 4 through 10 are the "Company Code" column, the "Name In One String" column, the "Parent Index" column, the "Company Number" column, the "FEIN" column, the "Company Status" column, and the "State of Domicile" column. Columns 11 through 22 are the "First Position" column, the "Second Position" column, the "Third Position" column, the "Fourth Position" column, the "Fifth Position" column, the "Sixth Position" column, the "Seventh Position" column, the "Eighth Position" column, the "Ninth Position" column, the "Tenth Position" column, the "Eleventh Position" column, and the "Twelfth Position" column. Columns 23 through 32 are the "Word Count" column, the "Final Review of Lowest Categories In Word String" (Final Review) column, the "One Third Cell Count" (⅓) column, the "Approximate First Third Category Weighting" (Appx. First Third Weight) column, the "Approximate Second Third Category Weighting" (Appx. Second Third Weight) column, the "Approximate Third Third Category Weighting" (Appx. Third Third Weight) column, the "First Third the Lowest Category Number Appears" column, the "First Position of Location Word In String" column, the "NUMBER OF LOCATION WORDS PER WORD STRING" column, and the "THE ⅓ OF THE WORD STRING THE LOCATION WORD(S) ARE LOCATED" column.

In steps 908A-908E, the insurance company name translator 130 searches the appropriate table for the word match and the possible name strings that might be the correct insurance company name. Table one for step 908A is an instance of table with similar information as that of table 808 of FIGS. 8M-8R. Table one includes, for example, only word strings with one unique word, and information about each child includes the company code, name, parent index, company number, fein, company status, state of domicile, first position, second position, third position, fourth position, fifth position, sixth position, seventh position, eighth position, ninth position, tenth position, eleventh position, twelfth position, word count, final review of lowest categories in word string, one third cell count, approximate first third category weighting, approximate second third category weighting, approximate third third category weighting, first third the lowest category number appears, first position of location word in word string, number of location words per word string, and the one third of the word string the location word(s) are located. Table two through table five include, for example, word strings with two unique words, word strings with three unique words, word strings with four unique words, and word strings with five unique words, respectively.

If there is more than one word with a word usage (e.g., if there is more than one word in the name string), the insurance company name translator 130 selects the first word. If two name word strings have been created, the insurance company name translator 130 keeps the return word string sets separate, since the analysis will be done separately and then compared. This is done for usage numbers between one and five, going to tables corresponding to the usage number and returning the rows that match that name string word (e.g., table one will return (910A) one row, since this is a direct match and is therefore the translation, table two will return (910B) two rows, table three will return (910C) three rows, table four will return (910D) four rows, and table five will return (910E) five rows).

For greater than the category of five usage words, if the insurance company name translator 130 uses an index table (e.g., table 806 of FIGS. 8G-8L or table 808 of FIGS. 8M-8R), searching for a match in column 1, returning (910F) as many rows as there are matches in column 1. If the insurance company name translator 130 identifies a group of identical rows, the insurance company name translator 130 returns the first row.

If the insurance company name translator 130 determines there are no matches in column 1 of an index table (e.g., table 806 of FIGS. 8G-8L or table 808 of FIGS. 8M-8R), then the insurance company name translator 130 searches for the low usage word in the body of an index table (e.g., table 806 of FIGS. 8G-8L or table 808 of FIGS. 8M-8R, columns 12 through columns 23), returning all rows matched for analysis. The insurance company name translator 130 can also log an error in the index list since the body of an index table (e.g., table 806 of FIGS. 8G-8L or table 808 of FIGS. 8M-8R) had to be used for this word.

With respect to step 708, the insurance company name translator 130 associates matching information with each of the one or more candidate word strings. At this point the insurance company name translator 130 has calculated the number of words in the name string; the sequence of the words in the name string; if one of the words is a city, state, country, or region, and the number of rows (e.g., possible name strings) that may be the correct insurance company name. The returned rows (e.g., from steps 910B through 910F) contains word string words, a word string count, an indication of whether a location word exists, an indication of the location words position, an indication of what third of the word string the location word is in, and word usage for each word in the string. This information is saved along with the original name word string. If, for example, the insurance company name translator 130 performed a dual search, there are two sets of information.

Figure 9B:
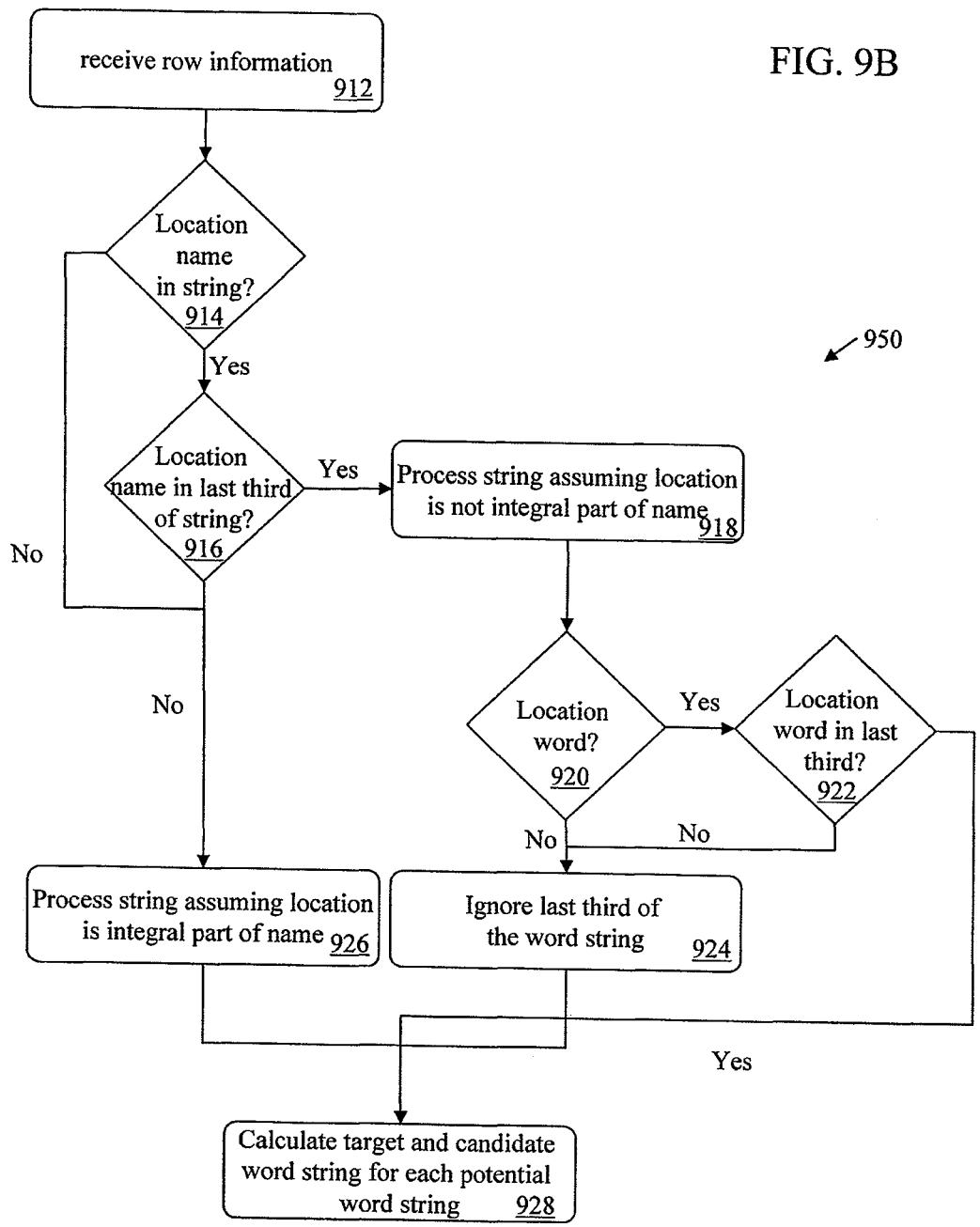
FIG. 9B is a flow chart of an exemplary method for generating analysis information for one or more word strings.

With respect to step 710, the insurance company name translator 130 generates analysis information for each of the one or more candidate word strings based on the associated matching information. FIG. 9B is a flow chart of an exemplary method 950 for generating analysis information for one or more word strings. The insurance company name translator 130 receives (912) the returned rows (e.g., from one of steps 910B through 910F) from the search. The information returned with each row includes, for example, the word string and information indicative of the word count, the existence of the location name, the position of the location name, which third of the string (e.g., the first third, second third, or last third of the word string) the location name is positioned in, and the word usage for each word in the string. The insurance company name translator 130 checks the information indicative of the existence of the location name to determine (914) whether there is a location name in the word string. If there is a location name in the word string, the insurance company name translator 130 determines (916) whether the location name is in the last third of the word string (e.g., by checking the information indicative of which third of the string the location name is positioned in). If the location name is in the last third of the word string, the insurance company name translator 130 processes (918) the string, assuming the location name is not an integral part of the insurance company name. The insurance company name translator 130 determines (920) whether the target word string has a location word. If the target word string has a location word, the insurance company name translator 130 determines (922) whether the location word in the target word string is in the last third of the target word string. If the location word is not in the last third, then the insurance company name translator 130 ignores (924) the last third of the candidate word string when performing the calculations.

If the insurance company name translator 130 determines (916) the location name is not in the last third of the word string, the insurance company name translator 130 processes (926) the word string assuming the location name is an integral part of the insurance company name. The insurance company name translator 130 calculates (928) information about the target and one or more candidate word strings, storing the information with each potential candidate word string in an analysis output table. The information includes a difference in total words, a number of word matches, a weighted word match count, a weighted word count, a weighted match difference, a sequence number count, and an average sequence number count.

The insurance company name translator 130 calculates the "difference in total," or the difference in the number of words in the original string (e.g., string "A") and each string that was returned (e.g., strings "B", "C", etc., returned through steps 910B through 910F). The difference is calculated, for example, as the word count of string "A" subtracted from the word count of string "B". The insurance company name translator 130 stores these results in the analysis output table.

The insurance company name translator 130 determines the number of word matches between the original word name string "A" and the word name strings returned ("B", "C", etc.). The insurance company name translator 130 can store these results in the analysis output table.

The insurance company name translator 130 calculates a "weighted word match count" or ("weighted match count"). The weighted word match count is calculated by using the word usage number. Each match equals one and is multiplied by the usage multiplier as shown below, these products are all summed and the results are stored in the analysis output table. The multipliers are shown below for each match case:
word usage number 1 thru 10 equals 100% or 1×100%=1;
word usage 11 thru 30 equals 98% or 1×98%=0.98;
word usage 31 to 49 equals 96% or 1×96%=0.96;
word usage 50 to 100 equals 90% or 1×90%=0.90;
word usage 101 to 400 equals 80% or 1×80%=0.80; and
word usage 401 to 5000 equals 50% or 1×50%=0.50.

The insurance company name translator 130 calculates the "weighted word count" for the original name string and each name string returned. The insurance company name translator 130 calculates the weighted word count by using the word usage number. Each word equals one and is multiplied by the usage multiplier shown below. The insurance company name translator 130 sums these products for each name string, and the results are stored in the analysis output table. Exemplary multipliers are shown below for each word usage:
word usage number 1 thru 10 equals 100% or 1×100%=1;
word usage 11 thru 30 equals 98% or 1×98%=0.98;
word usage 31 to 49 equals 96% or 1×96%=0.96;
word usage 50 to 100 equals 90% or 1×90%=0.90;
word usage 101 to 400 equals 80% or 1×80%=0.80; and
word usage 401 to 5000 equals 50% or 1×50%=0.50.

The insurance company name translator 130 calculate the "weighted match difference" by subtracting the "weighted word count" from the "weighted word match count." The results are stored in the analysis output table.

The insurance company name translator 130 calculates the "sequence number count" of the lowest usage match. The insurance company name translator 130 calculates the sequence number count by computing the difference in relative sequence of the "lowest usage word" (e.g., the word used the least in the word string) in the original name word string from each of the returned word strings words that match. For example, if the lowest usage word in the original name string is "aetna", it was in the second position in the sequence of the original string, and the returned name string where it matched was in the first position, then the count would be "−1." If, for example, it had been in the third position then it would be "1," in the fifth position then it would be "3", etc. The results are stored in the analysis output table.

The insurance company name translator 130 calculates the "average absolute sequence number count" for all matches. The insurance company name translator 130 calculates the average absolute sequence number count as the difference in relative sequence of the word in the original name word string from each of the returned word strings words that match. For example, if the word in the original name string was in the second position in the sequence of the original string, and the returned name string where it matched was in the first position, then the count would be "1," if it had been in the third position it would be "1," in the fifth position it would be "3", etc. Because it is the average, then there are no +/− signs. Usually, for each match the insurance company name translator 130 will calculate a number between 0 and 10. The insurance company name translator 130 sums the matches, dividing by the number of matches to calculate the average sequence number count. The results are stored in the analysis output table.

With respect to step 712, the insurance company name translator 130 associates an insurance company identifier with received data based on the analysis information and one or more matching rules. The analysis output table includes, for each candidate word string based on the original word string, a difference in total words, a number of word matches, a weighted word match count, a weighted word count, a weighted match difference, a sequence number count, and an average sequence number count. In some examples, the evaluation of the analysis output table is based on word usage.

FIG. 10A shows an exemplary graph 1000 for word position versus word usage count. The positions 1002 (numbers 1 through 12) along the top horizontal axis of graph 1000 indicate the position of a word in a string (e.g., 1 indicates the word is at the first position in the word string), and the ranges 1004A and 1004B (collectively ranges 1004) indicate categories of occurrences of words in the total number of insurance company names (e.g., category 1-10 means a specific word occurred 1-10 times in all the insurance names in the auditing system 104, so 1-10 is therefore a near unique word occurrence). For example, the entry in 1002 and 1004A for 1-10 occurrences at a word position 1 is 3875, which means that unique words occurred 3875 times in the first position of the word string of the insurance company name. This table relates occurrence categories to word string positions. The numbers in corresponding entries for positions 1002 and 1004A are numerical totals. The numbers in the corresponding entries for positions 1002 and 1004B are percentages. Advantageously, since unique words can facilitate translation of insurance company names, the graph 1000 shows, for some examples, the insurance company name translator 130 can use the first words in the string for translation, and the sequence of words in the string should be maintained during translation.

In some examples, the majority of the words fall into 4-5 word positions and the majority of the "differentiating" words fall into the first 2-3 word positions. What comprises a common word usage is based on positions 3 and 4, and can also be based on positions 2 and 5. Common words mostly make up positions 6 thru 11, as a percentage of totals, even though the word volume tails off as the position increases.

The insurance company name translator 130 uses rules to determine the best possible match. An exemplary rule set is described below, which is intended to be illustrative only and not limiting. The insurance company name translator 130 determines if the word usage number was one and there is a signal row match out of table 808. If this is the case, the insurance company name translator 130 concludes with that row as the translation. The insurance company name translator 130 indicates a table 808 translation in the analysis log next to the original name string, the translated name string, and the parent index number. Otherwise, the insurance company name translator 130 determines if the original name string is one word in length and the word usage number on that word is below 49. If so, the insurance company name translator 130 moves forward in the translation (e.g., Aetna has a usage of 33).

The insurance company name translator 130 determines if one row is returned with a match, and if so then the insurance company name translator 130 determines the row is the translation. The insurance company name translator 130 indicates a table 808 translation in the analysis log next to the original name string, the translated name string, and the parent index number. Otherwise, if the insurance company name translator 130 determines multiple rows are returned with matches, the insurance company name translator 130 tests the analysis output table. The test involves the insurance company name translator 130 looking at five values (i.e., the absolute value of the account difference, the absolute value of the number of matches, the number of words in the target word string, the absolute value of the weighted match difference, and the absolute value of the average sequence match count) all of which are sought to be minimized for the best match. For example, the insurance company name translator 130 can compute the absolute value of the account difference, plus the absolute value of the number of matches, minus the number of words in the target word string, plus the absolute value of the weighted match difference, plus the absolute value of the sequence count number, plus the absolute value of the average sequence match count. The lowest number computed for all the rows is the translation.

For example, FIG. 10B shows an exemplary string table 1020 and an exemplary analysis output table, tables 1022A and 1022B, collectively the analysis output table 1022. The first word string in the string table 1020, row 1024A, is the target word string, which is "AXIS COMPANY." The remaining four word strings, rows 1024B-1024D, are the candidate word strings identified through the insurance company name translator 130 using one or more of the steps described above (e.g., using the analysis calculations described above with reference to FIGS. 7-9B). The candidate word strings are "AXIS INSURANCE COMPANY", "AXIS REINSURANCE COMPANY", "AXIS SPECIALTY INSURANCE COMPANY", and "AXIS SURPLUS INSURANCE COMPANY." The calculations (e.g., as described with respect to step 710 of FIG. 7) for each row of the string table 1020 are shown in the two analysis output table extensions 1022A, 1022B. Each row in the analysis output tables 1022 correspond to a row in the string table 1020 (e.g., row 1024A of string table 1020 corresponds to row 1026A of table 1022A and row 1028A of table 1022B, and so on). The column titled "calculation" in table 1022B shows the output of the absolute value of the account difference, plus the absolute value of the number of matches minus the number of words in the target word string, plus the absolute value of the weighted match difference, plus the absolute value of the sequence count number, plus the absolute value of the average sequence match count. The lowest number output for all the rows is the translation, which is row 1028B. Thus, "AXIS COMPANY" is translated to "AXIS INSURANCE COMPANY."

FIG. 10C shows another exemplary string table 1040 and an exemplary analysis output table, tables 1042A and 1042B, collectively the analysis output table 1042. The first word string in the string table 1040, row 1044A, is the target word string, and the remaining four word strings, rows 1044B-1044E, are the candidate word strings identified through the insurance company name translator 130 using one or more of the steps described above. The calculations for each row of the string table 1040 are shown in the two analysis output table extensions 1042A, 1042B. Each row in the analysis output tables 1042 correspond to a row in the string table 1040 (e.g., row 1044A of string table 1040 corresponds to row 1046A of table 1042A and row 1048A of table 1042B, and so on). The lowest number output for all the rows is the translation, which is row 1048D. Thus, "CENTURION LIFE INSURANCE" is translated to "CENTURION LIFE INSURANCE COMPANY."

FIG. 10D shows another exemplary string table 1060 and an exemplary analysis output table, tables 1062A and 1062B, collectively the analysis output table 1062. The first word string in the string table 1060, row 1064A, is the target word string, and the remaining four word strings, rows 1064B-1064E, are the candidate word strings identified through the insurance company name translator 130 using one or more of the steps described above. Notably, the fourth candidate word string, column 1064E of string table 1060, has a location word in the last third of the word string (i.e., "OHIO"), and therefore the last third of the word string is effectively truncated for the calculation (e.g., as described above with reference to FIG. 9B). The calculations for each row of the string table 1060 are shown in the two analysis output table extensions 1062A, 1062B. Each row in the analysis output tables 1062 correspond to a row in the string table 1060 (e.g., row 1064A of string table 1060 corresponds to row 1066A of table 1062A and row 1068A of table 1062B, and so on). The lowest number output for all the rows is the translation, which is row 1068C. Thus, "CRUM FORSTER INSURANCE" is translated to "CRUM AND FORSTER INSURANCE COMPANY."

Parts translator 132 includes first parts translator 134A and second parts translator 134B, which the auditing system 104 uses to translate part line items. In some embodiments, parts translator 132 includes only one translator. In some examples, one or both of the first parts translator 134A and the second parts translator 134B are used to translate the word strings. In some embodiments, the first parts translator 134A and the second parts translator 134B are combined into one translator. Database 136 stores information needed by parts translator 132. For example, database 136 can store one or more data tables for the translation process (see, e.g., Tables 1-17), one or more rules used by the parts translator 132, and/or one or more rules associated with each of the client computers 102.

As discussed above, the audit report 140 generated by the output unit 138 can include an audit report of parts (a "parts audit report"), an audit of operations (an "operations audit report"), compliance information, a pay/no pay recommendation, a settlement process, or an estimate based on both the parts audit report and the operations audit report (a "multi-point estimate audit"). The auditing system 104 can use the part translator 132 to generate identifiers (e.g., part identifiers for part items) for use in generating audit reports.

The auditable items (e.g., part are made up of both alphanumeric and non-alphanumeric characters. The auditable items can be, for example, line items for an insurance demand file. For example, a line item can include characters indicative of a line item number, an entry number, a labor type, an operation, a line item description, a part type or part number, a dollar amount, a labor unit, and/or the like. Examples of line item descriptions are "R FRT OTR BELT MOULDING", "FRT BUMPER ASSY", "DOOR W/SIDE MIRROR SHELL REPAIR 3 HOURS", "RADIO—CD PLAYER INCL 1 FRT & R SPEAKER PLUG CONNECTION", "250 HP ENGINE—SPORT SUSPENSION WITH RALLY PACKAGE", and/or the like. These examples are not included to be limiting or conclusive, but are provided for illustrative, exemplary purposes only.

Figure 11:
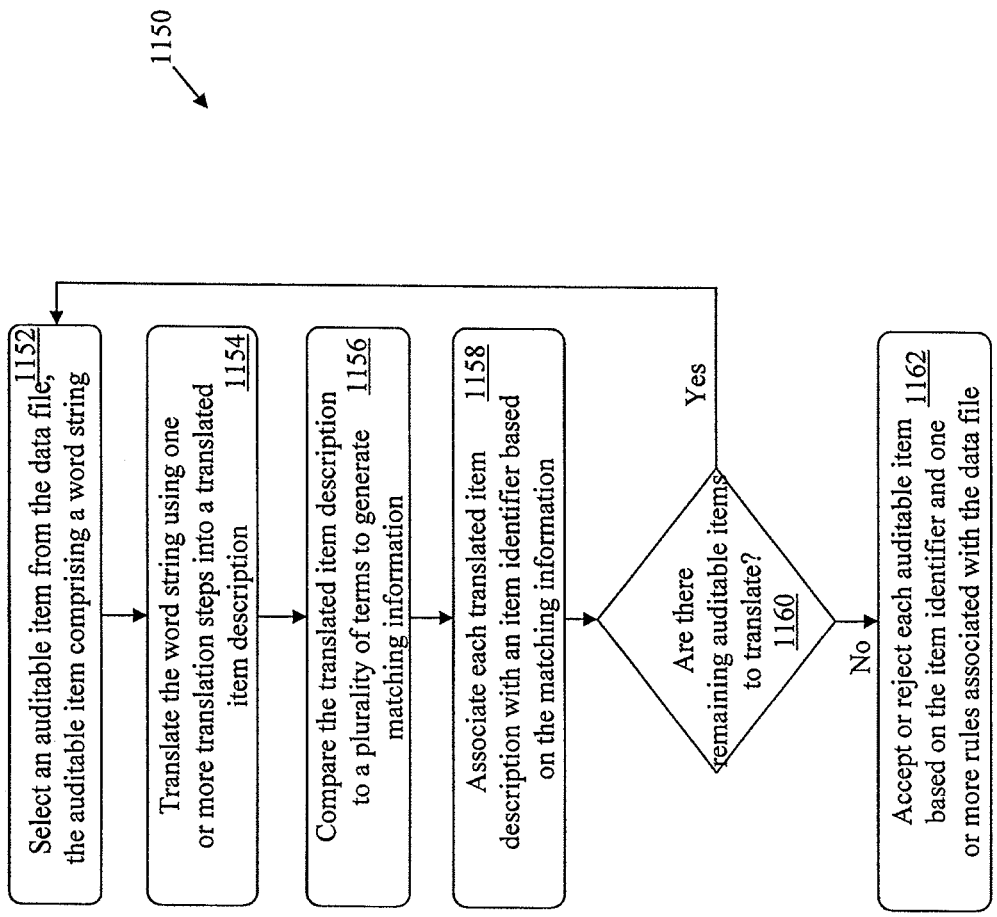
FIG. 11 is a flow chart of an exemplary method for auditing a data file.

FIG. 11 illustrates an exemplary method 1150 for auditing a data file (e.g., data file 120). The auditing system 104 selects (1152) an auditable item (e.g., auditable item 121A from the auditable items 121) in the data file 120. The auditable item is made up of a word string of one or more words. The auditing system 104 (e.g., via parts translator 132) translates (1154) the word string using one or more translation steps into a translated item description. The one or more translation steps are described in further detail below (see, e.g., FIGS. 12A-15B). The auditing system 104 compares (1156) the translated item description to a plurality of terms to generate matching information. The auditing system 104 associates (1158) each translated item description with an item identifier based on the matching information. If there are additional auditable items remaining (1160) in the data file 120, the auditing system 104 continues to translate (steps 1152-1158) each auditable item.

The auditing system 104 accepts or rejects (1162) each auditable item based on the item identifier and one or more rules associated with the data file. For example, if the auditing system 104 determines the item identifier for an auditable item is rejected based on the one or more rules associated with the data file, the auditing system 104 accepts auditable item. If the auditing system 104 determines the item identifier is accepted based on the one or more rules, the auditing system 104 accepts the auditable item. If the word string is unsuccessfully translated into a word string (e.g., at step 1154), the auditing system 104 can log the word string as an unsuccessful translation. If the auditing system 104 unsuccessfully associates the translated item description with a single item identifier, the auditing system 104 can associate the translated item description with a plurality of item identifiers. For example, the auditing system 104 can associate the translated item description with the five closest item identifiers. Advantageously, when there are close associations, a user can be presented with the closest matches and select the best match for the auditable item.

FIG. 12 illustrates an exemplary method 200 for initial processing of a word string during translation. Once the auditing system 104 selects an auditable item, the auditing system 104 preprocesses (1202) the word string associated with the auditable item. The auditing system 104 determines (1204) whether or not the word string contains one or more specific words. If the word string contains one or more specific words, the auditing system removes (1206) the standard terms. The auditing system determines (1208) whether the word string contains one or more predetermined terms. If the auditing system contains one or more predetermined terms, the auditing system processes (1210) the word string according to one or more rules associated with the predetermined terms. The auditing system determines (1212) whether the word string contains one or more abbreviations. If the auditing system contains one or more abbreviations, the auditing system processes (1214) the word string according to one or more rules associated with the abbreviations. The auditing system determines (1216) whether the word string contains header information. If the auditing system contains header information, the auditing system processes (1218) the word string according to one or more rules associated with the header information. The auditing system determines (1220) whether the word string contains one or more ambiguous terms. If the auditing system contains one or more ambiguous terms, the auditing system processes (1222) the word string according to one or more rules associated with the one or more ambiguous terms.

The auditing system 104 preprocesses (1202) the word string associated with the auditable item. Preprocessing includes, for example, removing one or more orientation words from the word string, removing one or more unnecessary words from the word string, adding a space before one or more punctuation marks in the word string, and other types of preprocessing.

An exemplary listing of orientation words includes FR, FRONT, FRT, FT, INNER, INR, L, LEFT, LH, LOWER, LT, LWR, OTR, OUTER, R, REAR, RH, RHT, RIGHT, RT, UPPER, and UPR. The auditing system 104 can include one or more rules (e.g., stored in DB 136) to remove unneeded words from the word string based on identifying one or more orientation words. The truncated word string (i.e., the word string with the identified words removed) is processed by additional steps, if any.

The auditing system 104 can test the word string for various type of punctuation characters to determine whether all characters are preceded by a space and followed by a space. The auditing system 104 can include one or more rules to add spaces as needed to prepare the word string for further processing. For example, "SIDE MIRROR (WITH ELECTRICAL CONTROL)" can be translated into "SIDE MIRROR (WITH ELECTRICAL CONTROL)."

The auditing system 104 determines (1204) whether or not the word string contains one or more specific words. If the word string contains one or more specific words, the auditing system removes (1206) the standard terms. Standard terms are terms that have no real impact on the part being described. An exemplary list of standard terms includes "2 DOOR", "3 DOOR", "4 DOOR", "2 CYLINDER", "4 CYLINDER", "6 CYLINDER", "8 CYLINDER", "2 WHEEL DRIVE", and "REPLACE". The auditing system 104 can include one or more rules to remove standard terms and to truncate the word string for further processing.

In some examples, the standard terms can include the words such as "repair" and/or "finishing" on certain body parts, such as door shells and/or panels, and/or the like. The auditing system 104 include have one or more rules to look for these types of word phrases and to remove any unnecessary words. For example "DOOR W/SIDE MIRROR SHELL REPAIR 3 HOURS" is translated into "DOOR W/SIDE MIRROR."

In some examples, the standard terms can include the term "cross-member" and various equivalents (e.g., "x-mbr"). The auditing system 104 can include one or more rules to remove the term(s). The standard terms can include other terms that do not add value to the identification of the part. For example, "RADIO—CD PLAYER INCL 8 FRT & R SPEAKER PLUG CONNECTION" is translated into "RADIO—CD PLAYER."

The auditing system determines (1208) whether the word string contains one or more predetermined terms. If the auditing system contains one or more predetermined terms, the auditing system processes (1210) the word string according to one or more rules associated with the predetermined terms. The predetermined terms can include, for example, "heads up display", "sport suspension", "standard suspension", "automatic or manual transmission", "manual" and/or "steering" followed by a word starting with "co", "combination", and/or other terms and abbreviations (e.g., "std sus" for "standard suspension") of such terms. For example, "250 HP ENGINE—SPORT SUSPENSION WITH RALLY PACKAGE" is translated to "250 HP ENGINE", "250 HP ENGINE—STD SUS WITH MAN TRANS" is translated to "250 HP ENGINE", "FLOOR MOUNTED SHIFTER MAN TRANS STD RATIO" is translated to "FLOOR MOUNTED SHIFTER", "SHIFT LEVER MANUAL STEERING COLUMN" is translated to "SHIFT LEVER", and "FRT R COMBINATION LAMP" is translated to "FRONT RIGHT COMBINATION LAMP."

In some examples, the standard terms can be used to identify groupings of terms. FIG. 12B shows an exemplary table 1230 for groupings. The first column labeled "Designator" includes the designator words. The second through sixth columns, labeled "Term 1", "Term 2", "Term 3", "Term 4", "Term 5", respectively, include additional terms which can be associated with the designator. The seventh column labeled "Orient" includes orientation words associated with the designator word in the "Designator" column. The eighth column labeled "Desc" contains descriptor words, and the ninth column labeled "Name" contains item names. The auditing system 104 can include one or more rules to process a word string based on table 1230. For example, the auditing system 104 can search for a designator word. If a designator word is found, the word string can be examined and replaced with the correct orientation word from the "Orientation" column and the correct descriptor and item names from the "Desc" and "Name" columns.

In some examples, the standard terms can include any abbreviations for "without" and "with <some word>." The auditing system 104 can include rules to remove the abbreviations. The rules can be further configured to remove the part of the word string following those abbreviations. For example, "L FRT DOOR W/ELECTRIC LOCK" is translated to "L FRT DOOR."

In some examples, the standard terms can include metric indicators. The metric indicators can be, for example, alphanumeric, alpha, and numerical characters related to metrics. FIG. 12C shows an exemplary table 1232 for translating metric words. The first column labeled "Metric Words" lists various metric alias words. The second column labeled "Correct Word" lists the actual word the associated word in the "Metric Words" column. The third column labeled "Text/Numeric Words" lists various textual and numeric metric words. The fourth column labeled "Correct Word" lists the actual word associated with the word in the "Text/Numeric Words" column. For example, the numeric word "¼" corresponds to the correct word "one quarter." The auditing system 104 can include one or more rules for dealing with metrics. For example, the auditing rules may remove the metrics. Some auditing rules may keep metric indicators, such as "$1^{st}$", "$2^{nd}$", and "$3^{rd}$", for example. As an illustrative example, "4.2 L ENGINE" is translated to "ENGINE", and "ENGINE FOR A 240ZX MODEL" is translated to "ENGINE FOR A MODEL." The rules can be configured to delete the metric words from the word string and concatenate the remaining word string together for further processing.

In some examples, the standard terms can include computer generated formats. For example, computer generated formats can include code notations such as a part description followed by a dash, multiple spaces, and/or a 2 digit code number. For example, "R FRT FENDER—24" is translated to "R FRT FENDER." The auditing system 104 can include rules to identify computer generated formats and remove the superfluous computer generated custom codes.

In some examples, the standard terms can include non-alphanumeric characters. The auditing system 104 can include rules to determine if non-alpha-numeric characters are in the word string and to remove the characters. The rules can be configured to keep certain non-alphanumeric characters in the word string. For example, the rules can be configured to keep comas in the word string. The rules can also be configured to, upon determining parentheses exist in the word string, to remove all text and characters within the parentheses. The rules can also be configured to, upon determining quotes exist in the word string, to also remove all text within the quote. For example, "TINTED WINDSHIELD (EMBEDDED ANTENNA)" is translated to "TINTED WINDSHIELD."

In some examples, the standard terms can include single letters. For an item name, there are often finite single letter word string combinations that are allowable. The auditing system 104 can include rules to determine if the individual letter(s) are allowable, and if not they can be removed from the word string. In some examples, the standard terms can include the term "TYPE." The auditing system 104 can include a rule to determine if the word string contains the word "TYPE." The rules can be further configured to remove the word "TYPE" and all subsequent words.

The auditing system determines (1212) whether the word string contains one or more abbreviations. If the auditing system contains one or more abbreviations, the auditing system processes (1214) the word string according to one or more rules associated with the abbreviations. FIG. 12D is a diagram of an exemplary table 1234 for translating abbreviations. The first column of table 1234, labeled "To Be Converted," includes abbreviations which may exist in a word string. The second column, labeled "Convert To" is the value the corresponding abbreviation from column one is converted to by, for example, one or more rules in the auditing system 104. For example, if the abbreviation "W/S" is located in a word string, the abbreviation is translated to "WINDSHIELD," "4WD" is translated to "FOUR WHEEL DRIVE," and so on. The abbreviations can include both text and non-text characters. An exemplary rule can be configured to determine if there are any text/non-text abbreviation matches in the first column. For each match in the "To Be Converted" column, the abbreviation is replaced by the corresponding text in the "Convert To" column.

The abbreviations can include dual meaning abbreviations. For example, "R" can either be "Right" or "Rear." FIG. 12E is a diagram of an exemplary table 1236 of dual meaning abbreviations. The first column labeled "Abbreviation" includes dual meaning abbreviations, and the second column labeled "Conversion" is the a conversion for the corresponding dual meaning abbreviation in the "Abbreviation" column. One or more rules in the auditing system 104 can be configured to handle the dual meaning abbreviations by searching for abbreviations (e.g., terms in the "Abbreviation" column of table 1236) and replacing the abbreviations with the proper conversion terms (e.g., the "Conversion" column of table 1236). For example, if the rule detects "R RUNNING BOARD" in the word string, it is translated to "RIGHT RUNNING BOARD."

FIG. 12F is a diagram of another exemplary table 1238 of abbreviations and conversion words (e.g., aliases). The first column, labeled "Abbreviation," includes the abbreviated word which may be located in the word string. The second column, labeled "Final Word," includes the word the corresponding word from the "Abbreviation" column is translated to in the word string. The auditing system 104 can include one or more rules configured to translate words from the "Abbreviation" column to the corresponding word in the "Final Word" column if the words exist in the word string. For example, "ABSRBR", if located in the word string, is translated to "ABSORBER," "ADHSV" is translated to "ADHESIVE," and so on. The rules can be configured to compare each group of letters separated by a space, or single letter separated by a space in the word string to the abbreviations in the "Abbreviation" column with the same first letter. For example, the first match for a group of words in the word string an abbreviation from the "Abbreviation" column can replace the group of letters or letter in the word string. The replacement term from the "Final Word" column can be placed in the same sequence position as the original group of letters or letter in the word string. If there is no match for a word in the string, the rules can be configured to remove the word from the word string and log the description.

The auditing system determines (1216) whether the word string contains header information. If the auditing system contains header information, the auditing system processes (1218) the word string according to one or more rules associated with the header information. Header information can include "CCC Header" information.

FIG. 12G is a diagram of an exemplary table 1240 of header information and how the header information can be converted. The first column labeled "CCC Section Headers" includes a list of headers which can be located in the word string. The second column, labeled "Orientation Word (Add this word at the beginning)," may include an orientation word depending on the associated header from the "CCC Section Headers" column. The third column, labeled "Orientation Word (Add this word at the end)," may include an orientation word depending on the associated header from the "CCC Section Headers" column. For example, if there is "CCC Header" information attached to the part word string (i.e., the original word string or the word string as previously processed by one or more rules) in the claim log table, the one or more rules can be configured to appropriately translate the header information. For example, the rules can determine if the header should be used, if the header should be converted to different words, and/or if the header should be discarded. The header can add words from the "Orientation Word (Add this word at the beginning)" column to the beginning of the word string and/or add words from the "Orientation Word (Add this word at the end)" column to the end of the word string. The fourth column, labeled "Descriptor Word (Add this word at the beginning)", may include a descriptor word to add at the beginning of the word string. The fifth column, labeled "Descriptor Word (Add this word at the end)", may include a descriptor word to add at the end of the word string.

Each row of table 1240 can have an associated rule for performing the header information conversion. For example, for row one containing "AIR CONDITIONER & HEATER", insert "AIR CONDITIONER" at the beginning of the word string if a word from the following list of words is in the word sting: FAN, HOSE, SHROUD, CONDENSER, EVAPORATOR, CASE, LINE, SWITCH, PIPE, TUBE, MOTOR, BLOWER, CLUTCH, HEATER, HOUSING, COMPRESSOR, VENT, CORE, PULLEY, CONTROL, OPENING, BOX, CAP, EYE, HUB, DUCT, UNIT, INLET, BLADE, BRACE, CABLE, COVER, FRAME, MOUNT, PLATE, SHAFT, STRUT, VALVE, BAFFLE, FILLER, GRILLE, MODULE, SHIELD, SYSTEM, CONTROL, SUPPORT, ACTUATOR, MANIFOLD, RECEIVER, DISTRIBUTOR, GAS, OIL, FUSE, FLEX, ROOF, TANK, GUARD, IDLER, MOUNT, FILTER, OUTLET, WIRING, INSULATOR, PROTECTOR, DEHYDRATOR, THERMOSTAT, REFRIGERANT, TRANSMISSION, and LABEL. However, if inserting "AIR CONDITIONER" causes a duplication, do not insert the term. If none of the words are in the word string do not use the word "AIR CONDITIONER" and go to "HEATER" (a separate row in table 1240, not shown) and test for those words.

For example, for row two containing "AIR CONDITIONER & HEATER", don't insert "HEATER" at the beginning of the word string if it causes a duplication. Insert "HEATER" if at least one of the following words are in the word string: WIRING, CASE, CORE, BLOWER, EVAPORATOR, HOUSING, DUCT, SWITCH, UNIT, COVER, BEZEL, CONTROL, RETAINER, BRACKET, SEAL, FAN, and ASSEMBLY. Otherwise, if none of these words are present, do not insert the word "HEATER."

For example, for row three containing "BACK DOOR", don't insert "BACK" in orientation and "DOOR" in the beginning of the word string if it causes duplication. Insert "BACK" in orientation and "DOOR" in the beginning of the word string if at least one of these words are present in the word string: LOCK, SKIN, LATCH, PANEL, SHELL, VISOR, HANDLE, SWITCH, REGULATOR, LIFT, OPENER, MOTOR, FILLER, WIRING, HARNESS, OPENING, WEATHERSTRIP, GASKET, PANEL, TRIM, GLASS, INSULATION, HINGE, MOULDING, TRIM PANEL, WINDOW, POST, MIRROR, MODULE, SILL, TAPE, VENT, INSULATOR, PROTECTOR, SASH, ROD, LATCH, SCUFF, STONE, WATER, WHEEL, PILLAR, ROCKER, ARMREST, FRAME, CONTROL, GARNISH, SPEAKER, STRIKER, GRAVEL, CLADDING, TRACK, LINK, SHIELD, SHROUD, IMPACT, INSERT, CATCH, BUSHING, ENERGY, SIGNAL, CYLINDER, DEFLECTOR, TIE, BOLT, or SCREW.

For example, for row four containing "BACK GLASS", don't insert "BACK" in orientation and "GLASS" in the beginning of the word string if it causes duplication. Insert "BACK" in orientation and "GLASS" in the beginning of the word string if at least one of these words are present in the word string: MOTOR, WEATHERSTRIP, OPENING, TRIM, MOULDING, LENS, DAM, STRIKER, GUIDE, CHANNEL, SEAL, GASKET, RUN, RETAINER, RAIL, and FASTENER.

For example, for row five containing "BODY SIDE PANELS" don't insert "SIDE" in orientation and "BODY" and "PANEL" in the beginning of the word string if it causes duplication or if none of these words are present in the word string: ANTENNA, TRAILER, GAUGE, GLOVE, RADIO, CD, CASSETTE, FUEL, REARVIEW, AIR, FINISH, SHIELD, HINGE, LATCH, PAN, BRACE, MOULDING, SUPPORT, LINER, SPEAKER, HOLDER, BELT, CARPET, SILL, WEATHERSTRIPE, CLADDING, PAD, TAPE, MOUNT, SUPPORT, PIN, INSERT, ROD, BAR, EYE, REINFORCEMENT, NUT, BOLT, STAY, BRACKET, RETAINER, RIVET, CLIP, EMBLEM, DECAL, CONTROL, APPLIQUE, SEAL, GASKET, NAMEPLATE, GLOVE, CLUSTER, WHEEL, GROMMET, SCREW, FASTENER, BEZEL, CHANNEL, GUIDE, HAZARD, SWITCH, WIRING, PROTECTOR, ASHTRAY, SPEAKER, STONE, HARNESS, GUTTER, GARNISH, RAIL, and REGULATOR.

For example, for row six containing "CAB" don't insert "CABIN" in the beginning of the word string if it causes duplication or if none of the following words are present in the word string: RUNNING, TRANSFER, FUEL, SECTION, ROOF, TRIM, PANEL, BAR, FRAME, CORNER, FILLER, SPEAKER, MOULDING, DOOR, SUNVISOR, COWL, LOCK, PILLAR, SEAT, BACKUP, LAMP, ROCKER, LICENSE, UNDERSIDE, WINDSHIELD, ANTENNA, GLASS, WINDOW, DASH, DOME, FUEL, HEATER, LAMP, TAPE, CARPET, VENT, FLOOR, DRIVE, GRILLE, INLET, DAMPER, HEADER, FLARE, CONTROL, SUNROOF, OVERHEAD, PRESSURE, TAILGATE, and AIR.

For example, for row seven containing "CENTER PILLAR & ROCKER PANEL"

For example, for row eight containing "CENTER PILLAR & ROCKER PANEL", don't insert "CENTER" in orientation and "PILLAR" in the beginning of the word string if it causes duplication or if none of the following words are present in the word string: MOULDING, WINDOW, TRIM, BAFFLE, BELT, PANEL, ROCKER, COVER, FINISH, INSULATOR, GARNISH, WEATHERSTRIP, FILLER, BRACE, EXTENSION, HANDLE, LAMP, VENT, DECAL, LABEL, and APPLIQUE. If none of the words are in the word string, do not use the word "CENTER PILLAR" and go to "ROCKER PANEL" (a separate row in table 1240, not shown) and test for those words.

For example, for row nine containing "CLEAR COAT", never insert the word.

For example, for row ten containing "CONSOLE", don't insert "CONSOLE" in the beginning of the word string if it causes duplication or if none of the following words are present in the word string: FLOOR, HAZARD, WINDOW, CONTROL, TRANSFER, SEAT, BOOT, VENT, CD, RADIO, SWITCH, ARMREST, AMPLIFIER, CUSHION, DOOR, KEY, FLEX, SHELF, WASHER, BATTERY, SHIFTER, SPEAKER, INTERIOR, PROTECTOR, PARK, OUTLET, AIR, MAT, TRIM, MOULDING, HOLDER, LINING, ASHTRAY, HARNESS, HOUSING, COMPARTMENT, LID, BEZEL, BRACKET, STRIP, KNOB, RETAINER, SHIFT, MOUNT, REINFORCEMENT, DOME, VIDEO, and CABLE.

For example, for row eleven containing "CONVERTIBLE TOP" don't insert "CONVERTIBLE" in the beginning of the word string if it causes duplication or if none of these words are present in the word string: TOP, BLOCK, COVER, GLASS, WASHER, EXHAUST, LIFT, MOTOR, HINGE, PILLAR, DOOR, ROCKER, CROSS, TRUNK, BATTERY, ROOF, FENDER, QUARTER PANEL, SEAL, and BOW.

The auditing system determines (1220) whether the word string contains one or more ambiguous terms. If the auditing system contains one or more ambiguous terms, the auditing system processes (1222) the word string according to one or more rules associated with the one or more ambiguous terms. The one or more ambiguous terms can include dual meaning words in the word string. For example, the word "Clip" can be either a grouping of parts or a simple fastener.

FIGS. 12H and 12I are exemplary diagrams of table 1242 which includes an exemplary list of dual meaning words and associated terms, with columns one through seven shown FIG. 12H, and the remaining columns eight through fourteen shown in FIG. 12I. Columns one through seven, labeled "And1," "And2," "And3," "And4," "Or1," "Or2," and "Or3," respectively, include words which may appear in the word string. Columns eight through eleven, labeled "Constraint 1," "Constraint 2," "Constraint 3," and "Constraint 4," respectively, include constraint terms which may appear in the word string. Columns "Or1," "Or2," and "Or3," include dual meaning words. Columns "And1," "And2," "And3," and "And4," include words which may appear before the dual meaning words in columns "Or1," "Or2," and "Or3." Columns twelve through fourteen, labeled "Orientation," "Descriptor," and "Item Name," respectively, include words which represent the translation of the dual meaning words into the Converted Non-HQ Part Description (CNHQPD) table. The CNHQPD table is a temporary table created to hold the result of the raw word string processing by the translator (e.g., the part translator 132). For example, as the word string is pared into various categories, the portions of the word string are loaded into the table for comparison to table 1250 of FIGS. 12O-12W.

The one or more rules can be configured to determine if the word string includes any dual meaning words from columns "Or1," "Or2," or "Or3." For example, if the word string includes one or more dual meaning words and the words are preceded by any of the sets of words shown in columns "And1," "And2," "And3," or "And4," and none of the words shown in constraint columns "Constraint 1," "Constraint 2," "Constraint 3," or "Constraint 4," appear in the word string, then the words from the "item name," "orientation," and "descriptor" columns can be placed in the "item name," "orientation," "descriptor" portion of the matching table (e.g., the CNHQPD Table). The words do not need to be in sequence in the word string, nor do the words need to be the only words in the string to match. If, for example, the word string is translated, the word string can be matched to an identifier (see, e.g., FIGS. 15A-15B).

Figure 13:
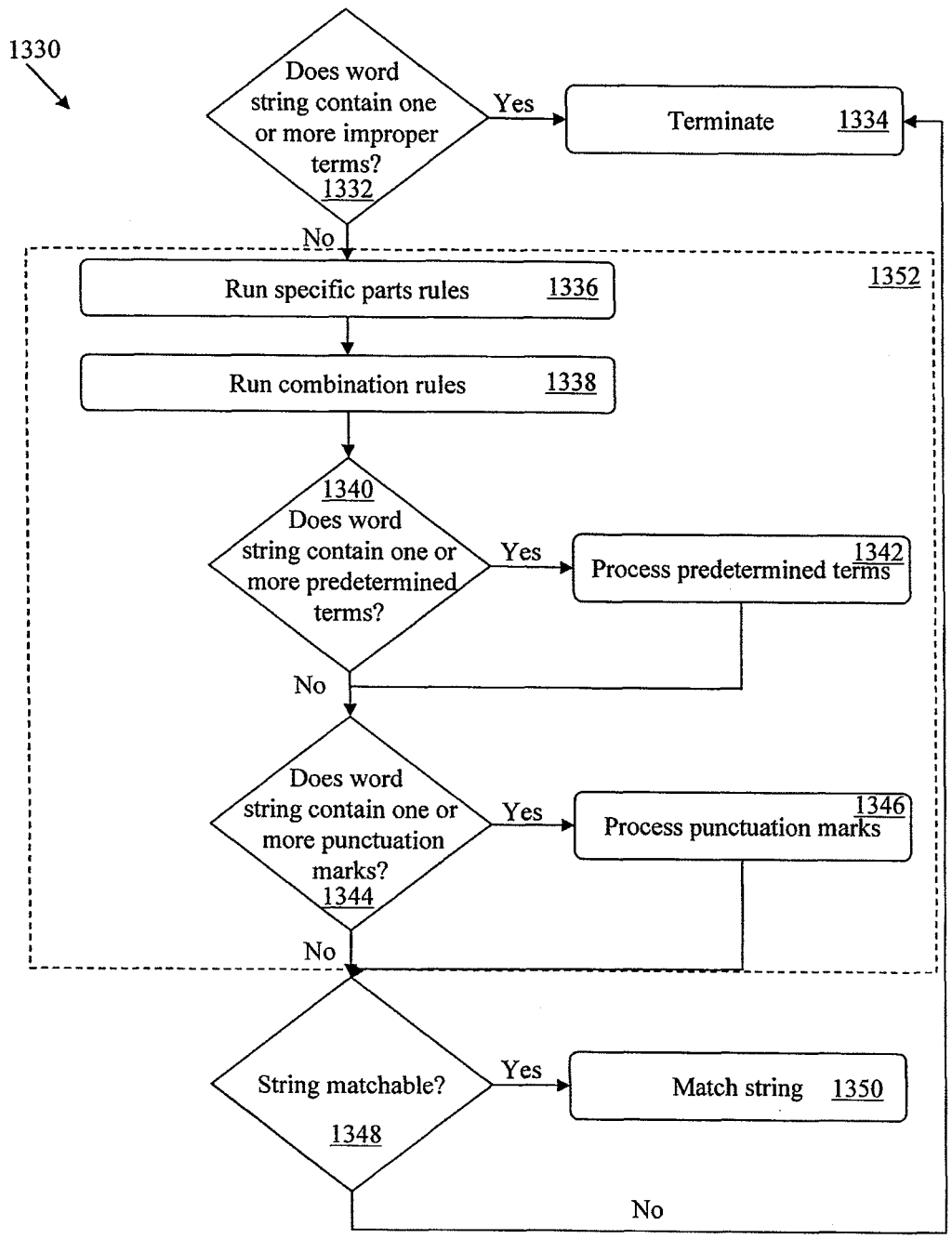
FIG. 13 is a flow chart of an exemplary method for translating a word string according to a first embodiment.

FIG. 13 illustrates an exemplary method 1330 for translating a word string according to a first embodiment. The auditing system 104 determines (1332) whether the word string contains one or more improper terms. If the auditing system 104 determines the word string contains one or more improper terms, the auditing system 104 terminates (1334) the translation process. If the auditing system 104 determines the word string does not contain improper terms, the auditing system runs (1336, 1338) one or more specific parts rules and/or one or more combination rules on the word string.

The auditing system 104 determines (1340) whether the word string contains one or more predetermined terms. If the word string contains one or more predetermined terms, the auditing system 104 processes (1342) the predetermined terms. The auditing system 104 determines (1344) whether the word string contains one or more punctuation marks. If the word string contains one or more punctuation marks, the auditing system 104 processes (1346) the punctuation marks. The auditing system determines (1348) if the word string is able to be matched to an identifier. The auditing system 104 can estimate the answer if there is not enough information for the word string. The auditing system 104 matches (1350) the word string to an identifier. If at any time the word string is represented by a single word, that word is deemed (1352) the item name. The auditing system 104 can move to the matching table for comparison with identifiers.

The auditing system 104 (e.g., in a rules engine) has a set of rules that addresses specific parts. For example, a rule can be configured to determine if the word string contains the words "converter" and "exhaust," then the descriptor is "catalytic" and the item name is "converter." These specific part rules can be used to help identify common word usage in part descriptions. All of the rules can be run against the word string in sequence.

The auditing system has a set of rules that addresses the use of combinations of common words used in part descriptions. For example, a rule can be configured to determine if the word string contains the word set "four wheel drive" but not the word "axle," and delete the word set "four wheel drive." These rules can be used to help avoid misleading word combinations that make the word string appear ambiguous. All of the rules can be run against the word string in sequence.

The predetermined items can include orientation words, punctuation, and/or combinations of words. Orientation words describe the location or placement of a part.

An exemplary list of "Orientation Words" is BACK, BACKWARD, BOTTOM, CENTER, DRIVER, DRIVER-SIDE, FLEET, FORWARD, FRONT, INNER, LEFT, LOWER, MIDDLE, OUTER, PASSENGER, PASSENGER-SIDE, REAR, RIGHT, SIDE, STEP, UNDER, UP, and UPPER. If there are word matches in the word string with terms from the "Orientation Words," the rules can be configured to move these to the matching table (e.g., the CNHQPD Table) for placement in the orientation fields in the same sequence they appear in the word string. The rules can be configured to remove the orientation words from the word string.

If the remaining word string begins with a coma, one or more rules can be configured to delete the coma before continuing processing the word string. If the word string has the first and/or the second word delineated by a coma, the one or more rules can be configured to determine the first and/or second words in the string is the item name unless the word is "assembly" or "set." If, for example, the word preceding the coma is "assembly" or "set," the rules can be configured to delete the word "assembly" or "set." If, for example, there is a word that was preceding "assembly" or "set," the one or more rules can be configured to treat the word as the item name and all other words as descriptors of the item name. The one or more rules can be configured, after determining the word preceding the coma is not "assembly" or "set," to treat the word preceding the coma as the item name (e.g., and to load the word into the item name field in the CNHQPD Table). The rules can be configured to treat the other word as the first descriptor and the remainder of the string can be loaded into the following descriptor fields in their present sequence. The rules can be configured to remove all comas in the word string. The rules can be configured to make sure that all words are separated by just one space. Based on the processing, the rules can be configured to match an identifier with the word string or continue processing.

The rules can be configured to deal with groupings of words. For example, if the word string consists of two or more words, one of which is the word "assembly," "set," "extension," "unit," or a fastener (e.g., one of the exemplary terms listed in the list BOLT, CLIP, EXTENSION, GROMMET, LUG, NUT, RIVET, SCREW, STUD, UNIT, ASSEMBLY, and SET) the rules can be configured appropriately. For example, if the word string includes "fastener," "extension," and/or "unit," a rule can be configured to place the descriptor(s) in a descriptor field in the matching table. The rule can be configured to place "fastener," "extension," or "unit" in the item name field in the matching table. The rule can be configured to delete all words following the word "fastener," "extension," or "unit."

The rule can be configured so that if "assembly" or "set" is located in the word string, all words following the word "assembly" or "set" are deleted. The word preceding "assembly" or "set" can be placed in the item name field. Other words (e.g., all the remaining words can be placed in the descriptor fields. The rules can be configured to delete the word "assembly" or "set." If one word remains, the rule can be configured to treat the remaining word as the item name. For example, the rule can be configured to place the remaining word in item name field of the matching table. The rule can be configured, upon determining that "assembly" or "set" is the first word in the word string, to delete "assembly" or "set."

The auditing system 104, in some embodiments, can determine whether the word string satisfies a condition associated with the predetermined item. If the word string satisfies the condition, the auditing system 104 can generate the translated item description. For example, the auditing system 104 can include rules (e.g., tests) for pattern recognition of standard part description patterns. For example, the remaining string can be parsed to determine the presence of a primary item name. A primary item name is, for example, a bumper, hood, fender, etc.

An exemplary listing of primary item names is AIR, AXLE, BED, BEDSIDE, BODY, BRAKE, BUMPER, CABIN, CLUTCH, AIRCONDITIONER, CONSOLE, COWL, DOOR, EMISSION, ENGINE, EXHAUST, FENDER, FUEL, GRILLE, HEADLAMP, HEATER, HOOD, QUARTERPANEL, RADIATOR, ROOF, STEERING, SUSPENSION, TRANSMISSION, TRUNK, WASHER, WHEEL, WINDOW, WINDSHIELD, and WIPER. The rules can be configured to place the first match in the first descriptor field in the matching table. The rules can be configured, upon determining there are two consecutive primary item names in the word string, to treat the two words as a single primary item name. If, for example, there are two primary item name words in the string and they are not consecutive, the rules can be configured to, for a lack of information, perform statistical estimates (see, e.g., FIGS. 15A-15B).

If a primary item name exists in the word string, the word sequence can be important. For example, if the primary item name is the first word in the word string, then the last word in the string may be the word string's item name. The rules can be configured to place the last word in the "item name" field in the matching table (e.g., the CNHQPD Table). The words between the primary item name (e.g., the first word in the string) and the item name (e.g., the last word in the word string) can be placed in the second, third & fourth descriptor fields in the same sequence they are in the string.

If, for example, the primary item name is the last word in the string, then the first word in the string may be the string's item name. The rules can be configured to place the first word of the string in the "item name" field in the matching table. The rules can be configured to place the rest of the words in sequence in the descriptor fields after the "primary item name" is placed in the first descriptor field.

If, for example, the primary item name is in the middle of the string, the rules can be configured to treat the word to the right of it as the string's item name. The word can be placed in the "item name" field of the matching table. To the left, all words can be placed in sequence in the descriptor fields after the primary item name is placed in first descriptor field. The rule can be configured to ignore all other words.

If a translated item description is not generated, the auditing system 104 can generate the translated item description based on a statistical estimation. The rules can be configured to estimate the correct answer based on statistical norms. For example, if the remaining string does not have a primary item name, the string has two non-consecutive primary item names, and/or the string is made up of only primary item names, the rules can be configured to place the last word in the string in the "item name" field and the other words in the descriptor fields in the sequence they appear in the string.

FIG. 12J is a diagram of an exemplary table 1244 that includes a list of words which should not be translated. Column one is the "One Word and Listed Words" column, and if the word string consists of one word only and any of the words in column one, then the part translator 132 does not try to translate the word string. Column two is the "One Word and Orientation Words" column, and if the word string consists of only a word from column two and orientation words, then the part translator 132 does not try to translate the word. Column three is the "One Word" column, and if the word string consists of only one word and any of the words in column three is that word, then the part translator 132 will always try to translate the word. If, for example, one word remains or one word and orientation words only, rules can be configured to check to see if the word should not be translated. If that word is a word that should not be translated, the auditing system 104 can move to a lack of information step that does not provide a translation.

Figure 14A:
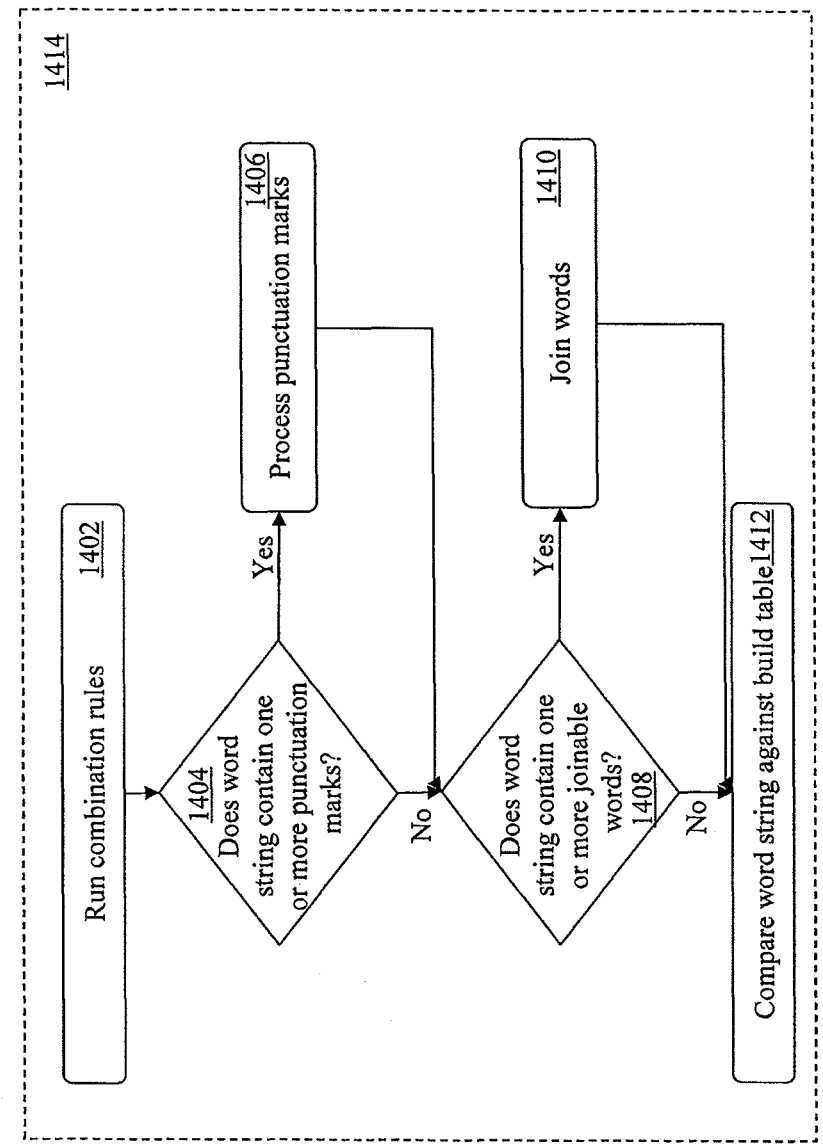
FIGS. 14A-14C is a flow chart of an exemplary method for translating a word string according to a second embodiment.
Figure 14B:
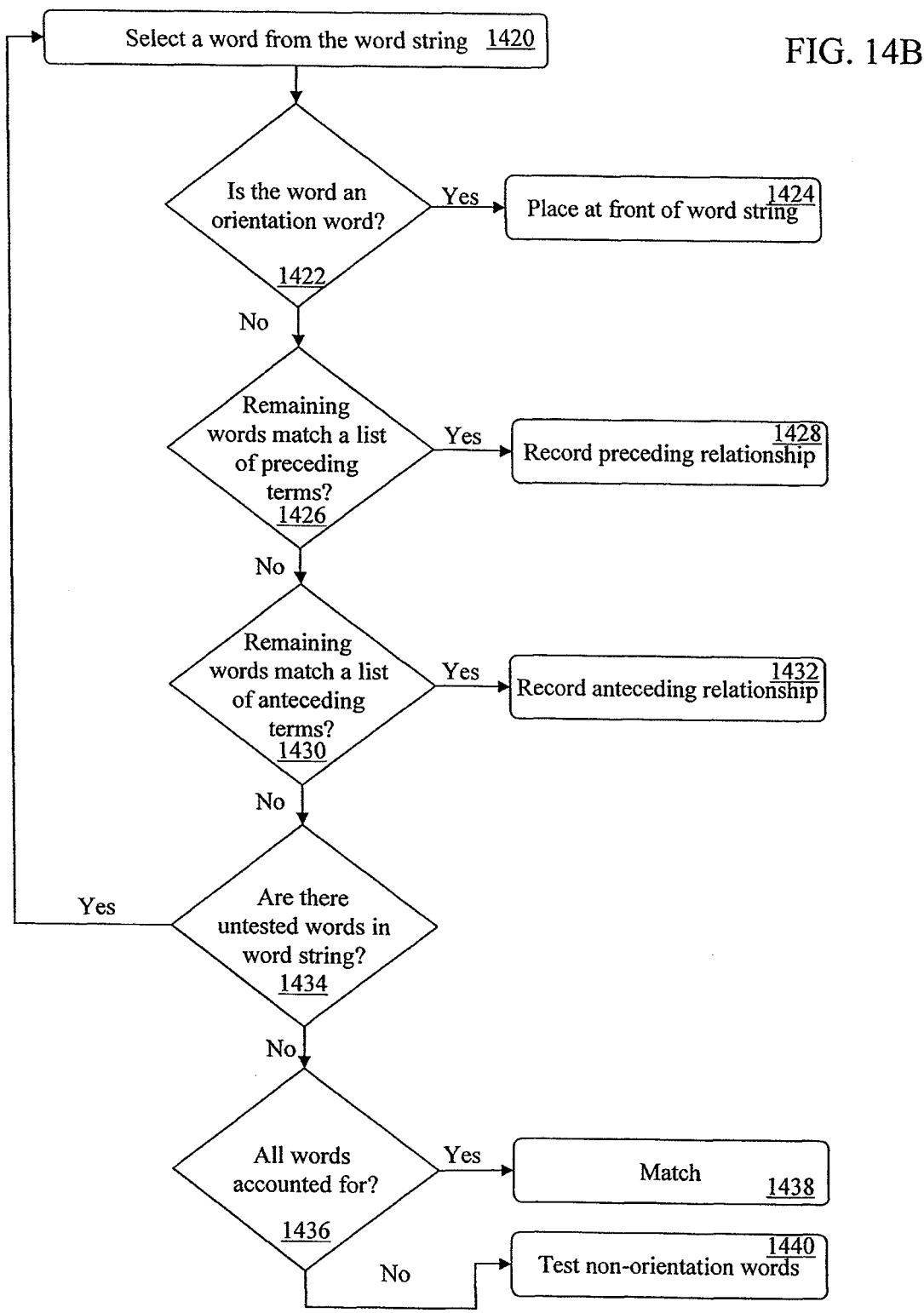
Figure 14C:
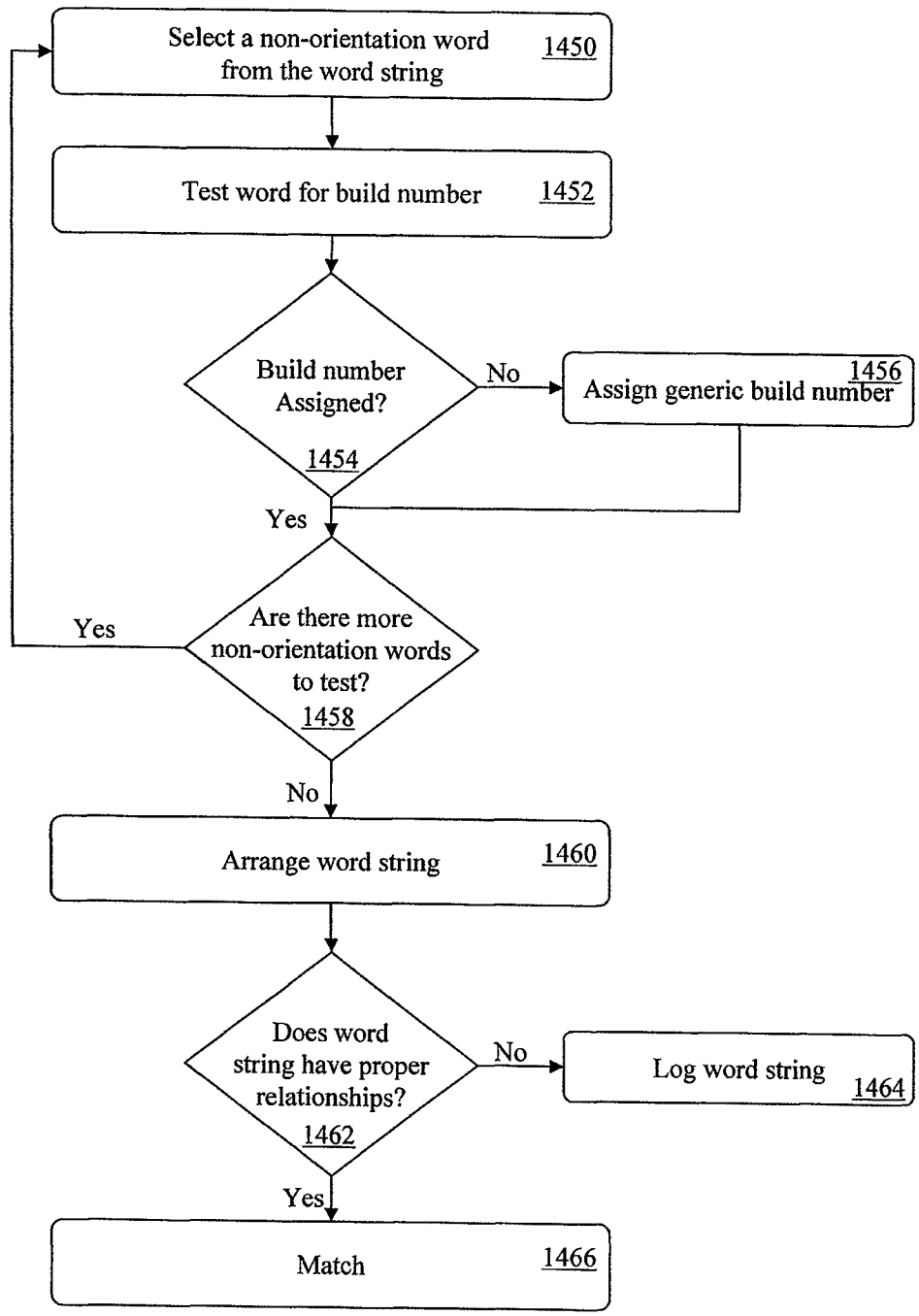

FIGS. 14A-14C illustrate an exemplary method 1400 for translating a word string according to a second embodiment. The auditing system 104 runs (1402) one or more combination rules on the word string. If the auditing system determines (1404) the word string contains one or more punctuation marks (e.g., through running one or more rules), the auditing system 104 processes (1406) the punctuation marks. If the auditing system 104 determines the word string contains (1408) one or more joinable words, the auditing system joins (1410) the words. The auditing system 104 compares (1412) the word string against the build table. If at any time the word string is represented by a single word, the word is determined (1414) to be the item name.

The predetermined items can include commas and/or word pairs. For example, all comas in the word string can be removed, making sure that all words are separated by one space. FIG. 12K is a diagram of an exemplary table 1246 that shows a list of combination words. The first column labeled "First Word" and the second column labeled "Second Word" list the two words of a word combination. The corresponding entry in the third column, labeled "Combined Word" is the combination of the two words. For example, if any of the word pairs shown in columns "First Word" and "Second Word" appear in the remaining word string (even if not consecutive), the words can be treated as one word as shown in the corresponding entry of the "Combined Word" column of table 1246.

As shown in FIGS. 14B and 14C, the auditing system 104 compares the word string against a build table to generate a relationship between the one or more words of the word string, the build table comprising one or more index words, each index word being associated with index information. In FIG. 14B, the auditing system 104 selects (1420) a word from the word string. If the word is (1422) an orientation word, the word is placed (1424) at the front of the word string. If not, if the remaining words match (1426) a list of preceding terms, the preceding relationship is recorded (1428). Otherwise, if the remaining words match (1430) a list of anteceding terms, the anteceding relationship is recorded (1432). The process repeats (1434) if there are remaining untested words in the word string. Once all words are accounted for (1436), the string is matched (1438). Otherwise, if all words are not accounted for, the auditing system 104 tests (1440) non-orientation words.

FIGS. 12L-12N are diagrams of an exemplary table 1248, which is an example of a build table. FIG. 12L shows columns one through for, FIG. 12M shows columns five through nine, and FIG. 12N shows columns ten through fifteen. Table 1248 includes a first column, labeled "Index" ("I") containing a unique index number for each row. The second column "Dictionary," ("D"), includes the terms of interest. Table 1248 is indexed with the words in the "Dictionary" column. The table can also be indexed by, for example, the terms in table 1238. The table provides three types of information about each index word through columns three through five, labeled "When Is A Noun," ("When Noun") "When Is An Adjective," and "When Is An Orientation," respectively. The "When Is A Noun" column lists the criteria when the corresponding entry in the "Dictionary" column is considered a noun. The "When Is An Adjective" column lists the criteria for when the corresponding entry in the "Dictionary" column is considered an adjective. The "When Is An Orientation" column lists the criteria when the corresponding entry in the "Dictionary" column is treated as an orientation word.

The sixth through thirteenth columns, labeled "Major Assembly," "Assembly A," "Sub-Assembly B," "Sub-Assembly Component," "Simple Component," "Support Structure," "Protector," and "Hardware/Consumables," consecutively, provide information corresponding to build number. For example, if the corresponding entry in the "Dictionary" column is associated with the words present (if any) in the entry for the "Major Assembly" column, the build number is 8, if the corresponding entry in the "Dictionary" column is associated with the words present (if any) in the entry for the "Assembly A" column, the build number is 7, and so on. The fourteenth column, labeled "Generic Build Number," lists a generic build number for the corresponding entry in the "Dictionary" column. The fifteenth column, labeled "Generic Classification," lists a classification for the corresponding entry in the "Dictionary" column.

For example, the auditing system can categorize the index words as primarily noun, adjective or orientation words based on the "When Is A Noun," "When Is An Adjective," and "When Is An Orientation" columns, recognizing that some words can be both. The tested word can be processed differently depending on how the word is labeled. For example, if the tested word is a noun, the words that tend to precede the noun are listed in the "When Is A Noun" column. If, for example, the word "never" is in the "When Is A Noun" column, then the tested word is not used as a noun. If the tested word is an adjective, the words that tend to "follow" the adjective are listed in the "When Is An Adjective" column. If, for example, the word "never" is listed in the "When Is An Adjective" column, then the tested "word" is not used as a adjective. If, for example, the word "always" and/or "all words" is listed in the "When Is An Adjective" column, then the tested word is usually used as a adjective for all words it appears with. The same can be true for the words in the "When Is An Orientation" column.

Tables similar to table 1248 can be generated, for example, based on the perspective of item names and descriptions. In some examples, table 1248 is based on 1.5 million random item names and descriptions. For example, word placement trends can be utilized to generate a table like table 1248. For example, if the word is primarily a noun then it will have a set of words that "precede" the noun (e.g., superior to the noun in the relationship), whereas if it is primarily an adjective it will have a group of words that normally follow the word within a word string (e.g., inferior to the adjective in the relationship). Other word trends can include, for example, if the word is primarily a noun then the word will be the first word in the preceding word group. (e.g., the reason for this is that there may be word groups under the noun category at times when the word is not primarily a noun).

If each word in the word string is tested using, for example, table 1248, the auditing system 104 may find words in the word string where the word being tested is either a noun or an adjective, thereby indicating whether it precedes or follows the word being tested. For example, assume there is a word sting with "A, B, C, D", where none of the words are orientation words. The auditing system 104 can generate a string of relationships such as: A>C, B>C>D, C>D, B>D. In order to satisfy all the relationships in this case, the word string sequence must be A, B, C, D, where D is treated as the item name. A correct order of the words in the word string sequence can be determined by the order that correctly satisfies all the relationships in table 1248. There can be as many relationships as there are words in the word string. Words tested and found to be orientation words can simply be held as orientation words that precede the word string.

Table 1248 provides a generic build number and noun/adjective/orientation categorization. The "Generic Build Number" column and the "Generic Classification" column provide the generic categorization. The "Generic Classification" column can be used to determine whether the word being tested is a Noun, Adjective, Orientation word. The "Generic Build Number" column, for adjectives, indicates the word should be treated as Descriptors. For nouns, the "Generic Build Number" column provides a generic build number. Generic build numbers can represent, for example, 8=Major Assembly, 7=Assembly, 6=Sub Assembly, 5=Sub Assembly Component, 4=Simple Component, 3=Single Pressed/Rolled/Cast/Fiber Support Structure, 2=Plastic/Rubber Trim—Molding-Protector, and 1=Hardware/Consumables.

For orientation words, the "Generic Build Number" column can indicate the word is an orientation word. Orientation words can be collected and placed at the front of the word string. Word strings with multiple nouns and descriptors can be sequenced to abide by the following statement: after orientation words the highest build noun followed by the descriptor words followed last be the lowest build noun which is the item name. Parts can be described by what the part is attached to, what the part is a part of, and/or what the part is located near. For example, the lowest build number can be the item name.

The "Major Assembly," "Assembly A," "Sub-Assembly B," "Sub-Assembly Component," "Simple Component," "Support Structure," "Protector," and "Hardware/Consumables" columns can indicate information for a customized Build Number. A noun it can be part of item names that reside at different levels in the build table. For example, the word "receiver" can be a simple connector on a tow bar or it can be a receiver in a complex navigation system, and therefore two different levels of number are supplied. These numbers can be determined by matching the words in the various columns between "Major Assembly," "Assembly A," "Sub-Assembly B," "Sub-Assembly Component," "Simple Component," "Support Structure," "Protector," and "Hardware/Consumables" with other words besides the word being tested in the word string. For example, if for the test the auditing system 104 is using "word receiver" and other words in the word string are either "navigation," "keyless entry," or "radio," then receiver in this case is a sub assembly with the build number 6. If the other words in the word string had been "frame,' "hitch," or "bumper," then receiver in this case is a sub assembly component with the build number 5. The build numbers collected for the word string from the "Major Assembly," "Assembly A," "Sub-Assembly B," "Sub-Assembly Component," "Simple Component," "Support Structure," "Protector," and "Hardware/Consumables" columns are treated just as the numbers collected from the "Generic Build Number" column. In some examples, however there is a slightly higher degree of accuracy with regard to the build level of each word in the "Major Assembly," "Assembly A," "Sub-Assembly B," "Sub-Assembly Component," "Simple Component," "Support Structure," "Protector," and "Hardware/Consumables" columns.

For example, assume a word string includes "A B C D." Each word in the word string is tested. For example, word "A" is tested by locating word "A" in the "Dictionary" column to identify the build row that pertains to information about this word. If the corresponding entry in the "When Is An Orientation" has an "Always," the test word A is an orientation word, and it is positioned first in the word string. If it has a "Never" continue to the "When is A Noun" column. In the corresponding cell in the "When is A Noun" column, determine if any of the words "B", "C", "D" are present. If any of the words are present, they precede "A" or they are > then "A". If the relationships exist they are recorded for analysis, otherwise the process continues.

For the corresponding entry in the "When Is An Adjective" column, determine if any of the words "B", "C", "D" are present. If any of the words are present, they follow, or antecede, "A" or they are < then "A." If the relationships exist they are recorded for analysis, otherwise the process continues.

The process repeats as indicated above for words B, C, and D. The system determines whether all the words are accounted for by being related to one another. If all words are accounted for, then the auditing system 104 sequences the words to satisfy all relationships and places any orientation words in the front of the resulting word string. The translation can move to the identification step with the matching table (See, e.g., FIGS. 15A-15B). If all words are not accounted for, then the auditing system 104 sequence the words to satisfy all relationships that exist and places any orientation words in the front of the resulting word string. The one or more words without a relationship (i.e., non-orientation words) are placed at the end of the word string and processed as shown in FIG. 14C.

In FIG. 14C, the auditing system selects (1450) a non-orientation word from the word string. The selected word is tested (1452) for a build number. If a build number was not assigned (1454), the auditing system 104 assigns (1456) a build number. The process repeats (1458) steps 1450 through 1456 for each remaining non-orientation word to test. The auditing system arranges (1460) the word string. If the auditing system 104 determines (1462) the word string does not have proper relationships, the auditing system 104 logs (1464) the word string. Otherwise, the auditing system matches (1466) the word string (see, e.g., FIGS. 15A-15B).

For example, returning to the "A B C D" word string example, each word besides orientation words are tested (1452). if word A is a non-orientation word, A is tested by locating word A in the "Dictionary" column to identify the build row that pertains to information about word A. For the corresponding entries in the "Major Assembly," "Assembly A," "Sub-Assembly B," "Sub-Assembly Component," "Simple Component," "Support Structure," "Protector," and "Hardware/Consumables" columns, the auditing system determines if any of the words B, C, or D are present. If any of the words are present, then test word A should be assigned the build number corresponding to the column where the cell match occurred. If no match occurred (1454), the auditing system 104 assigns (1456) the generic build number of the corresponding entry in the "Generic Build Number" column.

The process above is repeated (1458) for each word B, C, or D that are non-orientation words. The auditing system 104 can determine whether all the words in the word string "A B C D" are properly identified. For example, each word should be identified as an orientation word, a noun with a build number, or an adjective denoted as a build number. The auditing system 104 can arrange (1460) the word string, for example, with any orientation words first, any nouns with a number arranged highest to lowest (where the lowest noun is the item name), and any adjectives placed directly before the item name. The auditing system 104 determines (1462) whether the relationships established in the first test (e.g., FIG. 14B) are maintained with exception of the word(s) without relationships and the orientation words. If the relationships established in the first test are maintained with exception of the word(s) without relationships and the orientation words, the auditing system 104 matches (1438) with the matching table (see, e.g., FIGS. 15A-15B). Otherwise, the auditing system 104 can log (1464) information of the word string in, for example, a bad translation log.

Figure 15A:
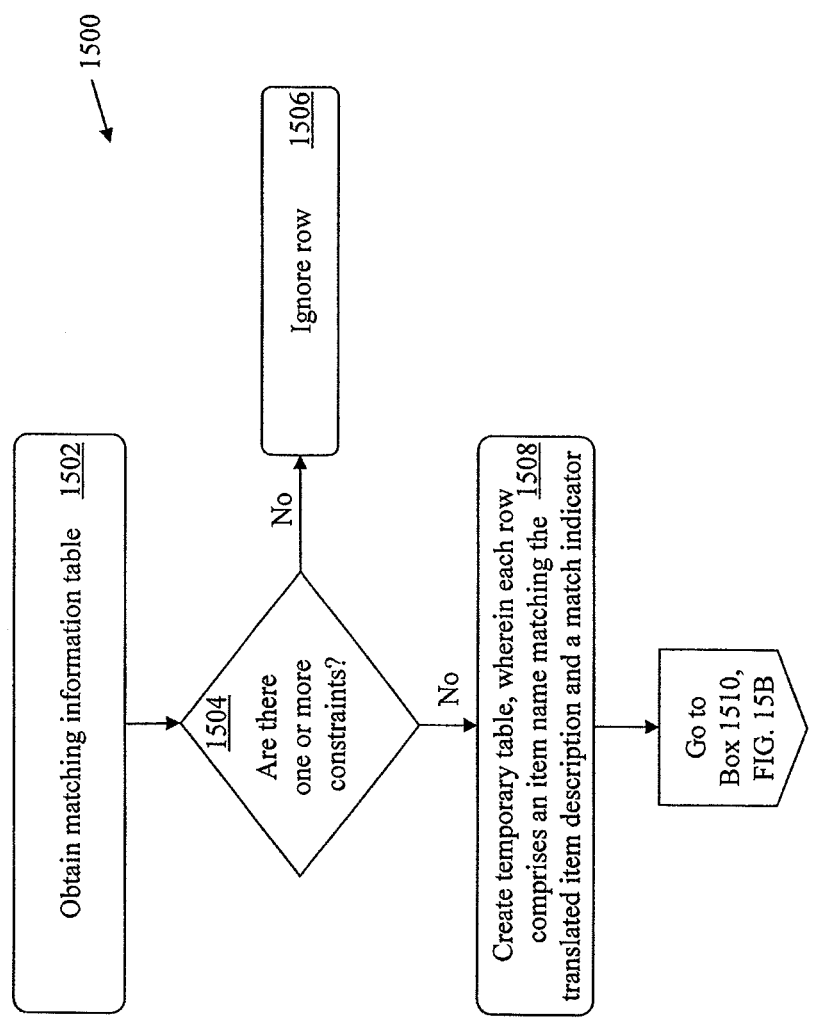
FIGS. 15A-15B is a flow chart of an exemplary method for matching a translated word.
Figure 15B:
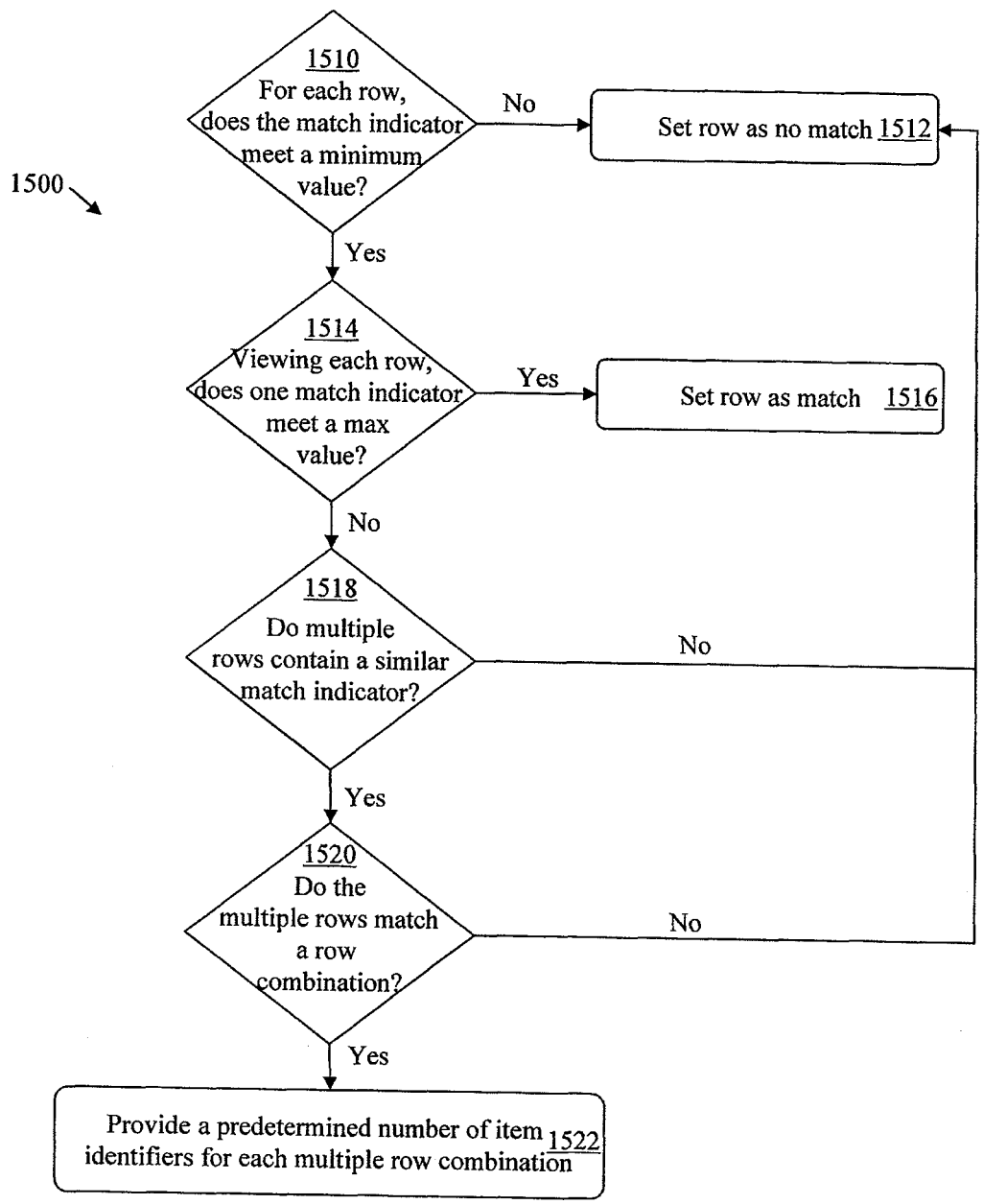

FIGS. 15A-15B illustrate an exemplary method 400 for matching a translated word. The auditing system 104 obtains (1502) a matching table (e.g., a CNHQPD table) including the translated item description. The auditing system (104) determines if there are one or more constraints in one or more rows of the matching information table. If there are one or more constraints in a row, the auditing system 104 ignores (1506) the row. The auditing system creates (1508) a temporary table, wherein each row comprises an item name matching the translated item description, and a match indicator. For each row of the temporary table, the auditing system 104 determines (1510) if the match indicator meets a minimum match value. If the row does not meet the minimum match value, the auditing system 104 sets (1512) the row as a no match. If only one row meets a maximum match value (1514), the auditing system 104 sets (1516) the row as the match. Otherwise, the auditing system 104 checks each row to determine (1518) whether multiple rows contain a similar match indicator. If multiple rows contain a similar match indicator, the auditing system 104 determines (1520) whether the multiple rows match a row combination. If yes, the auditing system provides (1522) a predetermined number of item identifiers for each multiple row combination.

For example, the matching information table (e.g., the CNHQPD table representation of the translated item description) is compared to an item description table with one or more matching rules in the auditing system 104. FIGS. 12O-12W are diagrams of an exemplary table 1250, an item description table. FIG. 12O shows columns one through six, named "CAT_NAME", "SUB_CAT_NAME", "SUB_SUB_CAT_NAME", "GENERIC PART ID", "MATCH COUNT", and "ORIENTATION 1," respectively. The CAT_ NAME column includes the category name, which for the rows in FIG. 12O is "AIR BAGS & AIR BAG ELECTRICAL." The SUB_CAT_NAME column lists the sub-category of the corresponding category name for each row. The two sub-categories are "AIR BAGS" (rows one through four) and "ELECTRICAL" (in rows five through six). The SUB_SUB_CAT_NAME column lists the sub-category of the corresponding sub-category name for each row. The GENERIC PART ID column includes a generic part ID number for each row. The MATCH COUNT columns indicate the number of matches. The ORIENTATION 1 column includes orientation words.

FIG. 12P shows columns seven through fourteen named "Orientation Alias 1", "Orientation Alias 2", "Orientation Alias 3", "Orientation Alias 4", "Orientation Alias 5", "Descriptor 1", "Descriptor Alias 1", and "Descriptor Alias 2", respectively. Columns seven through eleven include orientation alias words. The "Descriptor 1" column includes descriptor words. Although only one Descriptor column is shown, table 1250 can include any number of descriptor columns. FIG. 12Q shows columns fifteen through twenty-two, labeled "Descriptor Alias 3", "Descriptor Alias 4", "Descriptor Alias 5", "Descriptor Alias 2", "Descriptor Alias 7", "Part Name", "Part Name Alias Word 1", and "Part Name Alias Word 2," respectively. The Descriptor Alias columns (e.g., Descriptor Alias 1 through Descriptor Alias 7) include descriptor alias terms. The Part Name column includes the part name of the row. The Part Name Alias Word 1 and Part Name Alias Word 2 columns include part name alias words.

Figure 12R:
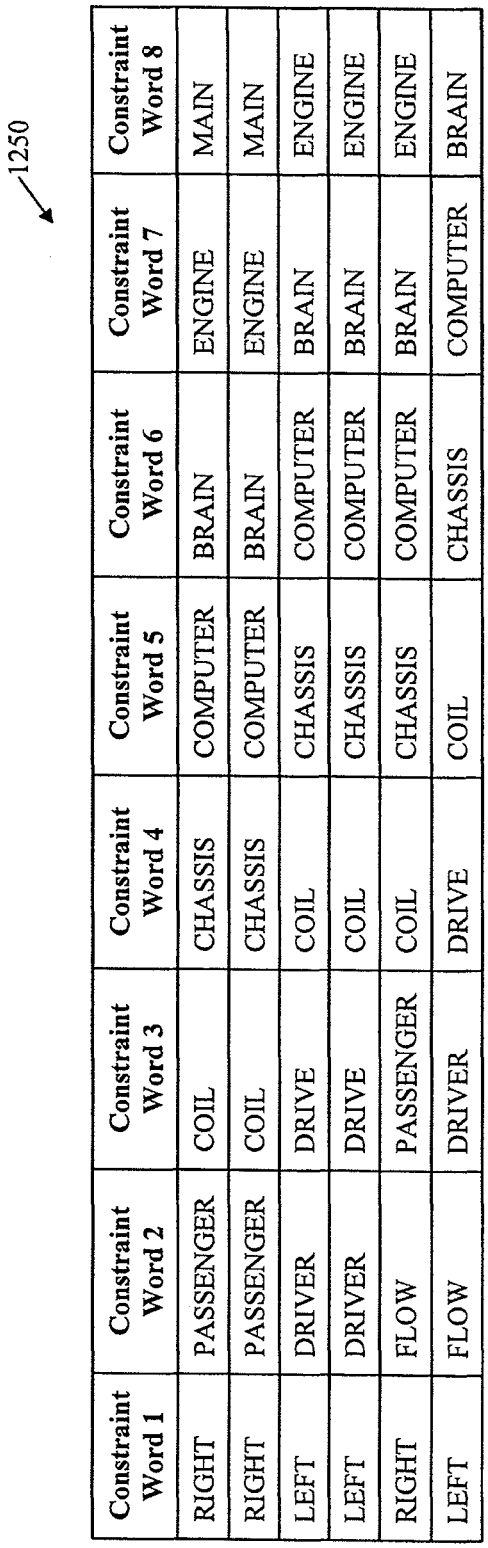
FIGS. 12B-12X are diagrams of exemplary tables for translating word strings.
Figure 12U:
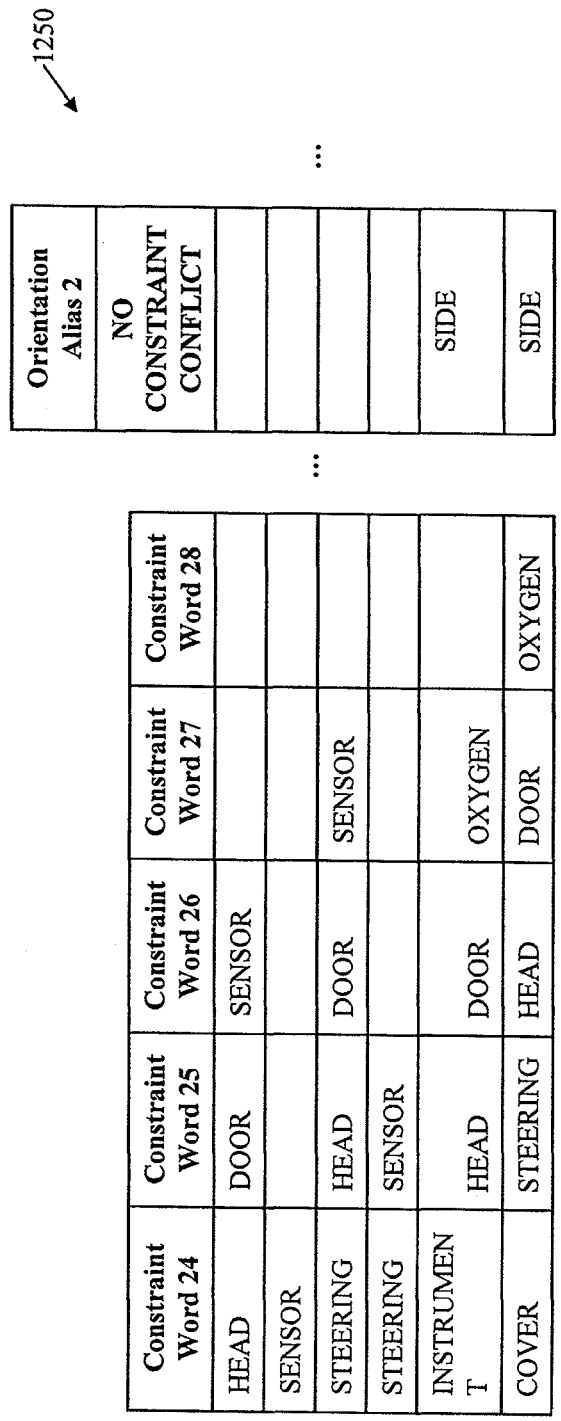

FIG. 12R shows columns twenty-three through thirty, which are labeled consecutively from "Constraint Word 1" through "Constraint Word 8." FIG. 12S includes columns thirty-one through thirty-eight, which are labeled consecutively from "Constraint Word 9" through "Constraint Word 16." FIG. 12T includes columns thirty-nine through forty-five, which are labeled consecutively from "Constraint Word 17" through "Constraint Word 23." FIG. 12U includes columns forty-six through fifty-one, where columns forty-six through fifty are labeled consecutively from "Constraint Word 24" through "Constraint Word 28." Column fifty-one is labeled "Orientation Alias 2/NO CONSTRAINT CONFLICT" and includes terms where, for the "Orientation Alias 2" column from FIG. 12P, there is no constraint conflict. As indicated in FIG. 12U, there can be any number of columns before and/or after column fifty-one for other constraint conflicts for columns in table 1250.

Figure 12V:
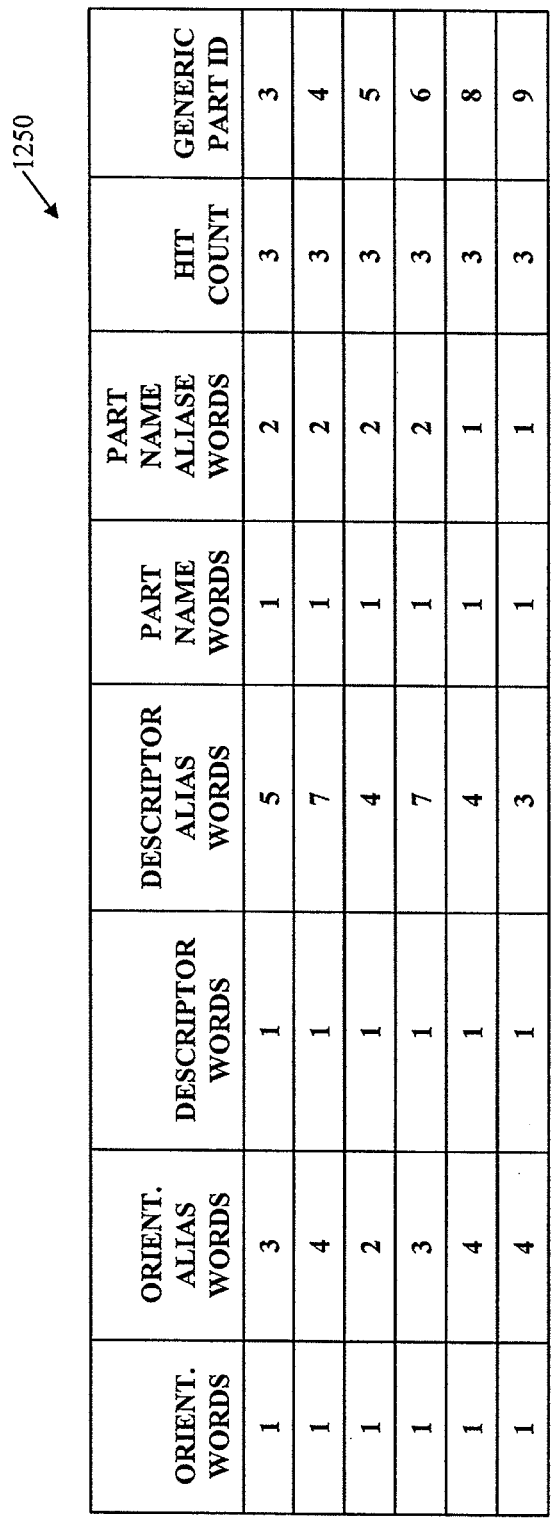

FIG. 12V includes columns fifty-two through fifty-nine, labeled "Orientation Words" ("Orient. Words"), "Orientation Alias Words" ("Orient. Alias Words"), "Descriptor Words", "Descriptor Alias Words", "Part Name Words", "Part Name Alias Words," "Hit Count", and "Generic Part ID." Columns fifty-two through fifty-nine relate to word counts for the particular column indicators. FIG. 12W includes columns sixty through sixty-five. Columns sixty, sixty-one, and sixty-two are indicative of "Part Description—1" for each row. Columns sixty-three, sixty-four, and sixty-five are indicative of "Part Description—12." As indicated in FIG. 12W, any number of additional part descriptions can be included in table 1250 between "Part Description—1" and "Part Description—12" and/or after "Part Description—12." Any number of columns can be used in table 1250 as necessary to represent each row entry (e.g., more orientation columns to represent additional orientation words, etc.). A match can also attach an identifier (e.g., a part ID) to the item. If no match occurs then the original translated item description can be placed in, for example, a log table.

If there are any constraint word matches (1504) in constraint columns (e.g., the Constraint Word 1 column through the Constraint Word 28 column) of table 1250, then that row is not used in the temporary table for analysis. The matching rules takes the item name located in matching information table and searches for all matches in item name and alias columns of table 1250 (e.g., from the "orientation 1" column through the "descriptor alias 7" column). The auditing system 104 creates (1508) a temporary table for analysis of the information which consists of all the match rows found in table 1250. These rows contain, for example, orientation, orientation alias, descriptor, descriptor alias, match indicator, item name and item name alias information. The match indicator is a number of term matches for the particular row. The match percentage is calculated for each category of word. The percentage can be calculated, for example, by using the denominator as the count of orientation, descriptor and item name words in the table 1250 description for the matching row, and the numerator as the count of any matches that occur in any of the categories (e.g., orientation, descriptor, descriptor alias, item name, item name alias).

The Match Count column in FIG. 12O includes the minimum count for a match for the corresponding row. The matching rules can verify that the minimum has been achieved (1510) for each row based on the associated match indicator. If not, the row may not be used in the match analysis. If the auditing system determines (1512) there is one match which full fills all the requirements of the minimum match level, the match has no constraint words, and there are no other candidates for the match, the auditing system 104 can associate the generic item identifier as the item translation. For example, if a part name string is "Right Front Impact Absorber", the min count is three (3) and the actual count is one (1) for orientation, one (1) for orientation alias, one (1) for descriptor, and one (1) for part name. There are no constraint words, so the total count of four (4) indicates the part name string is a candidate item translation.

If the auditing system determines (1518) there are multiple matches with the same fulfillment requirements, the matching rules can handle the situation appropriately. FIG. 12X is a diagram of an exemplary table 1252 that lists generic item identifiers which can require associating multiple generic item identifiers with a particular word string. The first column, column "Index" ("I") contains a unique identifier for each row. The second through ninth columns, labeled "Col. A", "Col. B", "Col. C", "Col. D", "Col. E", "Col. F", "Col. G", and "Col. H", respectively, list generic identifiers. For example, if a part name string is "Axle Shaft", the part name string has four candidates: Front right axle shaft, Front left axle shaft, Rear right axle shaft, and Rear left axle shaft. These four candidates are reported. If, for example, there is a match with the generic item identifier of the entry and table 1250, the customer can be provided with dual translations, or any number of translations (e.g., five translations). This can occur, for example, when an insurance estimator has not included orientation information to different between symmetrical part types (e.g., right and left front fender, etc.).

If no match can be found (e.g., no word remains in the word string to match after the matching rules are complete), the auditing system 104 can log the description and indicate there is insufficient information for a translation. A list of exemplary words which should not be included in the word string during the matching steps is ANTIFREEZE, APPLIQUE, BADGE, BALL, BOLT, BUCKLE, BULB, BUTTON, CANISTER, CHANNEL, CLAMP, CLIP, CLOCK SPRING, CLOCKSPRING, DECAL, EMBLEM, FASTNER, FLAP, GASKET, GROMMET, GUIDE, HANGER, KNOB, LABEL, LETTER, LOGO, MUDGUARD, NAMEPLATE, NUT, ORNAMENT, RELAY, RETAINER, RIVET, ROPE, SCREW, SEAL, SEALER, SHACKLE, SHIM, SNAP, SPACER, STAY, STRAP, STRIPE, STUD, U BOLT, U-BOLT, WEDGE, CAULK, and SEALER. If, for example, the word string includes one or more words from this list, the auditing system can log the description and indicate there is no translation possible due to the inclusion of one or more of the words in the list.

The following is an exemplary translation method using some of the rules discussed above. The following exemplary translation method is intended for illustrative purposes only:

(1) Treat the "word string" as a machine generated or user generated free text field and tested for a particular pattern of machine generated description using Table 1. If this machine pattern is present than run a rule that removes specific unneeded words from the part word string. If the pattern exists then the truncated part word string moves to the next step. If this is not the case then the whole word string moves to the next step.

(2) Test the "part word string" for various types of punctuation characters to determine whether all characters are preceded by a space and followed by a space. If they are not then add spaces as needed to prepare the part word string for further processing. If punctuation characters don't exist then move the part word string to the next step. If the punctuation characters exist then the rule adds the necessary spaces and the word string will progress to the next step.

(3) Test the part word string for existence of standard terminology that has no real impact on the part being described using Table 2. If present in the part word string remove the terms. If the throw-away terminology exists then the truncated part word string moves to the next step. Otherwise the whole word string moves to the next step.

(4) Test word string is tested for "repair" and "finishing" on door shells and panels. Look for specific word phrases included in, for example, the rules engine. If such word phrases don't exist then the part word string moves to the next step. If the word phrases do exist, remove the necessary words, and add the necessary words, and move the word string to the next step.

(5) Test the word string for the presence of a form of "cross-member." Look for specific word phrases included in, for example, the rules engine. If the word form does not exist, then move the part word string to the next step. If the word form does exist, remove the necessary words and add the "cross-member" identifier word and move to the next step.

(6) Determine if "other things" have been included with the part description that does not add value to the identification of the part. If "other things" have been included, determine where and how many words are not required. If this is not the case, move the part word string moves to the next step. Otherwise, all words dealing with unnecessary "other things" are removed by the rules, and the word string moves to the next step.

(7) If the part word string contains a description with the words "heads up display" attached, the rules engine will make a determination if the "heads up display" is the part and if so, move the item name and descriptor word to the matching table, skipping all subsequent rules in between. If this is not the case then the part word string moves to the next step.

(8) Determine if the part word string contains the words "sport suspension." If so, remove all unnecessary words that hinder identification of the item name and its necessary orientation and descriptor words and move the remaining item name word string to the next step. Otherwise move the part word string to the next step.

(9) Determine if the part word string contains the words "standard suspension." If so, remove all unnecessary words that hinder identification of the item name and its necessary orientation and descriptor words, and move the remaining item name word string to the next step. If this is not the case, move the part word string to the next step.

(10) Determine if the part word string contains the words "automatic or manual transmission." If so, remove all unnecessary words that hinder identification of the item name and its necessary orientation and descriptor words, and the remaining item name word string moves to the next step. Otherwise, move the part word string moves to the next step.

(11) Determine if the word string contains consecutive words starting with the words "manual" and "steering" and followed by a word starting with "co." If it does, remove all unnecessary words that hinder identification of the item name and its necessary orientation and descriptor words, and move the remaining item name word string to the next step. Otherwise, move the part word string to the next step.

(12) If the part word string contains the word "combination" with an orientation abbreviation, remove the abbreviation and replace it with a complete orientation word and move the part word string to the next step. Otherwise move the part word string to the next step.

(13) Address abbreviations containing both text and non-text characters using table 1234. If there is a match, replace the words accordingly, otherwise move the part word string to the next step.

(14) Identify if there are groupings of structural and sheet metal parts such as "assembly", "clip", "structure", "section", and "sheet metal." Test for "Clip Designator" words in the word string scanning through table 1230. If a match is found the remaining part of the word string is examined and replaced with the correct orientation, descriptor and item name. Upon completion the replacement word string is loaded into the matching table (e.g., the CNHQPD table) skipping the remaining part of the process until the word string is tested against the item type list (e.g., FIGS. 15A-15B). Otherwise, move the original part word string to the next step.

(15) If there are any abbreviations for "without" and "with xxxx," remove the abbreviations and the part of the word string following those abbreviations and continue to the next step. Otherwise move to the next step.

(16) Remove all metric indicators (alpha-numeric, alpha, and numerical characters dealing with metrics), with exception of the following three representations "1st", "2nd", and "3rd" using Table 4. If identified, delete the word(s) from the part word string. If they are not present, test for combinations of alpha-numeric combinations and if found delete them from the part word string. Then continue to the next step.

(17) Test for computer generated formats with internal code notations and remove the superfluous computer generated custom codes, if any. Then continue to the next step.

(18) Determine if there are any non-alpha-numeric characters in the word string and remove any non-alpha-numeric characters in the word string with the exception of comas. If parenthesizes are removed, also remove all text and characters within the parenthesizes. If quotes are removed also remove all text within the quote. Continue to next step.

(19) Reconcile all dual meaning abbreviations using table 1236. Then continue to the next step.

(20) Compare the text string shall be compared to table 1238. Each group of letters separated by a space, or single letter separated by a space shall be compared to all aliasing strings starting with the same first letter. Replace the group of letters or letter that was being tested with the first match, and replace the group in the same sequence position as the original group of letters or letter in the text string. At the end of this iterative process all words should be resolved in the text string. If there is no match for a word in the string, remove the word from the description and log it appropriately.

(21) If there is header (e.g., CCC Header) information, look for a match in table 1240. The rules determine if the header should be used or if it should be converted to different words or if it should be discarded. Continue to the next step.

(22) Determine if there are single letters within the remaining word string. Determine if the individual letter(s) are allowable, and if not remove the letter(s) from the word string. Continue to the next step.

(23) Next determine if there are dual meaning words in the word string using table 1242. If appropriate place the words in the matching table and move to the matching steps. The words do not have to be in sequence, nor do they have to be the only words in the string to match. Otherwise continue.

(24) Determine if the word string contains the word "TYPE." If the word string contains the word "TYPE" remove the word "TYPE" and all words following that word and continue. Otherwise continue without removing the word.

The exemplary translation method can proceed in multiple ways. Two exemplary method are discussed below. These examples are intended for illustrative purposes only and are not conclusive in any way. The output of example one and/or example two can be input into a matching procedure (e.g., the procedures shown in FIGS. 15A-15B and the related description).

Example One (1) If the word string contains any of the words listed in the list ANTIFREEZE, APPLIQUE, BADGE, BALL, BOLT, BUCKLE, BULB, BUTTON, CANISTER, CHANNEL, CLAMP, CLIP, CLOCK SPRING, CLOCKSPRING, DECAL, EMBLEM, FASTNER, FLAP, GASKET, GROMMET, GUIDE, HANGER, KNOB, LABEL, LETTER, LOGO, MUDGUARD, NAMEPLATE, NUT, ORNAMENT, RELAY, RETAINER, RIVET, ROPE, SCREW, SEAL, SEALER, SHACKLE, SHIM, SNAP, SPACER, STAY, STRAP, STRIPE, STUD, U BOLT, U-BOLT, WEDGE, CAULK, and SEALER, terminate the translation and do not attempt to match the word string with item identifiers. If this is not the case continue on in sequence.

(2) If at any time from this point in the sequence to the end of the sequence analysis of the word string, the word string is represented by a single word, that word shall be deemed the item name and move to the matching table.

(3) Run rules that addresses specific "part" rules.

(4) Run rules that address the use of combinations of common words used in part descriptions.

(5) Check the word string for orientation words that describe the location or placement of the part using, for example, the list BACK, BACKWARD, BOTTOM, CENTER, DRIVER, DRIVERSIDE, FLEET, FORWARD, FRONT, INNER, LEFT, LOWER, MIDDLE, OUTER, PASSENGER, PASSENGERSIDE, REAR, RIGHT, SIDE, STEP, UNDER, UP, and UPPER. If there are word matches, move the words to the matching table. Remove the orientation words from the word string and continue in sequence. If this is not the case continue in sequence.

(6) If the remaining string begins with a coma delete the coma before continuing in sequence.

(7) If the word string has the first and/or the second word delineated by a coma, then identify the first and/or word(s) in the string is the item name unless the word is "assembly" or "set." If the word preceding the coma is "assembly" or "set" delete the word "assembly" or "set." If there is a word that was preceding "assembly" or "set" it is the item name and all other words are descriptors. If the word preceding the coma is not "assembly" or "set" the word preceding the coma should be the item name and should be loaded into the item name field in the matching table. The other word is the first descriptor and the remainder of the string should be loaded into the following descriptor fields in their present sequence. Remove all comas in the word string at the completion of this step. The rules verify that all words are separated by just one space at the end of this step. Move to step that looks for HyperQuest ID part match. If there were no comas continue in sequence.

(8) If the word string consists of two or more words, one of which is the word "assembly," "set," "extension," "unit," or a fastener (e.g., one of the exemplary terms listed in the list BOLT, CLIP, EXTENSION, GROMMET, LUG, NUT, RIVET, SCREW, STUD, UNIT, ASSEMBLY, and SET): (8a) in the case of "fastener," "extension," or "unit," place the descriptor(s) in a descriptor field in the matching table and place "fastener," "extension," or "unit," in the item name field in the matching table. All words following the word "fastener," "extension," or "unit," are deleted. (8b) In the case of "assembly" or "set" all words following the word "assembly" or "set" are deleted. The word preceding "assembly" or "set" should be placed in the item name field and all other words placed in the descriptor fields. Delete the word "assembly or set". If one word remains, treat it as the item name, and place it in item name field of the matching table. If "assembly" or "set" is the first word in the word string, delete "assembly" or "set" and continue in sequence. If this is not the case continue in sequence. If this is not the case continue in sequence.

(9) Test for pattern recognition of standard part description patterns using, for example, the list of terms AIR, AXLE, BED, BEDSIDE, BODY, BRAKE, BUMPER, CABIN, CLUTCH, AIRCONDITIONER, CONSOLE, COWL, DOOR, EMISSION, ENGINE, EXHAUST, FENDER, FUEL, GRILLE, HEADLAMP, HEATER, HOOD, QUARTERPANEL, RADIATOR, ROOF, STEERING, SUSPENSION, TRANSMISSION, TRUNK, WASHER, WHEEL, WINDOW, WINDSHIELD, and WIPER.

(9a) If the "primary item name" is the first word in the string then the last word in the string is in the string's "item name" and should be placed in the "item name" field in the matching table. The words between the "primary item name" (first in the string) and the "item name" (last in the string) should be placed in the second, third & fourth descriptor fields in the same sequence they are in the string. Move to matching steps. If this is not the case continue in sequence.

(9b) If the "primary item name" is the last word in the string, then the first word in the string is the string's "item name." Place the first word of the string in the "item name" field in the matching table. The rest of the words can be placed in sequence in the descriptor fields after the "primary item name" is placed in the first descriptor field. Move to matching steps. If this is not the case continue in sequence.

(9c) If the "primary item name" is in the middle of the string the word to the right of it is the string's "item name" and should be placed in the "item name" field of the matching table. To the left all words can be placed in sequence in the descriptor fields after the "primary item name" is placed in first descriptor field. All other words should be ignored. Move to matching steps.

(9d) If information is lacking then estimate the correct answer based on statistical norms. The remaining string does not have a primary item name or it has two non-consecutive "primary item names" or it is made up of only "primary item names." Therefore, place the last word in the string in the "item name" field and the other words in the descriptor fields in the sequence they appear in the string. Move to matching steps.

(9e) If one word remains or one word and orientation words only, check table 1244 for that word and move to lack of information step that does not provide a translation or continue in sequence accordingly.

Example Two

Proceed as Described in FIGS. 14A-14C.

Figure 16A:
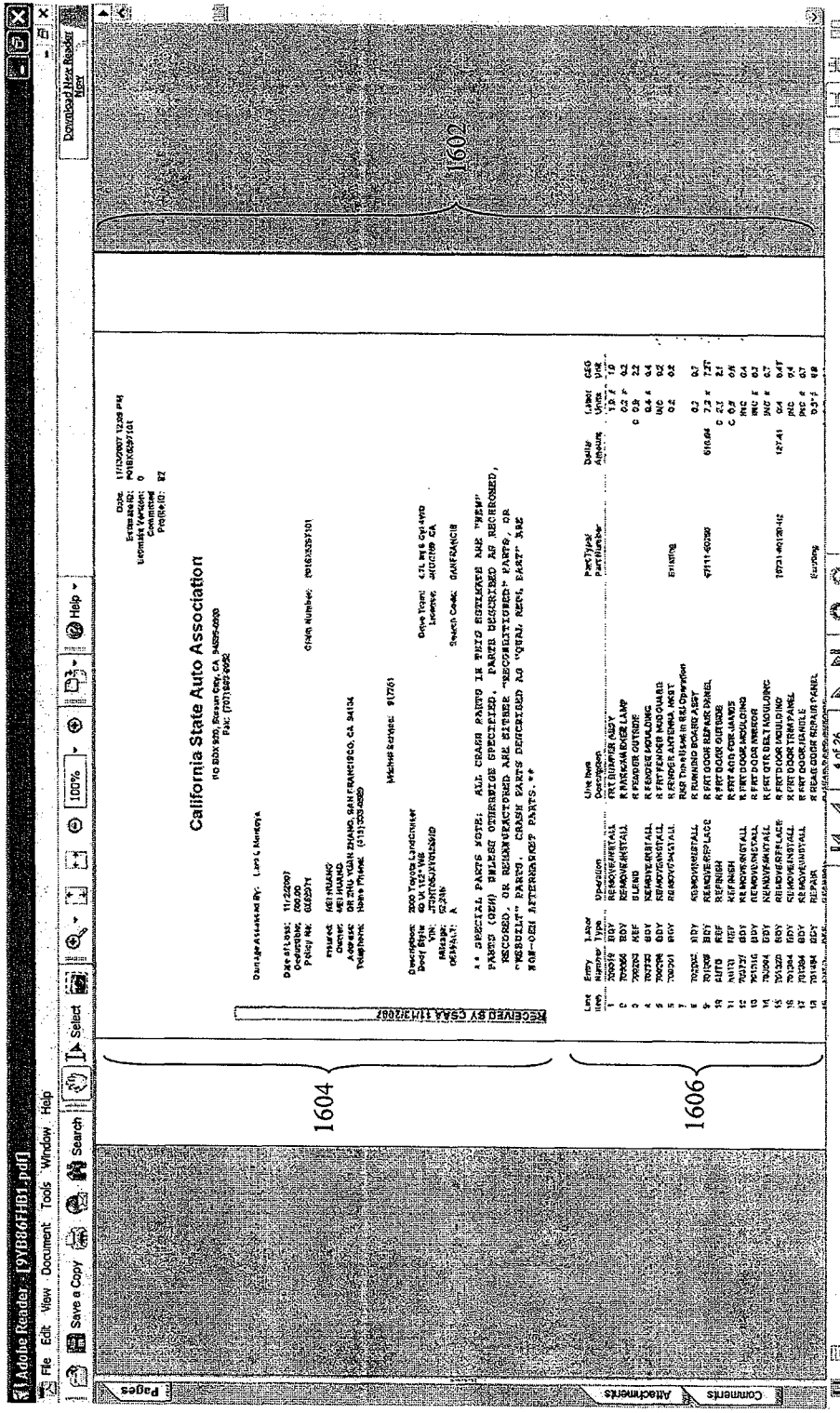
FIG. 16A is a screen shot of an exemplary demand file input into the auditing system.

FIG. 16A is a screen shot 1600 of an exemplary demand file 1602 input into the auditing system. The demand file 1602 includes header information 1604 and line items 1606. The line items include information, such as, the line item, the entry number, the labor type, the operation, the line item description, the part type/part number, the dollar amount, the labor units, and the C&G unit. While the demand file 1602 is an automobile demand file, this is for exemplary purposes only, as any type of claim file can be used with the present system.

Figure 16B:
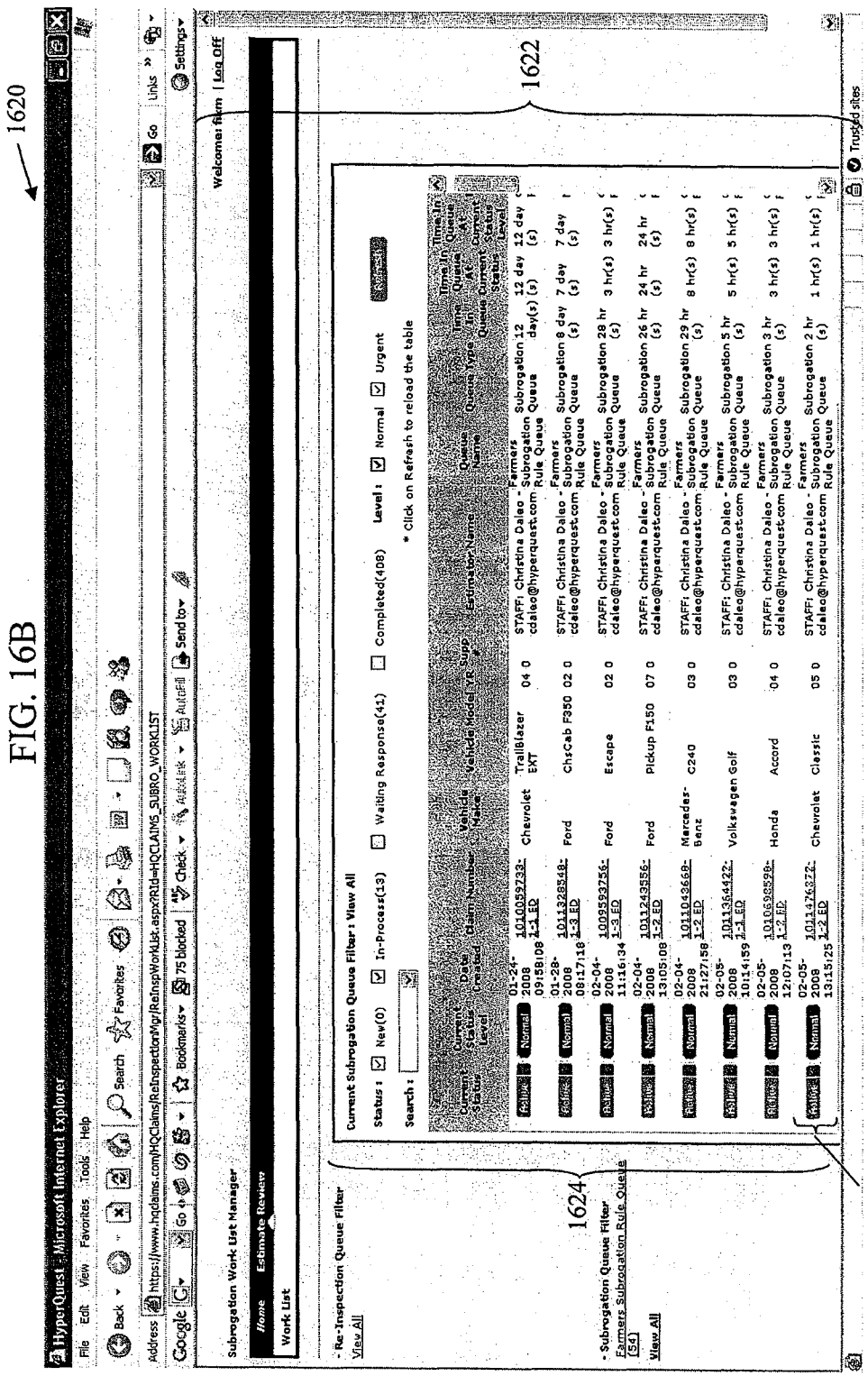

FIGS. 16B-16F are exemplary screen shots of an exemplary web utility used to carry out features of the subject invention. FIG. 16B is an exemplary screen shot 1620 of a subrogation work list manager 1622. The subrogation work list manager 1622 includes the current subrogation queue filter window 1624. The current subrogation queue filter window 1624 includes information for a plurality of claim files 1626, including, for example, the current status and the current status level. Claim files with a status of "Active" and a level of "Normal" are ready for a user of the web utility to view.

Figure 16C:
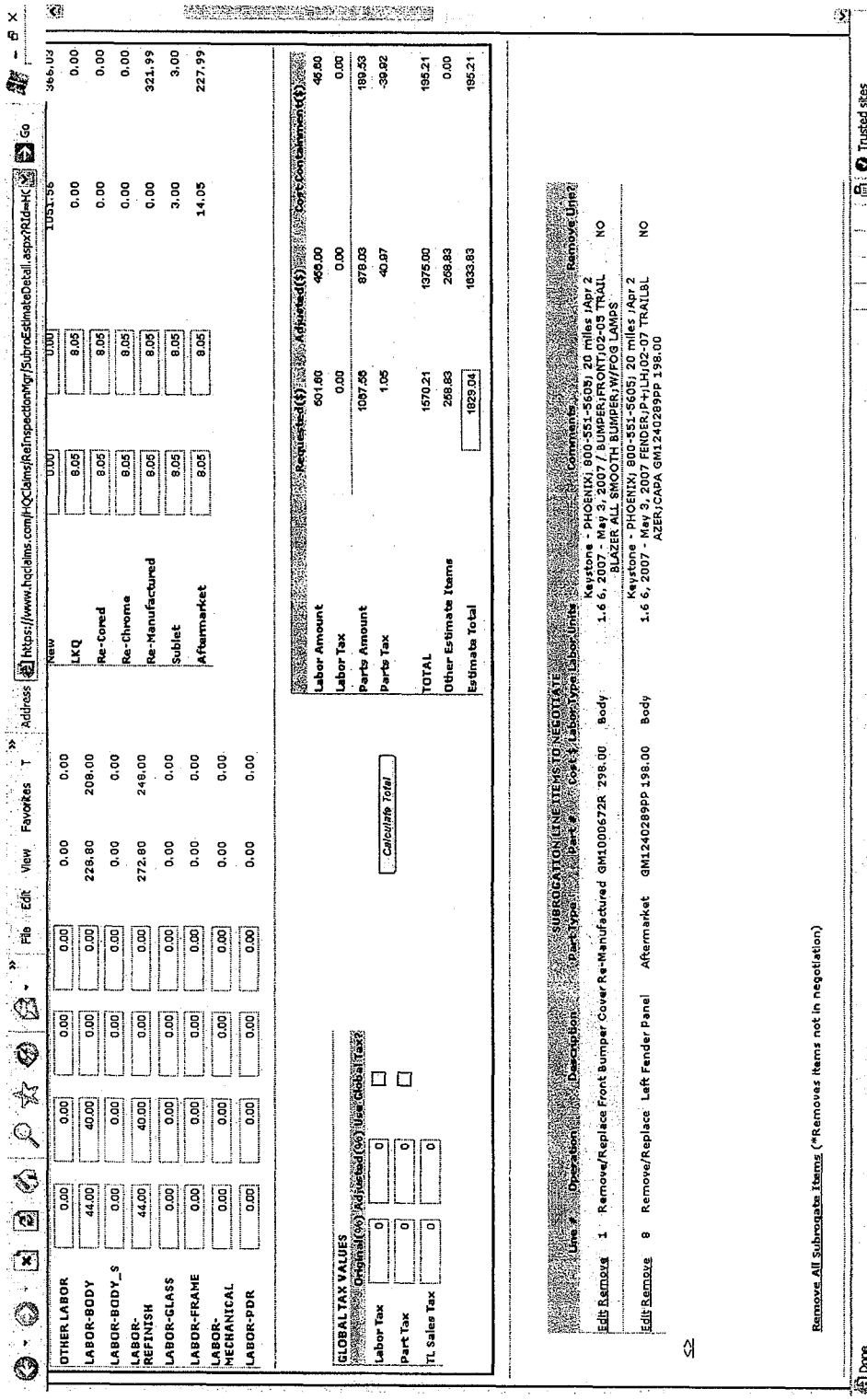
Figure 16D:
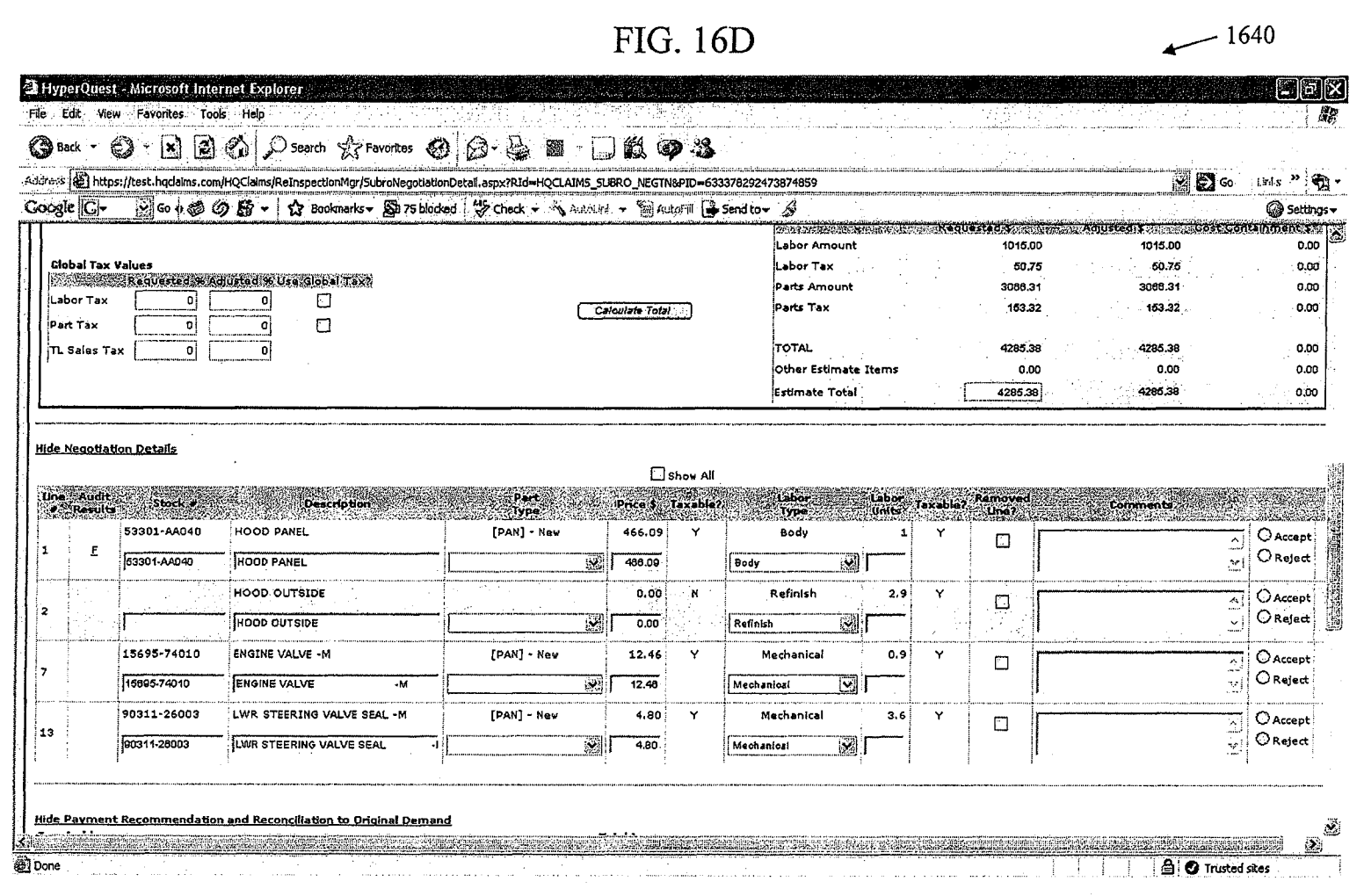
Figure 16E:
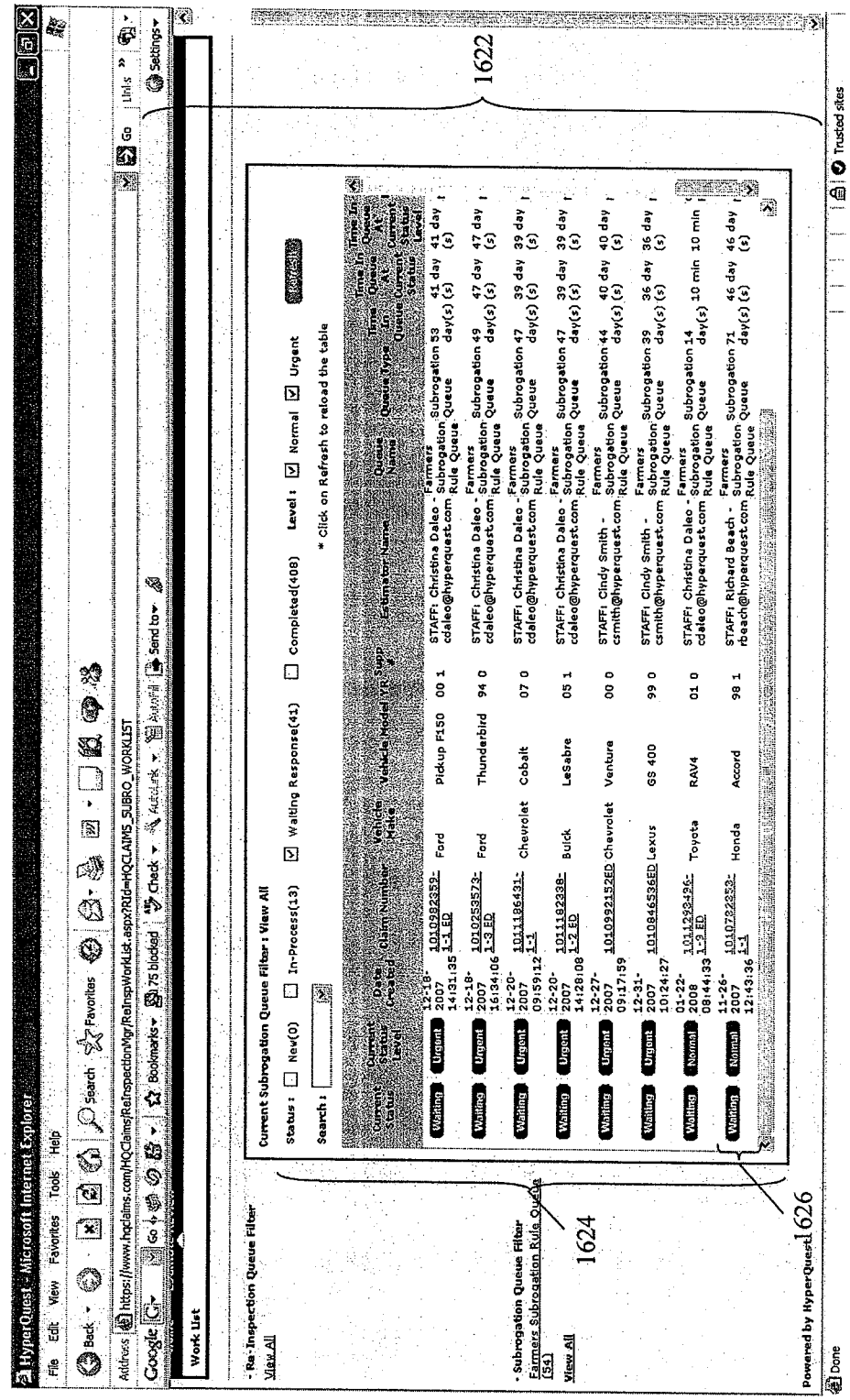

FIG. 16C is an exemplary screen shot of a claim breakdown window 1630 (e.g., for a claim file 1626 of FIG. 16B. The user of the web utility can, for example, view the parts and non-parts audit responses, determine which to settle, and move the claim to the negotiation review screen (SEE FIG. 16D). FIG. 16D is an exemplary screen shot of a negotiation review screen 1640. The user can contact the adverse carrier and settle the claim from the negotiation review screen 1640. As the claim is settled, the user can update the fields to reflect the desired changes on the final agreed estimate. FIG. 16E is a second exemplary view of the subrogation queue filter window 1624 of the subrogation work list manager 1622 of FIG. 16B. Once the user has settled the demand with the adverse carrier and updated the agreed changes, the status is changed to "Waiting" and the level remains "Normal." When the final estimate is updated with changes, the level changes to "Urgent" and the user can then access the claim and print the final estimate.

Figure 16F:
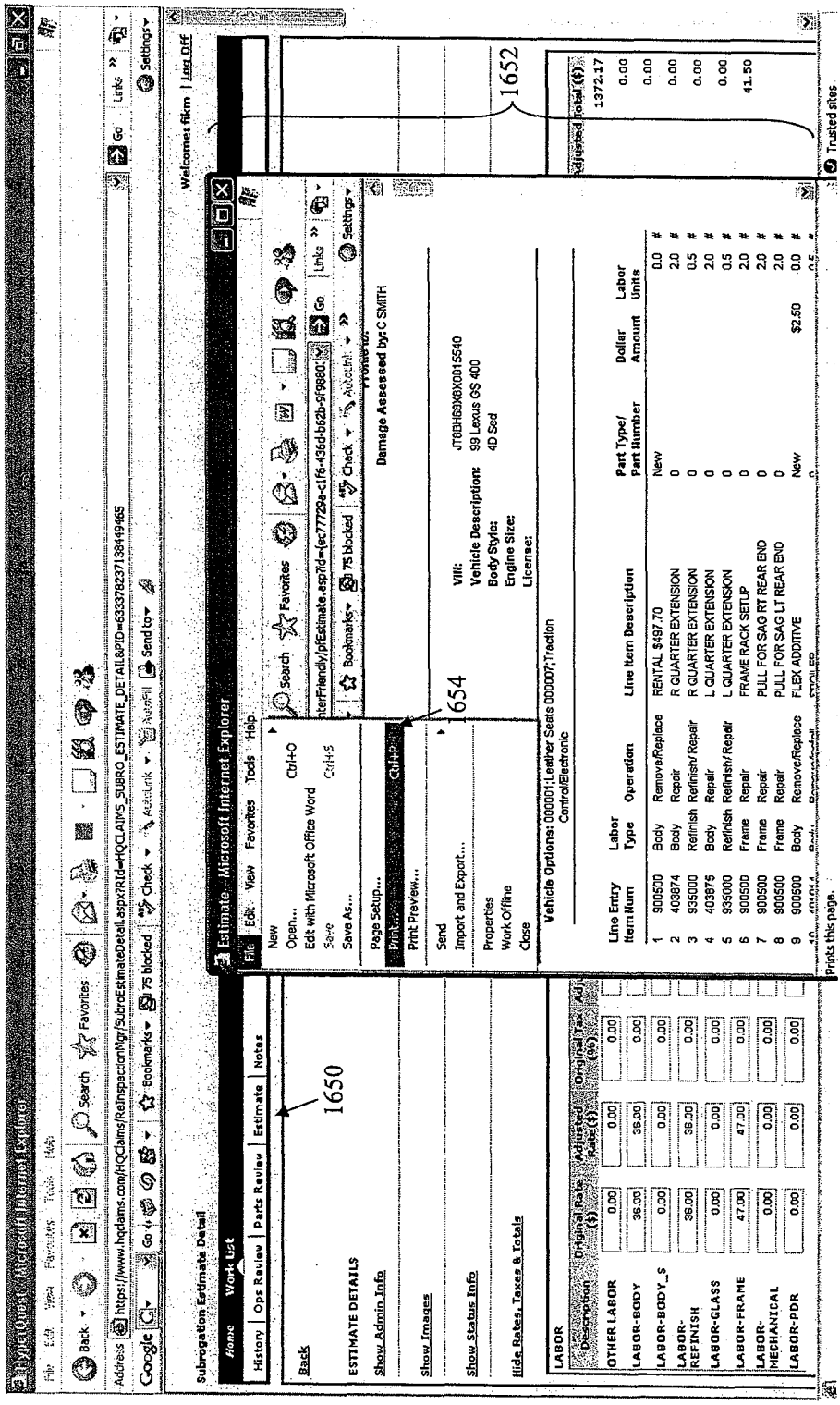
Figure 16G:
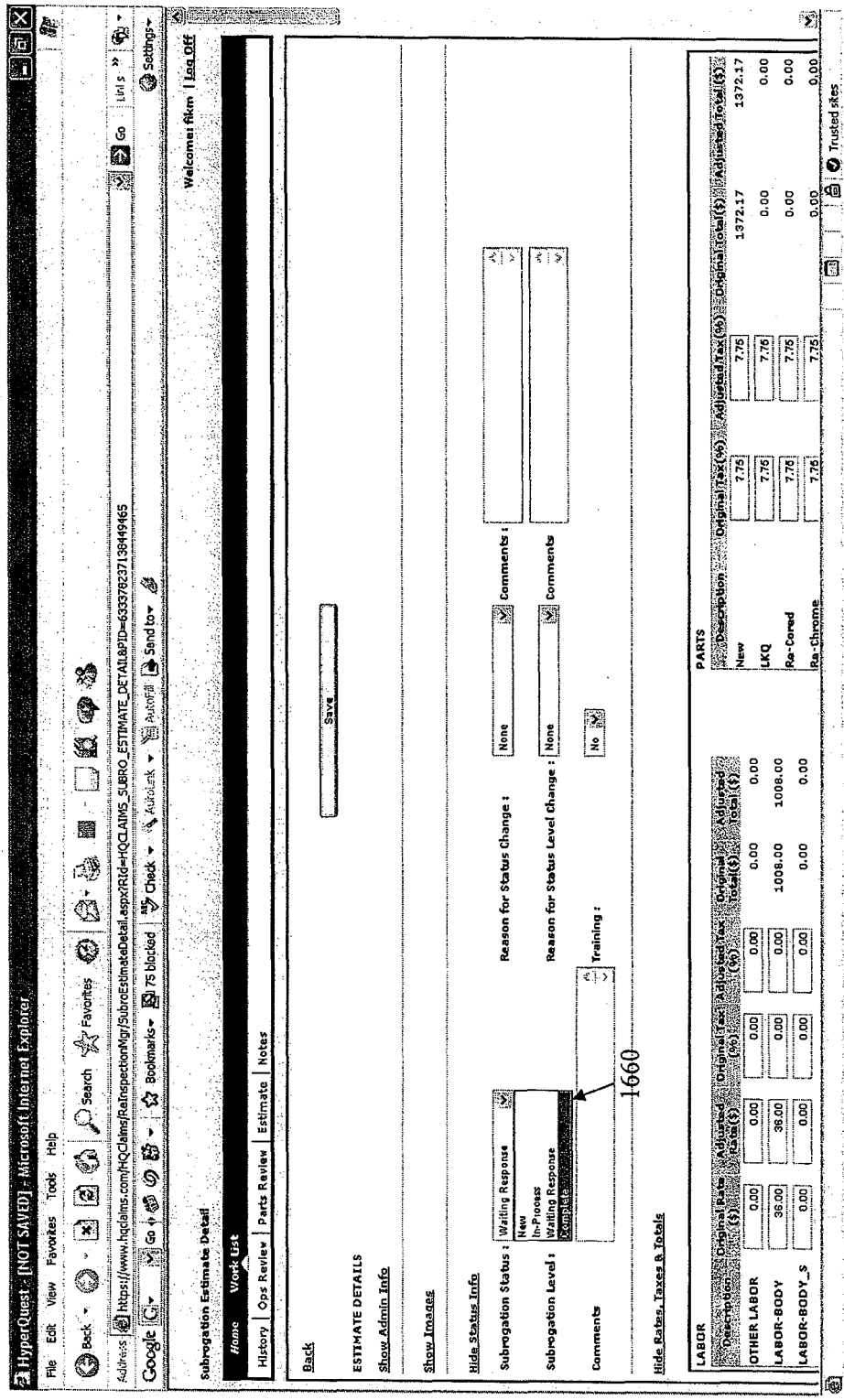

FIGS. 16E and 16F are an exemplary screen shot of the claim breakdown window 1630 of FIG. 16C. The user selects the "Estimate" option 1650 to view an updated final estimate 1652 with all adjustments incorporated. The user can select print 1654 to print the estimate to a document that can be uploaded to the claim file. The subrogation status changes to "Complete" 1660 after the final estimate has been printed. This action, for example, removes the claim file from the subrogation queue 1624 and places the file in a completed queue.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit). Subroutines can refer to portions of the computer program and/or the processor/special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Generally, a computer also includes, or is operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components.

The computing system can include clients and servers. A client and a server are generally remote from each other and typically interact through a communication network. The relationship of client and server arises by virtue of computer programs running on the respective computers and having a client-server relationship to each other.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A computerized auditing method comprising:
   receiving, via a processor, a data file comprising one or more auditable items;
   extracting, using the processor, a word string from each auditable item;
   translating, using the processor, each word string using one or more translation steps into a translated item description;
   for each translated item description:
      comparing, using the processor, the translated item description to a plurality of terms;
      generating, using the processor, a matching table comprising one or more entries, wherein each entry of the matching table comprises a matching term from the plurality of terms and matching information, the matching information comprising a match characteristic between the translated item description and the term and an item identifier;
      determining, using the processor, whether the match characteristic for each entry is below a predetermined threshold;
      when the match characteristic is below the predetermined threshold, removing, using the processor, the entry from the matching table;
      determining, using the processor, whether one entry of the matching table comprises a best match;
      when one entry comprises the best match, associating, using the processor, the item identifier of the one entry with the translated item description;
   accepting, using the processor, or rejecting each auditable item associated with an item identifier based on the item identifier and one or more rules associated with the data file; and generating, using the processor, an audit report.

2. The method of claim 1, wherein the insurance claim file includes a demand for subrogation.

3. A computerized auditing method comprising:
   receiving, via a processor, a data file comprising one or more auditable items, each auditable item comprising a word string having one or more words;
   translating, using the processor, each word string into a translated item description, wherein translating comprises:
      determining, using the processor, whether the word string comprises a primary name;
      when the word string comprises a primary item name, calculating, using the processor, the translated item description based on the primary name; and
   comparing, using the processor, each translated item description to a plurality of predetermined terms to generate matching information;
   associating, using the processor, each translated item description with an item identifier based on the matching information; and
   accepting, using the processor, or rejecting each auditable item based on the item identifier and one or more rules associated with the data file.

4. A computerized auditing method comprising:
   receiving, using the processor, a data file comprising one or more auditable items, each auditable item comprising a word string having one or more words;
   translating, using the processor, each word string for each auditable item into a translated item description, wherein translating each word string comprises:
      generating, using the processor, relationship information between two or more words of the word string based on a classification of each word of the word string;
      determining, using the processor, whether each word of the word string is associated with the relationship information;
      when each word of the word string is associated with the relationship information, calculate, using the processor, the translated item description based on the relationship information; and
   comparing, using the processor, each translated item description to a plurality of predetermined terms to generate matching information;
   associating, using the processor, each translated item description with an item identifier based on the matching information; and
   accepting, using the processor, or rejecting each auditable item based on the item identifier and one or more rules associated with the data file.

5. An apparatus comprising:
   an auditing system configured to receive a data file comprising one or more auditable items, each auditable item comprising a word string having one or more words; and
   a translator in communication with the auditing apparatus configured to:
      translate each word string for each auditable item using one or more translation steps into a translated item description;
      compare each translated item description to a plurality of terms to generate matching information;
      associate each translated item description with an item identifier based on the matching information; and
      accept or reject each auditable item based on the item identifier and one or more rules associated with the data file;
   wherein the auditing system and the translator comprise a processor in communication with a database.

6. The apparatus of claim 5 further comprising a text recognition unit in communication with the audit unit and the translator configured to recognize the text of the data file.

7. The apparatus of claim 5 further comprising an output unit configured to generate an audit report, the audit report comprising an audit result for each auditable item of the data file.

8. The apparatus of claim 5 further comprising a database in communication with the translator configured to store one or more rules, the one or more rules being used to translate the word string.

9. A computer program product, tangibly embodied in a non-transitory computer readable storage medium, the computer program product including instructions being operable to cause a data processing apparatus to:
   receive a data file comprising one or more auditable items, each auditable item comprising a word string having one or more words;
   translate each word string for each auditable item using one or more translation steps into a translated item description;
   compare each translated item description to a plurality of terms to generate matching information;
   associate each translated item description with an item identifier based on the matching information; and
   accept or rejecting each auditable item based on the item identifier and one or more rules associated with the data file.

10. A computerized auditing method comprising:
    receiving, at a processor, a data file comprising one or more auditable items, each auditable item comprising a word string having one or more words;
    translating, at said processor, each word string for each auditable item using one or more translation steps into a translated item description;
    comparing, at said processor, each translated item description to a plurality of terms to generate matching information;
    associating, at said processor, each translated item description with an item identifier based on the matching information; and
    accepting or rejecting, at said processor, each auditable item based on the item identifier and one or more rules associated with the data file.

11. The method of claim 10, wherein the auditable items include one or more operational items, the one or more operational items including an identity of an operational item that does not involve replacement of a vehicle part.

12. A computerized auditing method comprising:
    translating, using a processor, a word string of an auditable item using one or more translation steps into a translated item description, wherein the auditable item is a line item from an insurance claim file; and
    using the processor, accepting or rejecting the auditable item based on the translating, wherein the accepting includes automatically approving part selections on behalf of an insurer.

13. The method of claim 12, wherein the accepting includes documenting historical parts availability for subrogation reviewers.

14. A computerized auditing method comprising:
    receiving, via a processor, a data file comprising one or more auditable items, each auditable item being a line item from an insurance claim file, where each auditable item comprises a word string having one or more words;
    translating, using the processor, each word string for each auditable item using one or more translation steps into a translated item description, including automatically translating an operational item from the one or more auditable items, the operational item being an auditable item that does not involve a physical removal of a vehicle part or replacement of a vehicle part with a replacement part;
    associating, using the processor, each translated item description with an item identifier; and
    using the processor, accepting or rejecting each auditable item based on the item identifier and one or more rules associated with the data file.

15. The method of claim 14, wherein the data file is associated with a subrogation demand.

16. The method of claim 14, wherein the insurance claim file includes a demand for subrogation.

17. A computerized auditing method comprising:
    receiving, via a processor, an insurance data file comprising one or more auditable items, each auditable item comprising a word string having one or more words;
    translating, using the processor, each word string for each auditable item using one or more translation steps into a translated item description, including automatically translating an operational item from the one or more auditable items, the operational item being an auditable item that does not involve replacement of a vehicle part with a replacement part;
    associating, using the processor, each translated item description with an item identifier; and
    using the processor, accepting an auditable item based on the item identifier and one or more rules associated with the data file.

18. The method of claim 17, wherein the data file is associated with a subrogation demand.

19. A computerized vehicle insurance auditing system comprising:
    a processor coupled to a nontransitory computer readable storage medium having stored therein software instructions that, when executed by the processor, cause the processor to perform a series of operations including:
    receiving, via the processor, a data file comprising one or more auditable items, each auditable item being a line item from an insurance claim file, each auditable item comprising a word string having one or more words;
    translating, using the processor, each word string for each auditable item using one or more translation steps into a translated item description;
    associating, using the processor, each translated item description with an item identifier; and
    using the processor, automatically determining whether to accept or reject each auditable item based on the item identifier and one or more rules associated with the data file.

20. The system of claim 19, wherein the insurance claim file includes a demand for subrogation.

21. A nontransitory computer readable storage medium having stored therein software instructions that, when executed by a processor, cause the processor to perform a series of operations including:
    receiving an insurance data file comprising one or more auditable items, each auditable item comprising a word string having one or more words;
    translating each word string for each auditable item using one or more translation steps into a translated item description;
    comparing each translated item description to a plurality of terms to generate matching information;
    associating each translated item description with an item identifier based on the matching information; and determining whether to accept or reject each auditable item based on the item identifier and one or more rules associated with the data file.

22. The medium of claim 21, wherein the insurance claim file includes a demand for subrogation.

* * * * *